(12) United States Patent
Okumura et al.

(10) Patent No.: US 10,975,305 B2
(45) Date of Patent: Apr. 13, 2021

(54) PIPERIDINE DERIVATIVE, LIQUID CRYSTAL COMPOSITION, AND LIQUID CRYSTAL DISPLAY ELEMENT

(71) Applicants: JNC CORPORATION, Tokyo (JP); JNC PETROCHEMICAL CORPORATION, Tokyo (JP)

(72) Inventors: Kazuo Okumura, Chiba (JP); Michiko Sawada, Chiba (JP)

(73) Assignees: JNC CORPORATION, Tokyo (JP); JNC PETROCHEMICAL CORPORATION, Tokyo (JP)

( * ) Notice: Subject to any disclaimer, the term of this patent is extended or adjusted under 35 U.S.C. 154(b) by 108 days.

(21) Appl. No.: 16/231,953

(22) Filed: Dec. 25, 2018

(65) Prior Publication Data
US 2019/0194542 A1 Jun. 27, 2019

(30) Foreign Application Priority Data
Dec. 26, 2017 (JP) ............... JP2017-249713

(51) Int. Cl.
*G02F 1/1333* (2006.01)
*C09K 19/34* (2006.01)
(52) U.S. Cl.
CPC ................ *C09K 19/3444* (2013.01)
(58) Field of Classification Search
CPC ............ C09K 19/3444; G02F 1/1333
USPC ..................................... 252/299.61
See application file for complete search history.

(56) References Cited

U.S. PATENT DOCUMENTS

| 9,434,883 B2* | 9/2016 | Furusato | C09K 19/20 |
| 9,441,162 B2* | 9/2016 | Furusato | C09K 19/3483 |
| 2019/0194542 A1* | 6/2019 | Okumura | C09K 19/3444 |

FOREIGN PATENT DOCUMENTS

WO  2017154590  3/2018

* cited by examiner

*Primary Examiner* — Geraldina Visconti
(74) *Attorney, Agent, or Firm* — JCIPRNET

(57) ABSTRACT

To provide a compound having an effect of preventing photodegradation of a liquid crystal composition and high solubility in a liquid crystal composition, a liquid crystal composition containing the compound, and a liquid crystal display element containing the composition.

There are provided a compound represented by M(Z-Q)m, a liquid crystal composition containing the compound, and a liquid crystal display element using the composition. Here, m is 3, 4, or 5; M is a trivalent, tetravalent, or pentavalent cyclic group, an organic group, or a group constituted by trivalent nitrogen; Z is a single bond, —O—, —COO—, or —OCO—; and Q is a monovalent group represented by Formula (Q-1):

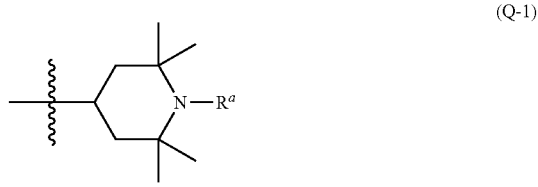

(Q-1)

in Formula (Q-1), $R^a$ is a hydrogen atom, —O., —OH, an alkyl group, or an alkenyl group, a terminal group (—$CH_3$) is optionally substituted with —$NHR^2$ or —$NR^3R^4$, and here $R^3$ and $R^4$ are an alkyl group.

14 Claims, No Drawings

PIPERIDINE DERIVATIVE, LIQUID CRYSTAL COMPOSITION, AND LIQUID CRYSTAL DISPLAY ELEMENT

CROSS-REFERENCE TO RELATED APPLICATION

This application claims the priority of Japan patent application serial no. 2017-249713, filed on Dec. 26, 2017. The entirety of the above-mentioned patent application is hereby incorporated by reference herein and made a part of this specification.

BACKGROUND

Technical Field

The disclosure relates to a compound having a piperidine ring, a liquid crystal composition, and a liquid crystal display element, and more specifically, to a compound having a tetramethylpiperidinyl group, a liquid crystal composition including the compound and having positive or negative dielectric anisotropy, and a liquid crystal display element including the composition.

Description of Related Art

Liquid crystal display elements are classified into phase change (PC), twisted nematic (TN), super twisted nematic (STN), electrically controlled birefringence (ECB), optically compensated bend (OCB), in-plane switching (IPS), vertical alignment (VA), fringe field switching (FFS), and field-induced photo-reactive alignment (FPA) based on operation modes of liquid crystal molecules. Liquid crystal display elements are classified as passive matrix (PM) and active matrix (AM) based on an element drive scheme. PMs are classified into static and multiplex matrixes. AMs are classified as thin film transistor (TFT), and metal insulator metal (MIM). TFTs are classified into those of amorphous silicon and polysilicon (polycrystalline silicon). The latter is classified into a high temperature type and a low temperature type according to a production process. Liquid crystal display elements are classified into a reflective type that uses natural light, a transmissive type that uses a backlight, and a semi-transmissive type that uses both natural light and a backlight based on a light source.

A liquid crystal display element contains a liquid crystal composition having a nematic phase. This composition has appropriate characteristics. It is possible to obtain an AM element having favorable characteristics by improving characteristics of this composition. The relationship between these characteristics is summarized in the following Table 1. Characteristics of the composition will be further described based on commercially available AM elements. A temperature range of the nematic phase is related to a temperature range in which the element can be used. A preferable upper limit temperature of the nematic phase is about 70° C. or higher, and a preferable lower limit temperature of the nematic phase is about −10° C. or lower. The viscosity of the composition is related to a response time of the element. In order to display a moving image with elements, a short response time is preferable. A shorter response time is desirable even if it is only by 1 millisecond. Therefore, a lower viscosity in the composition is preferable. A lower viscosity at low temperatures is more preferable.

TABLE 1

Characteristics of compositions and characteristics of AM elements

| Number | Characteristics of composition | Characteristics of AM element |
|---|---|---|
| 1 | Wide temperature range of a nematic phase | Wide temperature range in which the element can be used |
| 2 | Low viscosity | Short response time |
| 3 | Appropriate optical anisotropy | Large contrast ratio |
| 4 | Large positive or negative dielectric anisotropy | Low threshold voltage, low power consumption, and large contrast ratio |
| 5 | Large specific resistance | High voltage holding ratio and large contrast ratio |
| 6 | Stable with respect to ultraviolet radiation and heat | Long lifespan |
| 7 | Large elastic constant | Large contrast ratio and short response time |

The optical anisotropy of the composition is related to a contrast ratio of the element. According to a mode of the element, large optical anisotropy or small optical anisotropy, that is, appropriate optical anisotropy is necessary. A product ($\Delta n \times d$) of the optical anisotropy ($\Delta n$) of the composition and the cell gap (d) of the element is designed to maximize the contrast ratio. An appropriate product value depends on the type of operation mode. In an element having a small cell gap, a composition having large optical anisotropy is preferable. Large dielectric anisotropy in the composition contributes to a low threshold voltage, low power consumption, and a large contrast ratio in the element. Therefore, large positive or negative dielectric anisotropy is preferable. A large specific resistance in the composition contributes to a high voltage holding ratio and a large contrast ratio in the element. Therefore, a composition having a large specific resistance in an initial stage is preferable. A composition having a large specific resistance after long term use is preferable. The stability of the composition with respect to ultraviolet radiation and heat is related to a lifespan of the element. When this stability is higher, the lifespan of the element is longer. Such a characteristic is preferable for an AM element used in a computer monitor and a liquid crystal television.

In a polymer sustained alignment (PSA) type liquid crystal display element, a liquid crystal composition containing a polymer is used. First, a composition to which a small amount of a polymerizable compound is added is inserted into the element. Next, ultraviolet rays are emitted to the composition while a voltage is applied between substrates of the element. The polymerizable compound is polymerized and forms a polymer network structure in the composition. In this composition, since it is possible to control alignment of liquid crystal molecules according to the polymer, a response time of the element is shortened and image burn is lessened. Such effects of the polymer can be expected for elements having modes such as TN, ECB, OCB, IPS, VA, FFS, and FPA.

A liquid crystal composition is prepared by mixing liquid crystalline compounds. Additives such as a polymerizable compound, a polymerization initiator, a polymerization inhibitor, an optically active compound, an antioxidant, a UV absorber, a light stabilizer, a heat stabilizer, and an antifoaming agent are added to this composition as necessary. Among these, the light stabilizer has an effect of preventing the liquid crystalline compounds from being decomposed due to light from a backlight or sun. Since the element maintains a high voltage holding ratio due to this effect, the lifespan of the element become longer. A hindered amine light stabilizer (HALS) is suitable for such a purpose, but the development of better light stabilizers is expected.

[Patent Document 1] PCT International Publication No. WO 2017-154590

SUMMARY

One aspect of the disclosure is to provide a compound for preventing photodegradation of a liquid crystal composition and having high solubility in a liquid crystal composition. Another aspect is to provide a liquid crystal composition which contains the compound and has at least one of characteristics such as a high upper limit temperature of a nematic phase, a low lower limit temperature of a nematic phase, a low viscosity, appropriate optical anisotropy, large positive or negative dielectric anisotropy, a large specific resistance, high stability with respect to ultraviolet rays, high stability with respect to heat, and a large elastic constant. Another aspect is to provide a liquid crystal composition that is stable with respect to light. Still another aspect is to provide a liquid crystal display element which contains the composition and has a wide temperature range in which the element can be used, a short response time, a high voltage holding ratio, a low threshold voltage, a large contrast ratio, a low flicker rate, and a prolonged lifespan.

The disclosure relates to a compound represented by Formula (1), a liquid crystal composition containing the compound, and a liquid crystal display element containing the composition.

$$M(Z-Q)_m \quad (1)$$

in Formula (1), M is one selected from among a nitrogen atom, a trivalent cyclic organic group, a tetravalent cyclic organic group, and a pentavalent cyclic organic group; Z is a single bond, —O—, —COO—, or —OCO—; Q is a monovalent group represented by Formula (Q-1), and m is 3, 4 or 5,

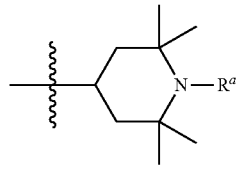

(Q-1)

In Formula (Q-1), $R^a$ is a hydrogen atom, —O., —OH, or —$R^1$, and here $R^1$ is an alkyl group having 1 to 20 carbon atoms or an alkenyl group having 2 to 20 carbon atoms, and in this alkyl or alkenyl group, at least one —$CH_2$— is optionally substituted with —O—, —CO—, —COO—, or —OCO—, a terminal group (—$CH_3$) is optionally substituted with —$NHR^2$ or —$NR^3R^4$, and here $R^2$, $R^3$, and $R^4$ are an alkyl group having 1 to 10 carbon atoms.

DESCRIPTION OF THE EMBODIMENTS

A compound of the disclosure is capable of preventing photodegradation of a liquid crystal composition and high solubility in a liquid crystal composition. Compared to analogous compounds, the compound has favorable compatibility with a liquid crystalline compound (refer to Comparative Example 1). A liquid crystal composition of the disclosure contains the compound and has at least one of characteristics such as a high upper limit temperature of a nematic phase, a low lower limit temperature of a nematic phase, a low viscosity, appropriate optical anisotropy, large positive or negative dielectric anisotropy, a large specific resistance, high stability with respect to ultraviolet rays, high stability with respect to heat, and a large elastic constant. The liquid crystal composition of the disclosure is stable with respect to light. A liquid crystal display element of the disclosure contains the composition and has a wide temperature range in which the element can be used, a short response time, a high voltage holding ratio, a low threshold voltage, a large contrast ratio, a low flicker rate, and a prolonged lifespan.

The terms used herein are used as follows. The terms "liquid crystal composition," and "liquid crystal display element" may be abbreviated as a "composition" and an "element." A "liquid crystal display element" generally refers to a liquid crystal display panel and a liquid crystal display module. A "liquid crystalline compound" generally refers to a compound having a liquid crystal phase such as a nematic phase or a smectic phase and a compound which does not have a liquid crystal phase and is mixed into a composition in order to adjust characteristics such as a temperature range of a nematic phase, a viscosity, and dielectric anisotropy. This compound has a six-membered ring, for example, 1,4-cyclohexylene and 1,4-phenylene and has rod-like molecules (liquid crystal molecules). A "polymerizable compound" is a compound that is added to form a polymer in the composition. A liquid crystalline compound having an alkenyl group is not classified as a polymerizable compound in that sense.

A liquid crystal composition is prepared by mixing a plurality of liquid crystalline compounds. Additives such as an optically active compound and a polymerizable compound are added to this liquid crystal composition as necessary. When additives are added, a proportion of a liquid crystalline compound is expressed as a weight percentage (weight %) based on a weight of a liquid crystal composition containing no additives. A proportion of additives is expressed as a weight percentage (weight %) based on a weight of a liquid crystal composition containing no additives. That is, a proportion of a liquid crystalline compound or an additive is computed based on a total weight of a liquid crystalline compound.

An "upper limit temperature of a nematic phase" may be abbreviated as an "upper limit temperature." A "lower limit temperature of a nematic phase" may be abbreviated as a "lower limit temperature." The expression "increasing dielectric anisotropy" means that a value increases positively when a composition has positive dielectric anisotropy, and means that a value increases negatively when a composition has negative dielectric anisotropy. The expression "a voltage holding ratio is high" means that an element has a high voltage holding ratio not only at room temperature but also at a temperature close to an upper limit temperature in an initial stage and thus, after it is used for a long time, it has a high voltage holding ratio not only at room temperature but also at a temperature close to an upper limit temperature. Characteristics of compositions and elements may be examined by an aging test.

Formula (1z) will be exemplified. At least one compound selected from among compounds represented by Formula (1z) may be abbreviated as "Compound (1z)."

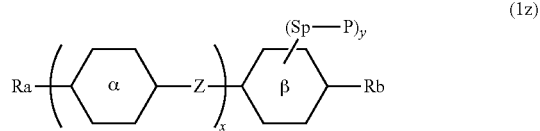

(1z)

"Compound (1z)" refers to one compound represented by Formula (1z), a mixture of two compounds, or a mixture of three or more compounds. These rules apply to compounds represented by other formulae. The expression "at least one compound selected from among compounds represented by Formula (1z) and Formula (2z)" means at least one compound selected from the group of Compound (1z) and Compound (2z).

In Formula (1z), the expression "Ra and Rb are an alkyl group, an alkoxy group, or an alkenyl group" means that Ra and Rb are independently selected from among an alkyl group, an alkoxy group, and an alkenyl group. That is, a group represented by Ra and a group represented by Rb may be the same as or different from each other. These rules also apply to a case in which the symbol Ra is used for a plurality of compounds. These rules also apply to a case in which a plurality of Ra's are used for one compound.

In Formula (1z), symbols such as α and β surrounded by a hexagon correspond to a ring α and a ring β, which indicates a ring such as a six-membered ring or a condensed ring. When the suffix 'x' is 2, there are two rings α. Two groups represented by two rings α may be the same as or different from each other. These rules also apply to any two rings α when the suffix 'x' is greater than 2. An oblique line crossing one side of the ring β indicates that any hydrogen atom on the ring β is optionally substituted with a substituent (-Sp-P). The suffix 'y' indicates the number of substituents substituted. When the suffix 'y' is 0, there is no such substitution. When the suffix 'y' is 2 or more, there are a plurality of substituents (-Sp-P) on the ring β. The rule "may be the same as or different from each other" applies even if the compound has the same substituents.

The expression "at least one 'A'" means that the number of 'A's' is arbitrary. The expression "at least one 'A' is optionally substituted with 'B'" means that, when the number of 'A's' is 1, the position on 'A' is arbitrary and when the number of 'A's' is two or more, the positions thereon can be selected without limitation. The expression "at least one —CH$_2$— is optionally substituted with —O—" may be used. In this case, —CH$_2$—CH$_2$—CH$_2$— may be converted into —O—CH$_2$—O— when non-adjacent —CH$_2$'s-are substituted with —O—. However, adjacent —CH$_2$'s-are not substituted with —O—. This is because, in this substitution, —O—O—CH$_2$— (peroxide) is formed.

An alkyl group of the liquid crystalline compound is linear or branched, and does not have a cyclic alkyl group. A linear alkyl group is preferable to a branched alkyl group. This similarly applies to terminal groups such as an alkoxy group and an alkenyl group. Regarding the configuration of 1,4-cyclohexylene, the trans type is preferable to the cis type in order to increase an upper limit temperature. Since 2-fluoro-1,4-phenylene is asymmetric in the left to right direction, there are leftward (L) and rightward (R).

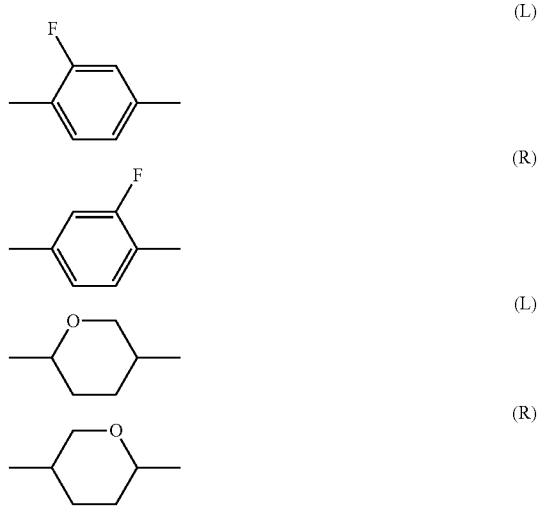

This also similarly applies to divalent groups such as tetrahydropyran-2,5-diyl. This also similarly applies to bonding groups (—COO— or —OCO—) such as a carbonyloxy group.

The disclosure includes the following items and the like.

Item 1. A compound represented by Formula (1):

$$M(Z-Q)m \qquad (1)$$

in Formula (1), M is one selected from among a nitrogen atom, a trivalent cyclic organic group, a tetravalent cyclic organic group, and a pentavalent cyclic organic group; Z is a single bond, —O—, —COO—, or —OCO—; Q is a monovalent group represented by Formula (Q-1), and m is 3, 4 or 5,

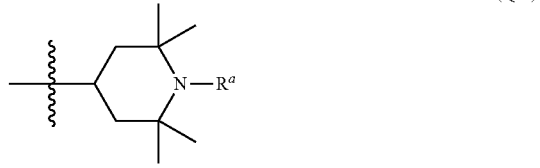

(Q-1)

in Formula (Q-1), R$^a$ is a hydrogen atom, —O., —OH, or —R$^1$, and R$^1$ is an alkyl group having 1 to 20 carbon atoms or an alkenyl group having 2 to 20 carbon atoms, and in this alkyl or alkenyl group, at least one —CH$_2$— is optionally substituted with —O—, —CO—, —COO—, or —OCO—, a terminal group (—CH$_3$) is optionally substituted with —NHR$^2$ or —NR$^3$R$^4$, and here R$^2$, R$^3$, and R$^4$ are an alkyl group having 1 to 10 carbon atoms.

Item 2. The compound according to Item 1, which is represented by Formula (1-1), Formula (1-2), or Formula (1-3):

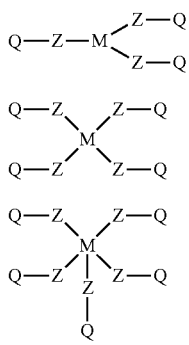

(1-1)

(1-2)

(1-3)

M of Formula (1-1) is a trivalent group represented by any one of Formula (M-1) to Formula (M-6), M of Formula (1-2) is a tetravalent cyclic group represented by any one of Formula (M-7) to Formula (M-11), M of Formula (1-3) is a pentavalent cyclic group represented by any one of Formula (M-12) and Formula (M-13), and in these groups, n is 0, 1, 2, or 3;

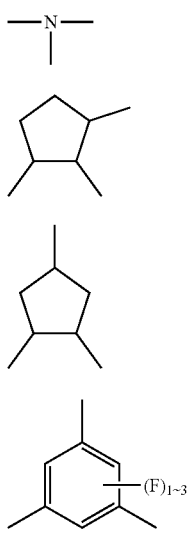

(M-1)

(M-2)

(M-3)

(M-4)

(M-5)

(M-6)

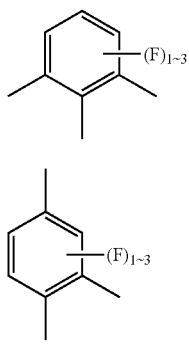

(M-7)

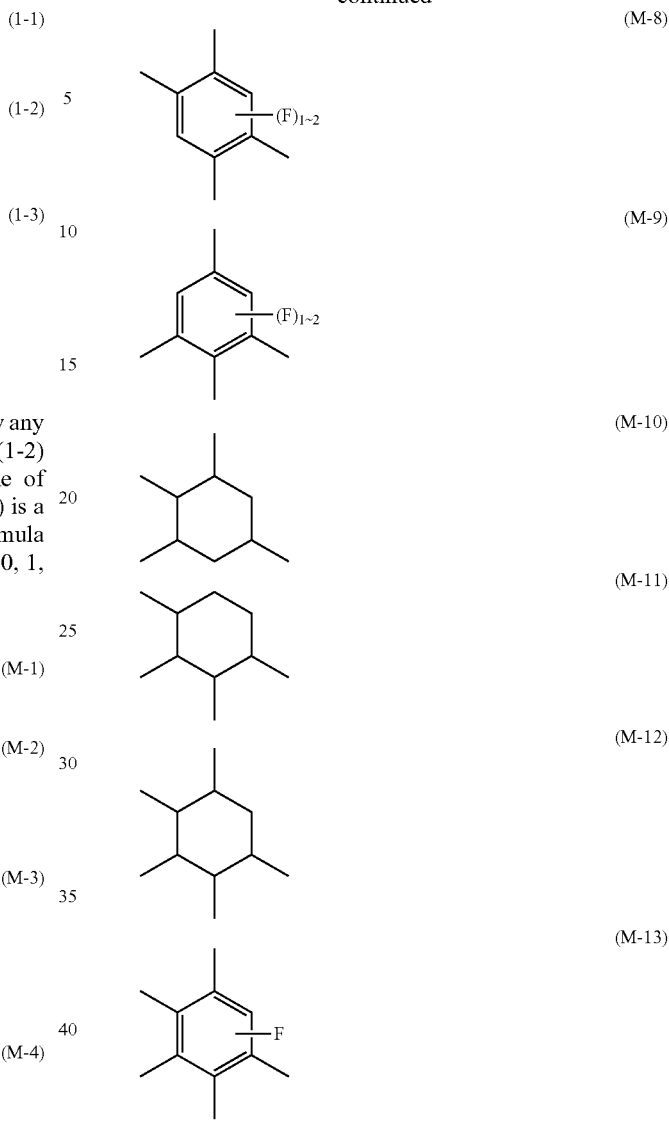

(M-8)

(M-9)

(M-10)

(M-11)

(M-12)

(M-13)

Z is a single bond, —O—, —COO—, or —OCO—; Q is a monovalent group represented by Formula (Q-1),

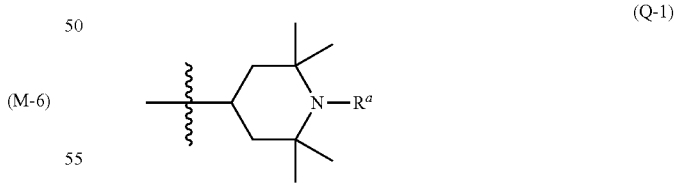

(Q-1)

in Formula (Q-1), $R^a$ is a hydrogen atom, —O., —OH, or —$R^1$ is an alkyl group having 1 to 12 carbon atoms or an alkenyl group having 2 to 12 carbon atoms, and in this alkyl or alkenyl group, at least one —$CH_2$— is optionally substituted with —O—, —CO—, —COO—, or —OCO—, a terminal group (—$CH_3$) is optionally substituted with —$NHR^2$ or —$NR^3R^4$, and here $R^2$, $R^3$, and $R^4$ are an alkyl group having 1 to 10 carbon atoms.

Item 3. The compound according to Item 1 or 2, which is represented by any one of Formula (1a) to Formula (1m):

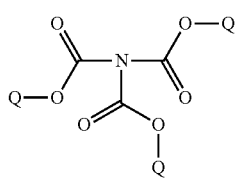 (1a)
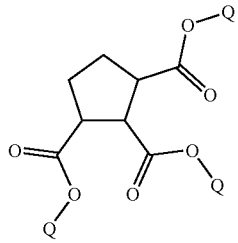 (1b)
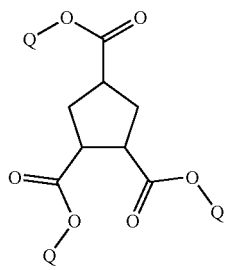 (1c)
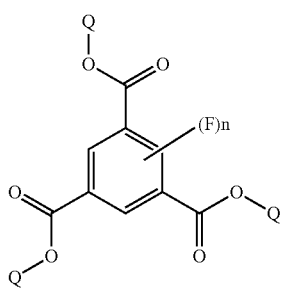 (1d)
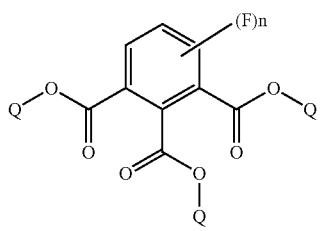 (1e)
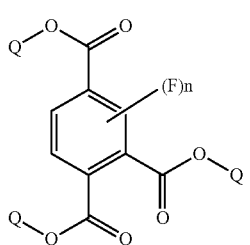 (1f)
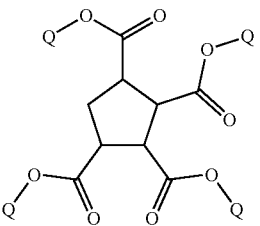 (1g)
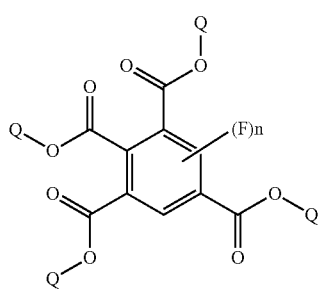 (1h)
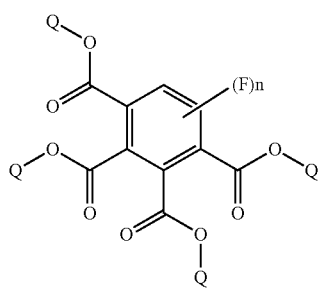 (1i)
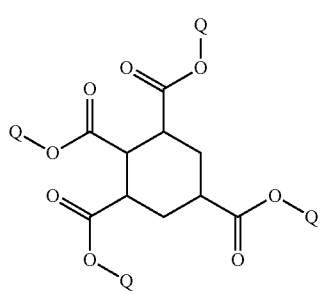 (1j)
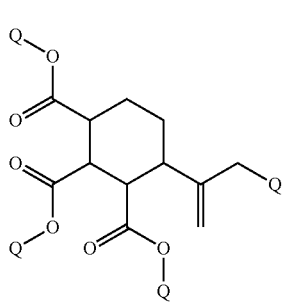 (1k)

-continued

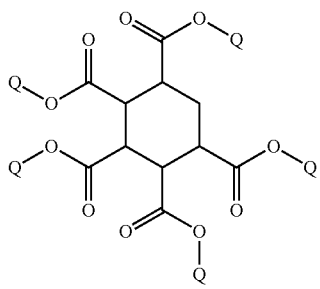
(1l)

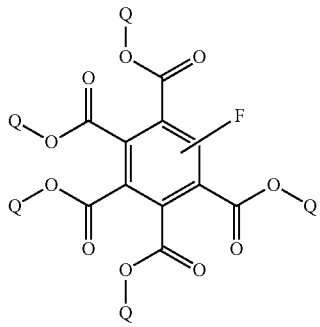
(1m)

in Formula (1a) to Formula (1m), n is 0 or 1; and Q is a monovalent group represented by Formula (Q-1),

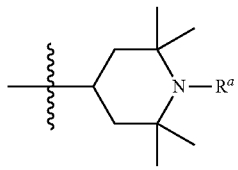
(Q-1)

in Formula (Q-1), $R^a$ is a hydrogen atom, —O., —OH, or —$R^1$, and here $R^1$ is an alkyl group having 1 to 10 carbon atoms or an alkenyl group having 2 to 10 carbon atoms, and in this alkyl or alkenyl group, one —CH$_2$— is optionally substituted with —O—, —CO—, —COO—, or —OCO—, a terminal group (—CH$_3$) is optionally substituted with —NHR$^2$ or —NR$^3$R$^4$, and here R$^2$, R$^3$, and R$^4$ are an alkyl group having 1 to 10 carbon atoms.

Item 4. The compound according to Item 3, which is represented by any one of Formula (1a) to Formula (1j), wherein, in Formula (1a) to Formula (1j), n is 0 or 1; and Q is a monovalent group represented by Formula (Q-1),

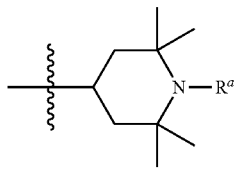
(Q-1)

in Formula (Q-1), $R^a$ is a hydrogen atom, —O., —OH, and alkyl group having 1 to 10 carbon atoms, or an alkoxy group having 1 to 10 carbon atoms.

Item 5. The compound according to Item 3, which is represented by any one of Formula (1a), Formula (1b), Formula (1c), Formula (1g), Formula (1j), and Formula (1k), wherein, in Formula (1a), Formula (1b), Formula (1c), Formula (1g), Formula (1j), and Formula (1k),

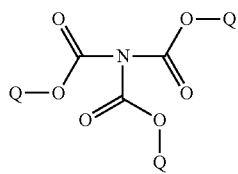
(1a)

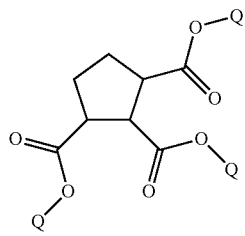
(1b)

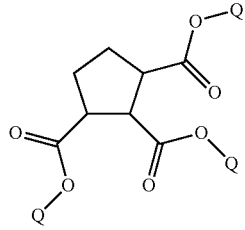
(1c)

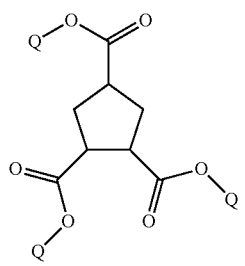
(1g)

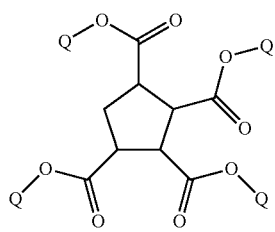
(1j)

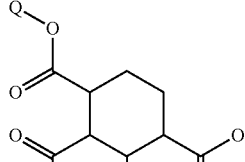
(1k)

Q is a monovalent group represented by Formula (Q-1),

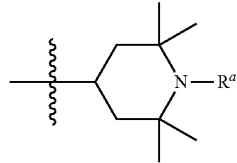
(Q-1)

in Formula (Q-1), $R^a$ is a hydrogen atom or an alkyl group having 1 to 10 carbon atoms.

Item 6. The compound according to any one of Items 1 to 5, which is represented by Formula (1a-1), Formula (1b-1), Formula (1c-1), Formula (1g-1), Formula (1j-1), or Formula (1k-1):

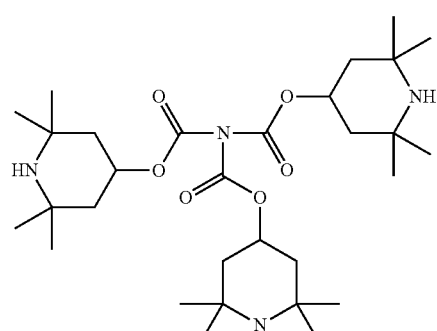
(1a-1)

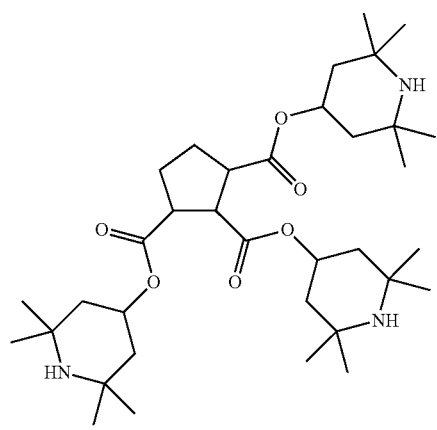
(1b-1)

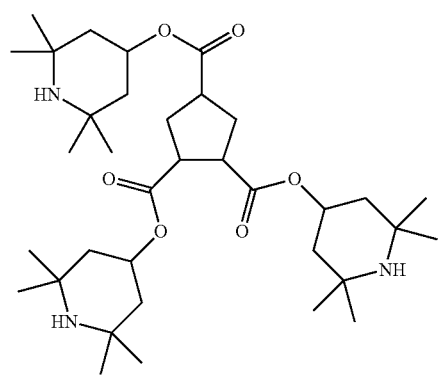
(1c-1)

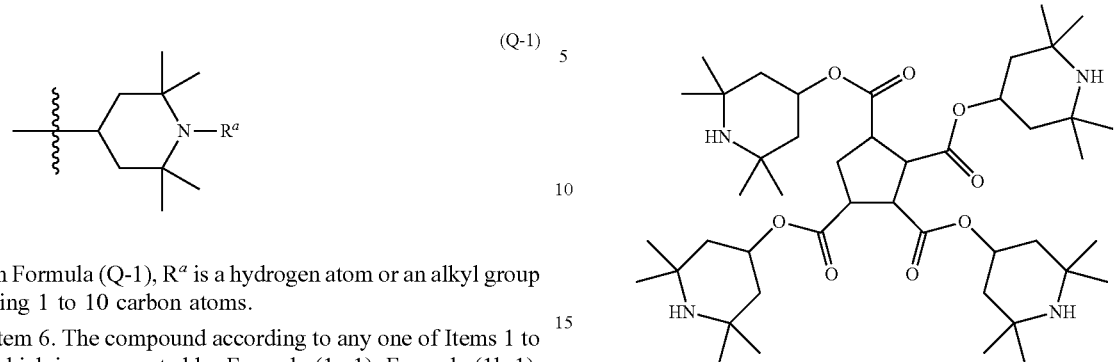
(1g-1)

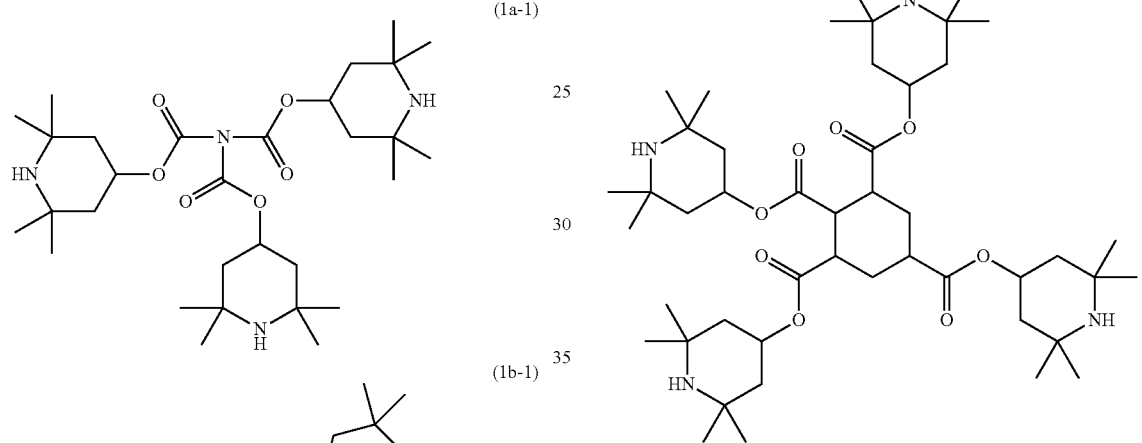
(1j-1)

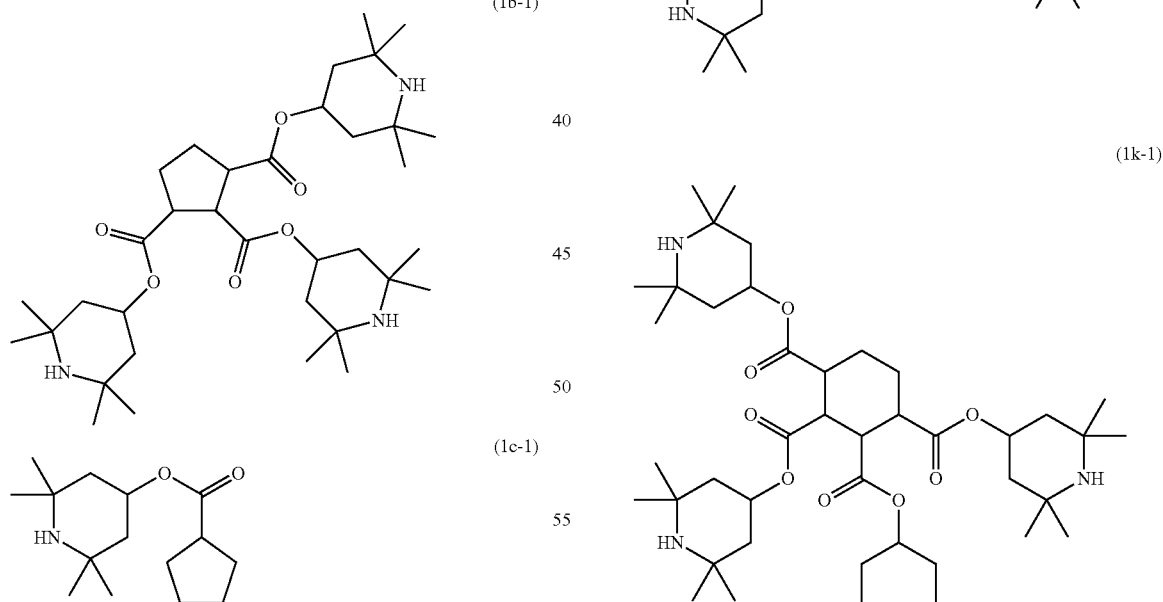
(1k-1)

Item 7. A liquid crystal composition containing at least one compound according to any one of Items 1 to 6.

Item 8. The liquid crystal composition according to Item 7 further containing at least one compound selected from the group of compounds represented by Formula (2) to Formula (4):

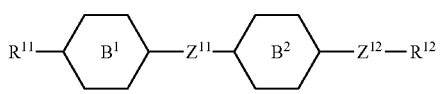
(2)

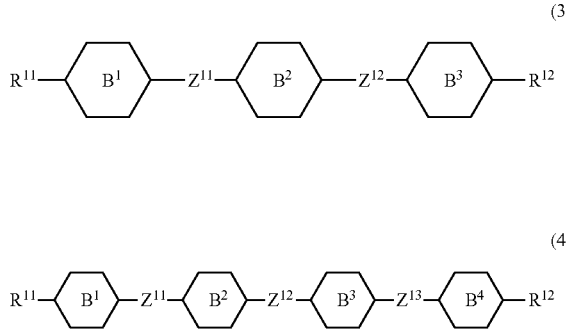
(3)
(4)

in Formula (2) to Formula (4), $R^{11}$ and $R^{12}$ are an alkyl group having 1 to 10 carbon atoms or an alkenyl group having 2 to 10 carbon atoms, and in these alkyl and alkenyl groups, at least one —$CH_2$— is optionally substituted with —O—, and in these groups, at least one hydrogen atom is optionally substituted with a fluorine atom;

the ring $B^1$, the ring $B^2$, the ring $B^3$, and the ring $B^4$ are independently 1,4-cyclohexylene, 1,4-phenylene, 2-fluoro-1,4-phenylene, 2,5-difluoro-1,4-phenylene, or pyrimidine-2,5-diyl; and $Z^{11}$, $Z^{12}$, and $Z^{13}$ are independently a single bond, —COO—, —$CH_2CH_2$—, —CH=CH—, or —C≡C—.

Item 9. The liquid crystal composition according to Item 7 or 8, further containing at least one compound selected from the group of compounds represented by Formula (21) to Formula (23):

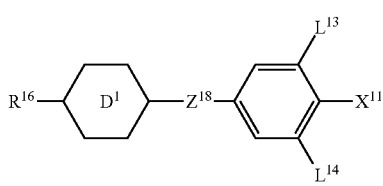
(21)

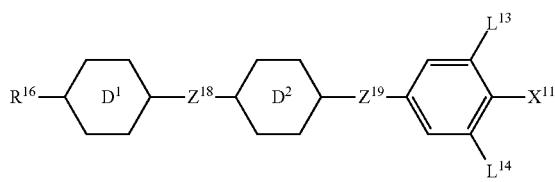
(22)

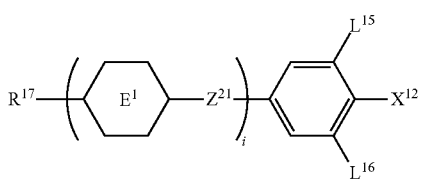
(23)

in Formulae (21) to (23), $R^{16}$ is an alkyl group having 1 to 10 carbon atoms or an alkenyl group having 2 to 10 carbon atoms, and in these alkyl and alkenyl groups, at least one —$CH_2$— is optionally substituted with —O—, and in these groups, at least one hydrogen atom is optionally substituted with a fluorine atom;

$X^{11}$ is a fluorine atom, a chlorine atom, —$CF_3$, —$CHF_2$, —$CH_2F$, —$OCF_3$, —$OCHF_2$, —$OCF_2CHF_2$, or —$OCF_2CHFCF_3$;

the ring $D^1$, ring $D^2$, and ring $D^3$ are independently 1,4-cyclohexylene, 1,4-phenylene in which at least one hydrogen atom is optionally substituted with a fluorine atom, tetrahydropyran-2,5-diyl, 1,3-dioxane-2,5-diyl, or pyrimidine-2,5-diyl;

$Z^{18}$, $Z^{19}$, and $Z^{20}$ are independently a single bond, —COO—, —$CH_2O$—, —$CF_2O$—, —$OCF_2$—, —$CH_2CH_2$—, —CH=CH—, —C≡C—, or —$(CH_2)_4$—; and $L^{13}$ and $L^{14}$ are independently a hydrogen atom or a fluorine atom.

Item 10. The liquid crystal composition according to any one of Items 7 to 9, further containing at least one compound selected from the group of compounds represented by Formula (24):

(24)

in Formula (24), $R^{17}$ is an alkyl group having 1 to 10 carbon atoms or an alkenyl group having 2 to 10 carbon atoms, and in these alkyl and alkenyl groups, at least one —$CH_2$— is optionally substituted with —O—, and in these groups, at least one hydrogen atom is optionally substituted with a fluorine atom;

$X^{12}$ is —C≡N or —C≡C—C≡N;

the ring $E^1$ is 1,4-cyclohexylene, 1,4-phenylene in which at least one hydrogen atom is optionally substituted with a fluorine atom, tetrahydropyran-2,5-diyl, 1,3-dioxane-2,5-diyl, or pyrimidine-2,5-diyl;

$Z^{21}$ is a single bond, —COO—, —$CH_2O$—, —$CF_2O$—, —$OCF_2$—, —$CH_2CH_2$—, or —C≡C—;

$L^{15}$ and $L^{16}$ are independently a hydrogen atom or a fluorine atom;

i is 1, 2, 3, or 4.

Item 11. The liquid crystal composition according to any one of Items 7 to 10, further containing at least one compound selected from the group of compounds represented by Formula (5) to Formula (13):

(5)
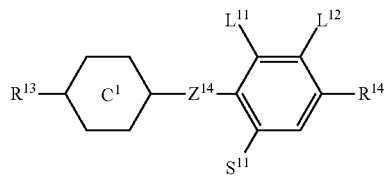
(6)
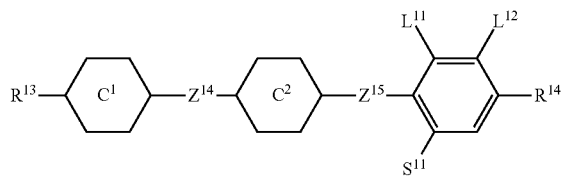
(7)
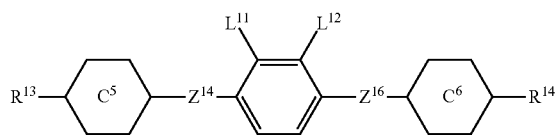
(8)
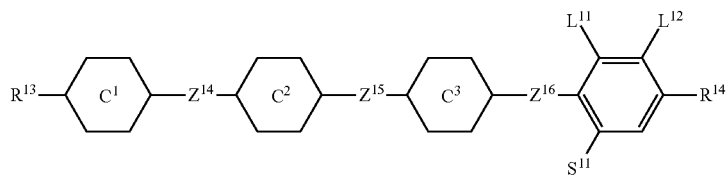
(9)
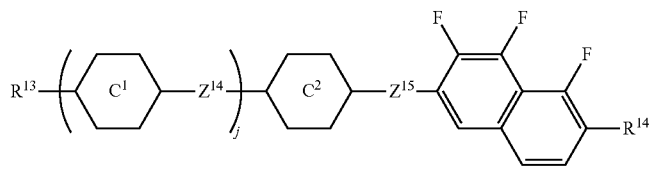
(10)
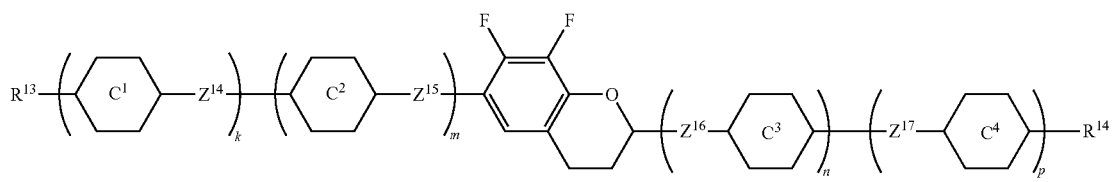
(11)
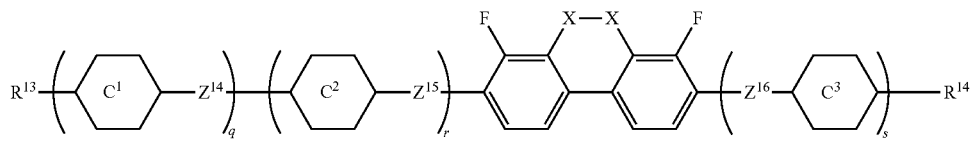
(12)
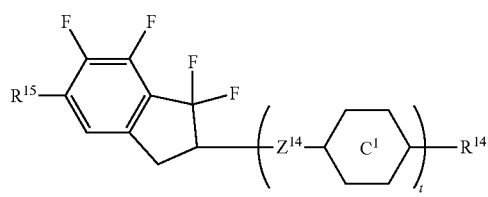
(13)
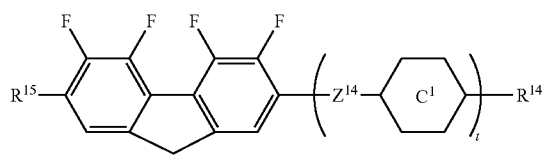

in Formulae (5) to (13), $R^{13}$, $R^{14}$ and $R^{15}$ are independently an alkyl group having 1 to 10 carbon atoms or an alkenyl group having 2 to 10 carbon atoms, and in these alkyl and alkenyl groups, at least one —$CH_2$— is optionally substituted with —O—, and in these groups, at least one hydrogen atom is optionally substituted with a fluorine atom, and $R^{15}$ may be a hydrogen atom or a fluorine atom;

the ring $C^1$, the ring $C^2$, the ring $C^3$, and the ring $C^4$ are independently 1,4-cyclohexylene, 1,4-cyclohexenylene, 1,4-phenylene in which at least one hydrogen atom is optionally substituted with a fluorine atom, tetrahydropyran-2,5-diyl, or decahydronaphthalene-2,6-diyl;

the ring $C^5$ and the ring $C^6$ are independently 1,4-cyclohexylene, 1,4-cyclohexenylene, 1,4-phenylene, tetrahydropyran-2,5-diyl, or decahydronaphthalene-2,6-diyl;

$Z^{14}$, $Z^{15}$, $Z^{16}$, and $Z^{17}$ are independently a single bond, —COO—, —$CH_2O$—, —$OCF_2$—, —$CH_2CH_2$—, or —$OCF_2CH_2CH_2$—;

$L^{11}$ and $L^{12}$ are independently a fluorine atom or a chlorine atom;

$S^{11}$ is a hydrogen atom or a methyl group;

X is —CHF— or —$CF_2$—; and j, k, m, n, p, q, r, and s are independently 0 or 1, a sum of k, m, n, and p is 1 or 2, and a sum of q, r, and s is 0, 1, 2, or 3, and t is 1, 2, or 3.

Item 12. A liquid crystal display element containing at least one liquid crystal composition according to any one of Items 7 to 11.

The disclosure also includes the following items.
(a) The liquid crystal composition further containing one, two, or at least three of additives such as a polymerizable compound, a polymerization initiator, a polymerization inhibitor, an optically active compound, an antioxidant, a UV absorber, a light stabilizer different from Compound (1), a heat stabilizer, and an antifoaming agent.
(b) A polymerizable composition prepared by adding a polymerizable compound to the liquid crystal composition.
(c) A liquid crystal composite prepared by polymerizing the polymerizable composition.
(d) A polymer sustained alignment (PSA) type liquid crystal display element containing the liquid crystal composite.
(e) Use of Compound (1) as a light stabilizer.
(f) Use of Compound (1) as a stabilizer.
(g) Use of a stabilizer in which a light stabilizer different from Compound (1) and Compound (1) are combined.
(h) Use of an optically active composition obtained by adding an optically active compound to the liquid crystal composition.

Embodiments of Compound (1), synthesis of Compound (1), a liquid crystal composition, and a liquid crystal display element will be described in order.

1. Embodiments of Compound (1)

Compound (1) of the disclosure has a plurality of tetramethylpiperidinyl groups. This compound is beneficial as a hindered amine light stabilizer. Compound (1) is suitable for trapping a decomposition product that is generated due to a photoreaction of a liquid crystalline compound. This compound can be added to a liquid crystalline compound mixture, that is, a liquid crystal composition. This is because this compound has high solubility in a liquid crystal composition. Compound (1) has an effect of preventing the liquid crystalline compound from being decomposed due to light from a backlight or sun. Compound (1) also has an effect as a heat stabilizer.

When the liquid crystal display element is used for a long time, the liquid crystalline compound is decomposed due to light and tends to form decomposition products. Since these products are impurities, these are not preferable for the element. This is because these impurities cause a phenomenon such as a decrease in the contrast ratio, the occurrence of display irregularities, or image burning. This phenomenon can be easily visually identified and even if its strength is very weak, it is highly noticeable. Therefore, a light stabilizer having an amount of impurities generated that is less than that of a light stabilizer of the related art by even 1% is preferable. Compound (1) is such a light stabilizer.

Preferable examples of Compound (1) will be described. Preferable examples of M, Z, and Q in Compound (1) also apply to sub-formulas of Compound (1). In Compound (1), when types of these groups are appropriately combined, it is possible to arbitrarily adjust properties. Compound (1) may contain a larger amount of isotopes such as $^2H$ (deuterium) and $^{13}C$ than a natural abundance of these isotopes since there are no significant differences in properties of such compounds.

In Formula (1), M is one selected from among a nitrogen atom, a trivalent cyclic organic group, a tetravalent cyclic organic group, and a pentavalent cyclic organic group. A group constituted by this trivalent nitrogen is a group represented by Formula (M-1). Preferably, M is Formula (M-1) to Formula (M-13) described in Item 2. More preferably, M is Formula (M-1), Formula (M-2), Formula (M-3), Formula (M-7), Formula (M-10), or Formula (M-11). Particularly preferably, M is Formula (M-2), Formula (M-3), Formula (M-7), Formula (M-10), or Formula (M-11). Most preferably, M is Formula (M-3).

In Formula (1), Z is a single bond, —O—, —COO—, or —OCO—. Preferably, Z is a single bond, —O—, —COO—, or —OCO—. More preferably, Z is a single bond, —O—, —COO—, or —OCO—. Particularly preferably, Z is ring-COO—. Most preferably, Z is (aliphatic ring)-COO—.

In Formula (1), Q is a monovalent group represented by Formula (Q-1).

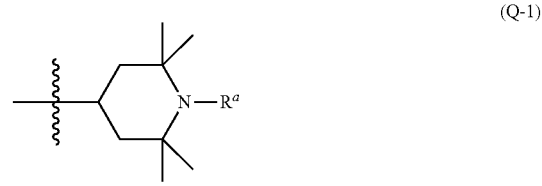

(Q-1)

In Formula (Q-1), $R^a$ is a hydrogen atom, —O.(oxy radical), —OH (hydroxy), or —$R^1$, here $R^1$ is an alkyl group having 1 to 20 carbon atoms or an alkenyl group having 2 to 20 carbon atoms, and in this alkyl or alkenyl group, at least one —$CH_2$— is optionally substituted with —O—, —CO—, —COO—, or —OCO—, a terminal group (—$CH_3$) is optionally substituted with —$NHR^2$ or —$NR^3R^4$, and here $R^2$, $R^3$, and $R^4$ are an alkyl group having 1 to 10 carbon atoms.

Preferably, $R^1$ is an alkyl group having 1 to 12 carbon atoms, an alkoxy group having 1 to 12 carbon atoms, or an alkenyl group having 2 to 12 carbon atoms. More preferably, $R^1$ is an alkyl group having 1 to 6 carbon atoms. In these groups, a terminal group (—$CH_3$) is optionally substituted with a secondary or tertiary amino group. A preferable amino group includes an alkyl group having 1 to 6 carbon atoms.

Preferably, $R^a$ is a hydrogen atom, —O—, —OH, an alkyl group having 1 to 3 carbon atoms, an alkoxy group having 1 to 3 carbon atoms, an amino group, an alkylamino group having 1 to 3 carbon atoms, or a dialkylamino group having 1 to 6 carbon atoms. More preferably, $R^a$ is a hydrogen atom, —O., —OH, a methyl group, an ethyl group, a methoxy group, an amino group, a methylamino group, or a dimethylamino group. Particularly preferably, $R^a$ is a hydrogen atom, —O—, —OH, a methyl group, or a methoxy group. Most preferably, $R^a$ is a hydrogen atom or a methyl group. Most preferably, $R^a$ is —O. or —OH.

2. Synthesis of Compound (1)

A synthesis method of Compound (1) will be described. Compound (1) can be synthesized by appropriately combining methods in organic synthetic chemistry. The methods are described in books such as Methoden der Organische Chemie (Houben-Wyle, Georg-Thieme Verlag, Stuttgart) Organic Syntheses (John Wily & Sons, Inc.), Organic Reactions (John Wily & Sons Inc.), Comprehensive Organic Synthesis (Pergamon Press), and New Course of Experimental Chemistry (Maruzen).

2-1. Generation of a Bonding Group

Regarding a method of generating a bonding group Z, a scheme will be shown first. Next, reactions described in the scheme in Methods (1) to (4) will be described. In the scheme, $MSG^1$ (or $MSG^2$) is a monovalent organic group having at least one ring. Monovalent organic groups represented by a plurality of $MSG^1$'s (or $MSG^2$'s) used in the scheme may be the same as or different from each other. Compounds (1A) to (1D) correspond to Compound (1).

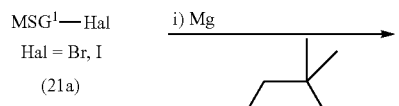

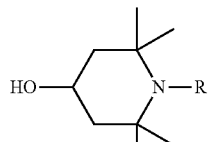

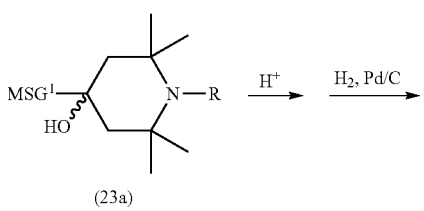

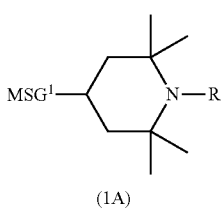

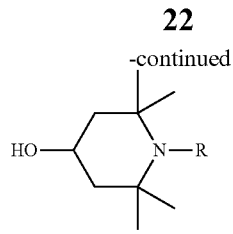

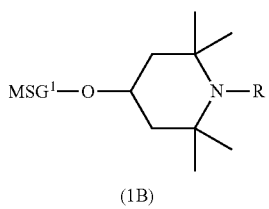

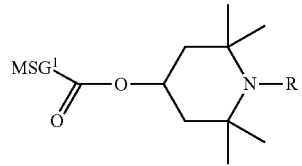

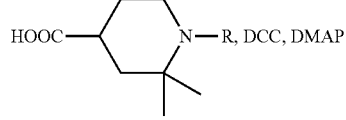

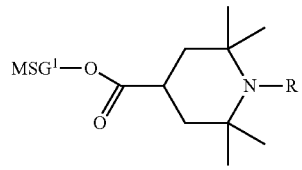

(1) Generation of a single bond

A Grignard reagent is prepared from a halide (21a) synthesized by a known method. A commercially available Compound (22a) is reacted with this reagent to obtain Compound (23a). Compound (23a) is treated with an acid and hydrogenated in the presence of a catalyst such as palladium carbon to synthesize Compound (1A).

(2) Generation of —O—

A fluoride (24a) and Compound (22b) are heated in the presence of a base such as potassium t-butoxide to synthesize Compound (1B).

(3) Generation of —COO—

Methyl ester (25a) and Compound (22b) are heated in the presence of a catalyst such as dibutyltin oxide to synthesize Compound (1C).

(4) Generation of —OCO—

An alcohol (26a) synthesized by a known method and commercially available carboxylic acid (27a) are dehydrated in the presence of DCC (1,3-dicyclohexylcarbodiimide) and DMAP (4-dimethylaminopyridine) to synthesize Compound (1D).

2-2. Raw Materials

Raw materials of a 2,2,6,6-tetramethylpiperidine ring are 4-hydroxy-2,2,6,6-tetramethylpiperidine, 2,2,6,6-tetramethyl-4-piperidone, and the like, and these are available from Sigma-Aldrich Co. LLC.

3. Liquid Crystal Composition 3-1. Component Compounds

A liquid crystal composition of the disclosure will be described. This composition includes at least one Compound (1) as a component A. This composition may contain two, three or more Compounds (1). A preferable proportion of Compound (1) is 0.01 weight % or more in order to maintain high stability with respect to ultraviolet rays and is 5 weight % or less in order for dissolving in a liquid crystal composition. A more preferable proportion is in a range of 0.05 weight % to 2 weight %. A most preferable proportion is in a range of 0.05 weight % to 1 weight %.

TABLE 2

Component compounds of composition

| Component | Component compound | Dielectric anisotropy |
|---|---|---|
| Component (a) | Compound (1) | Large negative |
| Component (b) | Compound (2) to Compound (4) | Small |
| Component (c) | Compound (5) to Compound (13) | Large negative |
| Component (d) | Compound (21) to Compound (23) | Large positive |
| Component (e) | Compound (24) | Large positive |

This composition contains Compound (1) as Component (a). Preferably, this composition may further contain a liquid crystalline compound selected from among Components (b) to (e) shown in Table 2. When the composition is prepared, it is preferable to select Components (b) to (e) in consideration of a positive or negative sign or a magnitude of dielectric anisotropy. This composition may contain a liquid crystalline compound different from Compounds (1) to (13) and (21) to (24). This composition may not contain such a liquid crystalline compound.

Component (b) is a compound in which two terminal groups are alkyl groups or the like. Preferable examples of Component (b) include Compounds (2-1) to (2-11), Compounds (3-1) to (3-19), and Compounds (4-1) to (4-7). In these compounds, $R^{11}$ and $R^{12}$ are independently an alkyl group having 1 to 10 carbon atoms or an alkenyl group having 2 to 10 carbon atoms, and in these alkyl and alkenyl groups, at least one —$CH_2$— is optionally substituted with —O—, and in these groups, at least one hydrogen atom is optionally substituted with a fluorine atom.

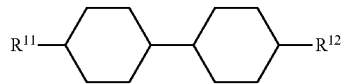

(2-1)

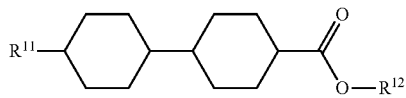

(2-2)

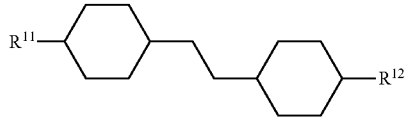

(2-3)

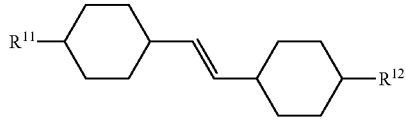

(2-4)

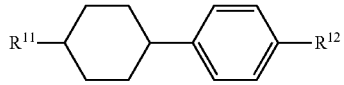

(2-5)

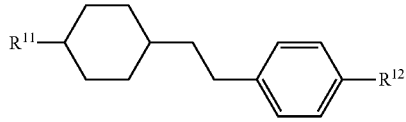

(2-6)

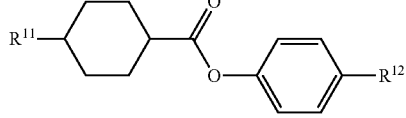

(2-7)

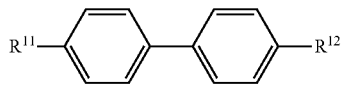

(2-8)

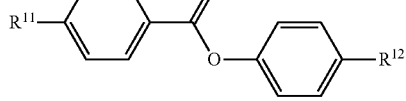

(2-9)

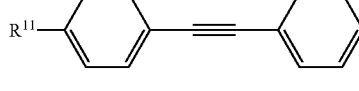

(2-10)

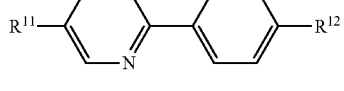

(2-11)

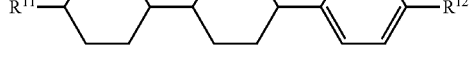

(3-1)

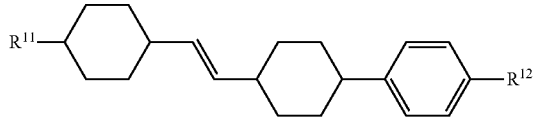

(3-2)

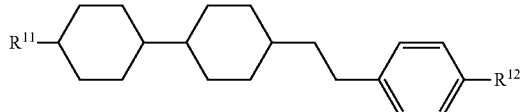

(3-3)

(3-4) 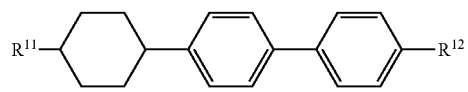
(3-5) 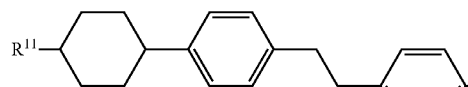
(3-6) 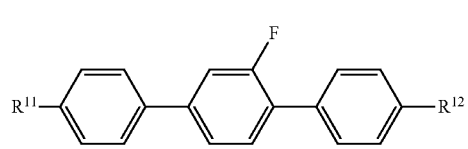
(3-7) 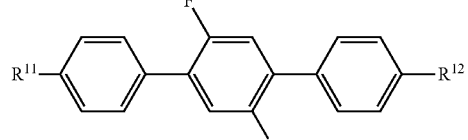
(3-8) 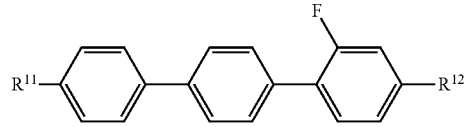
(3-9) 
(3-10) 
(3-11) 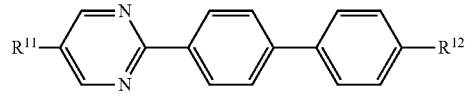
(3-12) 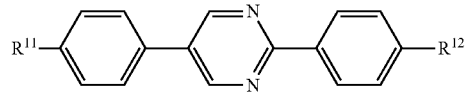
(3-13) 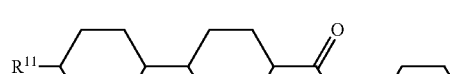
(3-14) 
(3-15) 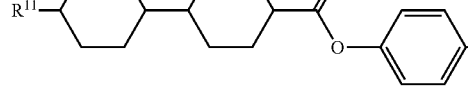
(3-16) 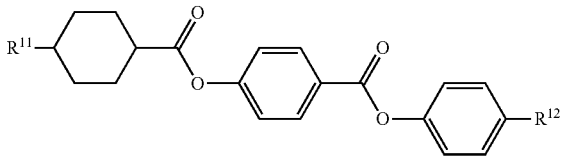
(3-17) 
(3-18) 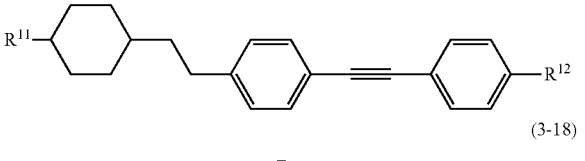
(3-19) 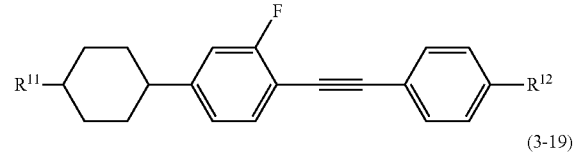
(4-1) 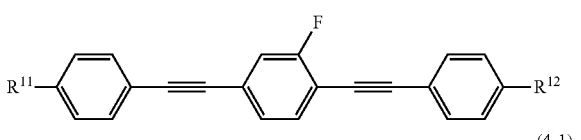
(4-2) 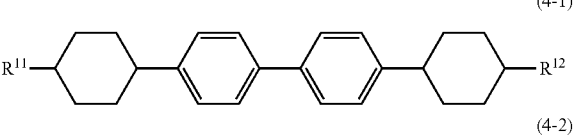
(4-3) 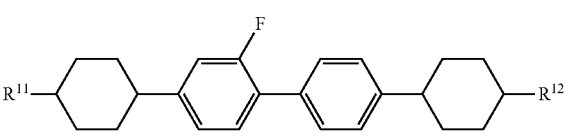
(4-4) 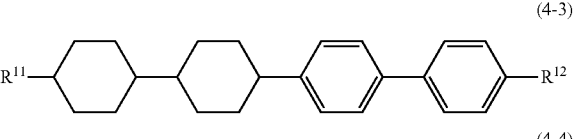
(4-5) 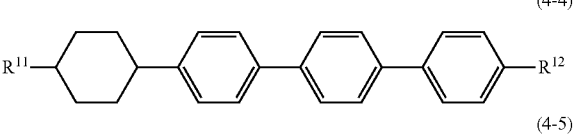
(4-6) 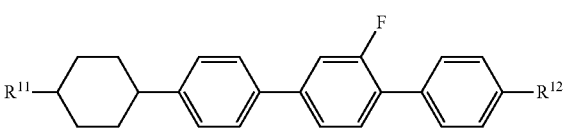
(4-7) 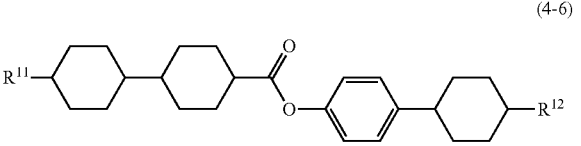

Component (b) has small dielectric anisotropy. Component (b) is close to being neutral. Compound (2) has an effect of lowering the viscosity or adjusting the optical anisotropy. Compounds (3) and (4) have an effect of increasing an upper limit temperature and thus widening a temperature range of the nematic phase or adjusting the optical anisotropy.

As the content of Component (b) increases, the viscosity of the composition decreases, but the dielectric anisotropy decreases. Therefore, a higher content is preferable as long as a required value of a threshold voltage of the element is satisfied. When a composition for a mode such as IPS and VA is prepared, the content of Component (b) is preferably 30 weight % or more, and more preferably 40 weight % or more on the basis of the weight of the liquid crystal composition.

Component (c) is Compounds (5) to (13). These compounds include a phenylene in which the lateral positions are substituted with two halogen atoms as in 2,3-difluoro-1,4-phenylene. Preferable examples of Component (c) include Compounds (5-1) to (5-9), Compounds (6-1) to (6-19), Compounds (7-1) and (7-2), Compounds (8-1) to (8-3), Compounds (9-1) to (9-3), Compounds (10-1) to (10-11), Compounds (11-1) to (11-3), Compounds (12-1) to (12-3), and Compound (13-1). In these compounds, $R^{13}$, $R^{14}$, and $R^{15}$ are independently an alkyl group having 1 to 10 carbon atoms or an alkenyl group having 2 to 10 carbon atoms, and at least one —$CH_2$— is optionally substituted with —O— in the alkyl group and the alkenyl group and in these groups, at least one hydrogen atom is optionally substituted with fluorine, and $R^{15}$ may be hydrogen or fluorine.

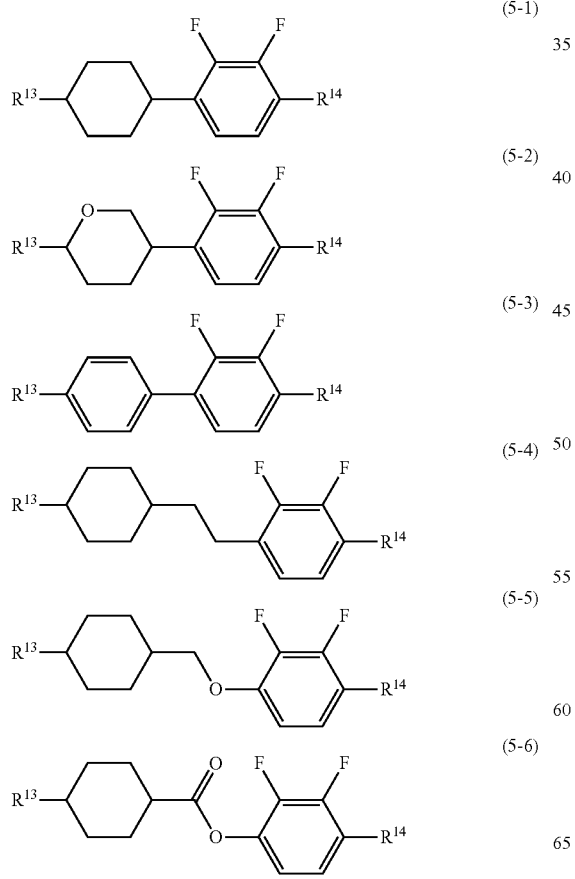
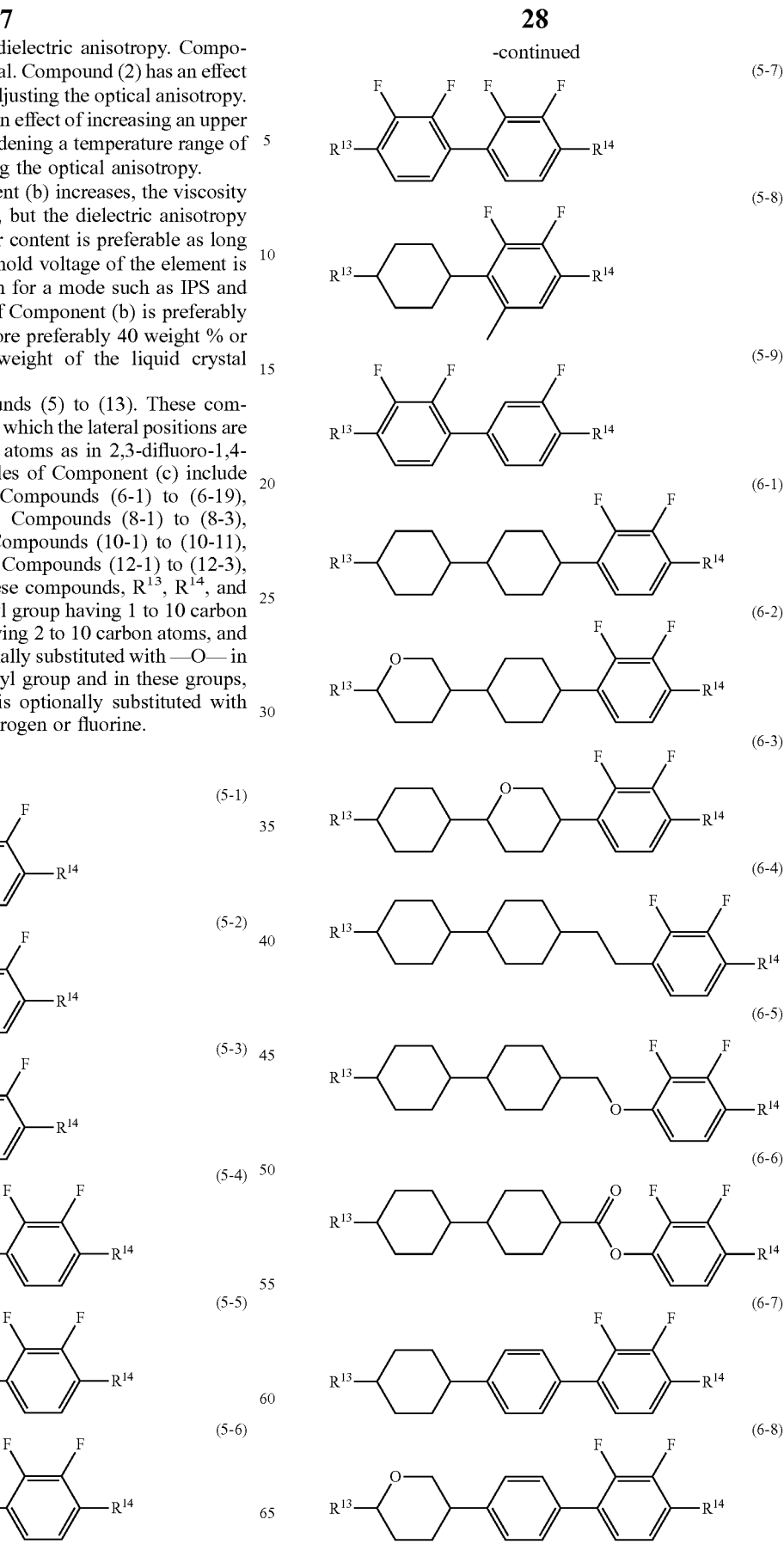

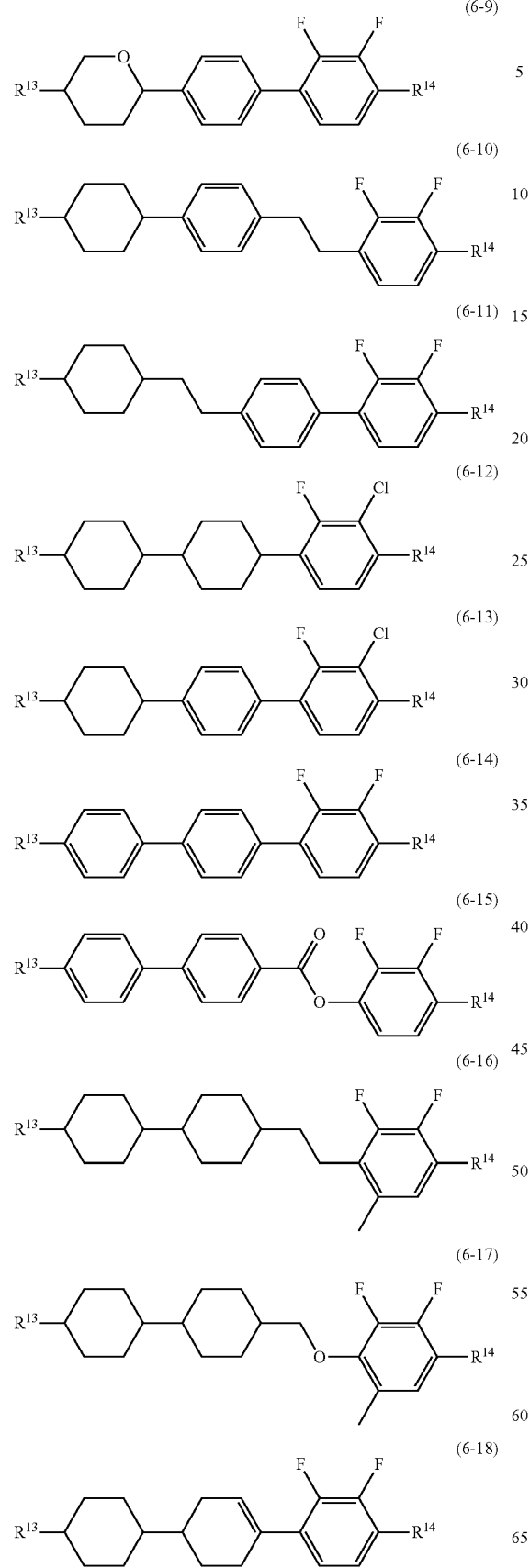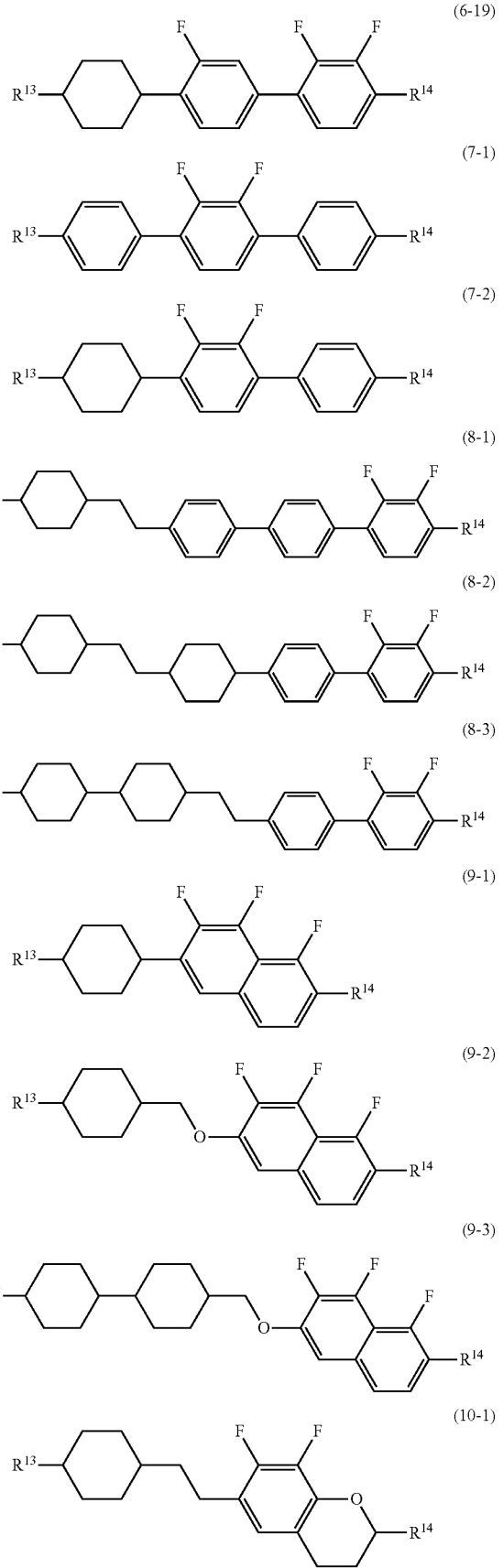

(10-2) 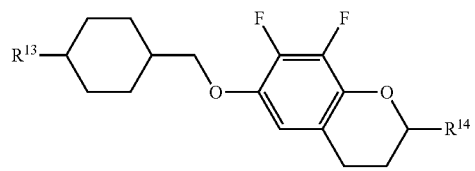
(10-3) 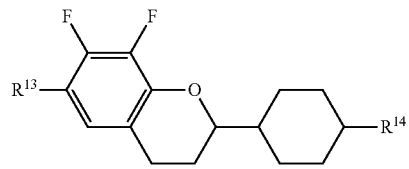
(10-4) 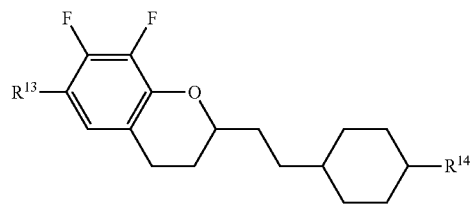
(10-5) 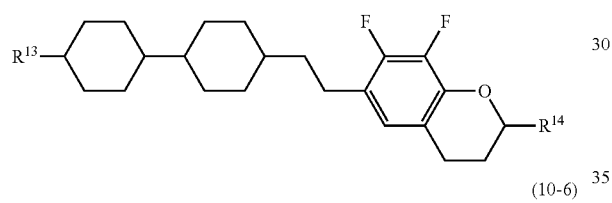
(10-6) 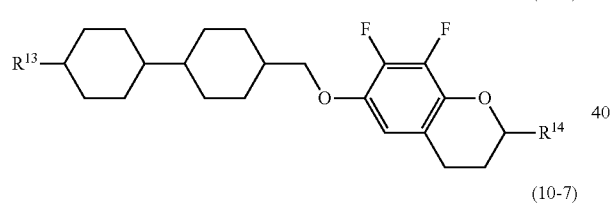
(10-7) 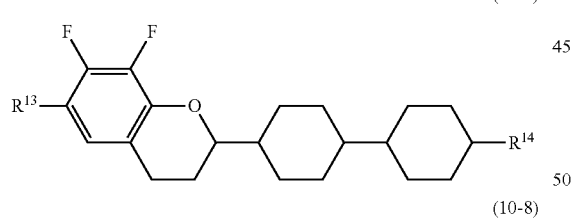
(10-8) 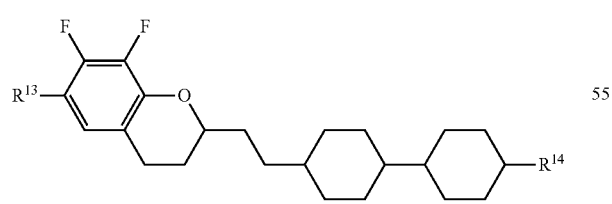
(10-9) 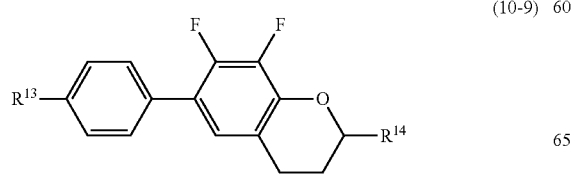
(10-10) 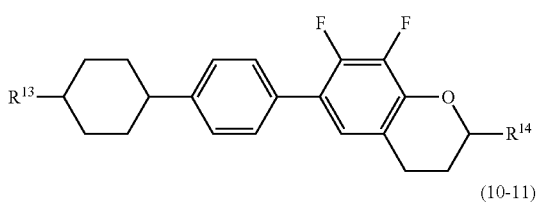
(10-11) 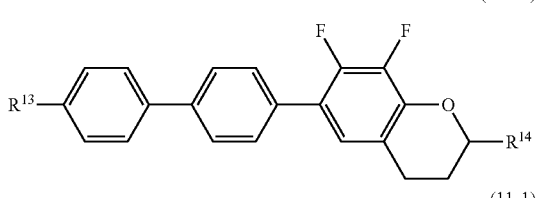
(11-1) 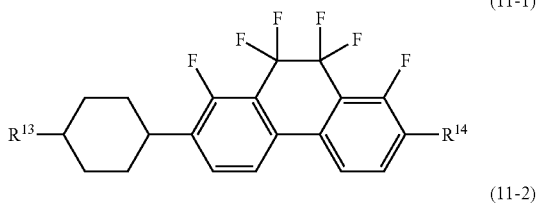
(11-2) 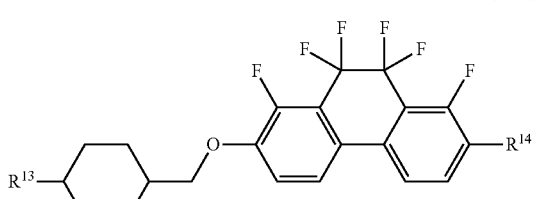
(11-3) 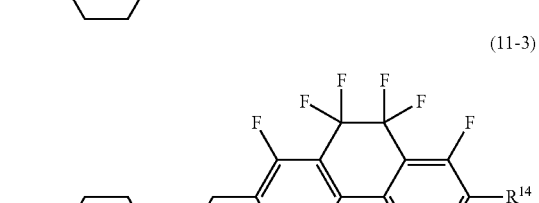
(12-1) 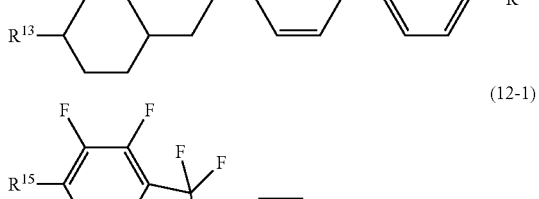
(12-2) 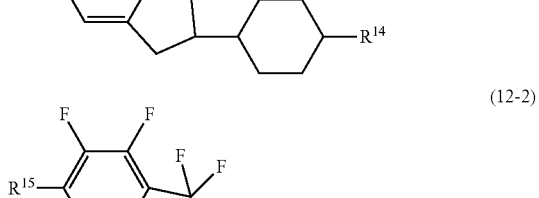
(12-3) 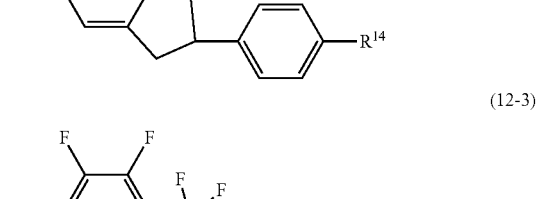
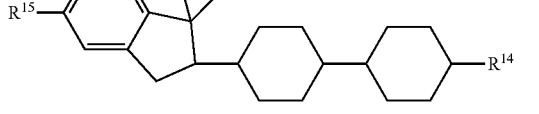

-continued (13-1)

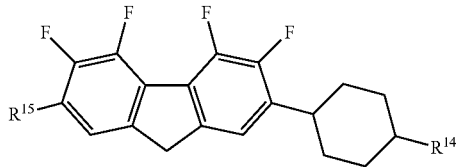

Component (c) has large negative dielectric anisotropy. Component (c) is used when a composition for a mode such as IPS, VA, and PSA is prepared. As the content of Component (c) increases, the dielectric anisotropy of the composition becomes negatively larger, but the viscosity increases. Therefore, the content is preferably as small as possible as long as a required value of a threshold voltage of the element is satisfied. In consideration of the fact that the dielectric anisotropy is about −5, in order for driving at a sufficient voltage, the content is preferably 40 weight % or more.

Among Components (c), since Compound (5) is a bicycle compound, it has an effect of lowering the viscosity, adjusting the optical anisotropy, or increasing the dielectric anisotropy. Since Compounds (6) and (7) are tricyclic compounds and Compound (8) is a tetracyclic compound, they have an effect of increasing the upper limit temperature, increasing the optical anisotropy, or increasing the dielectric anisotropy. Compounds (9) to (13) have an effect of increasing the dielectric anisotropy.

When a composition for a mode such as IPS, VA, and PSA is prepared, the content of Component (c) is preferably 40 weight % or more and more preferably in a range of 50 weight % to 95 weight % on the basis of the weight of the liquid crystal composition. When Component (c) is added to a composition having positive dielectric anisotropy, the content of Component (c) is preferably 30 weight % or less. When Component (c) is added, it is possible to adjust an elastic constant of the composition and adjust a voltage-transmittance curve of the element.

Component (d) is a compound having a halogen atom or a fluorine-containing group at the right end. Preferable examples of Component (d) include Compounds (21-1) to (21-16), Compounds (22-1) to (22-116), and Compounds (23-1) to (23-59). In these compounds, $R^{16}$ is an alkyl group having 1 to 10 carbon atoms or an alkenyl group having 2 to 10 carbon atoms, and in these alkyl and alkenyl groups, at least one —$CH_2$— is optionally substituted with —O—, and in these groups, at least one hydrogen atom is optionally substituted with fluorine. $X^{11}$ is fluorine, chlorine, —$OCF_3$, —$OCHF_2$, —$CF_3$, —$CHF_2$, —$CH_2F$, —$OCF_2CHF_2$, or —$OCF_2CHFCF_3$.

(21-1)

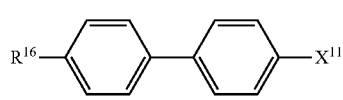

(21-2)

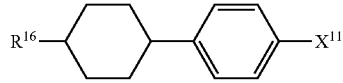

(21-3)

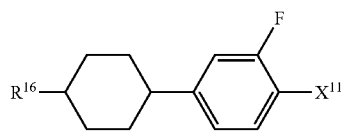

(21-4)

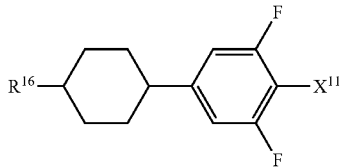

(21-5)

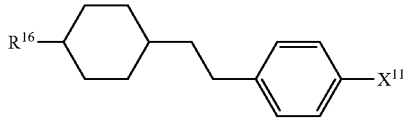

(21-6)

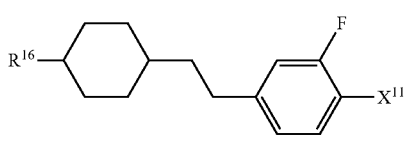

(21-7)

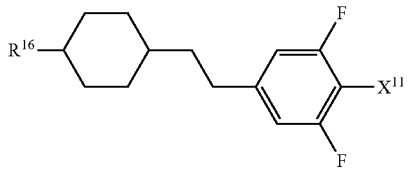

(21-8)

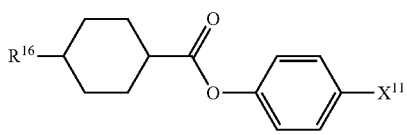

(21-9)

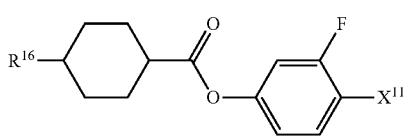

(21-10)

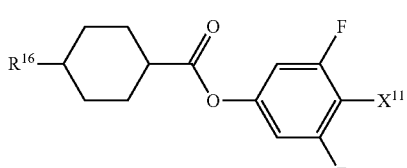

(21-11)

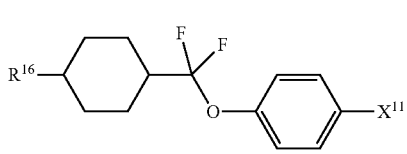

(21-12)

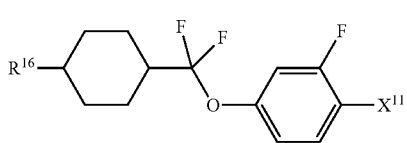

(21-13)

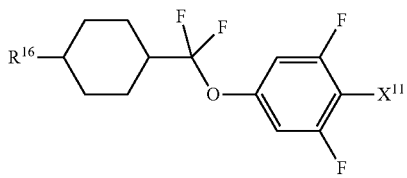

(21-14) 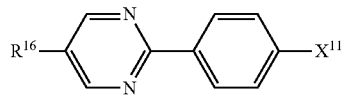
(21-15) 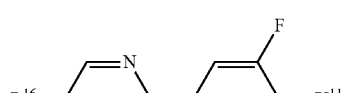
(21-16) 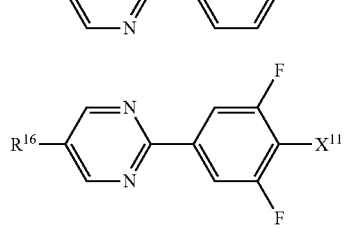
(22-1) 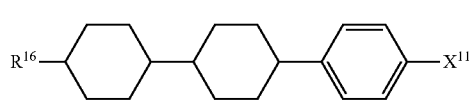
(22-2) 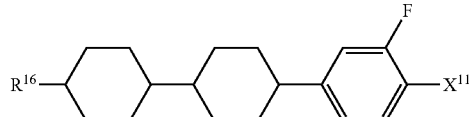
(22-3) 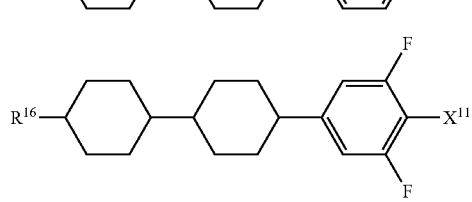
(22-4) 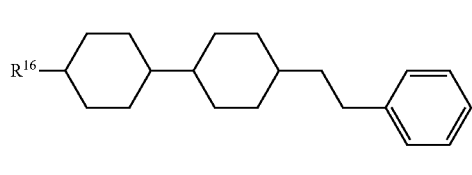
(22-5) 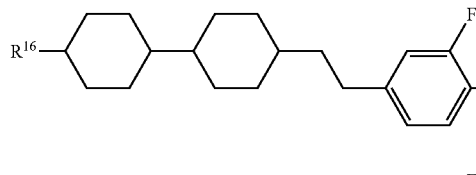
(22-6) 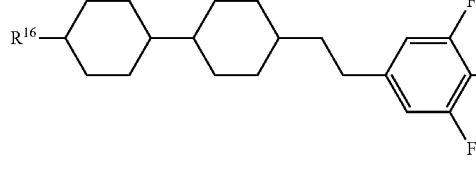
(22-7) 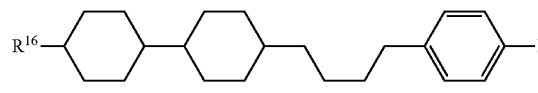
(22-8) 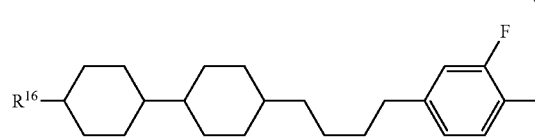
(22-9) 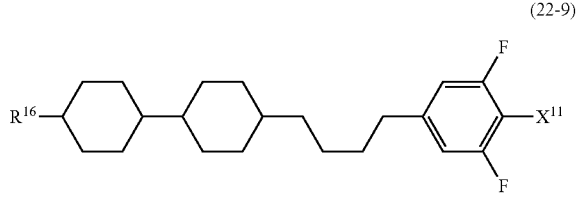
(22-10) 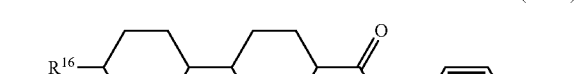
(22-11) 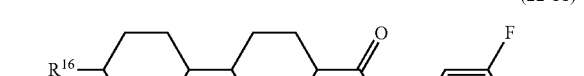
(22-12) 
(22-13) 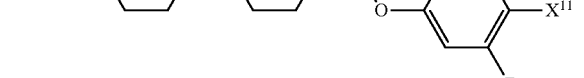
(22-14) 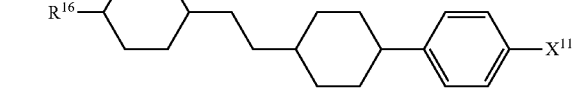
(22-15) 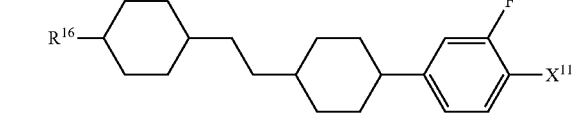
(22-16) 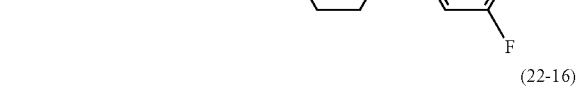
(22-17) 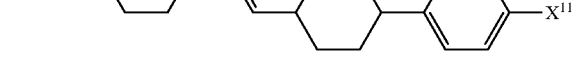

(22-18) 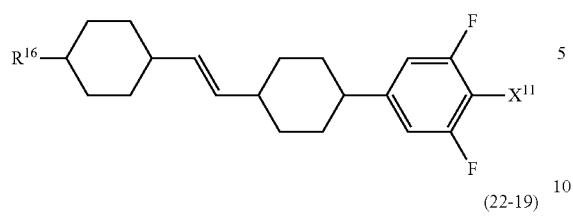
(22-19) 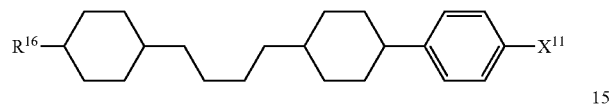
(22-20) 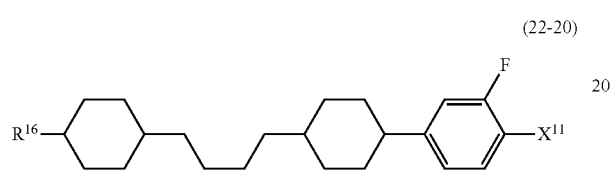
(22-21) 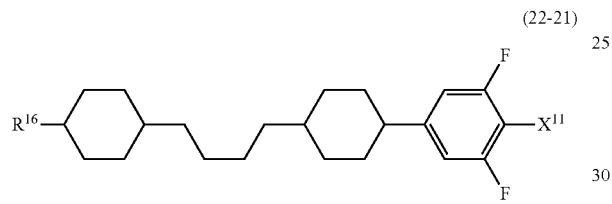
(22-22) 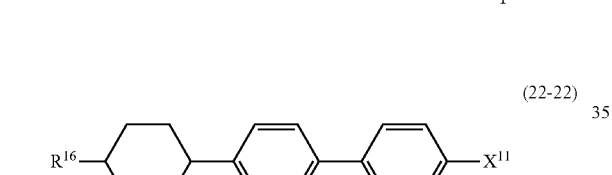
(22-23) 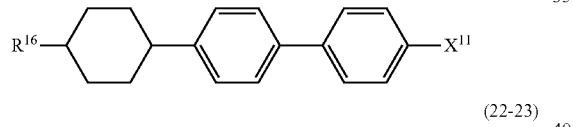
(22-24) 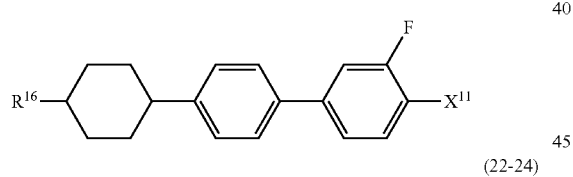
(22-25) 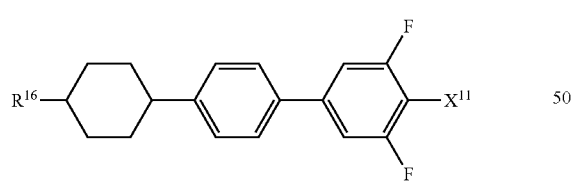
(22-26) 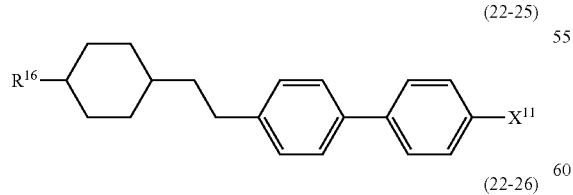
(22-27) 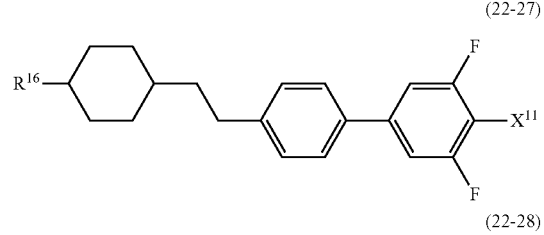
(22-28) 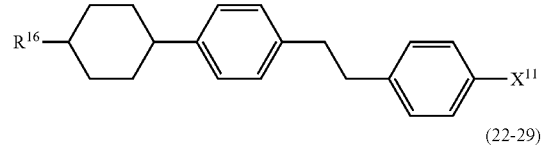
(22-29) 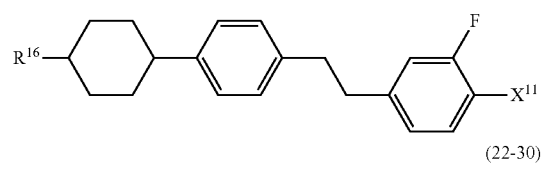
(22-30) 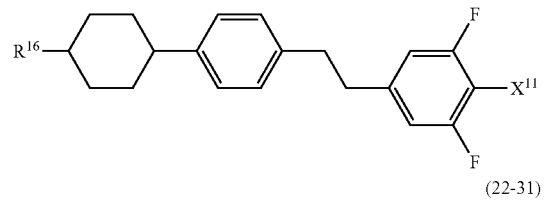
(22-31) 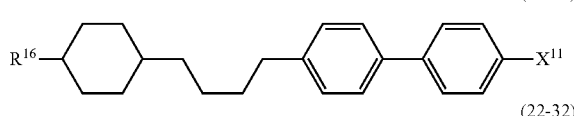
(22-32) 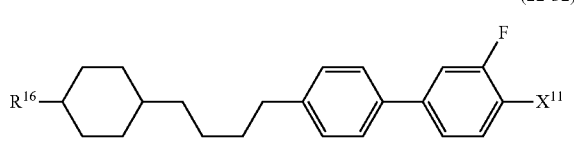
(22-33) 
(22-34) 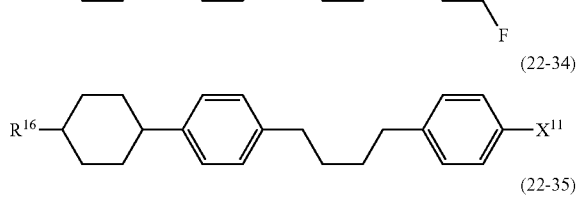
(22-35) 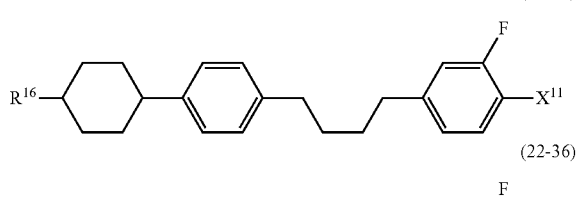
(22-36) 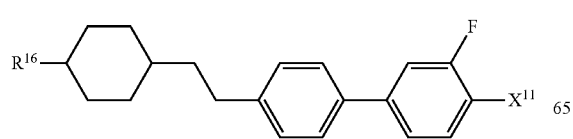

(22-37) 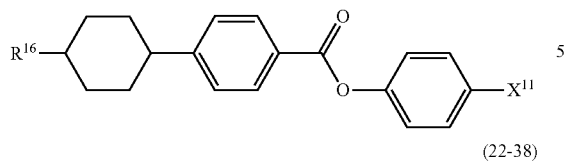
(22-38) 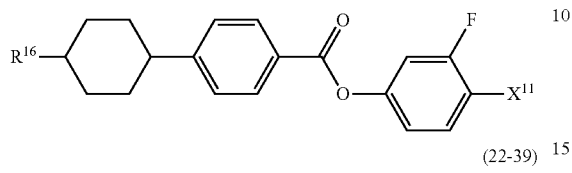
(22-39) 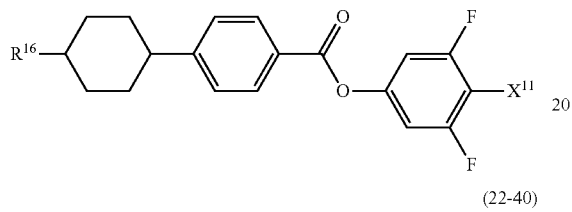
(22-40) 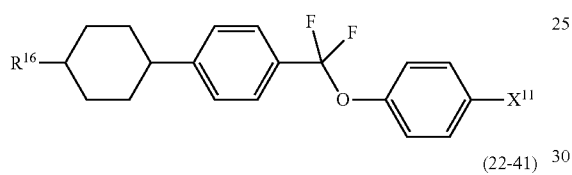
(22-41) 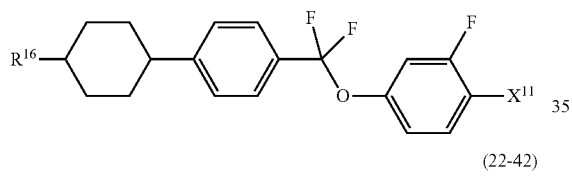
(22-42) 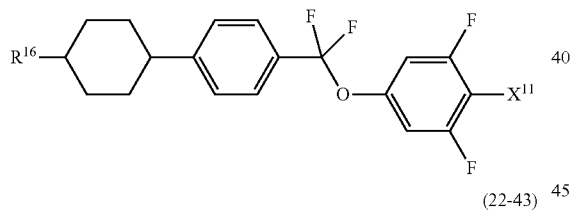
(22-43) 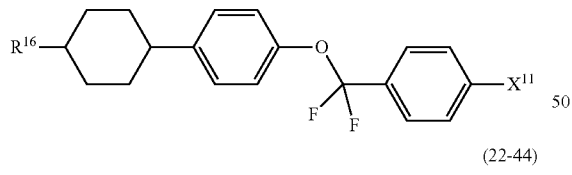
(22-44) 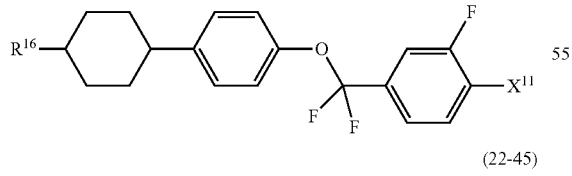
(22-45) 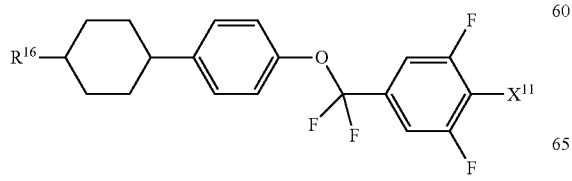
(22-46) 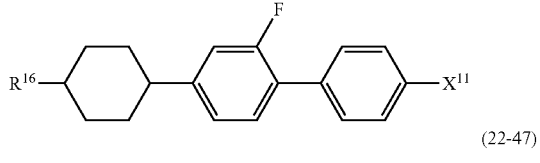
(22-47) 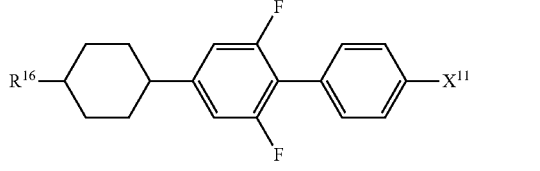
(22-48) 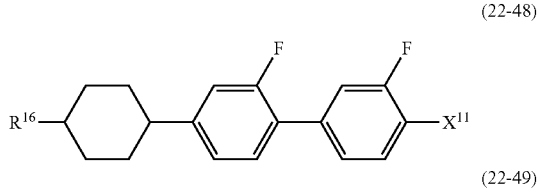
(22-49) 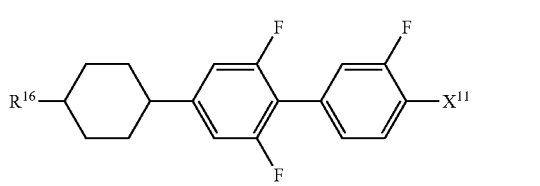
(22-50) 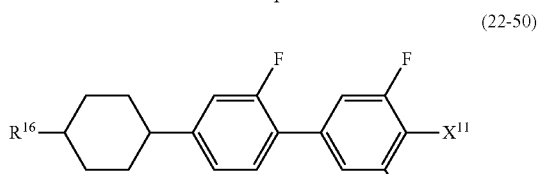
(22-51) 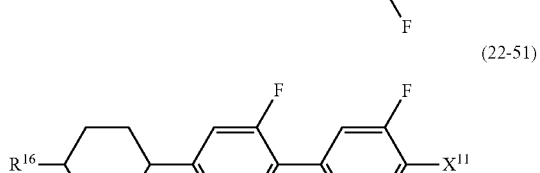
(22-52) 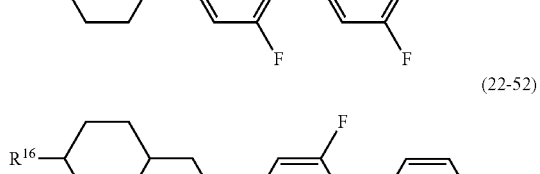
(22-53) 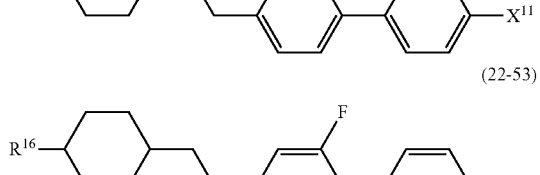
(22-54) 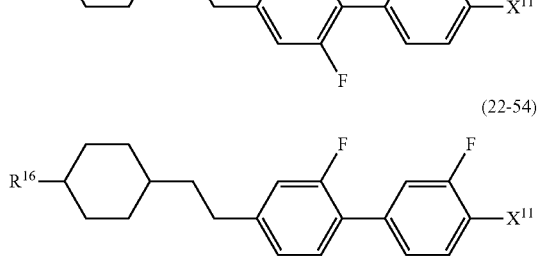

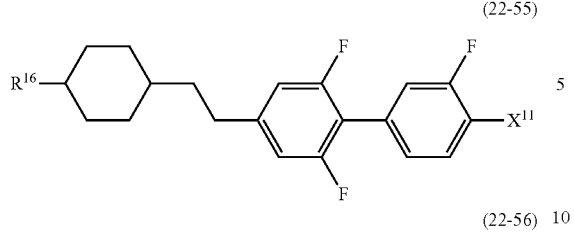
(22-55)
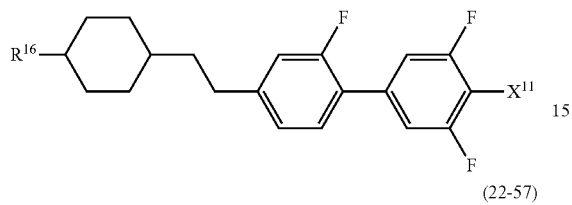
(22-56)
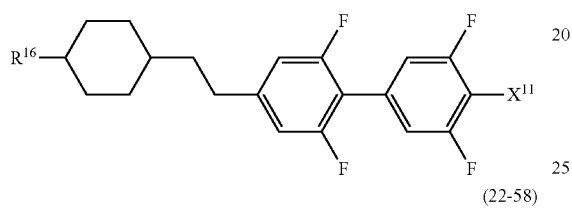
(22-57)
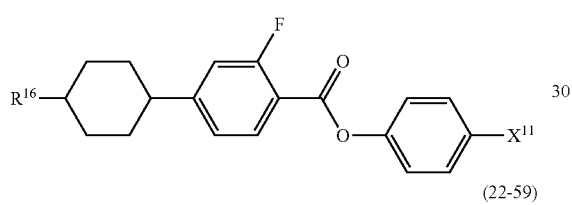
(22-58)
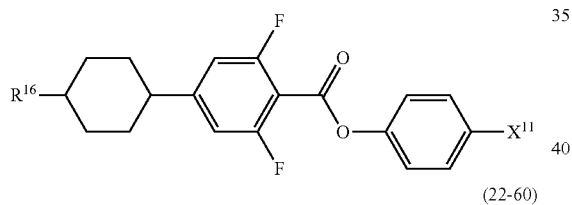
(22-59)
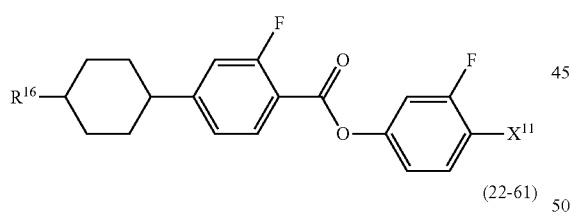
(22-60)
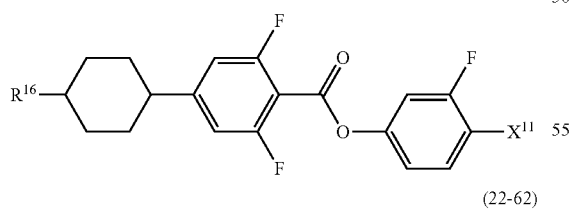
(22-61)
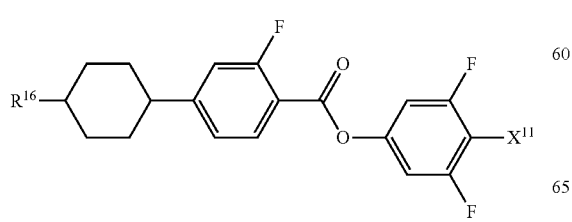
(22-62)
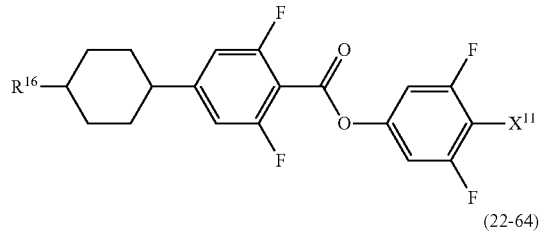
(22-63)
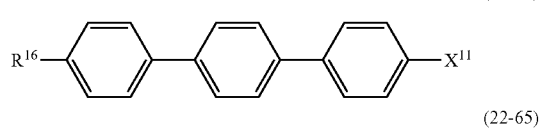
(22-64)
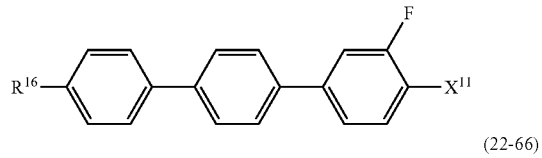
(22-65)
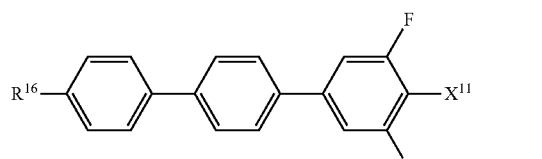
(22-66)
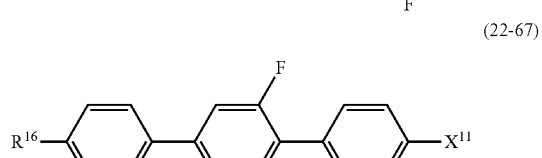
(22-67)
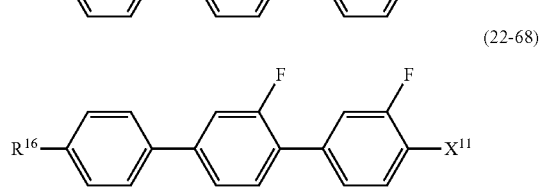
(22-68)
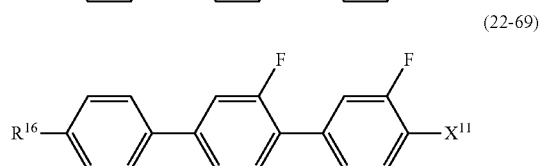
(22-69)
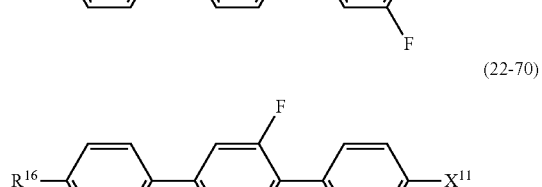
(22-70)
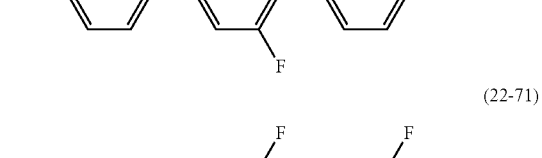
(22-71)
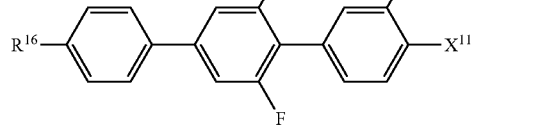

(22-72) 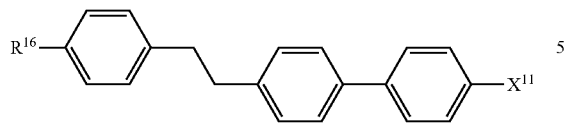
(22-73) 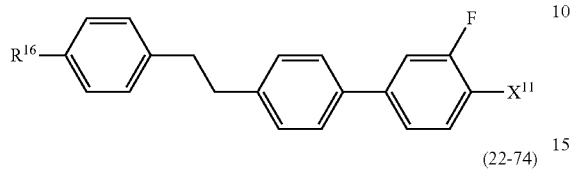
(22-74) 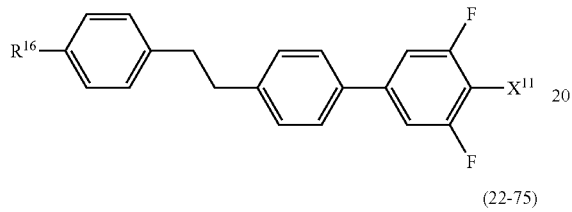
(22-75) 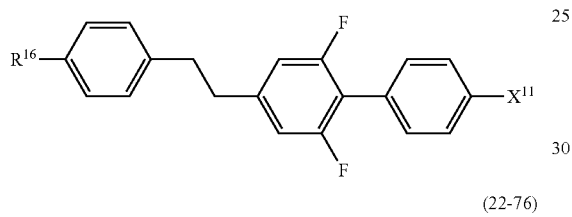
(22-76) 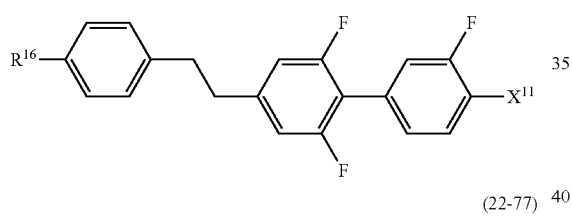
(22-77) 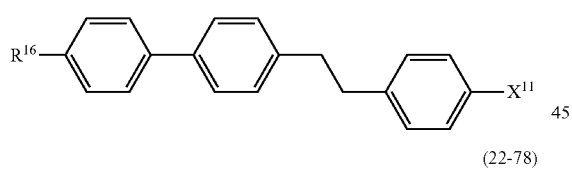
(22-78) 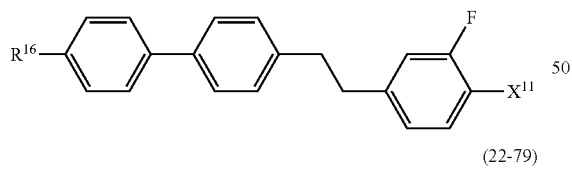
(22-79) 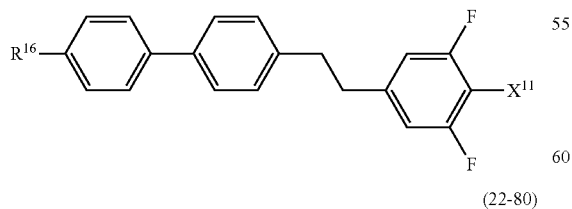
(22-80) 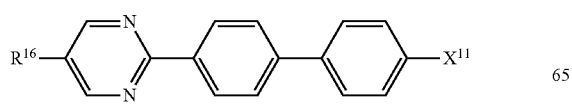
(22-81) 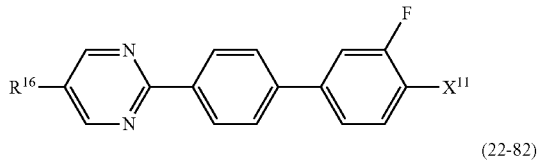
(22-82) 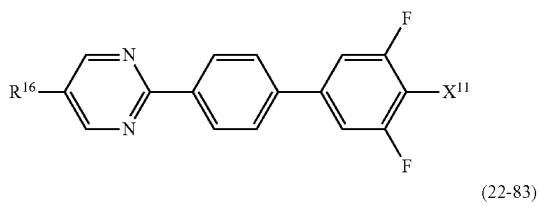
(22-83) 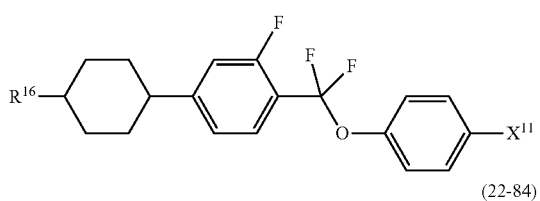
(22-84) 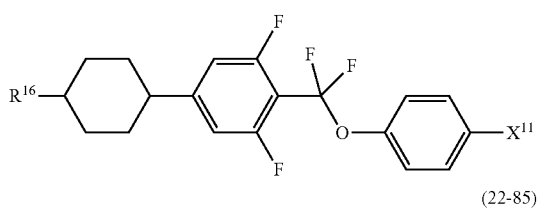
(22-85) 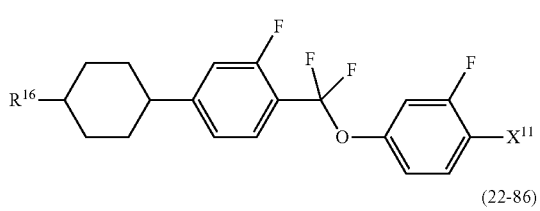
(22-86) 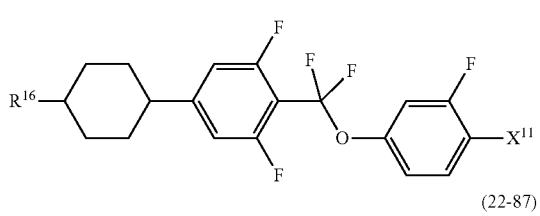
(22-87) 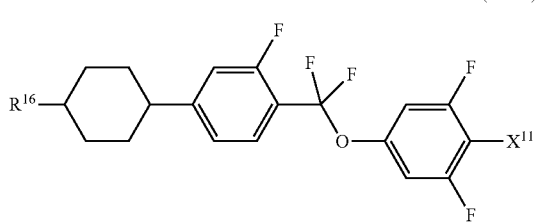
(22-88) 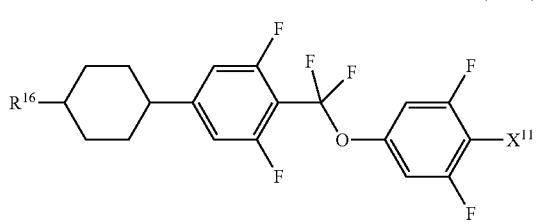

(22-89)
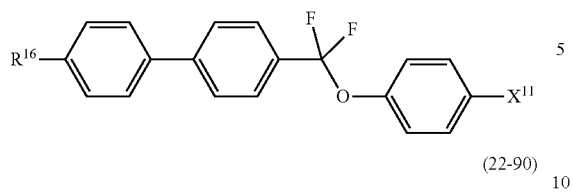
(22-90)
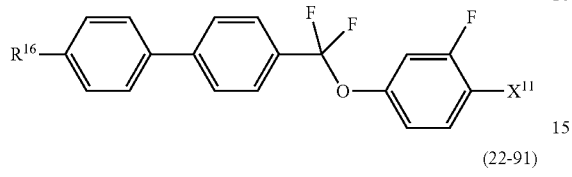
(22-91)
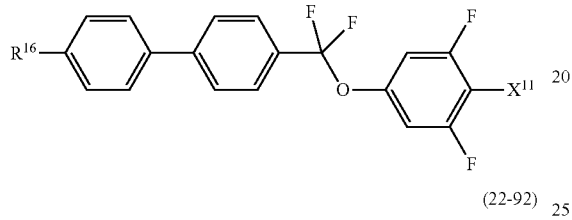
(22-92)
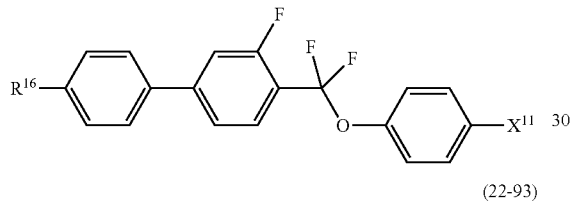
(22-93)
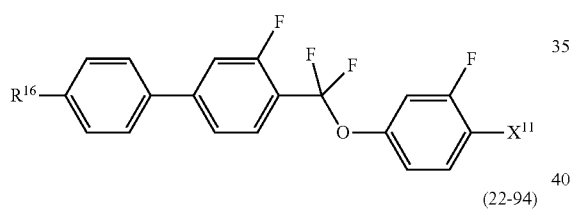
(22-94)
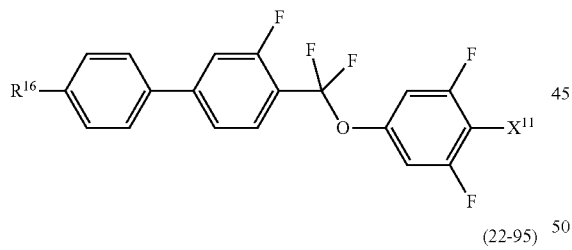
(22-95)
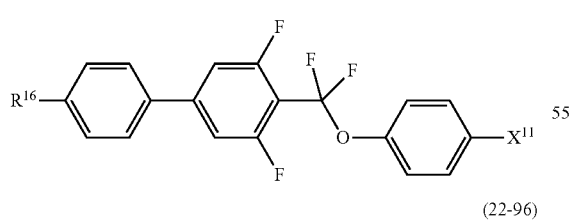
(22-96)
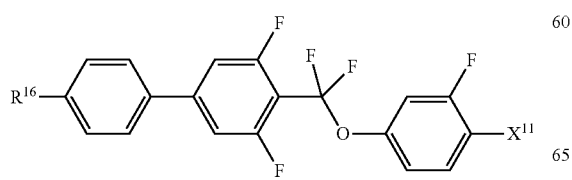
(22-97)
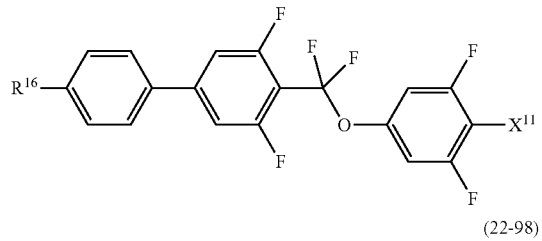
(22-98)
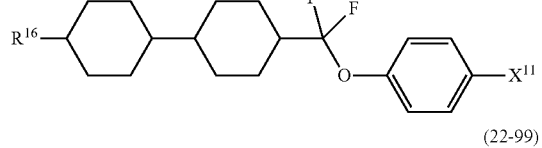
(22-99)
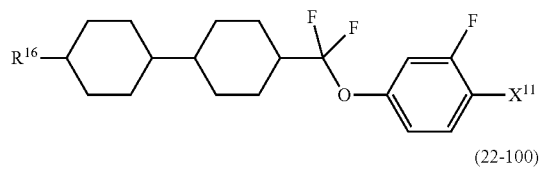
(22-100)
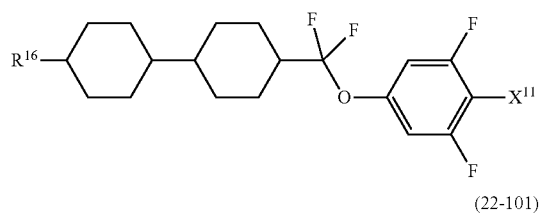
(22-101)
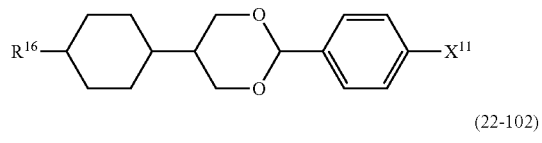
(22-102)
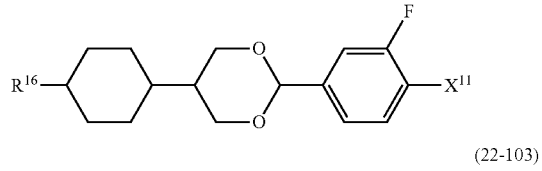
(22-103)
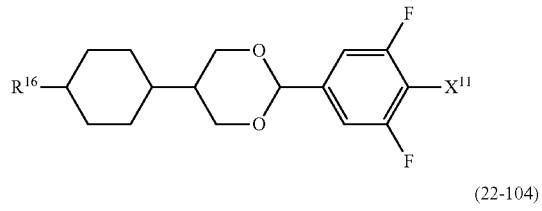
(22-104)
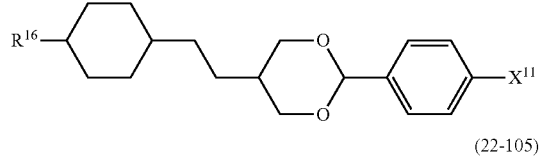
(22-105)
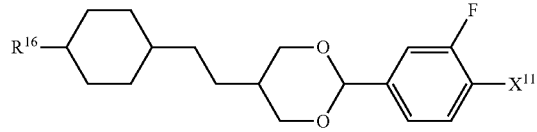

(22-106)
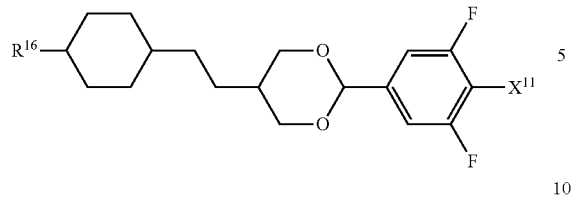
(22-107)
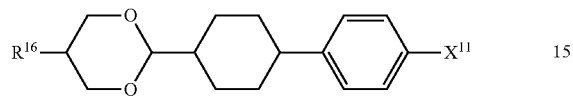
(22-108)
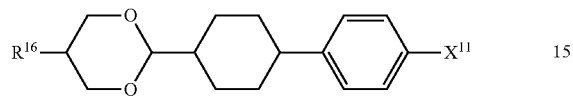
(22-109)
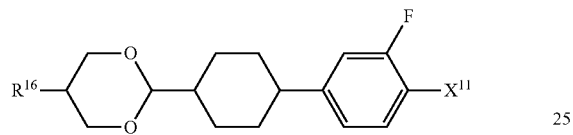
(22-110)
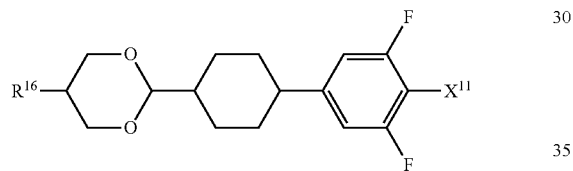
(22-111)
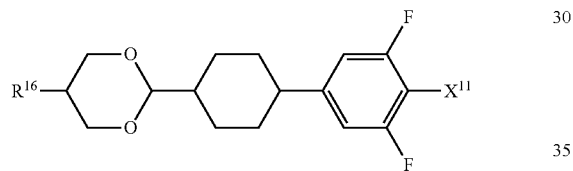
(22-112)
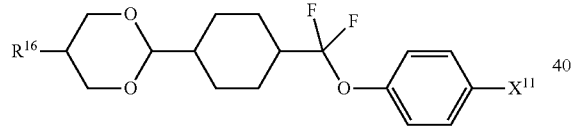
(22-113)
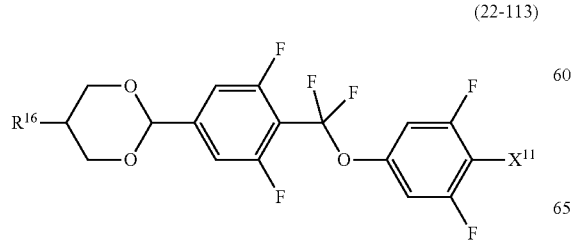
(22-114)
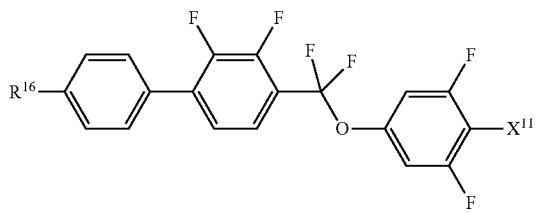
(22-115)
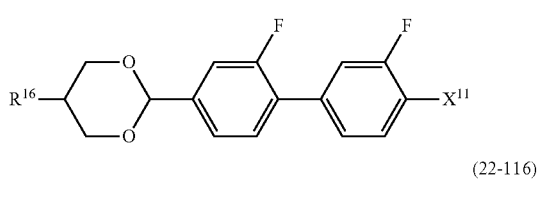
(22-116)
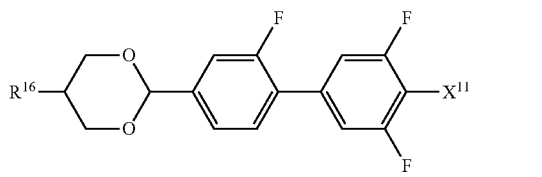
(23-1)
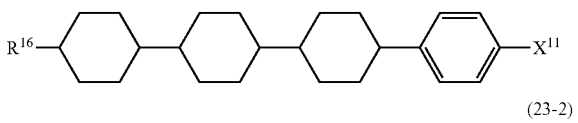
(23-2)
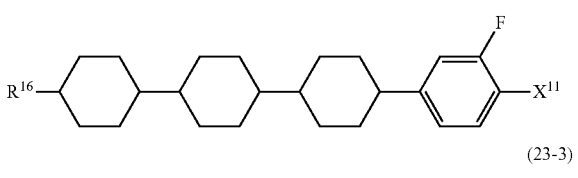
(23-3)
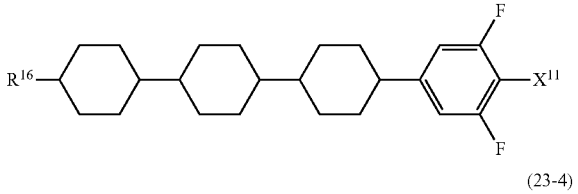
(23-4)
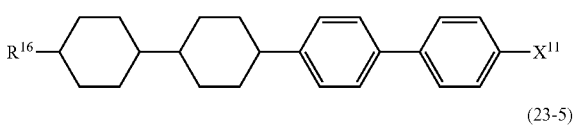
(23-5)
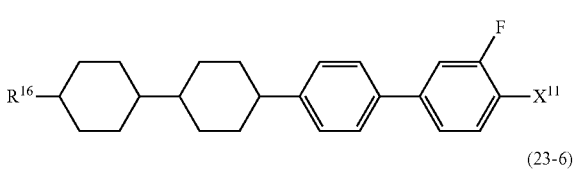
(23-6)
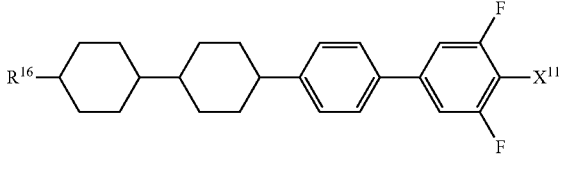

(23-7)
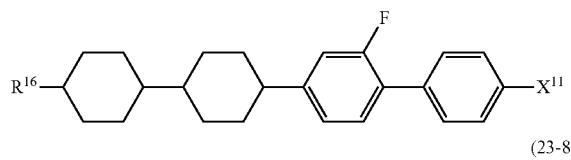
(23-8)
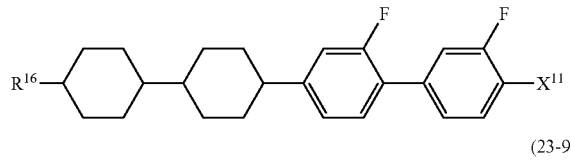
(23-9)
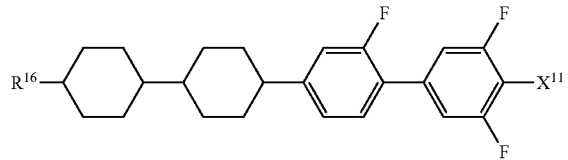
(23-10)
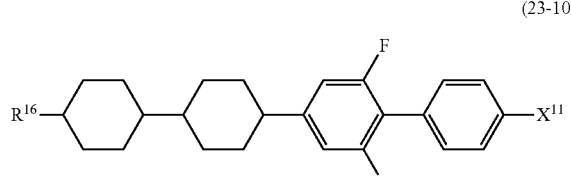
(23-11)
(23-12)
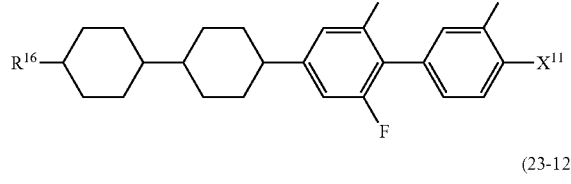
(23-13)
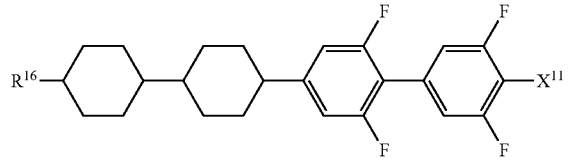
(23-14)
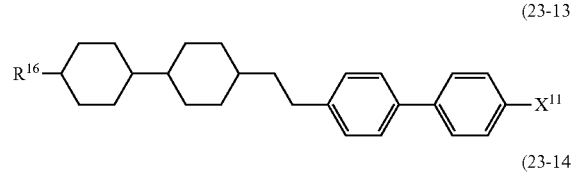
(23-15)
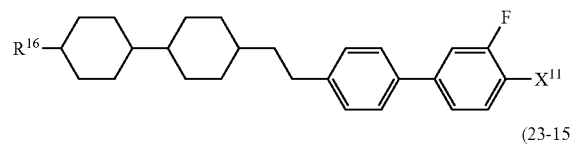
(23-16)
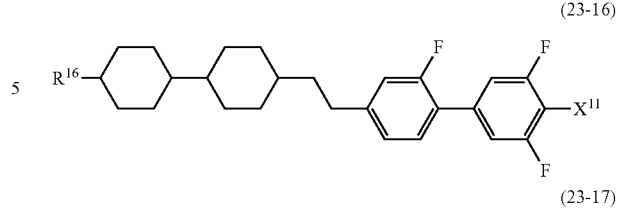
(23-17)
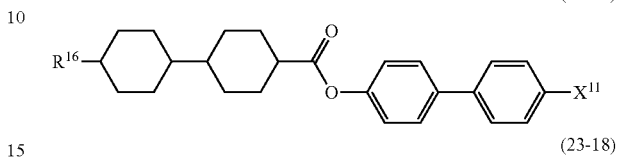
(23-18)
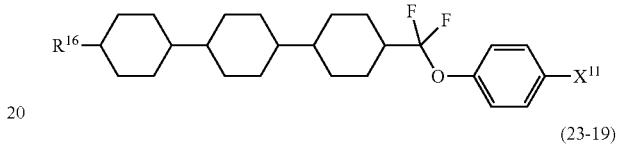
(23-19)
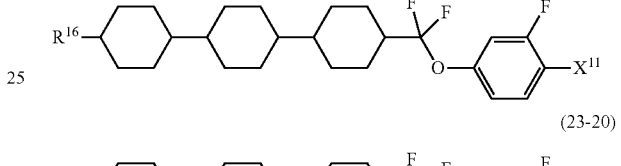
(23-20)
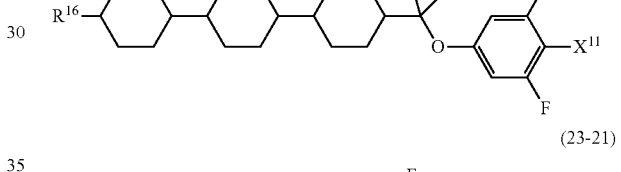
(23-21)
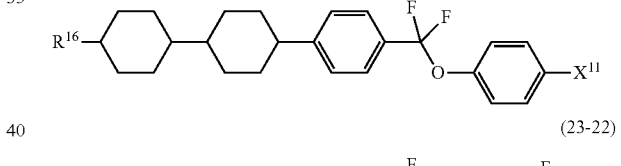
(23-22)
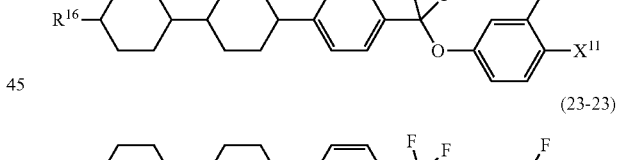
(23-23)
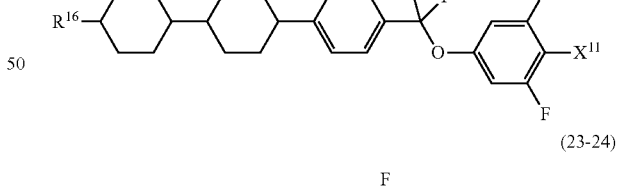
(23-24)
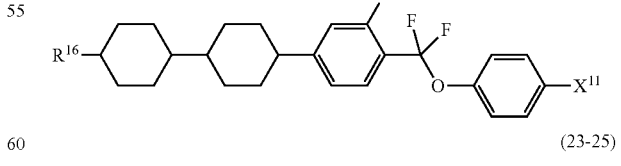
(23-25)
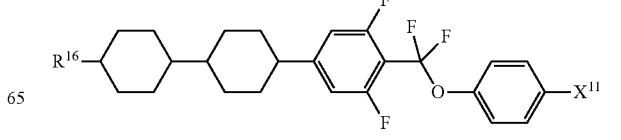

(23-26)
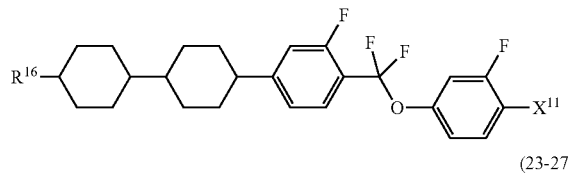
(23-27)
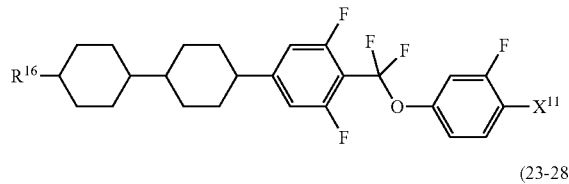
(23-28)
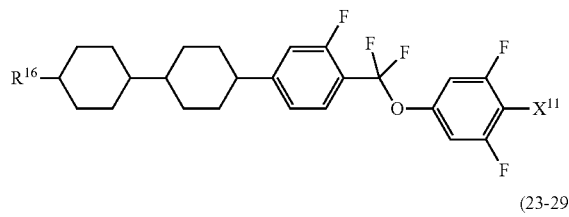
(23-29)
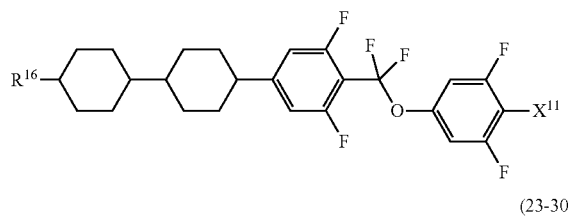
(23-30)
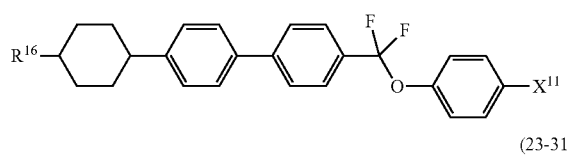
(23-31)
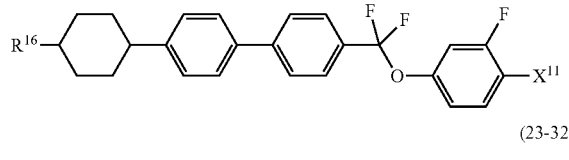
(23-32)
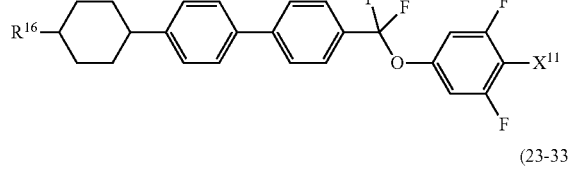
(23-33)
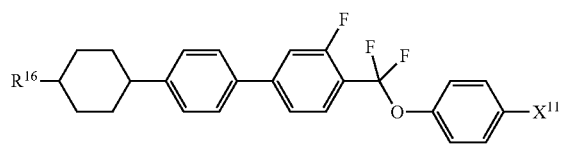
(23-34)
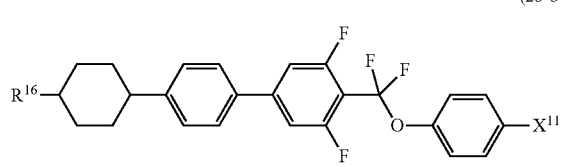
(23-35)
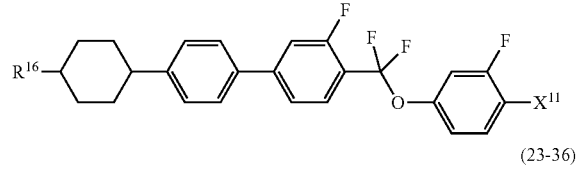
(23-36)
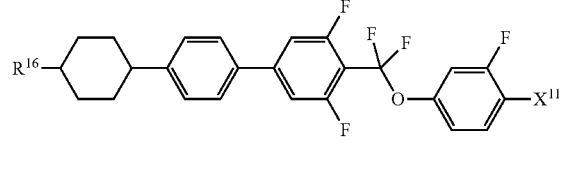
(23-37)
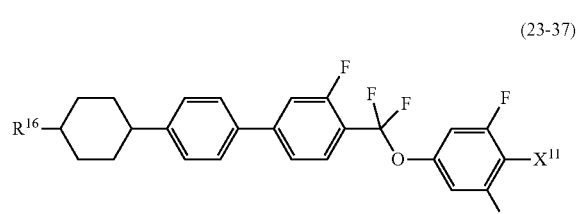
(23-38)
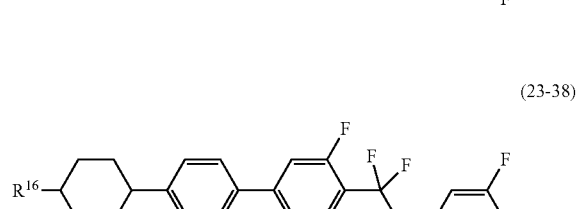
(23-39)
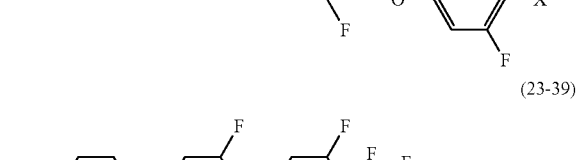
(23-40)
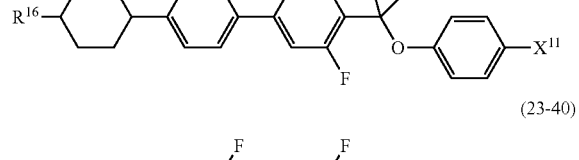
(23-41)
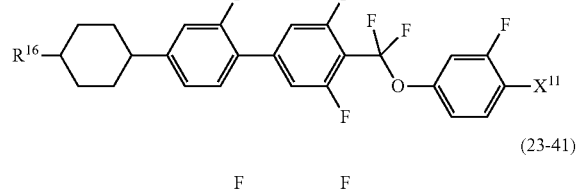
(23-42)
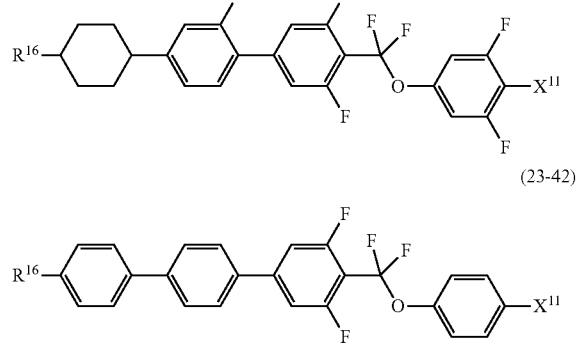

(23-43)
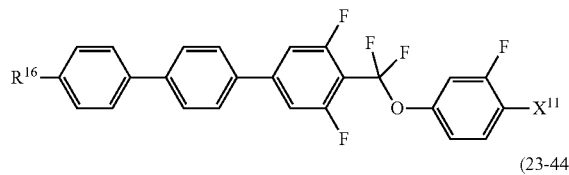
(23-44)
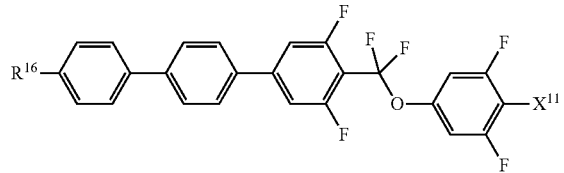
(23-45)
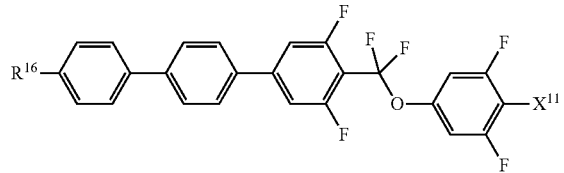
(23-46)
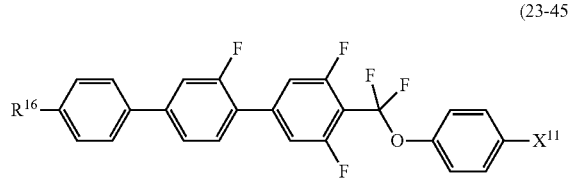
(23-47)
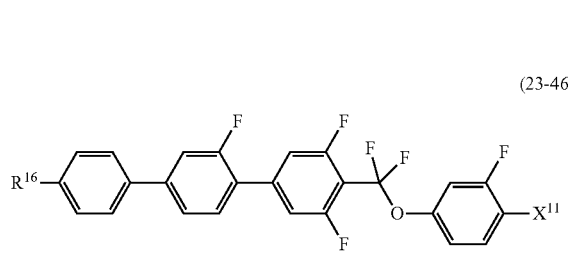
(23-48)
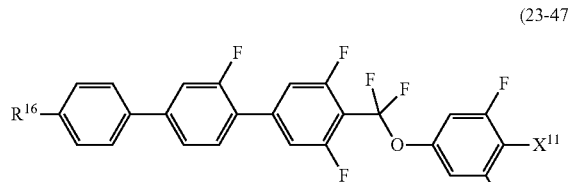
(23-49)
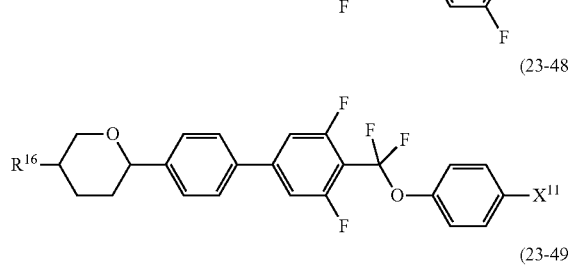
(23-50)
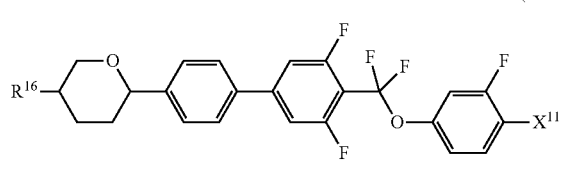
(23-51)
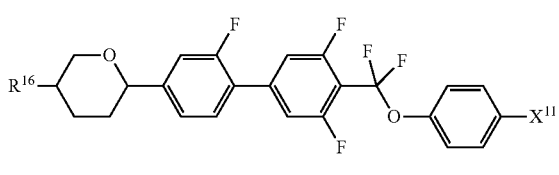
(23-52)
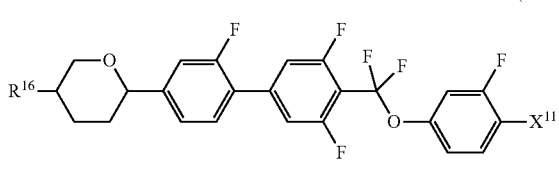
(23-53)
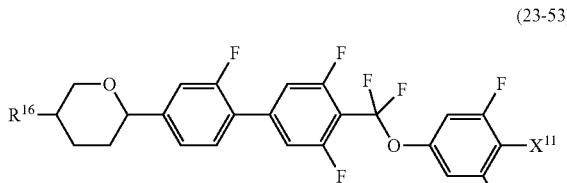
(23-54)
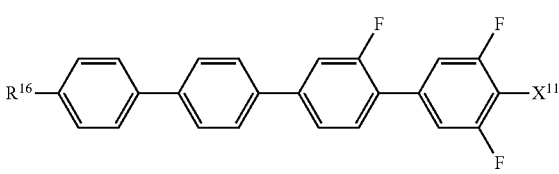
(23-55)
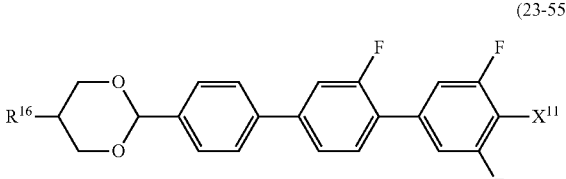
(23-56)
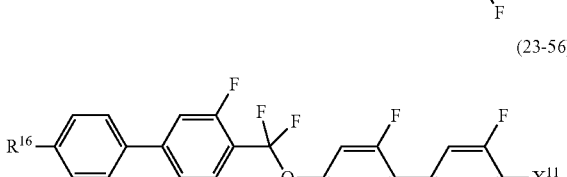
(23-57)
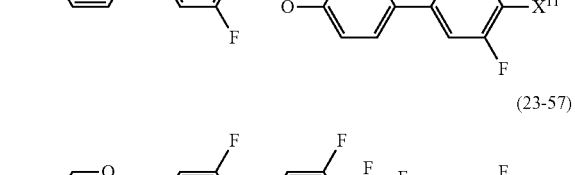
(23-58)
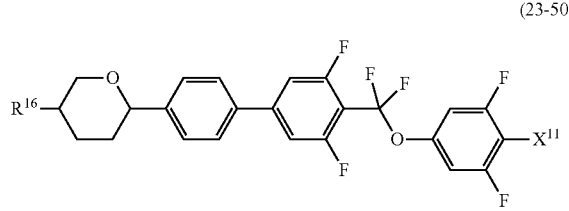

(23-59)

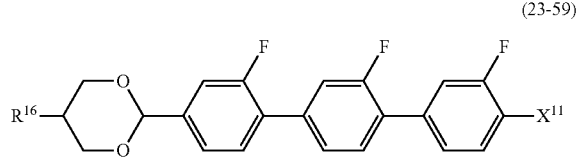

Since Component (d) has positive dielectric anisotropy and very favorable stability with respect to heat and light, it is used to prepare a composition for a mode such as IPS, FFS, and OCB. The content of Component (d) is suitably in a range of 1 weight % to 99 weight %, preferably in a range of 10 weight % to 97 weight %, and more preferably in a range of 40 weight % to 95 weight % on the basis of the weight of the liquid crystal composition. When Component (d) is added to a composition having negative dielectric anisotropy, the content of Component (d) is preferably 30 weight % or less. When Component (d) is added, it is possible to adjust an elastic constant of the composition and adjust a voltage-transmittance curve of the element.

Component (e) is Compound (24) in which the right terminal group is —C≡N or —C≡C—C≡N. Preferable examples of Component (e) include Compounds (24-1) to (24-64). In these compounds, $R^{17}$ is an alkyl group having 1 to 10 carbon atoms or an alkenyl group having 2 to 10 carbon atoms, and in these alkyl and alkenyl groups, at least one —CH$_2$— is optionally substituted with —O—, and in these groups, at least one hydrogen atom is optionally substituted with a fluorine atom. $X^{12}$ is —C≡N or —C≡C—C≡N.

(24-1)

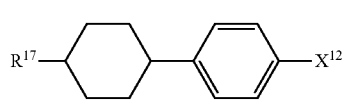

(24-2)

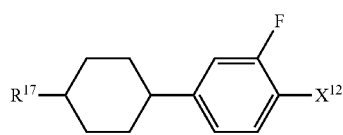

(24-3)

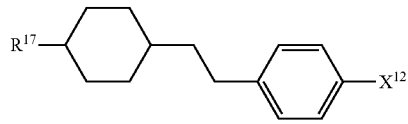

(24-4)

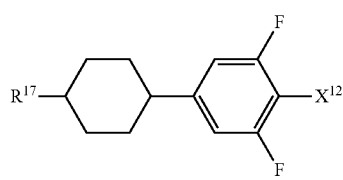

(24-5)

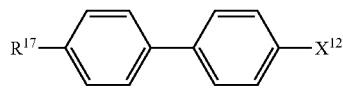

(24-6)

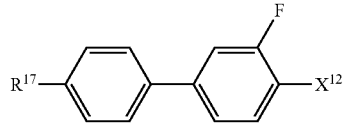

(24-7)

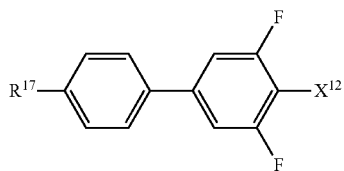

(24-8)

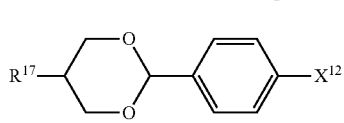

(24-9)

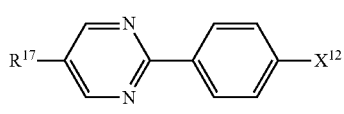

(24-10)

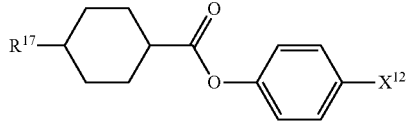

(24-11)

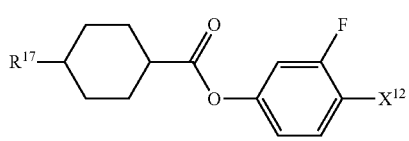

(24-12)

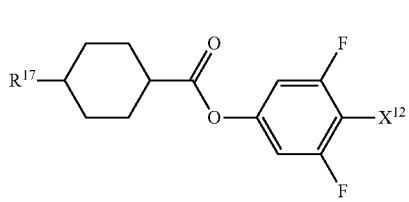

(24-13)

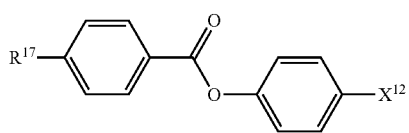

(24-14)

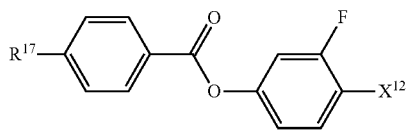

(24-15)

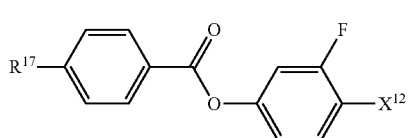

(24-16)

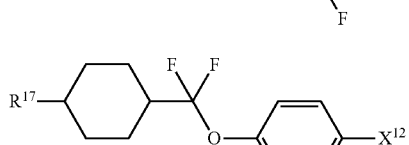

(24-17)

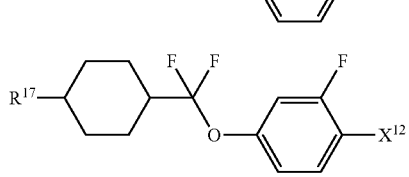

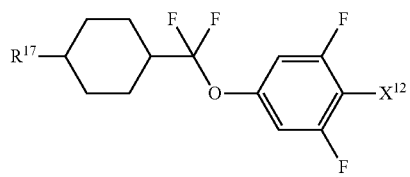
(24-18)
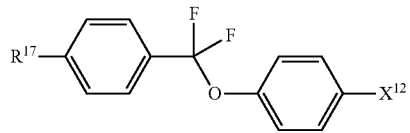
(24-19)
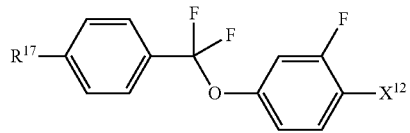
(24-20)
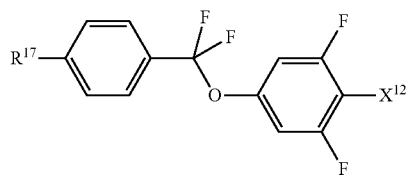
(24-21)
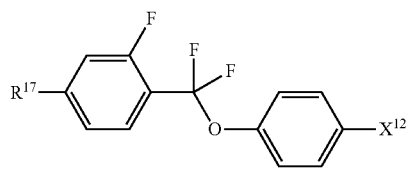
(24-22)
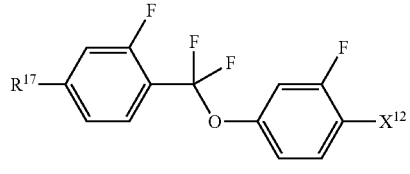
(24-23)
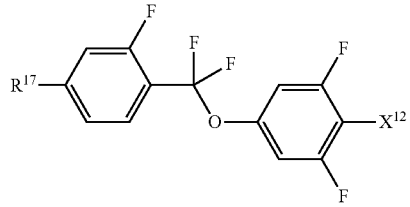
(24-24)
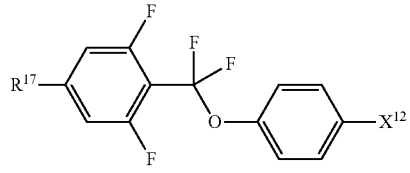
(24-25)
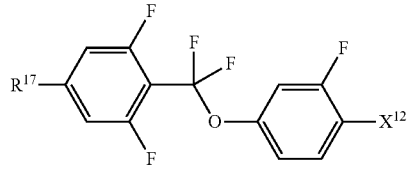
(24-26)
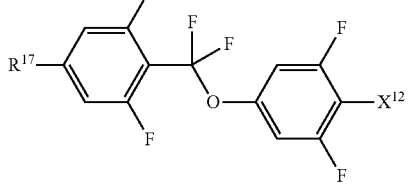
(24-27)
(24-28)
(24-29)
(24-30)
(24-31)
(24-32)
(24-33)
(24-34)
(24-35)
(24-36)

(24-37) 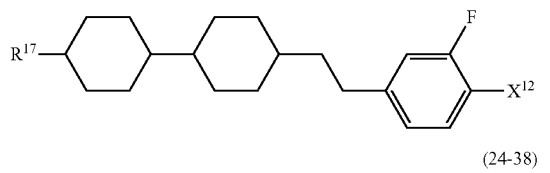
(24-38) 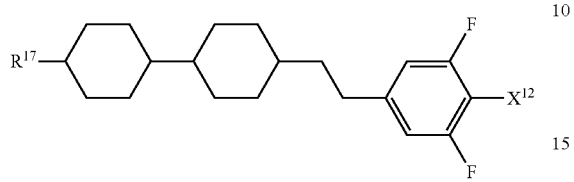
(24-39) 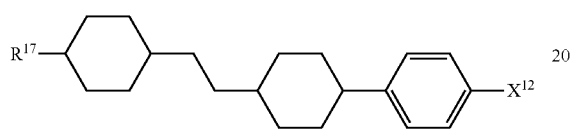
(24-40) 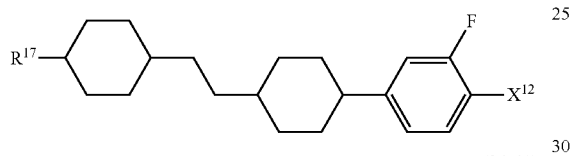
(24-41) 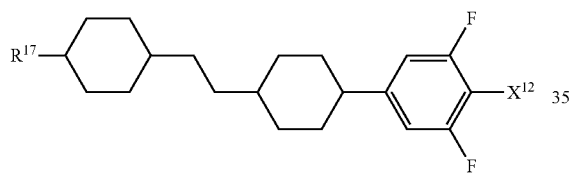
(24-42) 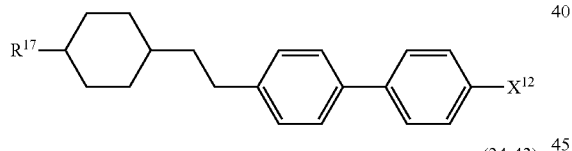
(24-43) 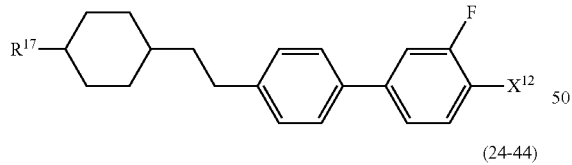
(24-44) 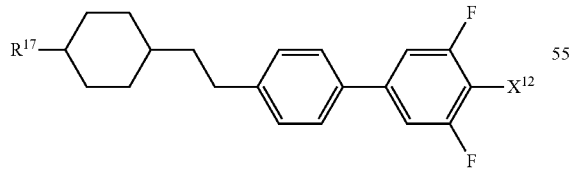
(24-45) 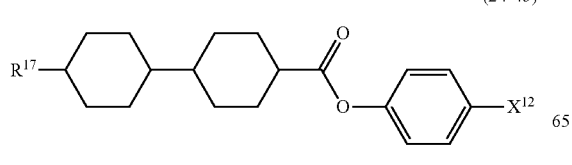
(24-46) 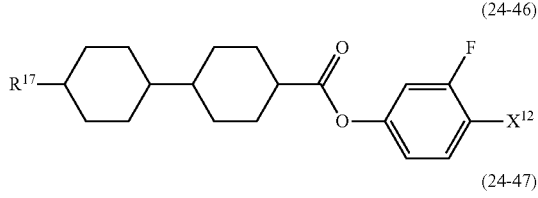
(24-47) 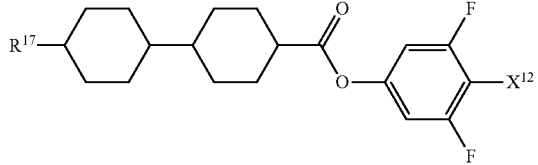
(24-48) 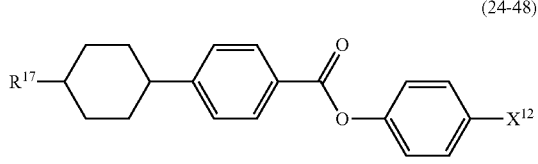
(24-49) 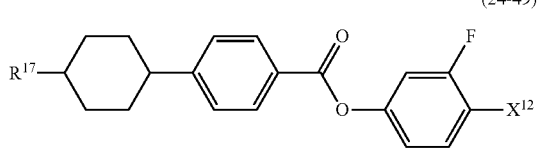
(24-50) 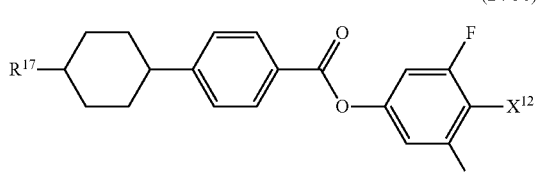
(24-51) 
(24-52) 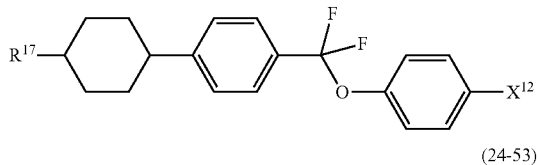
(24-53) 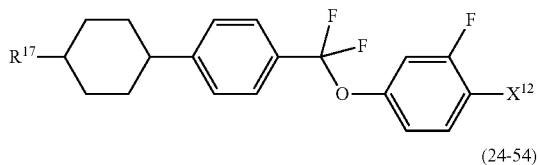
(24-54) 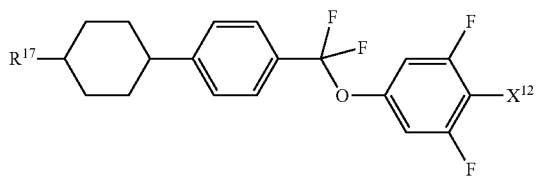

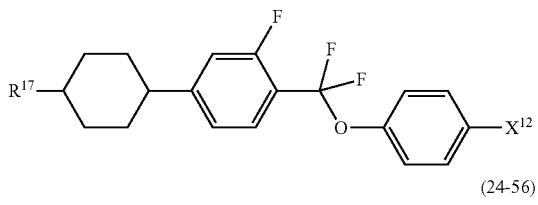
(24-55)

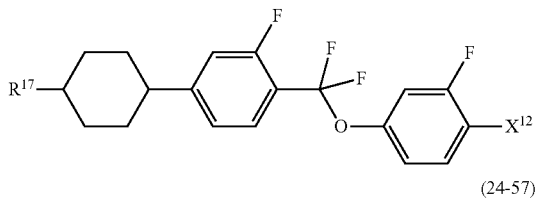
(24-56)

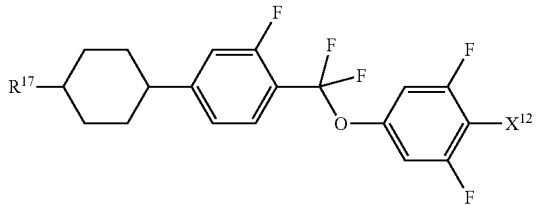
(24-57)

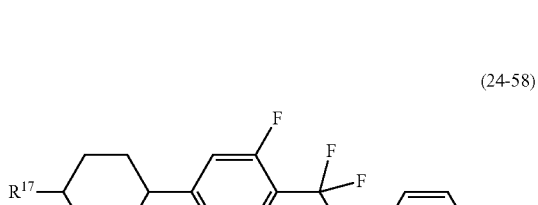
(24-58)

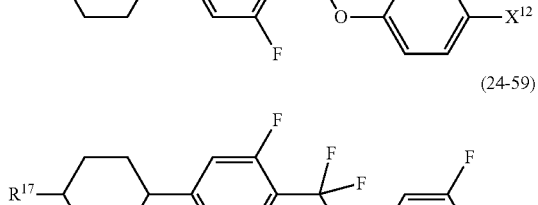
(24-59)

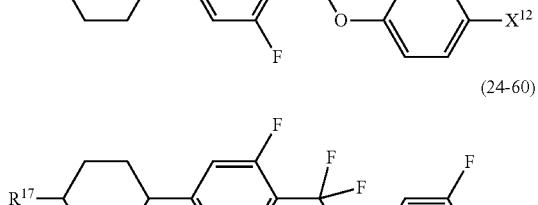
(24-60)

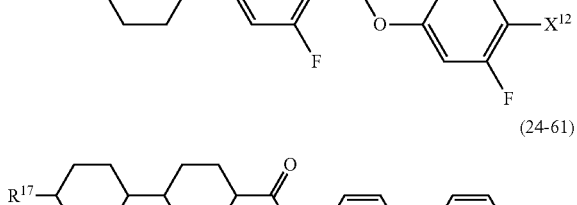
(24-61)

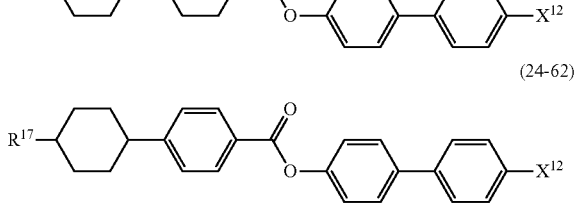
(24-62)

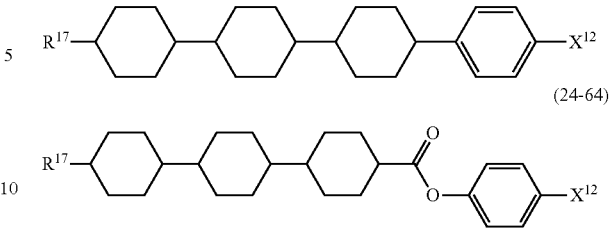
(24-63)

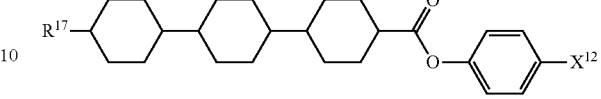
(24-64)

Since Component (e) has positive dielectric anisotropy and its value is large, it is used to prepare a composition for a mode such as TN. When Component (e) is added, it is possible to increase the dielectric anisotropy of the composition. Component (e) has an effect of widening a temperature range of the liquid crystal phase, adjusting the viscosity, or adjusting the optical anisotropy. Component (e) is also beneficial for adjusting a voltage-transmittance curve of the element.

When a composition for a mode such as TN is prepared, a proportion of the component D is suitably in a range of 1 weight % to 99 weight %, preferably in a range of 10 weight % to 97 weight %, and more preferably in a range of 40 weight % to 95 weight %. When the component D is added to a composition having negative dielectric anisotropy, a proportion of the component D is preferably 30 weight % or less. When the component D is added, it is possible to adjust an elastic constant of the composition and a voltage-transmittance curve of the element.

The component E is Compounds (9) to (15). These compounds have a phenylene in which the lateral positions are substituted with two halogen atoms as in 2,3-difluoro-1,4-phenylene. Preferable examples of the component E include Compounds (9-1) to (9-8), Compounds (10-1) to (10-17), Compound (11-1), Compounds (12-1) to (12-3), Compounds (13-1) to (13-11), Compounds (14-1) to (14-3), and Compounds (15-1) to (15-3). In these compounds, $R^{15}$, $R^{16}$, and $R^{17}$ are independently an alkyl group having 1 to 10 carbon atoms or an alkenyl group having 2 to 10 carbon atoms, and in these alkyl and alkenyl groups, at least one —$CH_2$— is optionally substituted with —O—, and in these groups, at least one hydrogen atom is optionally substituted with a fluorine atom, and $R^{17}$ may be a hydrogen atom or a fluorine atom.

The component E has large negative dielectric anisotropy. The component E is used when a composition for a mode such as IPS, VA, and PSA is prepared. As a proportion of the component E increases, the dielectric anisotropy of the composition becomes negatively larger, but the viscosity increases. Therefore, the proportion is preferably as small as possible as long as a required value of a threshold voltage of the element is satisfied. In consideration of the fact that the dielectric anisotropy is about −5, in order for driving at a sufficient voltage, the proportion is preferably 40 weight % or more.

Among the components E, since Compound (9) is a bicyclic compound, it has an effect of lowering the viscosity, adjusting the optical anisotropy, or increasing the dielectric anisotropy. Since Compounds (10) and (11) are a tricyclic compound, they have an effect of increasing the upper limit temperature, increasing the optical anisotropy, or increasing the dielectric anisotropy. Compounds (12) to (15) have an effect of increasing the dielectric anisotropy.

When a composition for a mode such as IPS, VA, and PSA is prepared, a proportion of the component E is preferably 40 weight % or more, and more preferably in a range of 50 weight % to 95 weight %. When the component E is added to a composition having positive dielectric anisotropy, a proportion of the component E is preferably 30 weight % or less. When the component E is added, it is possible to adjust an elastic constant of the composition and a voltage-transmittance curve of the element.

When Compound (1) is added to a composition in which the component B to the component E are appropriately combined, it is possible to prepare a liquid crystal composition that has at least one of physical properties such as high stability with respect to heat and light, a high upper limit temperature, a low lower limit temperature, a low viscosity, appropriate optical anisotropy (that is, large optical anisotropy or small optical anisotropy), large positive or negative dielectric anisotropy, a large specific resistance, and an appropriate elastic constant (that is, a large elastic constant or a small elastic constant). An element including such a composition has a wide temperature range in which the element can be used, a short response time, a high voltage holding ratio, a low threshold voltage, a large contrast ratio, low flicker rate, and a prolonged lifespan.

When the element is used for a long time, flicker may occur on a display screen. The flicker rate (%) can be represented as (luminance when positive voltage is applied-luminance when negative voltage is applied)/average luminance)×100. An element having a flicker rate in a range of 0% to 1% is less likely to cause flicker on the display screen even if the element is used for a long time. This flicker is related to image burning, and is assumed to be caused by a potential difference between a positive frame and a negative frame when the element is driven by an alternating current. A composition including Compound (1) is also beneficial for reducing the occurrence of flicker.

3-2. Additives

A liquid crystal composition is prepared by a known method. For example, component compounds are mixed, heated and dissolved together. According to applications, an additive may be added to this composition. Examples of the additive include a polymerizable compound, a polymerization initiator, a polymerization inhibitor, an optically active compound, an antioxidant, a UV absorber, a light stabilizer, a heat stabilizer, a dye, and an antifoaming agent. Such additives are well-known to those skilled in the art and described in documents.

In a liquid crystal display element having a polymer sustained alignment (PSA) mode, the composition includes a polymer. The polymerizable compound is added in order to form a polymer in the composition. While a voltage is applied between electrodes, when ultraviolet rays are emitted and the polymerizable compound is polymerized, the polymer is formed in the composition. According to this method, since a suitable pre-tilt is achieved, an element in which a response time is shortened and image burning is ameliorated is produced.

Preferable examples of the polymerizable compound include an acrylate, a methacrylate, a vinyl compound, a vinyloxy compound, propenyl ether, an epoxy compound (oxirane, oxetane), and vinyl ketone. More preferable examples include a compound having at least one acryloyloxy group and a compound having at least one methacryloyloxy group. Still more preferable examples include a compound having both an acryloyloxy group and a methacryloyloxy group.

More preferable examples are Compounds (M-1) to (M-18). In these compounds, $R^{25}$ to $R^{31}$ are a hydrogen atom or a methyl group; $R^{32}$, $R^{33}$, and $R^{34}$ are a hydrogen atom or an alkyl group having 1 to 5 carbon atoms, at least one of $R^{32}$, $R^{33}$, and $R^{34}$ is an alkyl group having 1 to 5 carbon atoms; v, w, and x are 0 or 1; and u and v are an integer of 1 to 10. $L^{21}$ to $L^{26}$ are a hydrogen atom or a fluorine atom; $L^{27}$ and $L^{28}$ are a hydrogen atom, a fluorine atom, or a methyl group.

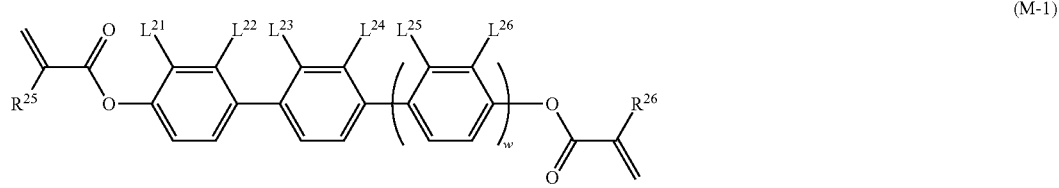

(M-1)

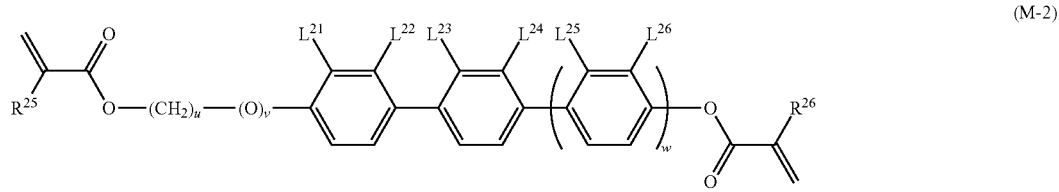

(M-2)

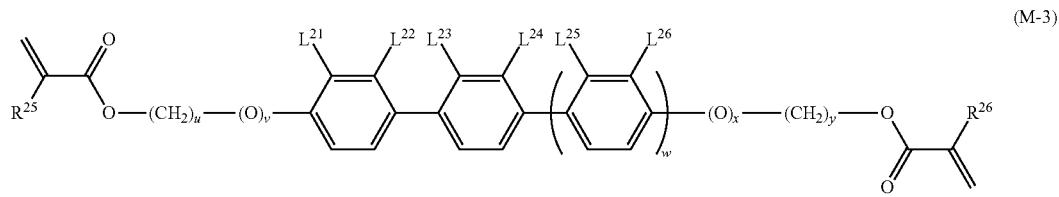

(M-3)

-continued
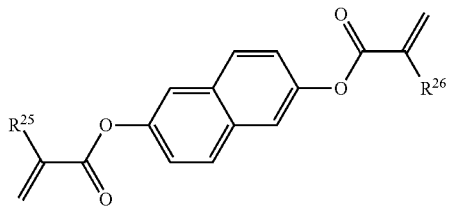
(M-4)
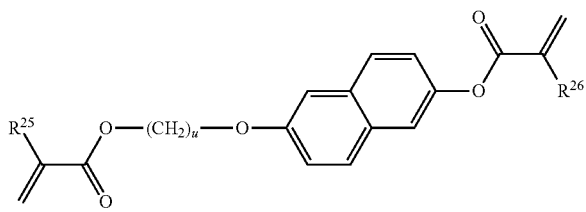
(M-5)
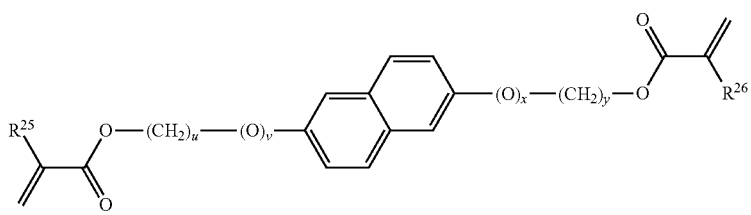
(M-6)
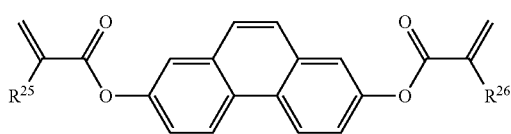
(M-7)
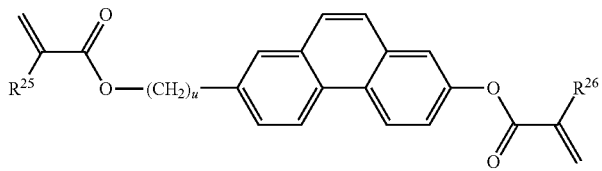
(M-8)
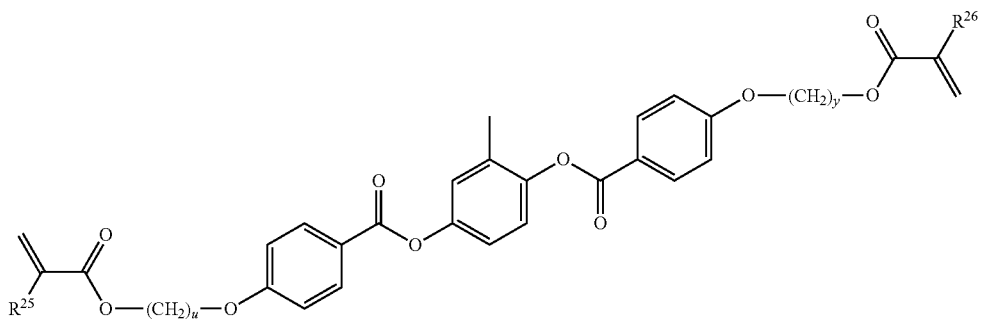
(M-9)
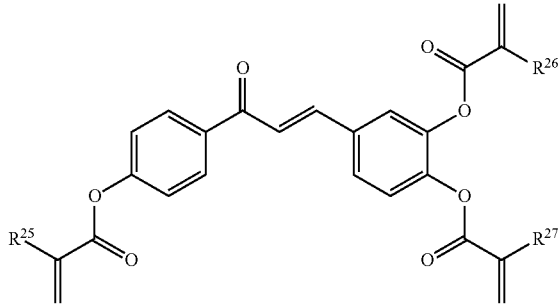
(M-10)

-continued
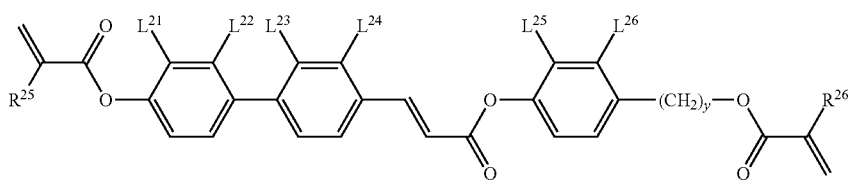
(M-11)
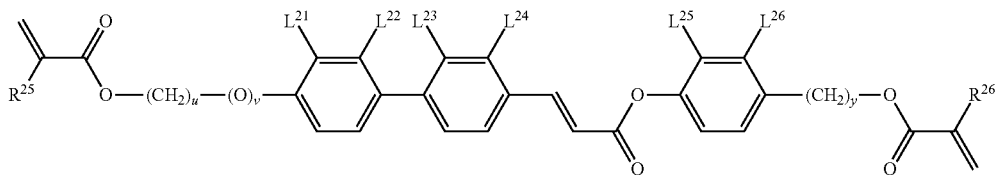
(M-12)
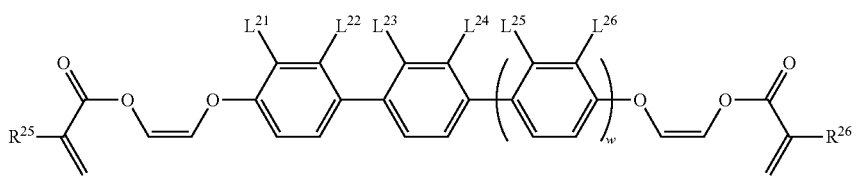
(M-13)
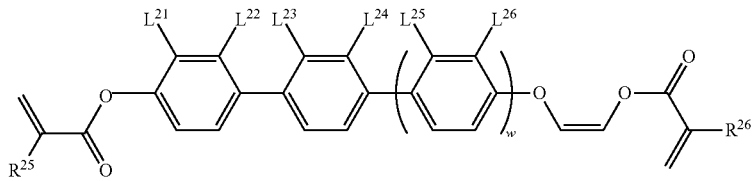
(M-14)
(M-15)
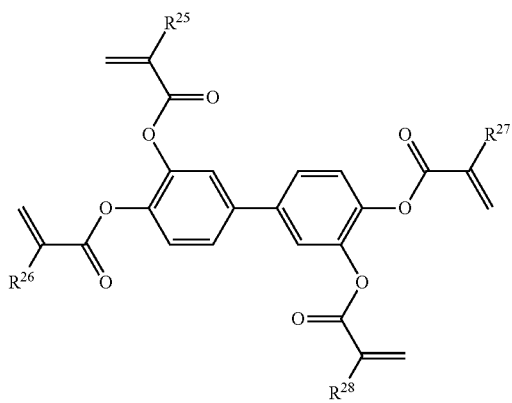
(M-16)
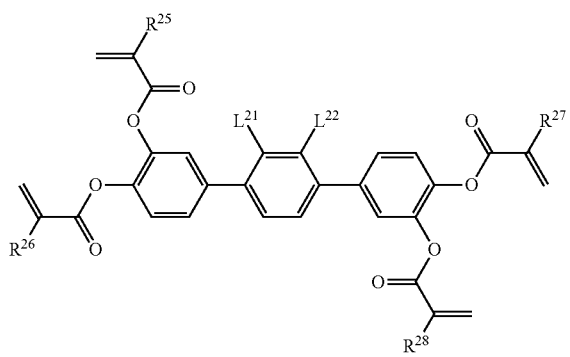

(M-17)

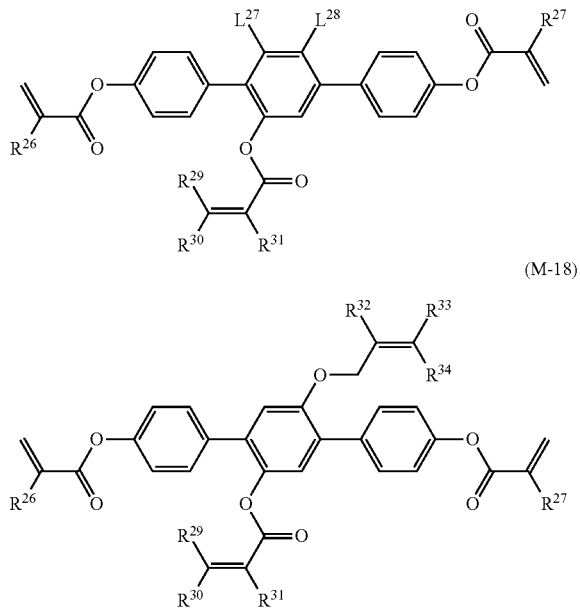

(M-18)

The polymerizable compound can be rapidly polymerized by adding a polymerization initiator. When reaction conditions are optimized, it is possible to reduce an amount of the polymerizable compound remaining. Examples of a photoradical polymerization initiator include Darocur series TPO, 1173, and 4265, and Irgacure series 184, 369, 500, 651, 784, 819, 907, 1300, 1700, 1800, 1850, and 2959 which are commercially available from BASF.

Additional examples of the photoradical polymerization initiator include 4-methoxyphenyl-2,4-bis(trichloromethyl) triazine, 2-(4-butoxystyryl)-5-trichloromethyl-1,3,4-oxadiazole, 9-phenylacridine, 9,10-benzphenazine, a benzophenone/Michler's ketone mixture, a hexaarylbiimidazole/mercaptobenzimidazole mixture, 1-(4-isopropylphenyl)-2-hydroxy-2-methylpropan-1-one, benzyldimethylketal, 2-methyl-1-[4-(methylthio)phenyl]-2-morpholinopropan-1-one, 2,4-diethyl xanthone/methyl p-dimethylaminobenzoate mixture, and a benzophenone/methyltriethanolamine mixture.

After a photoradical polymerization initiator is added to the liquid crystal composition, ultraviolet rays are emitted while an electric field is applied, and thus polymerization can be performed. However, unreacted polymerization initiator or decomposition products of a polymerization initiator may cause display defects such as image burning in the element. In order to prevent this, photopolymerization may be performed without adding a polymerization initiator. A preferable wavelength of light to be emitted is in a range of 150 nm to 500 nm. A more preferable wavelength is in a range of 250 nm to 450 nm, and a most preferable wavelength is in a range of 300 nm to 400 nm.

When the polymerizable compound is stored, a polymerization inhibitor may be added in order to prevent polymerization. Generally, the polymerizable compound is added to the composition when the polymerization inhibitor has not been removed. Examples of the polymerization inhibitor include hydroquinone, hydroquinone derivatives such as methyl hydroquinone, 4-t-butyl catechol, 4-methoxyphenol, and phenothiazine.

The optically active compound has an effect of inducing a helical structure in liquid crystal molecules, imparting a required helix angle, and thus preventing reverse twist. When the optically active compound is added, it is possible to adjust a helical pitch. Two or more optically active compounds may be added in order to adjust temperature dependence of the helical pitch. Preferable examples of the optically active compound include the following Compounds (Op-1) to (Op-18). In Compound (Op-18), a ring J is 1,4-cyclohexylene or 1,4-phenylene, and $R^{28}$ is an alkyl group having 1 to 10 carbon atoms. The symbol * indicates an asymmetric carbon atom.

(Op-1)

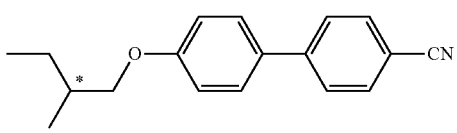

(Op-2)

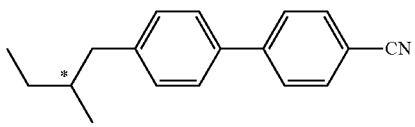

(Op-3)
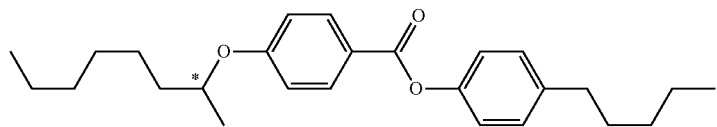
(Op-4)
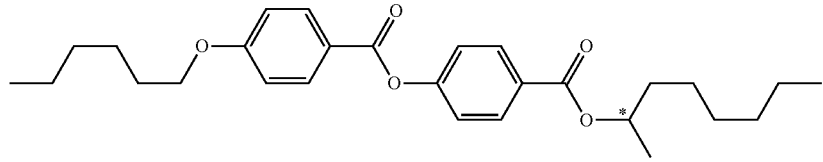
(Op-5)
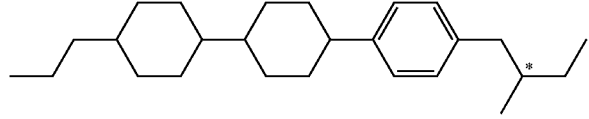
(Op-6)
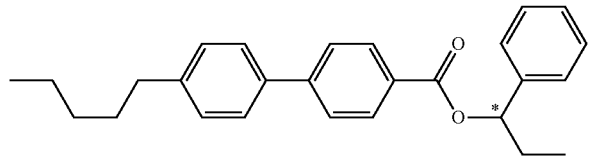
(Op-7)
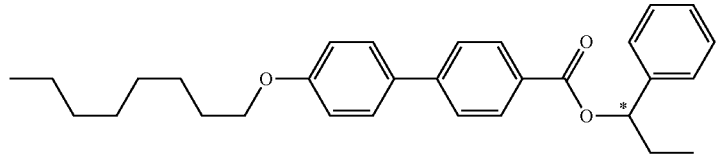
(Op-8)
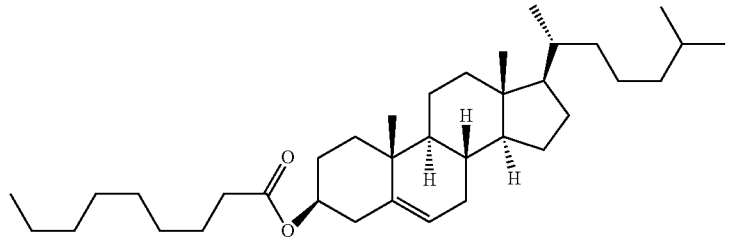
(Op-9)
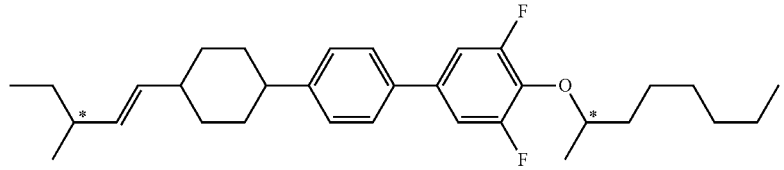
(Op-10)
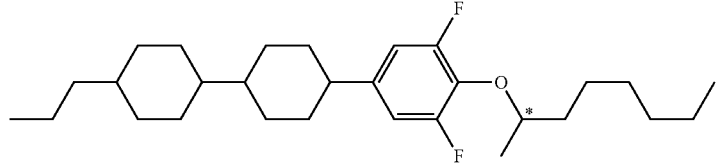
(Op-11)
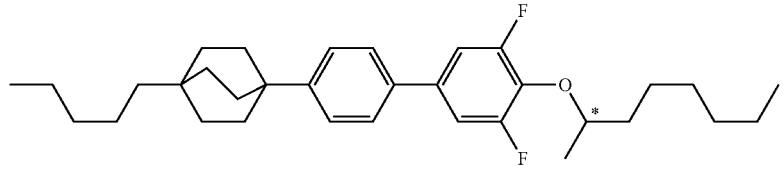

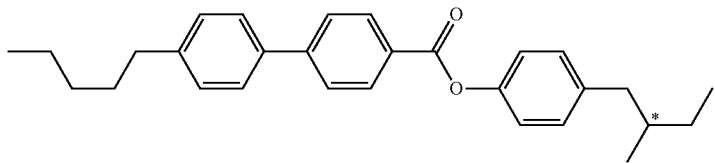
(Op-12)
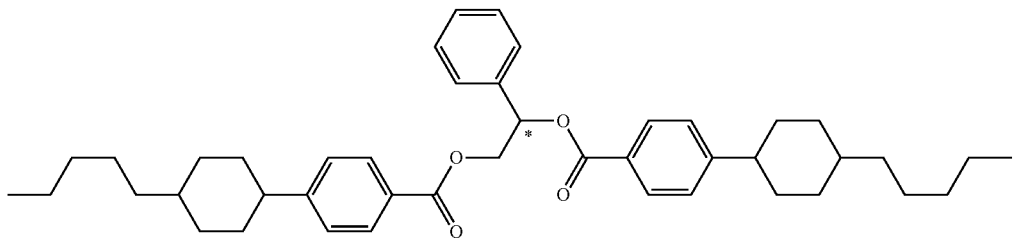
(Op-13)
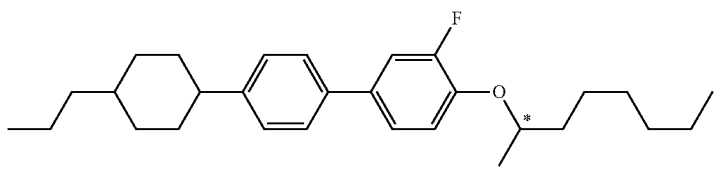
(Op-14)
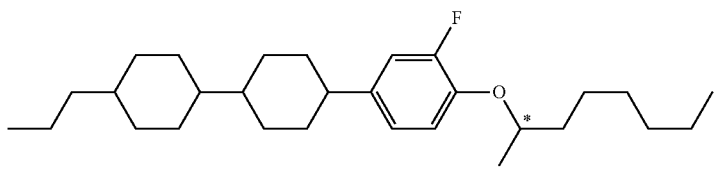
(Op-15)
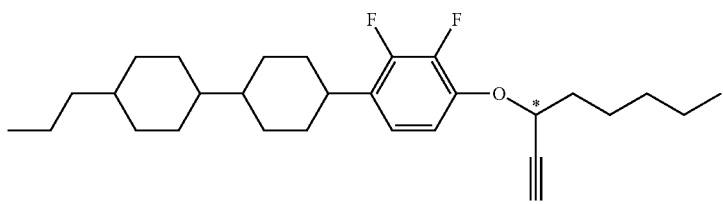
(Op-16)
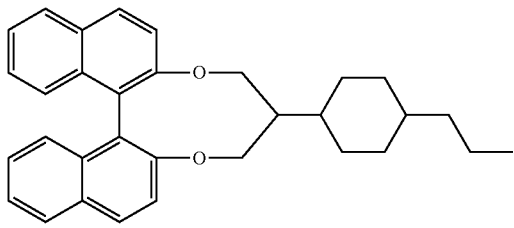
(Op-17)
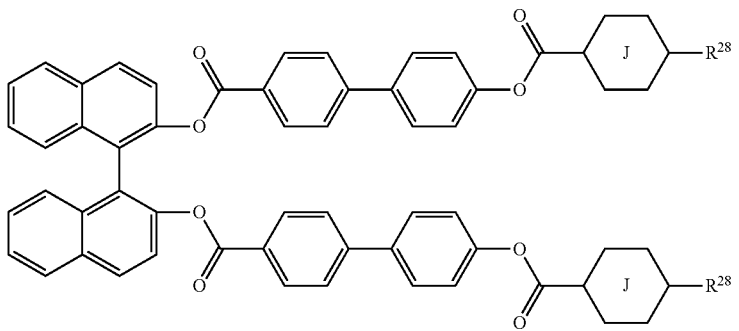
(Op-18)

An antioxidant is effective for maintaining a high voltage holding ratio. Preferable examples of the antioxidant include the following Compounds (AO-1) and (AO-2); Irganox 415, Irganox 565, Irganox 1010, Irganox 1035, Irganox 3114, and Irganox 1098 (product name; commercially available from BASF). A UV absorber is effective for preventing an upper limit temperature from decreasing. Preferable examples of the UV absorber include benzophenone derivatives, benzoate derivatives, and triazole derivatives. Specific examples include the following Compounds (AO-3) and (AO-4); Tinuvin 329, Tinuvin P, Tinuvin 326, Tinuvin 234, Tinuvin 213, Tinuvin 400, Tinuvin 328, and Tinuvin 99-2 (product name; commercially available from BASF); and 1,4-diazabicyclo[2.2.2]octane (DABCO).

A light stabilizer such as a sterically hindered amine is preferable in order to maintain a high voltage holding ratio. Preferable examples of the light stabilizer include the following Compounds (AO-5), (AO-6), and (AO-7); Tinuvin 144, Tinuvin 765, Tinuvin 770DF, and Tinuvin 780 (product name; commercially available from BASF); LA-52, LA-57, LA-77Y, and LA-77G (product name; commercially available from ADEKA). A heat stabilizer is also effective for maintaining a high voltage holding ratio. Preferable examples include Irgafos168 (product name; commercially available from BASF). In order to adapt the composition to an element in a guest host (GH) mode, a dichroic dye such as an azo dye or an anthraquinone dye is added to the composition. The antifoaming agent is effective for preventing foaming. Preferable examples of the antifoaming agent include dimethyl silicone oil and methylphenyl silicone oil.

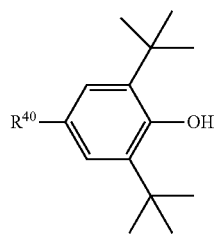

(AO-1)

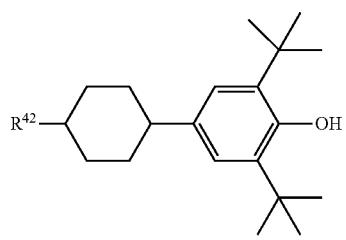

(AO-2)

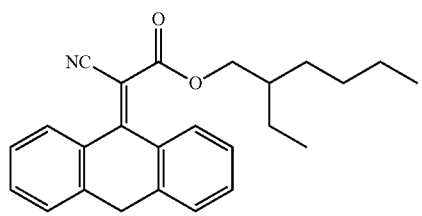

(AO-3)

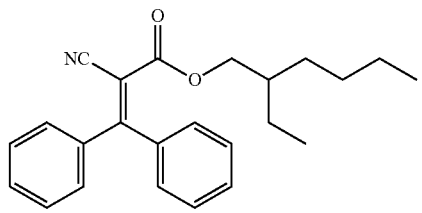

(AO-4)

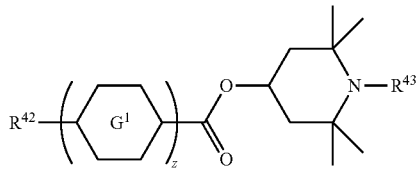

(AO-5)

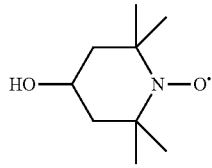

(AO-6)

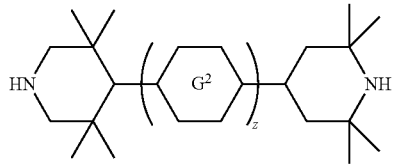

(AO-7)

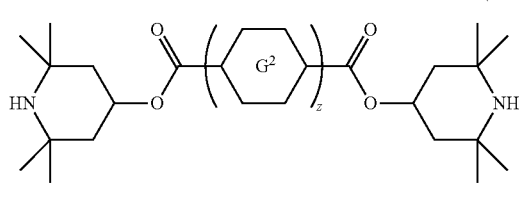

(AO-8)

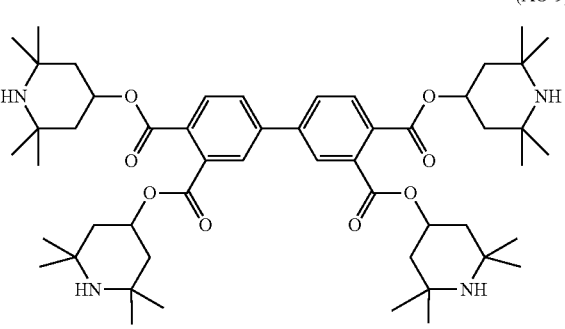

(AO-9)

In Compound (AO-1), $R^{40}$ is an alkyl group having 1 to 20 carbon atoms, an alkoxy group having 1 to 20 carbon atoms, —COOR$^{41}$, or —CH$_2$CH$_2$COOR$^{41}$, here, $R^{41}$ is an alkyl group having 1 to 20 carbon atoms. In Compounds (AO-2) and (AO-5), $R^{42}$ is an alkyl group having 1 to 20 carbon atoms. In Compound (AO-5), $R^{43}$ is a hydrogen atom, a methyl group or O-(oxygen radical); a ring $G^1$ is 1,4-cyclohexylene or 1,4-phenylene, in Compound (AO-7), a ring $G^2$ is 1,4-cyclohexylene, 1,4-phenylene, or 1,4-phenylene in which at least one hydrogen atom is substituted with a fluorine atom; and in Compounds (AO-5) and (AO-7), z is 1, 2, or 3.

4. Liquid Crystal Display Element

The liquid crystal composition can be used for a liquid crystal display element that has an operation mode such as PC, TN, STN, OCB, and PSA, and is driven by an active matrix method. This composition can also be used for a liquid crystal display element that has an operation mode such as PC, TN, STN, OCB, VA, and IPS and is driven by a passive matrix method. These elements can also be applied to any type of a reflective type, a transmissive type, and a semi-transmissive type.

This composition is also suitable for a nematic curvilinear aligned phase (NCAP) element, and here, the composition is microencapsulated. This composition can also be used for a polymer dispersed liquid crystal display element (PDLCD) and a polymer network liquid crystal display element (PNLCD). In these compositions, a large amount of the polymerizable compound is added. On the other hand, when a proportion of the polymerizable compound is 10 weight % or less, a liquid crystal display element in a PSA mode is produced. A preferable proportion is in a range of 0.1 weight % to 2 weight %. A more preferable proportion is in a range of 0.2 weight % to 1.0 weight %. An element in a PSA mode can be driven by a driving method such as an active matrix method and a passive matrix method. Such an element can also be applied to any type of a reflective type, a transmissive type, and a semi-transmissive type.

EXAMPLES

1. Measurement

The disclosure will be described in further detail with reference to examples. Since the examples are typical examples, the disclosure is not limited by the examples. Compound (1) was synthesized by the following procedures. The synthesized compounds were identified by a method such as NMR analysis. Physical properties of compounds and compositions and characteristics of elements were measured by the following methods.

NMR analysis: a DRX-500 (commercially available from Bruker BioSpin) was used for measurement. In $^1$H-NMR measurement, a sample was dissolved in a deuterated solvent such as $CDCL_3$ and measurement was performed under conditions of room temperature, 500 MHz, and a cumulative number of 16 measurements. Tetramethylsilane was used as an internal standard. $^{19}$F-NMR measurement was performed using $CFCl_3$ as an internal standard and a cumulative number of measurements was 24. In the explanation of nuclear magnetic resonance spectrums, s denotes singlet, d denotes doublet, t denotes triplet, q denotes quartet, quin denotes quintet, sex denotes sextet, m denotes multiplet, and br denotes broad.

Mass analysis: A QP-2010 Ultra type gas chromatography-mass spectrometer (commercially available from Shimadzu Corporation) was used for measurement. As a column, a capillary column DB-1 (with a length of 60 m, an inner diameter of 0.25 mm, and a film thickness of 0.25 µm, commercially available from Agilent Technologies Inc.) was used. Helium (1 ml/min) was used as a carrier gas. A temperature of a sample vaporization chamber was set to 300° C., a temperature of an ion source was set to 200° C., an ionization voltage was set to 70 eV, and an emission current was set to 150 uA. A sample was dissolved in acetone to prepare a 1 weight % solution, and 1 µl of the solution was injected into the sample vaporization chamber. As a recorder, a GCMSsolution system (commercially available from Shimadzu Corporation) was used.

Gas chromatographic analysis: A GC-2010 type gas chromatography instrument (commercially available from Shimadzu Corporation) was used for measurement. As a column, a capillary column DB-1 (with a length 60 m, an inner diameter of 0.25 mm, and a film thickness of 0.25 µm, commercially available from Agilent Technologies Inc.) was used. Helium (1 mL/min) was used as a carrier gas. A temperature of a sample vaporization chamber was set to 300° C., and a temperature of a detector (FID) was set to 300° C. A sample was dissolved in acetone to prepare a 1 weight % solution, and 1 µl of the solution was injected into the sample vaporization chamber. As a recorder, a GC Solution system (commercially available from Shimadzu Corporation) was used.

HPLC analysis: a Prominence (LC-20AD; SPD-20A, commercially available from Shimadzu Corporation) was used for measurement. As a column, a YMC-Pack ODS-A (with a length of 150 mm, an inner diameter of 4.6 mm, and a particle size of 5 µm, comercially available from YMC Co., Ltd.) was used. As an eluent, acetonitrile and water were appropriately mixed and used. As a detector, a UV detector, an RI detector, a CORONA detector, or the like was appropriately used. When a UV detector was used, a detection wavelength was set to 254 nm. A sample was dissolved in acetonitrile to prepare a 0.1 weight % solution and 1 µL of the solution was introduced into a sample chamber. As a recorder, a C-R7Aplus (commercially available from Shimadzu Corporation) was used.

UV-visible spectroscopic analysis: a PharmaSpec UV-1700 (commercially available from Shimadzu Corporation) was used for measurement. A detection wavelength of 190 nm to 700 nm was set. A sample was dissolved in acetonitrile to prepare a 0.01 mmol/L solution, and put into a quartz cell (optical path length of 1 cm) for measurement.

Measurement sample: when a phase structure and a transition temperature (a clearing point, a melting point, a polymerization initiation temperature, etc.) were measured, a compound itself was used as a sample. When physical properties such as an upper limit temperature in a nematic phase, a viscosity, optical anisotropy, and dielectric anisotropy were measured, a mixture of a compound and a mother liquid crystal was used as a sample.

Extrapolation method: When a sample in which a compound was mixed with a mother liquid crystal was used, measurement was performed as follows. A sample in which 15 weight % of the compound and 85 weight % of the mother liquid crystal were mixed together was prepared. An extrapolated value was calculated from the measured value of the sample according to the following equation and this value was described. <Extrapolated value>=(100×<measured value of sample>−<weight % of mother liquid crystal>×<measured value of mother liquid crystal>)/<weight % of compound>.

When a crystal (or a smectic phase) was precipitated at 25° C. at this ratio, the ratio between the compound and the mother liquid crystal was changed to 10 weight %:90 weight %, 5 weight %:95 weight %, and 1 weight %:99 weight % in that order, and physical properties of the sample were measured at a ratio at which no crystal (or a smectic phase) was precipitated at 25° C. Here, unless otherwise specified, the ratio between the compound and the mother liquid crystal was 15 weight %:85 weight %.

When the dielectric anisotropy of the compound was zero or positive, the following mother liquid crystal (A) was used. A proportion of each component is indicated by weight %.

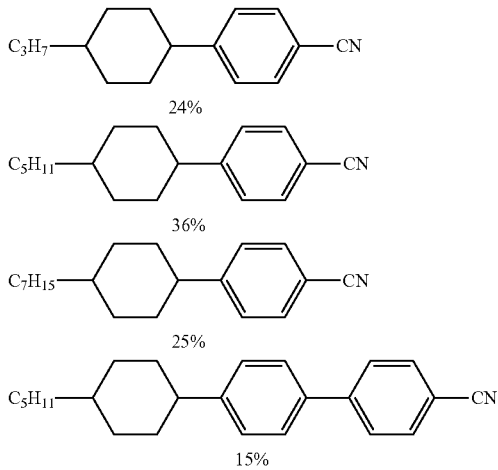

When the dielectric anisotropy of the compound was zero or negative, the following mother liquid crystal (B) was used. A proportion of each component is indicated by weight %.

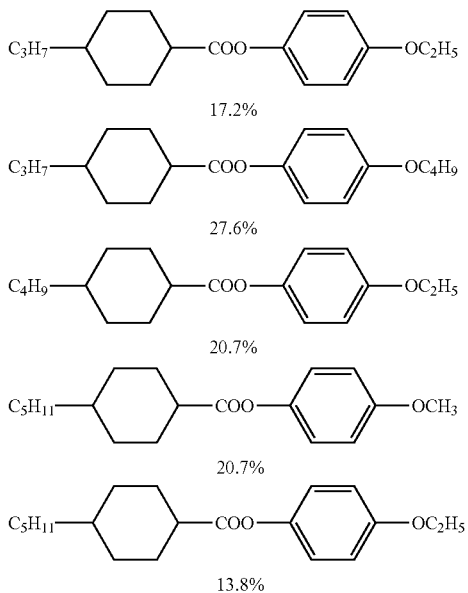

Measurement method: physical properties were measured by the following method. Most of these are described in JEITA standards (JEITA-ED-2521B) discussed and established by the Japan Electronics and Information Technology Industries Association (JEITA). Modified methods thereof were also used. No thin film transistor (TFT) was attached to a TN element used for measurement.

(1) Phase structure: A sample was placed on a hot plate (FP-52 type hot stage commercially available from Mettler) of a melting point measuring device including a polarization microscope. While this sample was heated at a speed of 3° C./min, a phase state and a change thereof were observed under a polarization microscope, and a type of the phase was identified.

(2) Transition temperature (° C.): A scanning calorimeter Diamond DSC system (commercially available from Perki-nElmer) or a high sensitivity differential scanning calorimeter X-DSC7000 (commercially available from Hitachi High-Tech Science Corporation) was used for measurement. The temperature of the sample was raised or lowered at a speed of 3° C./min, a starting point of an endothermic peak or an exothermic peak according to a phase change in the sample was obtained by extrapolation, and a transition temperature was determined. A melting point and a polymerization initiation temperature of the compound were measured using this device. A temperature at which the compound transitions from a solid phase to a liquid crystal phase such as a smectic phase or a nematic phase may be abbreviated as a "lower limit temperature of a liquid crystal phase." A temperature at which the compound transitions from a liquid crystal phase to a liquid phase may be abbreviated as a "clearing point."

A crystal is represented as C. When two types of crystal are distinguished, they are denoted as $C_1$ and $C_2$. The smectic phase is represented by S and the nematic phase is represented as N. When phases are distinguished as a smectic A phase, a smectic B phase, a smectic C phase, and a smectic F phase, they are represented as $S_A$, $S_B$, $S_C$, and $S_F$, respectively. A liquid (isotropic) is represented as I. The transition temperature is expressed as, for example, "C 50.0 N 100.0 I." This indicates that a transition temperature from a crystal to a nematic phase is 50.0° C., and a transition temperature from a nematic phase to a liquid is 100.0° C.

(3) Compatibility of compound: A mother liquid crystal and a compound were mixed such that a proportion of the compound was 20 weight %, 15 weight %, 10 weight %, 5 weight %, 3 weight %, or 1 weight % and thereby a sample was prepared. The sample was put into a glass bottle, and stored in a freezing chamber at −10° C. or −20° C. for a certain time. It was observed whether a nematic phase of the sample was maintained or a crystal (or a smectic phase) precipitated. Conditions in which a nematic phase was maintained were used as a measure of compatibility. A proportion of the compound and the temperature of the freezing chamber were changed as necessary.

(4) Upper limit temperature of nematic phase (TNT or NI; ° C.): A sample was placed on a hot plate of a melting point measuring device including a polarization microscope and heated at a speed of 1° C./min. A temperature at which a part of the sample changed from a nematic phase to an isotropic liquid was measured. When a sample is a mixture of Compound (1) and a mother liquid crystal, the sample is indicated by a symbol TNT. This value was calculated using the above extrapolation method. When a sample is a mixture of Compound (1) and a compound selected from among Compounds (2) to (15), the measured value is indicated by a symbol NI. The upper limit temperature of a nematic phase may be abbreviated as an "upper limit temperature."

(5) Lower limit temperature of nematic phase (Tc; ° C.): A sample having a nematic phase was put into a glass bottle and stored in a freezer at 0° C., −10° C., −20° C., −30° C., and −40° C. for 10 days, and then a liquid crystal phase was observed. For example, when the sample remained in a nematic phase at −20° C., and changed to a crystal or a smectic phase at −30° C., Tc is described as <−20° C. A lower limit temperature of the nematic phase may be abbreviated as a "lower limit temperature."

(6) Viscosity (bulk viscosity; η; measured at 20° C.; mPa·s): An E type rotational viscometer (commercially available from Tokyo Keiki) was used for measurement.

(7) Optical anisotropy (refractive index anisotropy; measured at 25° C.; Δn): Measurement was performed by an Abbe refractometer in which a polarizing plate was attached to an eyepiece using light with a wavelength of 589 nm. A surface of a main prism was rubbed in one direction and the sample was then added dropwise onto the main prism. A refractive index (n∥) was measured when a direction of polarized light was parallel to a rubbing direction. A refractive index (n⊥) was measured when a direction of polarized light was perpendicular to a rubbing direction. A value of optical anisotropy (Δn) was calculated from the equation Δn=n∥−n⊥.

(8) Specific resistance (ρ; measured at 25° C.; Ωcm): 1.0 mL of a sample was injected into a container including an electrode. A DC voltage (10 V) was applied to this container and a direct current was measured after 10 seconds. A specific resistance was computed from the following equation. (Specific resistance)={(voltage)×(electric capacitance of container)}/{(direct current)×(dielectric constant of vacuum)}.

(9) Voltage holding ratio (VHR-1; measured at 25° C.; %): A TN element used for measurement included a polyimide alignment film, and an interval (cell gap) between two glass substrates was 5 μm. This element was sealed with an adhesive that was cured with ultraviolet rays after the sample was inserted. A pulse voltage (at 5 V for 60 microseconds) was applied to this element for charging. An attenuating voltage was measured for 16.7 milliseconds by a high-speed voltmeter, and an area A between a voltage curve in a unit cycle and the horizontal axis was obtained. An area B was an area when the voltage was not attenuated. A voltage holding ratio was expressed as a percentage of the area A with respect to the area B.

(10) Voltage holding ratio (VHR-2; measured at 80° C.; %): A voltage holding ratio was measured in the same manner as in the above method except that the voltage holding ratio was measured at 80° C. instead of 25° C. The result was indicated by a symbol VHR-2.

(11) Flicker rate (measured at 25° C.; %): A multimedia display tester 3298F (commercially available from Yokogawa Electric Corporation) was used for measurement. A light source was an LED. An interval (cell gap) between two glass substrates was 3.5 μm, and a sample was inserted into an FFS element in a normally black mode in which a rubbing direction was antiparallel. This element was sealed using an adhesive that was cured with ultraviolet rays. A voltage was applied to this element, and a voltage at which a quantity of light that had passed through the element was a maximum was measured. A sensor part was brought close to the element while the voltage was applied to the element, and a displayed flicker rate was read.

A physical property measurement method was different between a sample having positive dielectric anisotropy and a sample having negative dielectric anisotropy. A measurement method for positive dielectric anisotropy will be described from measurement (12a) to measurement (16a). A measurement method in negative dielectric anisotropy will be described from measurement (12b) to measurement (16b).

(12a) Viscosity (rotational viscosity; γ1; measured at 25° C.; mPa·s; sample with positive dielectric anisotropy): Measurement was performed according to a method described in M. Imai et al., Molecular Crystals and Liquid Crystals, Vol. 259, 37 (1995). A sample was inserted into a TN element in which a twist angle was 0 degrees and an interval (cell gap) between two glass substrates was 5 μm. Voltages from 16 V to 19.5 V were gradually applied at 0.5 V intervals to this element. After no voltage was applied for 0.2 seconds, application was repeated under conditions of one square wave (square pulse; 0.2 seconds) and no voltage application (2 seconds). A peak current and a peak time of a transient current generated by this application were measured. A value of the rotational viscosity was obtained from these measured values and Equation (8) on page 40 in the paper (M. Imai et al.). A value of the dielectric anisotropy necessary for this calculation was obtained by the method described below using an element for which the rotational viscosity was measured.

(12b) Viscosity (rotational viscosity; γ1; measured at 25° C.; mPa·s; sample with negative dielectric anisotropy): Measurement was performed according to a method described in M. Imai et al., Molecular Crystals and Liquid Crystals, Vol. 259, 37 (1995). A sample was inserted into a VA element in which an interval (cell gap) between two glass substrates was 20 μm. Voltages from 39 V to 50 V were gradually applied at 1 V intervals to this element. After no voltage was applied for 0.2 seconds, application was repeated under conditions of one square wave (square pulse; 0.2 seconds) and no voltage application (2 seconds). A peak current and a peak time of a transient current generated by this application were measured. A value of the rotational viscosity was obtained from these measured values and Equation (8) on page 40 in the paper (M. Imai et al.). The dielectric anisotropy required for this calculation was measured in the following dielectric anisotropy section.

(13a) Dielectric anisotropy (Δε; measured at 25° C.; sample with positive dielectric anisotropy): A sample was inserted into a TN element in which an interval (cell gap) between two glass substrates was 9 μm and a twist angle was 80 degrees. A sine wave (10 V, 1 kHz) was applied to this element, and after 2 seconds, a dielectric constant (ε∥) in a long axis direction of liquid crystal molecules was measured. A sine wave (0.5 V, 1 kHz) was applied to this element, and after 2 seconds, a dielectric constant (ε⊥) in a short axis direction of liquid crystal molecules was measured. A value of the dielectric anisotropy was calculated from the equation Δε=ε∥−ε⊥.

(13b) Dielectric anisotropy (Δε; measured at 25° C.; sample with negative dielectric anisotropy): A value of the dielectric anisotropy was calculated from the equation Δε=ε∥−ε⊥. A dielectric constant (ε∥ and ε⊥) was measured as follows.

1) Measurement of dielectric constant (ε⊥): An ethanol (20 mL) solution containing octadecyltriethoxysilane (0.16 mL) was applied to a well-washed glass substrate. The glass substrate was rotated by a spinner and then heated at 150° C. for 1 hour. A sample was inserted into a VA element in which an interval (cell gap) between two glass substrates was 4 μm, and this element was sealed using an adhesive that was cured with ultraviolet rays. A sine wave (0.5 V, 1 kHz) was applied to this element and after 2 seconds, a dielectric constant (ε∥) in a long axis direction of liquid crystal molecules was measured.

2) Measurement of dielectric constant (ε⊥): A polyimide solution was applied to a well-washed glass substrate. The glass substrate was fired and a rubbing treatment was then performed on the obtained alignment film. A sample was inserted into a TN element in which an interval (cell gap) between two glass substrates was 9 μm and a twist angle was 80 degrees. A sine wave (0.5 V, 1 kHz) was applied to this element, and after 2 seconds, a dielectric constant ($\varepsilon\perp$) in a short axis direction of liquid crystal molecules was measured.

(14a) Elastic constant (K; measured at 25° C.; pN; sample with positive dielectric anisotropy): A HP4284A type LCR meter (commercially available from Yokogawa-Hewlett-Packard Company) was used for measurement. A sample was inserted into a horizontally aligned element in which an interval (cell gap) between two glass substrates was 20 μm. A charge of 0 V to 20 V was applied to this element, and an electrostatic capacitance (C) and an applied voltage (V) were measured. These measured values were fitted using Equation (2.98) and Equation (2.101) on page 75 in "Liquid Crystal Device Handbook" (commercially available from Nikkan Kogyo Shimbun, Ltd.), and values of $K_{11}$ and $K_{33}$ were obtained from Equation (2.99). Next, in Equation (3.18) on page 171, $K_{22}$ was computed using the values of $K_{11}$ and $K_{33}$ obtained above. An elastic constant K was expressed as an average value of $K_{11}$, $K_{22}$, and $K_{33}$ obtained in this manner.

(14b) Elastic constant ($K_{11}$ and $K_{33}$; measured at 25° C.; pN; sample with negative dielectric anisotropy): An EC-1 type elastic constant measuring instrument (commercially available from TOYO Corporation) was used for measurement. A sample was inserted into a vertically aligned element in which an interval (cell gap) between two glass substrates was 20 μm. A charge of 20 V to 0 V was applied to this element, and an electrostatic capacitance (C) and an applied voltage (V) were measured. These values were fitted using Equation (2.98), and Equation (2.101) on page 75 in "Liquid Crystal Device Handbook" (commercially available from Nikkan Kogyo Shimbun, Ltd.) and a value of the elastic constant was obtained from Equation (2.100).

(15a) Threshold voltage (Vth; measured at 25° C.; V; sample with positive dielectric anisotropy): An LCD5100 type luminance meter (commercially available from Otsuka Electronics) was used for measurement. A light source was a halogen lamp. A sample was inserted into a TN element in a normally white mode in which an interval (cell gap) between two glass substrates was 0.45/Δn (μm) and a twist angle was 80 degrees. A voltage (32 Hz, square wave) applied to this element was gradually increased by 0.02 V from 0 V to 10 V. In this case, light was emitted to the element in a vertical direction and a quantity of light that had passed through the element was measured. A voltage-transmittance curve in which the transmittance was 100% when the quantity of light was a maximum and the transmittance was 0% when the quantity of light was a minimum was created. A threshold voltage was a voltage when the transmittance was 90%.

(15b) Threshold voltage (Vth; measured at 25° C.; V; sample with negative dielectric anisotropy): An LCD5100 type luminance meter (commercially available from Otsuka Electronics) was used for measurement. A light source was a halogen lamp. A sample was inserted into a VA element in a normally black mode in which an interval (cell gap) between two glass substrates was 4 μm and a rubbing direction was antiparallel, and this element was sealed using an adhesive that was cured with ultraviolet rays. A voltage (60 Hz, square wave) applied to this element was gradually increased by 0.02 V from 0 V to 20 V. In this case, light was emitted to the element in a vertical direction and a quantity of light that had passed through the element was measured. A voltage-transmittance curve in which the transmittance was 100% when the quantity of light was a maximum and the transmittance was 0% when the quantity of light was a minimum was created. A threshold voltage was a voltage when the transmittance was 10%.

(16a) Response time ($\tau$; measured at 25° C.; ms; sample with positive dielectric anisotropy): An LCD5100 type luminance meter (commercially available from Otsuka Electronics) was used for measurement. A light source was a halogen lamp. A low-pass filter was set at 5 kHz. A sample was inserted into a TN element in a normally white mode in which an interval (cell gap) between two glass substrates was 5.0 μm and a twist angle was 80 degrees. A square wave (60 Hz, 5 V, 0.5 seconds) was applied to this element. In this case, light was emitted to the element in a vertical direction and a quantity of light that had passed through the element was measured. The transmittance was 100% when the quantity of light was a maximum, and the transmittance was 0% when the quantity of light was a minimum. A rise time ($\tau r$; millisecond) was a time required for the transmittance to change from 90% to 10%. A fall time ($\tau f$; millisecond) was a time for the transmittance to change from 10% to 90%. A response time was a sum of the rise time and the fall time obtained in this manner.

(16b) Response time ($\tau$; measured at 25° C.; ms; sample with negative dielectric anisotropy): An LCD5100 type luminance meter (commercially available from Otsuka Electronics) was used for measurement. A light source was a halogen lamp. A low-pass filter was set at 5 kHz. A sample was inserted into a PVA element in a normally black mode in which an interval (cell gap) between two glass substrates was 3.2 μm and a rubbing direction was antiparallel. This element was sealed using an adhesive that was cured with ultraviolet rays. A voltage that was slightly higher than a threshold voltage was applied to this element for 1 minute, and next ultraviolet rays of 23.5 mW/cm$^2$ were emitted for 8 minutes while a voltage of 5.6 V was applied. A square wave (60 Hz, 10 V, 0.5 seconds) was applied to this element. In this case, light was emitted to the element in a vertical direction and a quantity of light that had passed through the element was measured. The transmittance was 100% when the quantity of light was a maximum, and the transmittance was 0% when the quantity of light was a minimum. A response time was a time (fall time; milliseconds) required for the transmittance to change from 90% to 10%.

2. Synthesis Examples of Compounds 2-1. Synthesis of Compound (137)

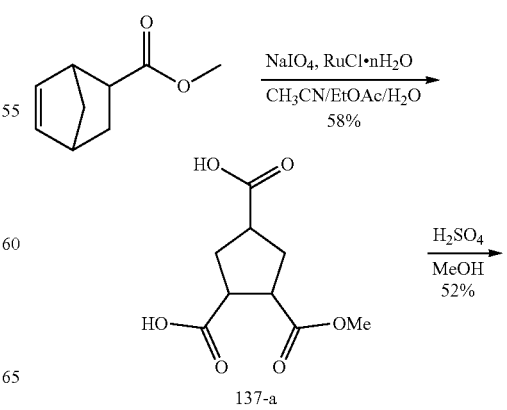

137-a

-continued

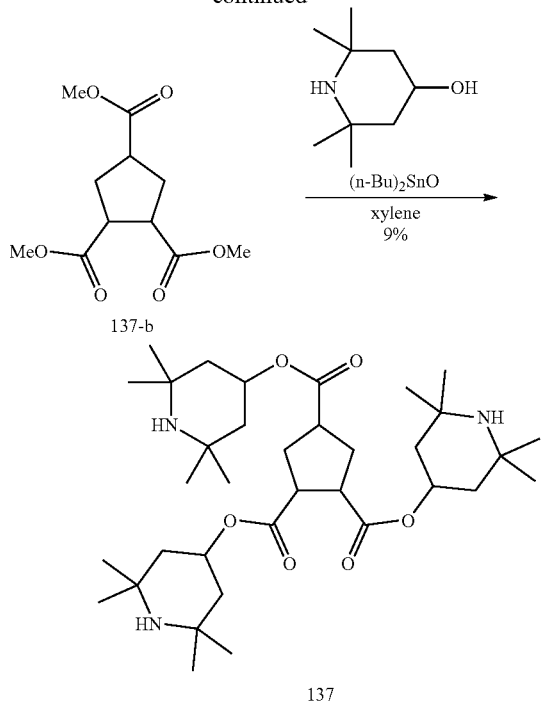
137-b

137

First Process:

Water (100 ml), ethyl acetate (70 ml), and acetonitrile (70 ml) were added to sodium periodate (28.108 g, 131.41 mmol), and additionally ruthenium chloride (34 mg, 0.16 mmol) was added thereto. Methyl 5-norbornene-2-carboxylate (5.0 g, 32.85 mmol; commercially available from Tokyo Chemical Industry Co., Ltd.) was gradually added to this solution. The mixture was stirred at room temperature overnight and the reaction mixture was then poured into water (100 ml) and extracted in ethyl acetate (70 ml×3). The extract liquid was washed with 2 N-hydrochloric acid (70 ml) and 0.5 N-sodium thiosulfate aqueous solution (70 ml), and dried with anhydrous magnesium sulfate. The extract liquid was concentrated under a reduced pressure, and Compound (137-a) (4.1 g, 58%) as a colorless oil was obtained.

Second Process:

A mixture of Compound (137-a) (4.1 g, 18.96 mmol), methanol (50 ml), and sulfate (5 ml) was heated and refluxed for 6 hours. The reaction mixture was poured into water (100 ml) and extracted in toluene (50 ml×3). The extract liquid was washed with a saturated sodium bicarbonate aqueous solution (30 ml×2) and salt water (30 ml×2), and dried with anhydrous magnesium sulfate, and concentrated under a reduced pressure. The residue was purified through silica gel chromatography (heptane:ethyl acetate=1:1), and Compound (137-b) (2.4 g, 9.83 mmol) as a colorless oil was obtained.

Third Process:

A mixture of Compound (137-b) (1.0 g, 4.09 mmol), 2,2,6,6-tetramethylpiperidin-4-ol (1.93 g, 12.28 mmol), dibutyltin oxide (0.12 g, 0.49 mmol), and xylene (30 ml) was heated and refluxed for 12 hours. The reaction mixture was poured into water (30 ml) and extracted in ethyl acetate (20 ml×3). The extract liquid was dried with anhydrous magnesium sulfate and concentrated under a reduced pressure. The residue was purified through silica gel chromatography (chloroform:methanol=4:1) and Compound (137) (0.23 g, 9%) as a colorless crystal was obtained.

$^1$H-NMR (CDCl$_3$, ppm): δ 1.10-1.17 (24H, m), 1.24 (18H, s), 1.89-1.94 (6H, m), 2.04-2.15 (2H, m), 2.27-2.40 (2H, m), 2.92 (1H, tt, J=8.6 Hz, 8.6 Hz), 3.12 (1H, dd, J=8.7 Hz, 9.9 Hz), 3.22 (1H, dd, J=8.7 Hz, 7.6 Hz), 5.06-5.23 (m, 3H).

Comparative Example 1

The compatibility of Compound (137) was measured. This compound in a proportion of 0.1% was dissolved in the mother liquid crystal (B) and stored in a freezer at −25° C. For comparison, Compound (I-1a) described in paragraph [0200] in PCT International Publication No. WO 2017-154590 was selected, and its compatibility was measured. This is because this compound had a similar chemical structure. The results are shown in Table 3. In Comparative Compound (I-1a), a crystal was precipitated after 7 days. On the other hand, in Compound (137), a nematic phase was maintained even after 7 days. Therefore, it was found that the compound of the disclosure had superior compatibility at a low temperature.

TABLE 3

| Measurement of compatibility | | |
|---|---|---|
| Compound | Chemical structure | Compatibility (−25° C.) |
| Compound (137) | | No crystal was precipitated after 7 days |

TABLE 3-continued
Measurement of compatibility
| Compound | Chemical structure | Compatibility (−25° C.) |
|---|---|---|
| Comparative Compound (I-1a) | 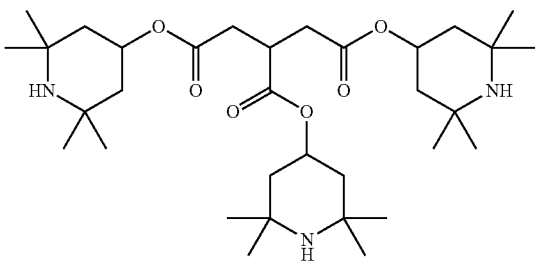 | Crystal was precipitated after 7 days |
2-2. Example of Compound (1)
Compound (1) was synthesized according to "2. Synthesis of Compound (1)" and "Synthesis Example" described above. Examples of such a compound are shown below.
| No. |  |
|---|---|
| 1 | 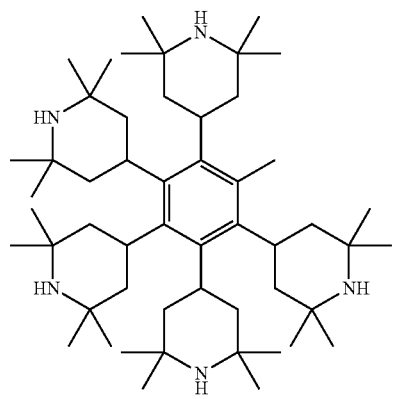 |
| 2 | 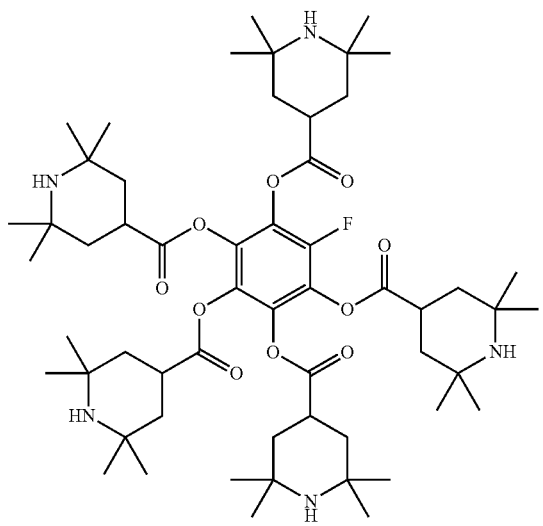 |

| No. |  |
|---|---|
| 3 | 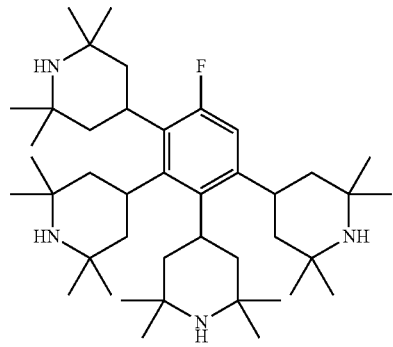 |
| 4 | 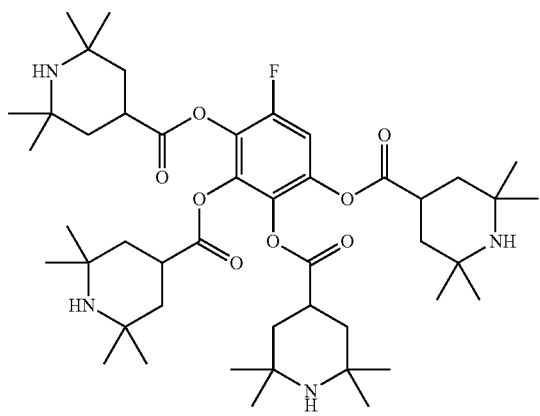 |
| 5 | 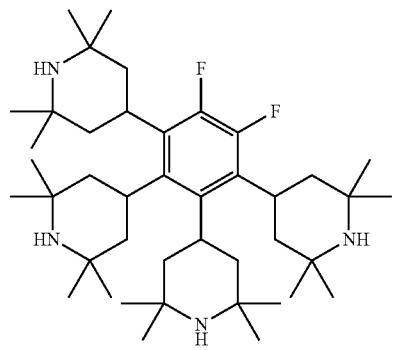 |
| 6 | 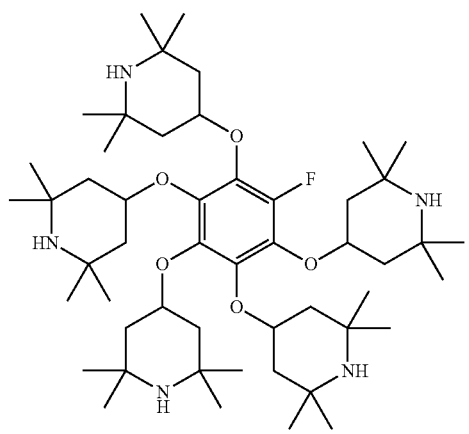 |

-continued
| No. |  |
|---|---|
| 7 | 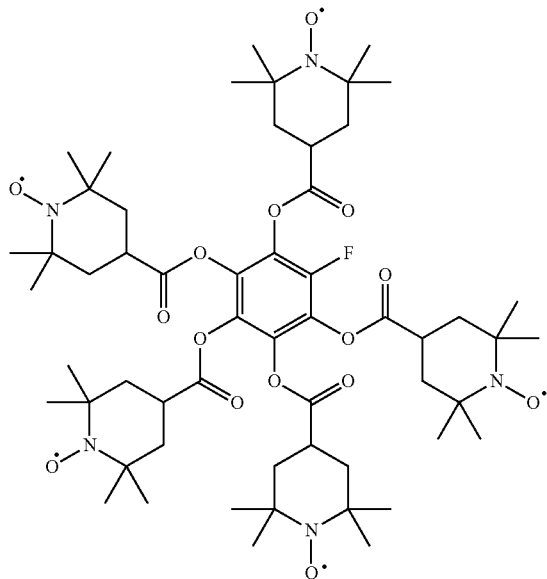 |
| 8 | 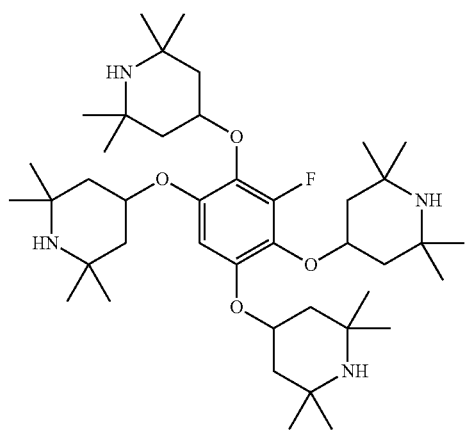 |
| 9 | 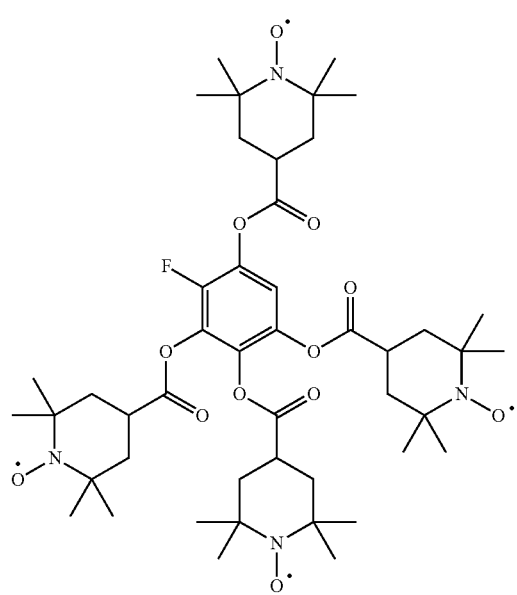 |

-continued
| No. | |
|---|---|
| 10 | 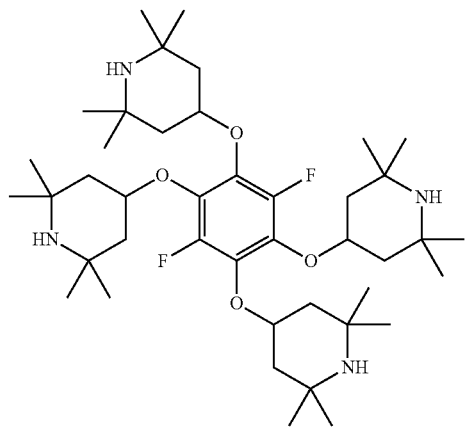 |
| 11 | 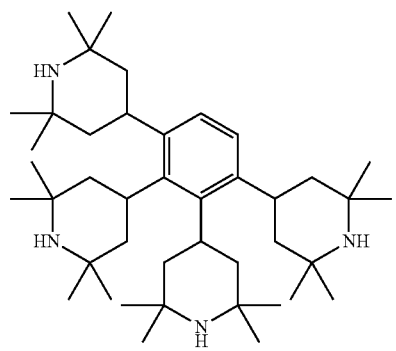 |
| 12 | 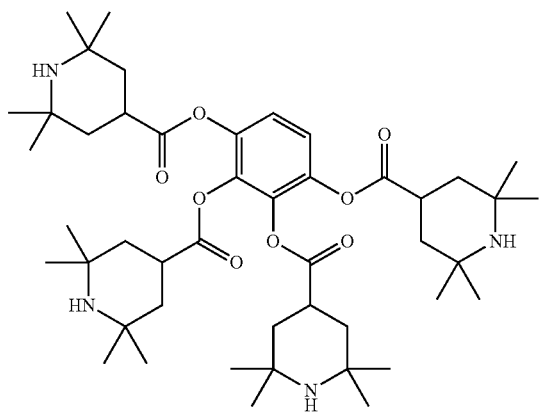 |
| 13 | 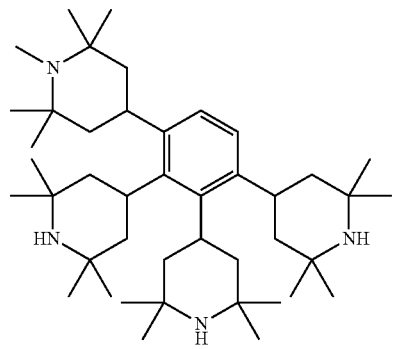 |

| No. | |
|---|---|
| 14 | 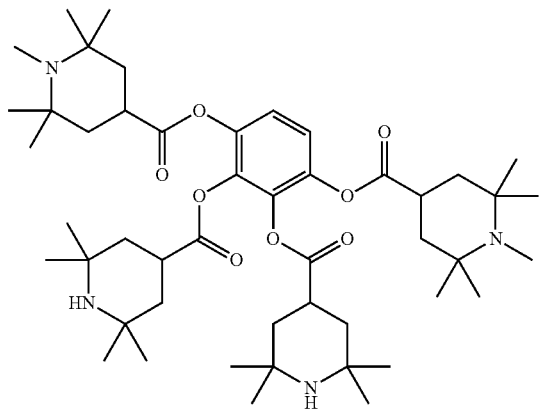 |
| 15 | 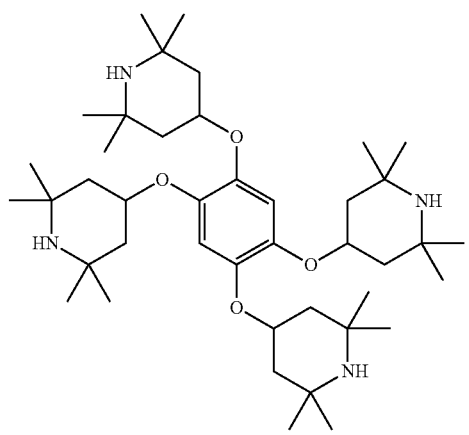 |
| 16 | 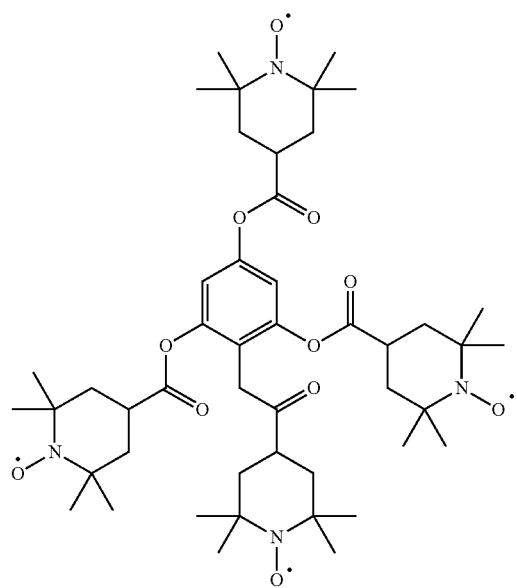 |

| No. |
|---|
| 17 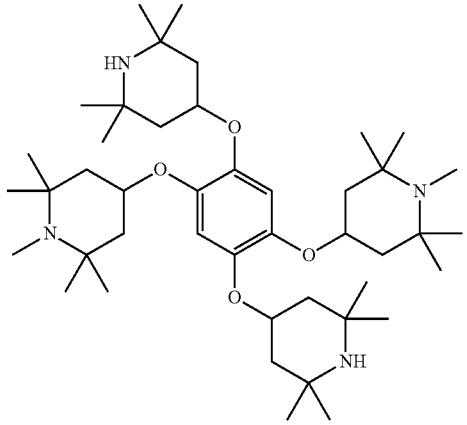 |
| 18 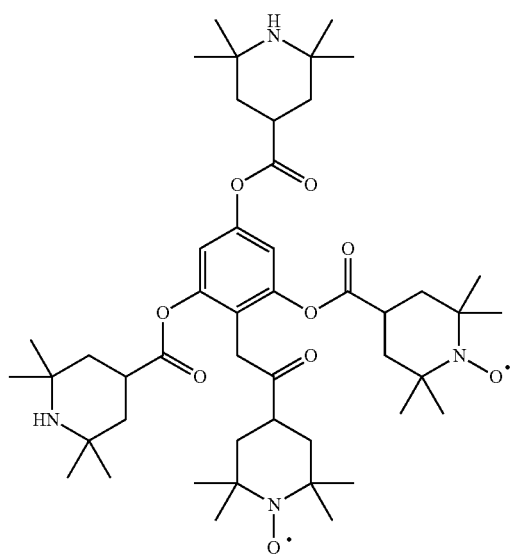 |
| 19 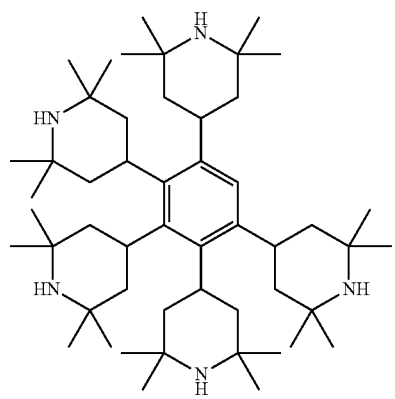 |

| No. |
|---|
| 20 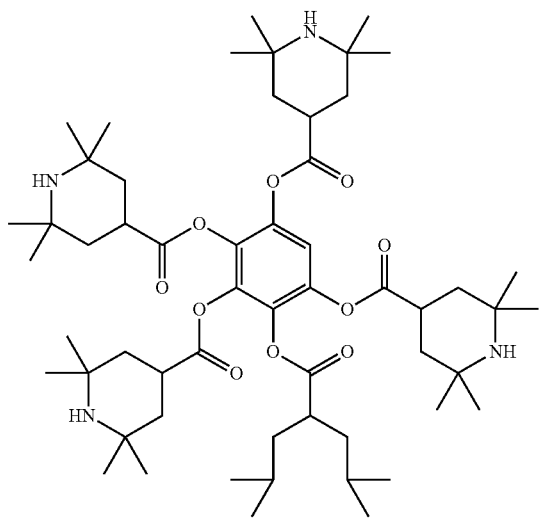 |
| 21 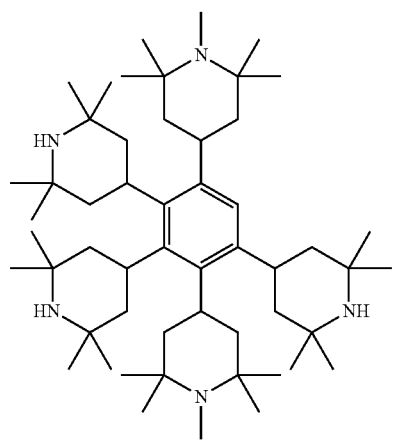 |
| 22 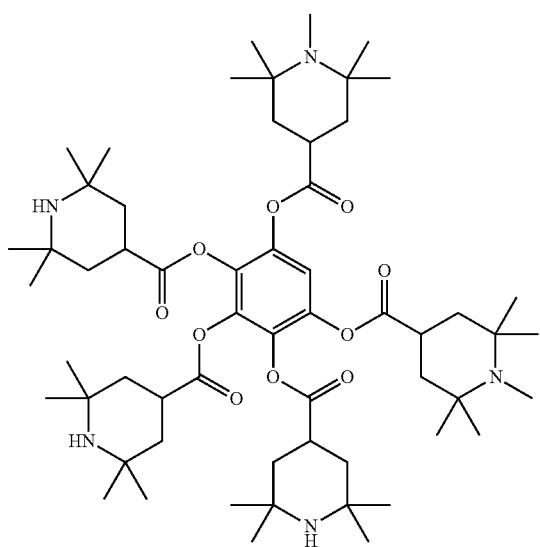 |

| No. |
|---|
| 23 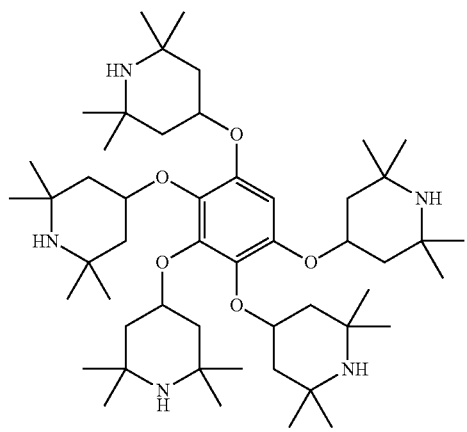 |
| 24 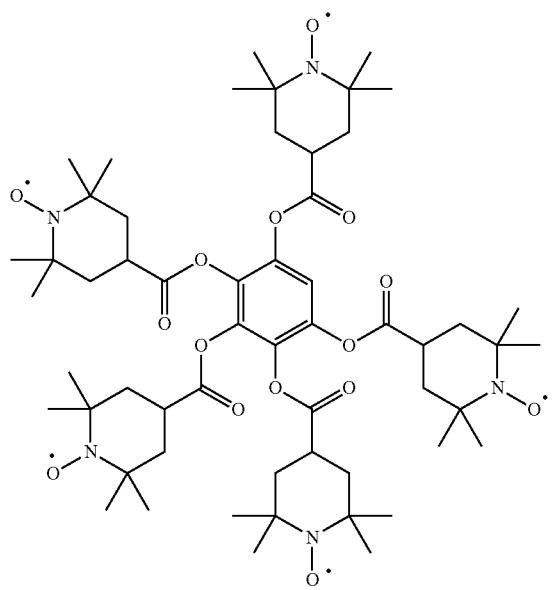 |
| 25 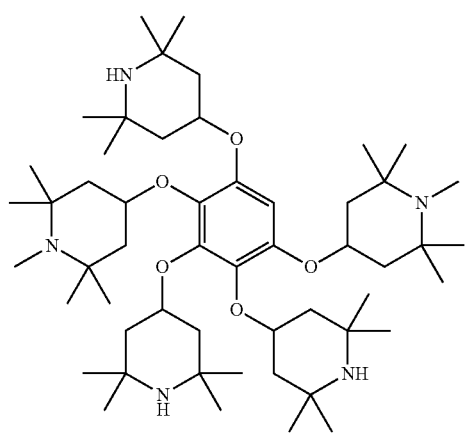 |

| No. | |
|---|---|
| 26 | 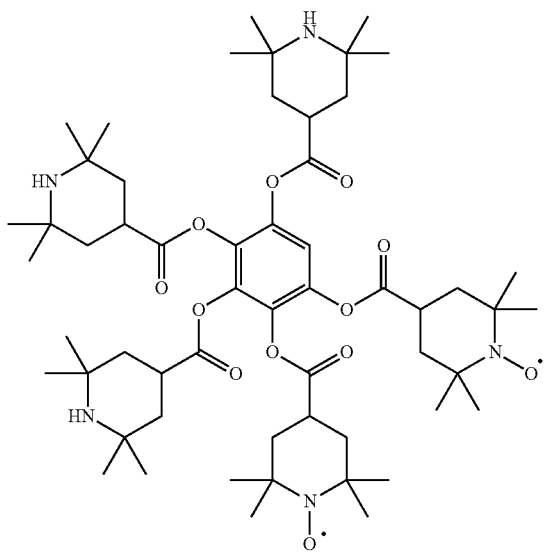 |
| 27 | 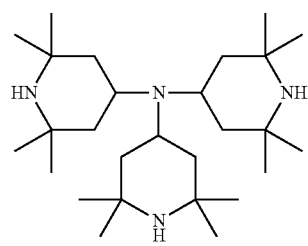 |
| 28 | 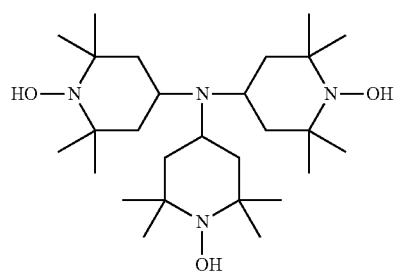 [SMILES: CC1(C)CC(N(C2CC(C)(C)N(O)C(C)(C)C2)C2CC(C)(C)N(O)C(C)(C)C2)CC(C)(C)N1O] |
| 29 | 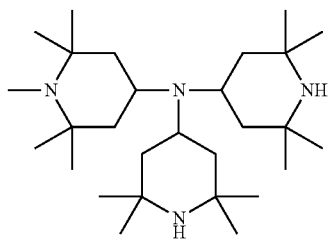 |
| 30 | 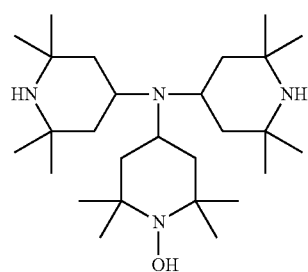 |

-continued
| No. | |
|---|---|
| 31 | 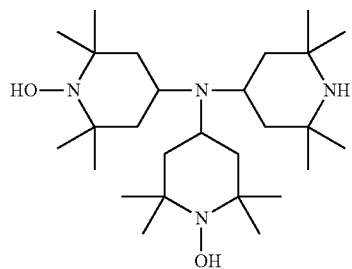 [SMILES: CC1(C)CC(N(C2CC(C)(C)N(O)C(C)(C)C2)C2CC(C)(C)N(O)C(C)(C)C2)CC(C)(C)N1] |
| 32 | 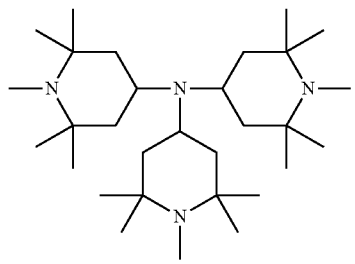 |
| 33 | 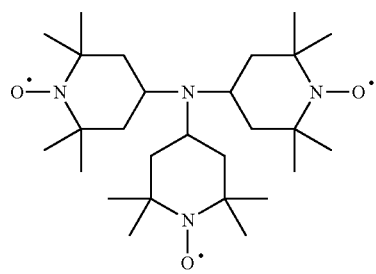 [SMILES: CC1(C)CC(N(C2CC(C)(C)N(O)C(C)(C)C2)C2CC(C)(C)N(O)C(C)(C)C2)CC(C)(C)N1O] |
| 34 | 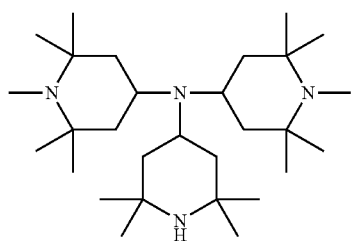 |
| 35 | 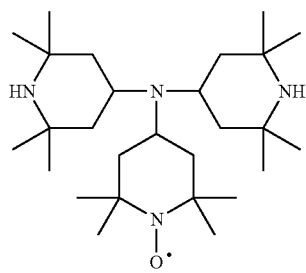 |

-continued
| No. | |
|---|---|
| 36 | 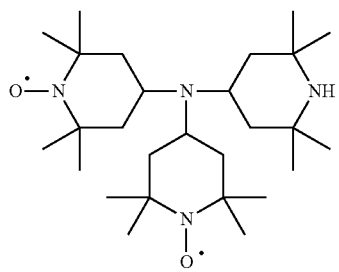 [SMILES: CC1(C)CC(N(C2CC(C)(C)N(O)C(C)(C)C2)C2CC(C)(C)N(O)C(C)(C)C2)CC(C)(C)N1] |
| 37 | 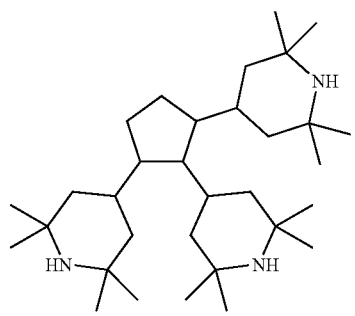 |
| 38 | 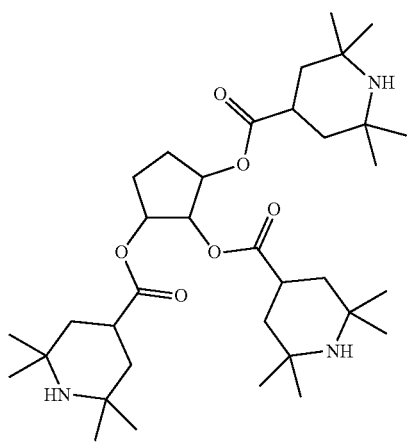 |
| 39 | 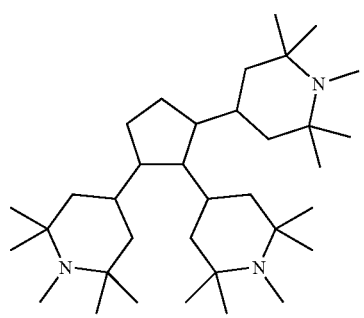 |

| No. |
| --- |
| 40 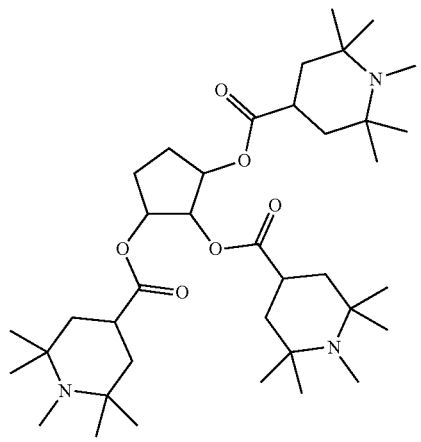 |
| 41 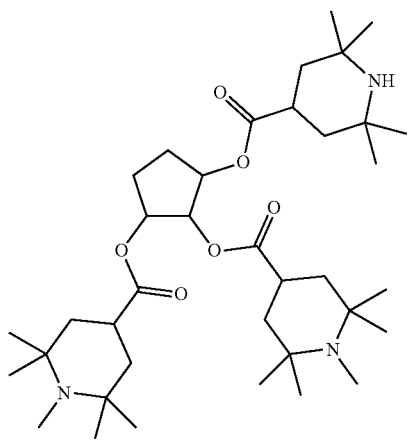 |
| 42 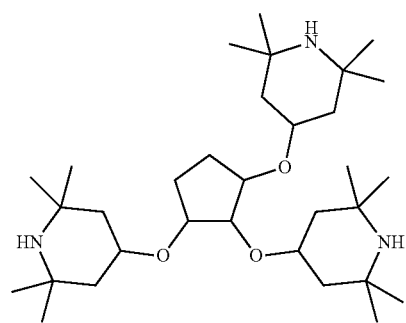 |

| No. |
|---|
| 43 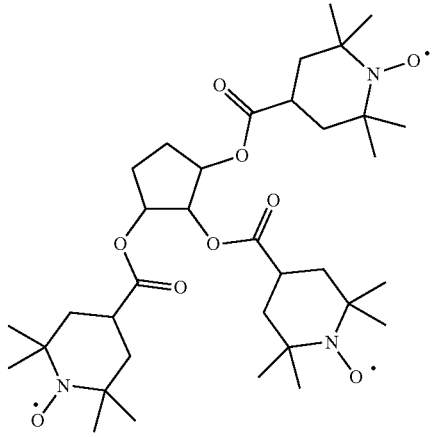 [SMILES: CC1(C)CC(C(=O)OC2CCC(OC(=O)C3CC(C)(C)N(O)C(C)(C)C3)C2OC(=O)C2CC(C)(C)N(O)C(C)(C)C2)CC(C)(C)N1O] |
| 44 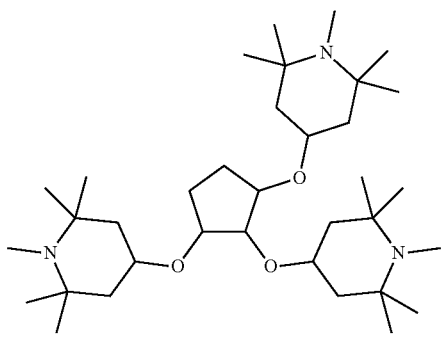 |
| 45 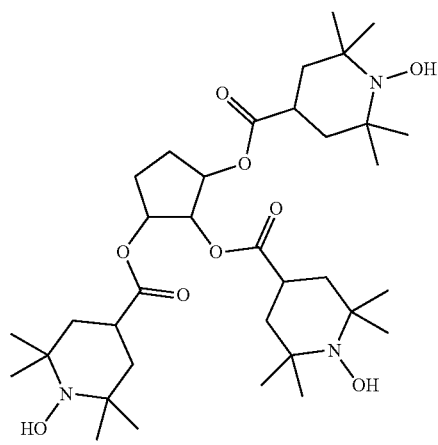 [SMILES: CC1(C)CC(C(=O)OC2CCC(OC(=O)C3CC(C)(C)N(O)C(C)(C)C3)C2OC(=O)C2CC(C)(C)N(O)C(C)(C)C2)CC(C)(C)N1O] |

| No. |
|---|
| 46 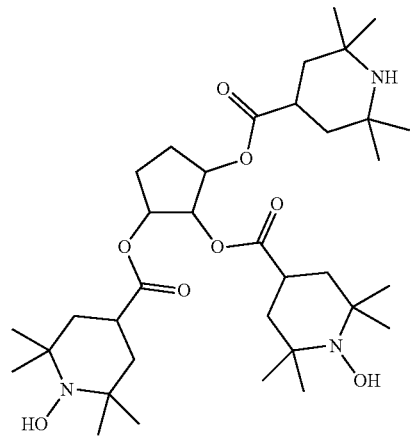 |
| 47 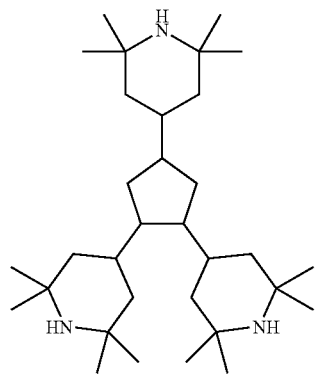 |
| 48 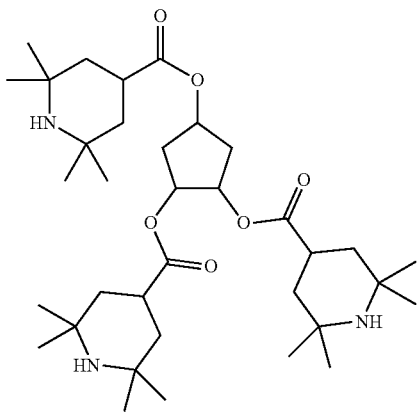 |

-continued
| No. | |
|---|---|
| 49 | 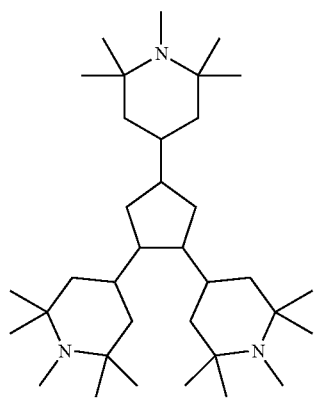 |
| 50 | 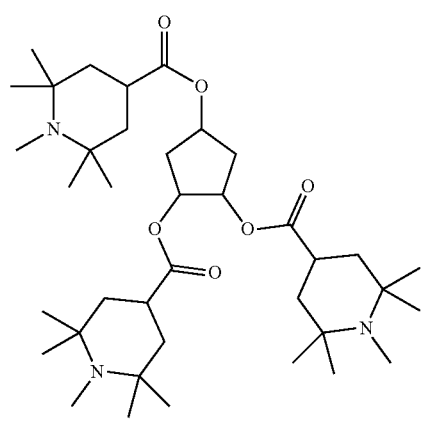 |
| 51 | 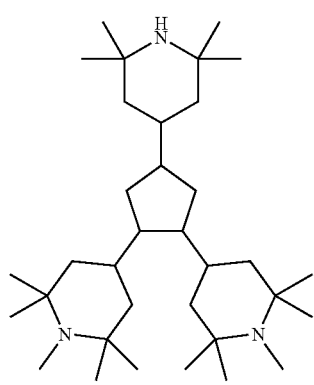 |

| No. |
| --- |
| 52 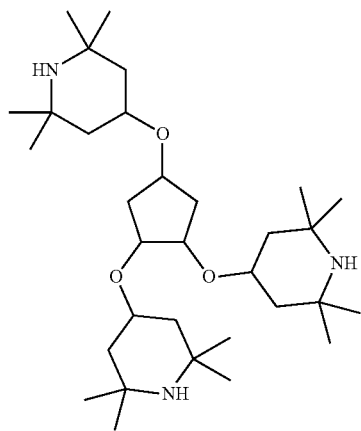 |
| 53 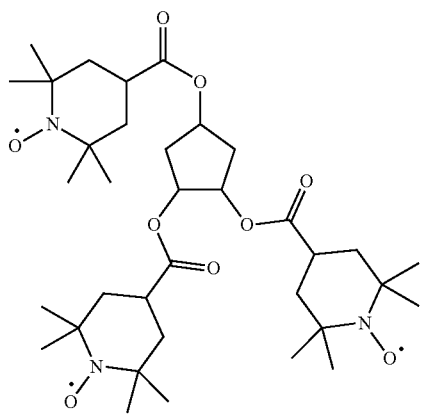 |
| 54 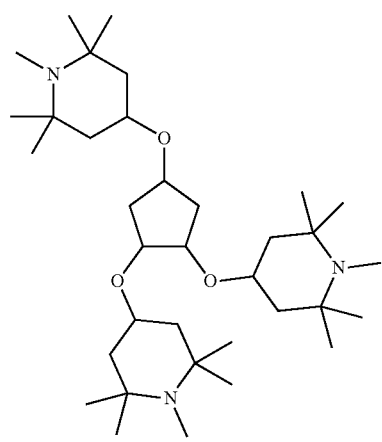 |

| No. |
|---|
| 55 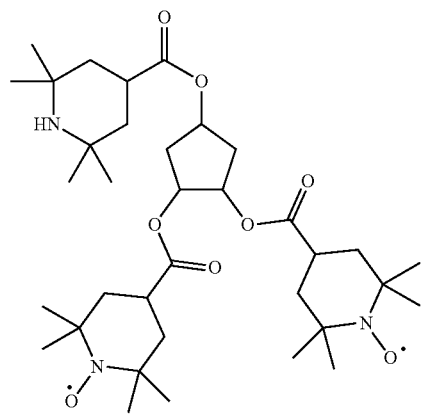 |
| 56 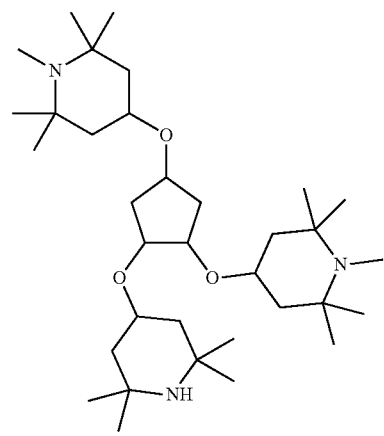 |
| 57 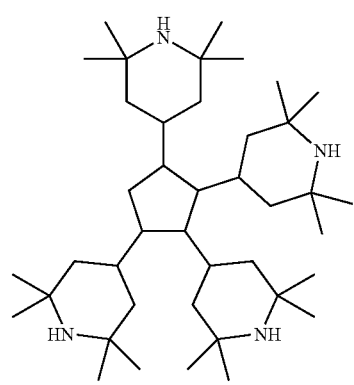 |

| No. | |
|---|---|
| 58 | 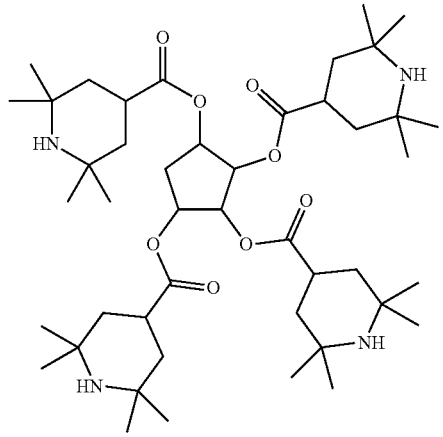 |
| 59 | 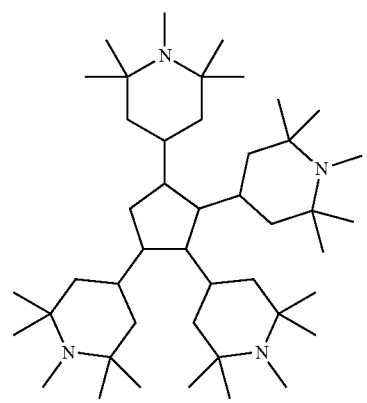 |
| 60 | 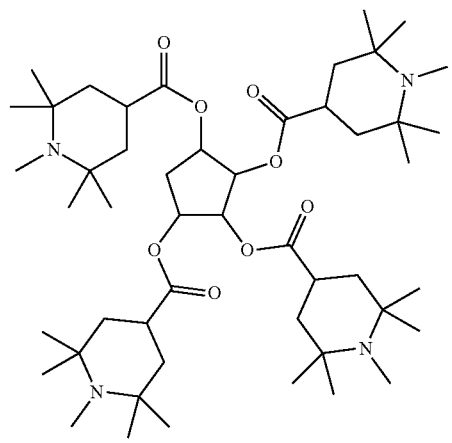 |

-continued
| No. | |
|---|---|
| 61 | 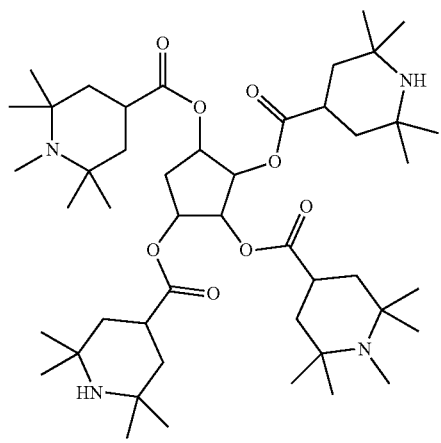 |
| 62 | 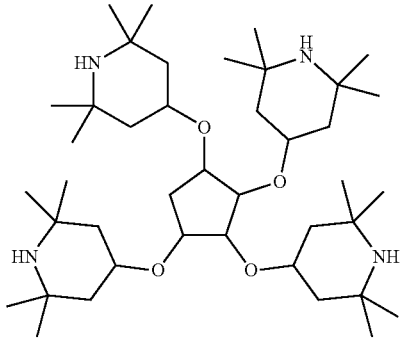 |
| 63 | 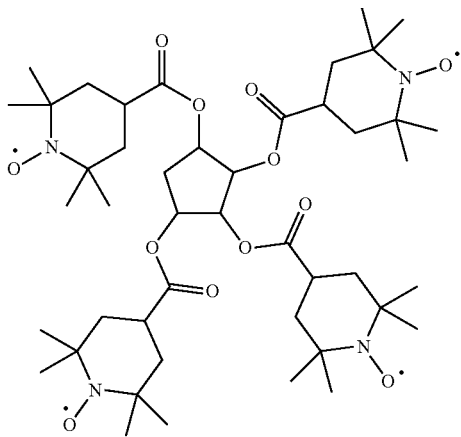 [SMILES: CC1(C)CC(C(=O)OC2CC(OC(=O)C3CC(C)(C)N(O)C(C)(C)C3)C(OC(=O)C3CC(C)(C)N(O)C(C)(C)C3)C2OC(=O)C2CC(C)(C)N(O)C(C)(C)C2)CC(C)(C)N1O] |
| 64 | 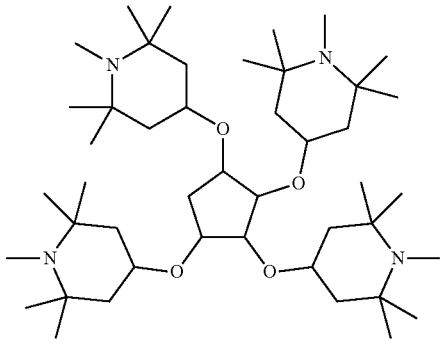 |

| No. |
| --- |
| 65 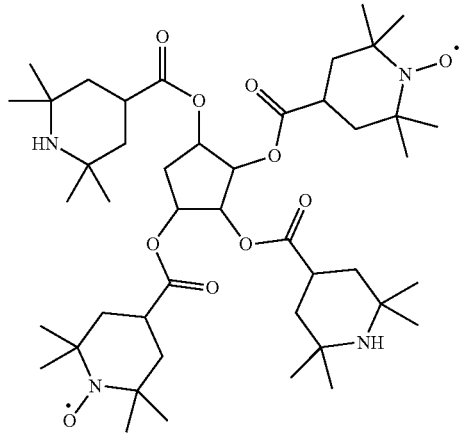 [SMILES: CC1(C)CC(C(=O)OC2CC(OC(=O)C3CC(C)(C)N(O)C(C)(C)C3)C(OC(=O)C3CC(C)(C)NC(C)(C)C3)C2OC(=O)C2CC(C)(C)N(O)C(C)(C)C2)CC(C)(C)N1] |
| 66 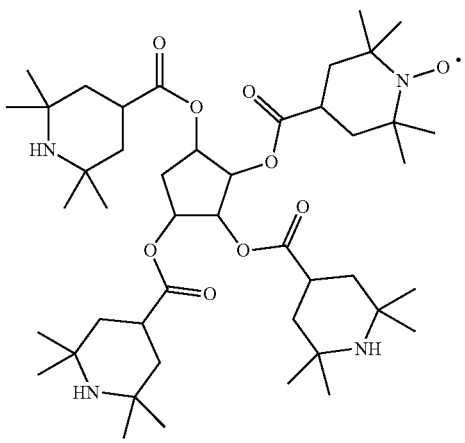 [SMILES: CC1(C)CC(C(=O)OC2CC(OC(=O)C3CC(C)(C)NC(C)(C)C3)C(OC(=O)C3CC(C)(C)N(O)C(C)(C)C3)C2OC(=O)C2CC(C)(C)NC(C)(C)C2)CC(C)(C)N1] |
| 67 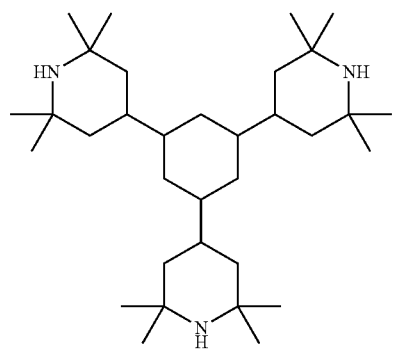 |

| No. | |
|---|---|
| 68 | 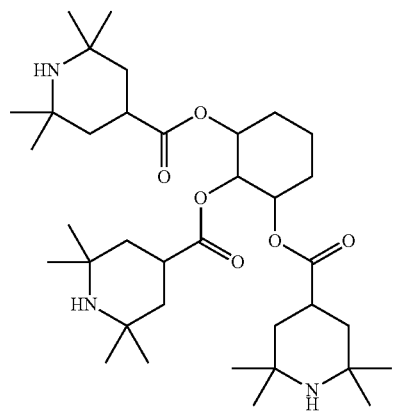 |
| 69 | 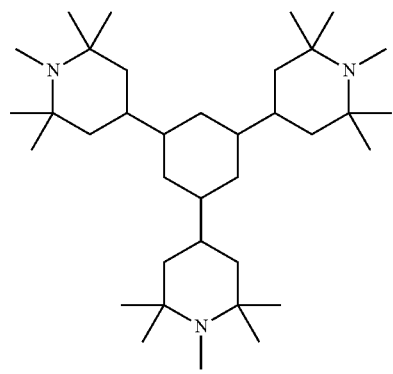 |
| 70 | 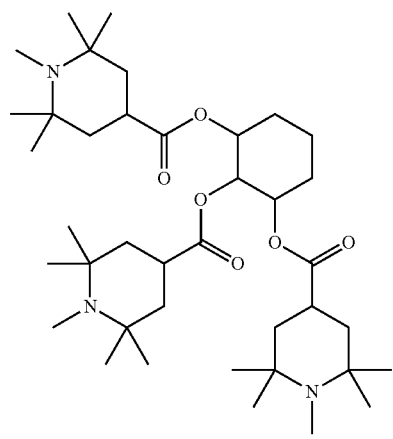 |

| No. |
|---|
| 71 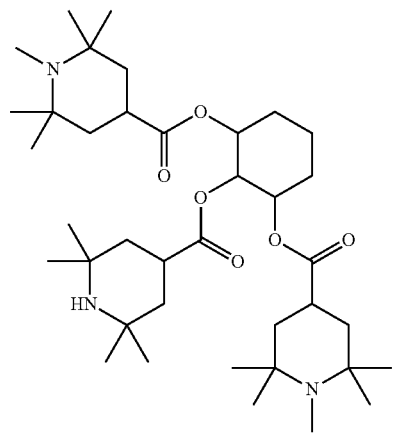 |
| 72 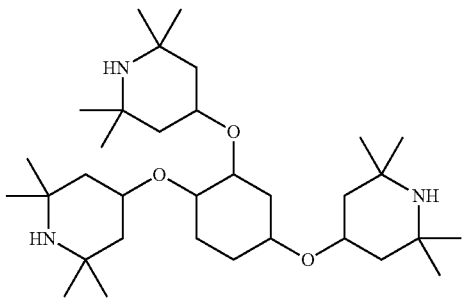 |
| 73 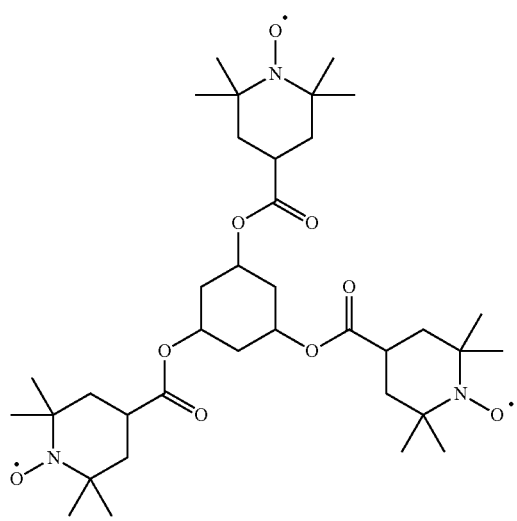 |
| 74 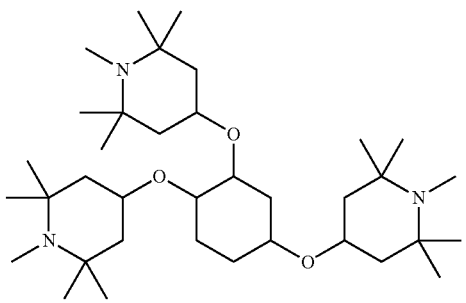 |

-continued
| No. |
|---|
| 75 |
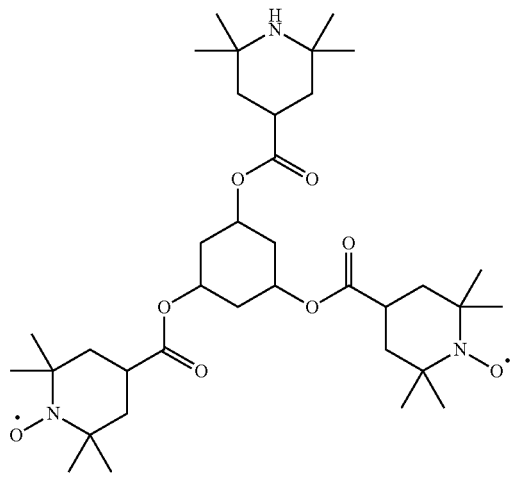
| 76 |
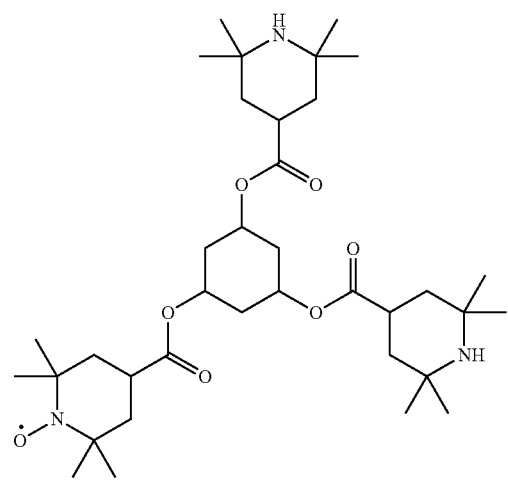
| 77 |
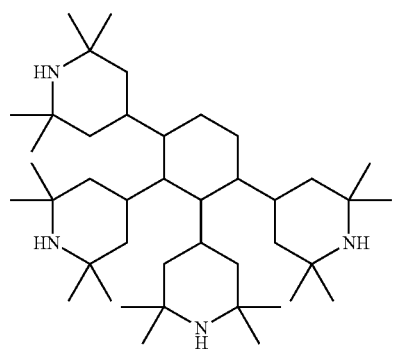

| No. | |
|---|---|
| 78 | 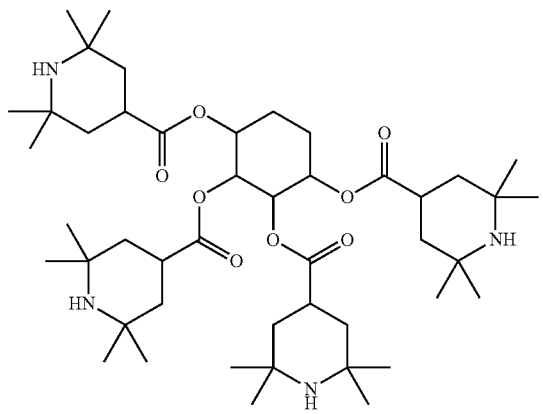 |
| 79 | 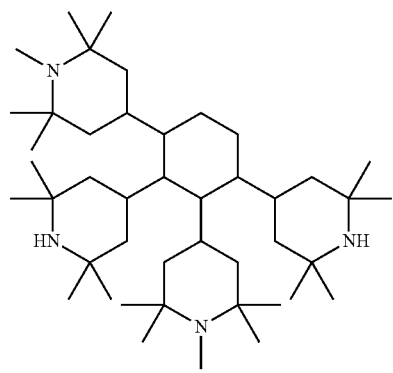 |
| 80 | 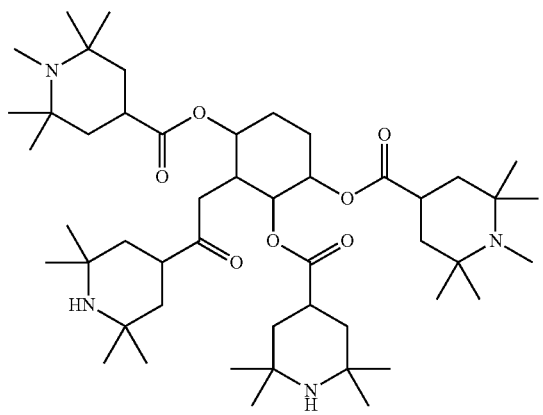 |

| No. | |
|---|---|
| 81 | 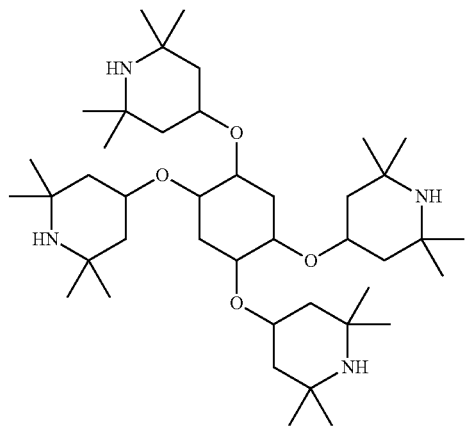 |
| 82 | 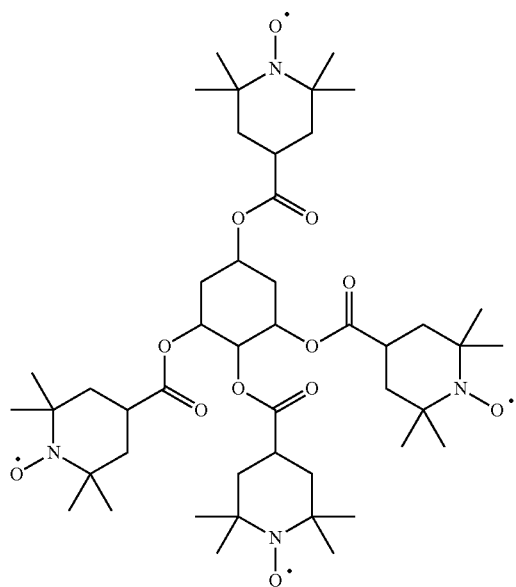 |
| 83 | 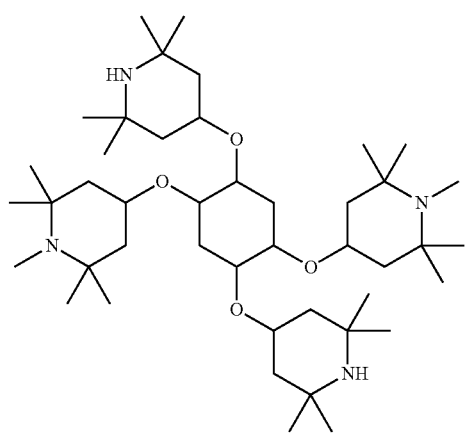 |

| No. |
|---|
| 84 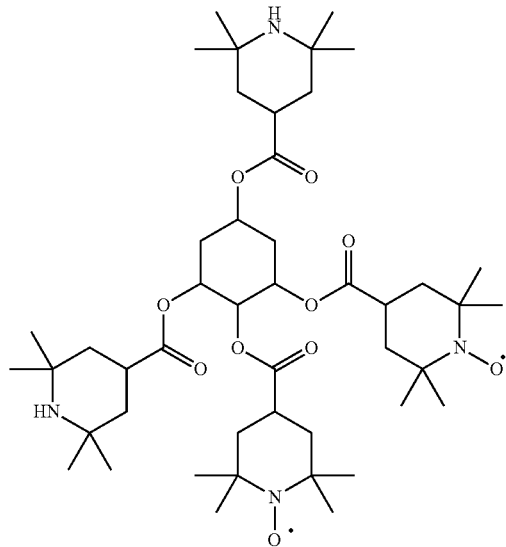 |
| 85 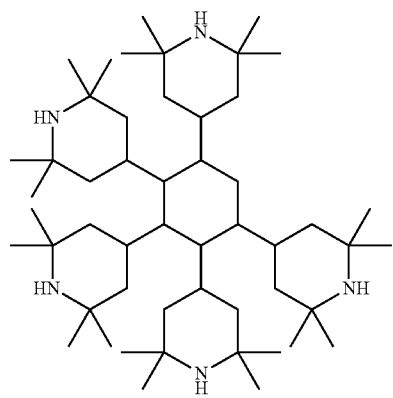 |
| 86 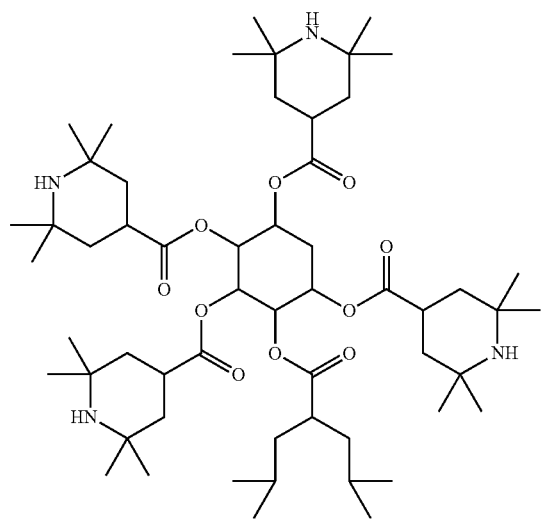 |

-continued
| No. | |
|---|---|
| 87 | 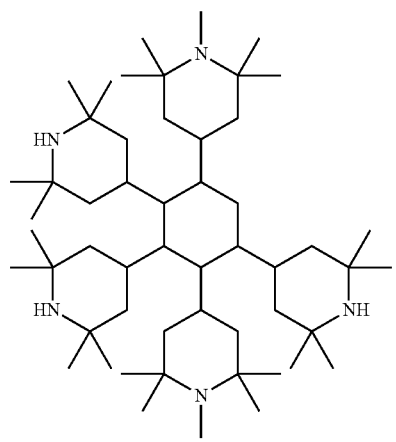 |
| 88 | 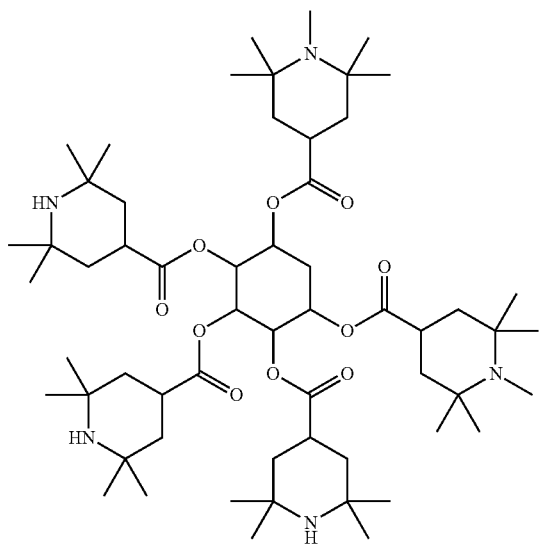 |
| 89 | 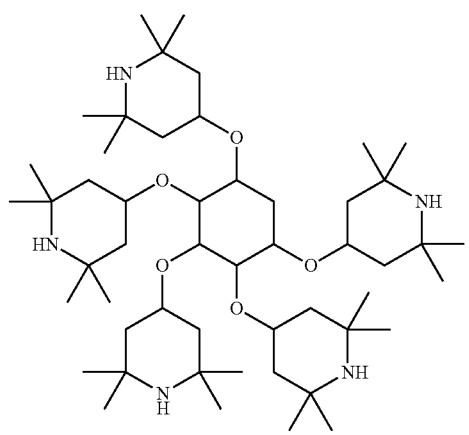 |

| No. |
|---|
| 90 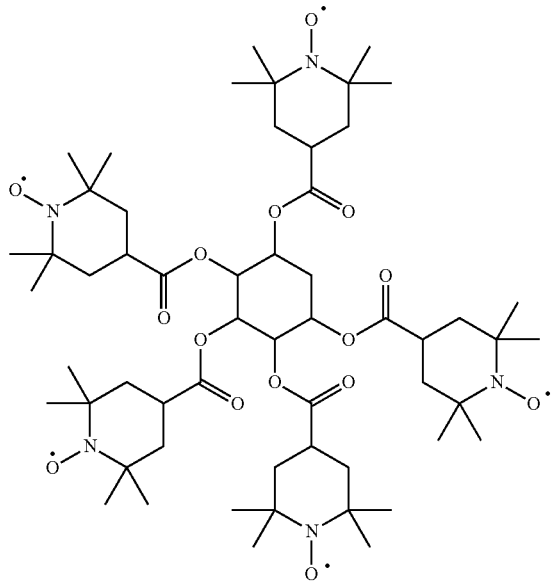 |
| 91 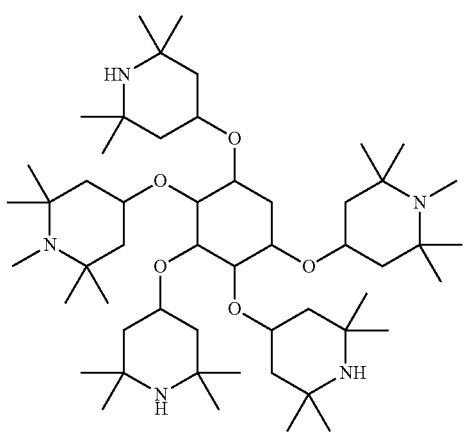 |
| 92 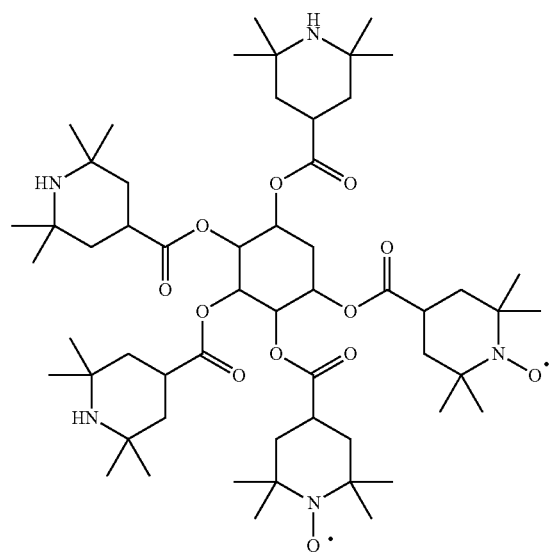 |

| No. |
| --- |
| 93 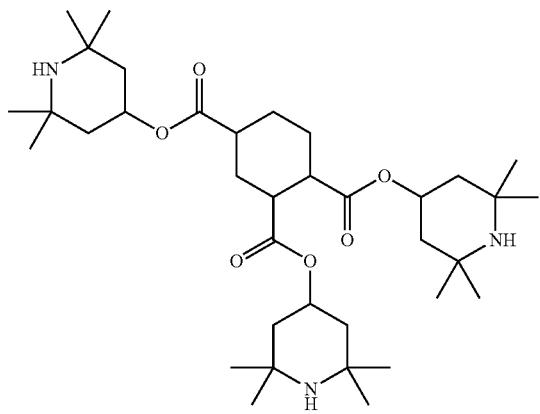 |
| 94 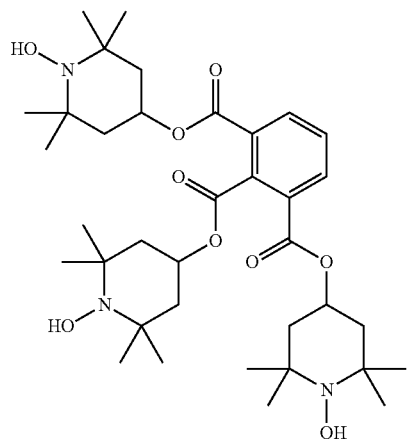 |
| 95 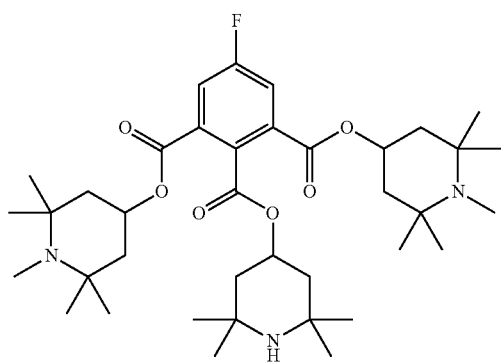 |

| No. |
|---|
| 96 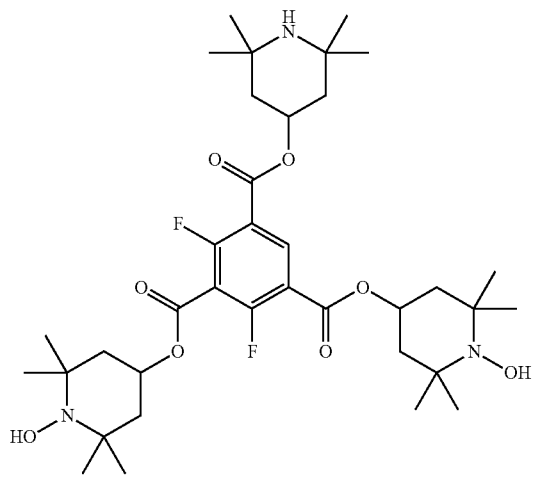 |
| 97 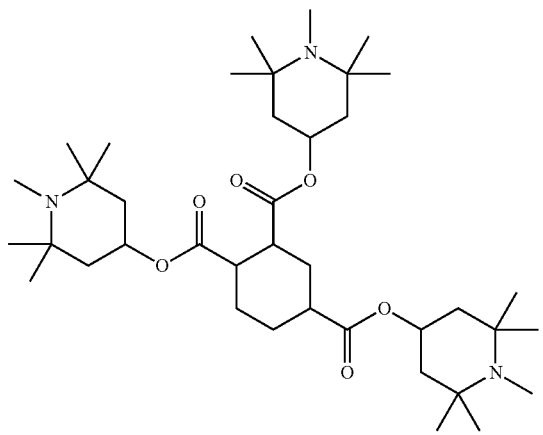 |
| 98 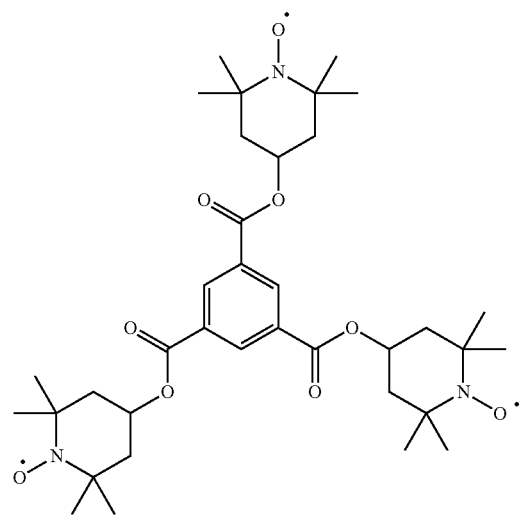 |

-continued
| No. |
|---|
| 99 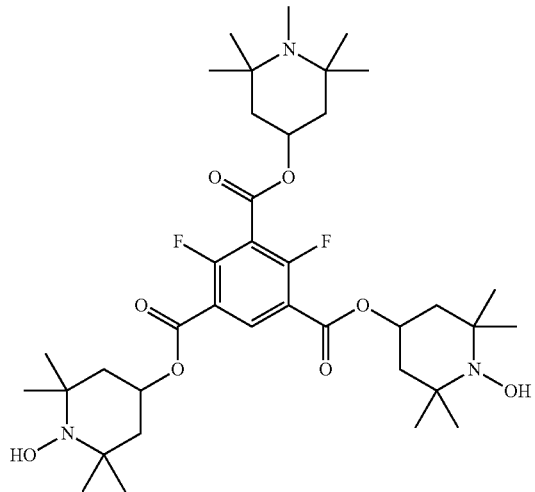 |
| 100 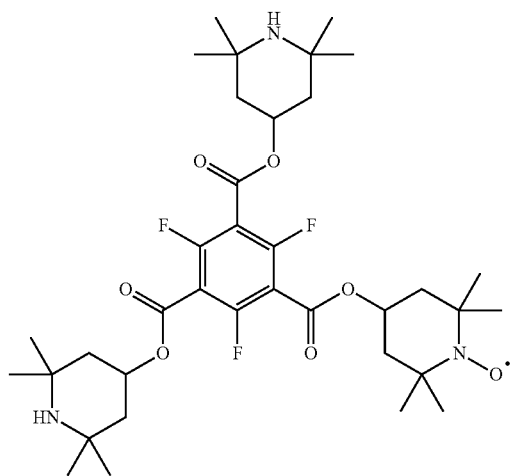 |
| 101 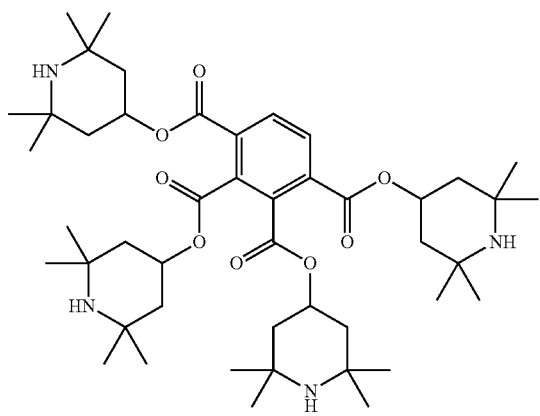 |

-continued
| No. |
| --- |
| 102 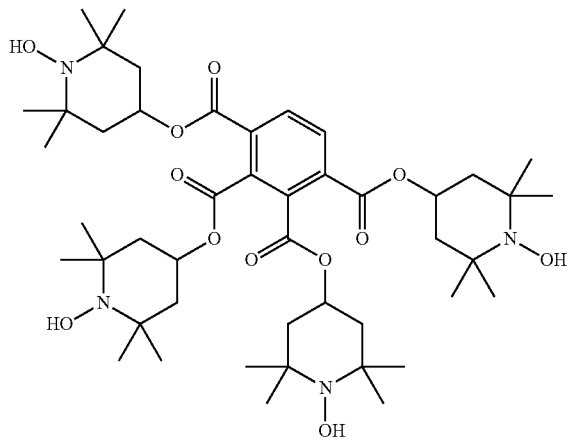 |
| 103 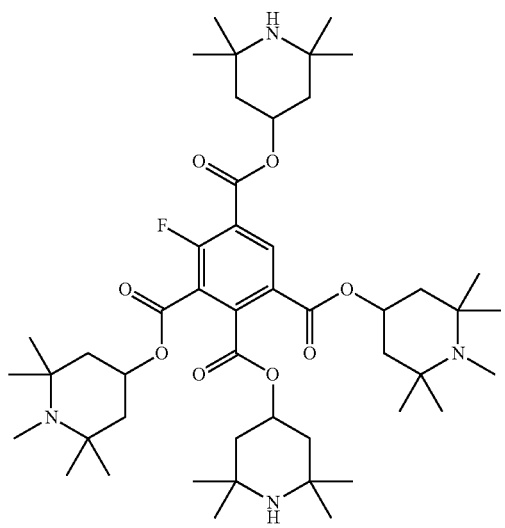 |
| 104 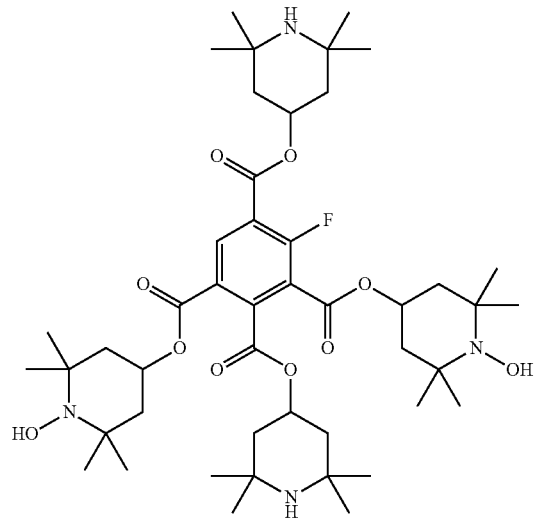 |

| No. |
|---|
| 105 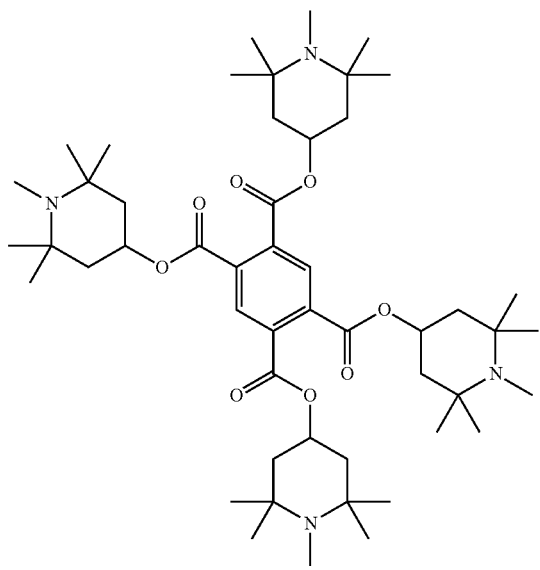 |
| 106 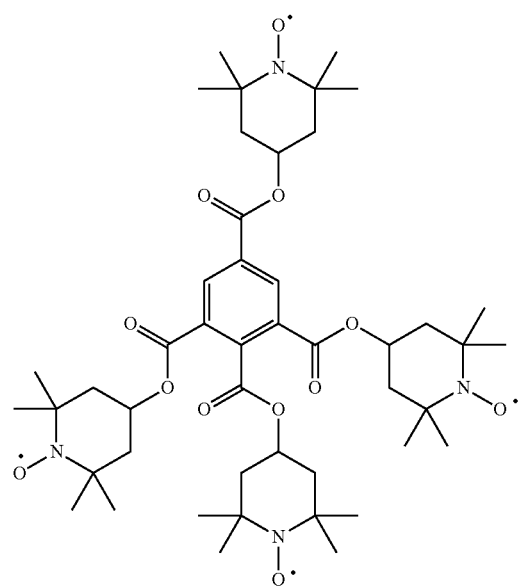 |

| No. |
|---|
| 107 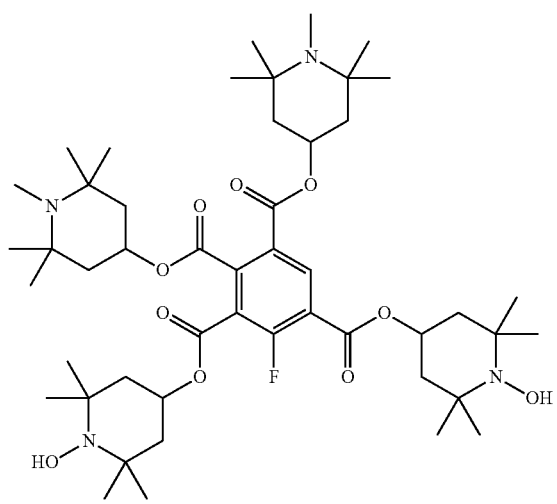 |
| 108 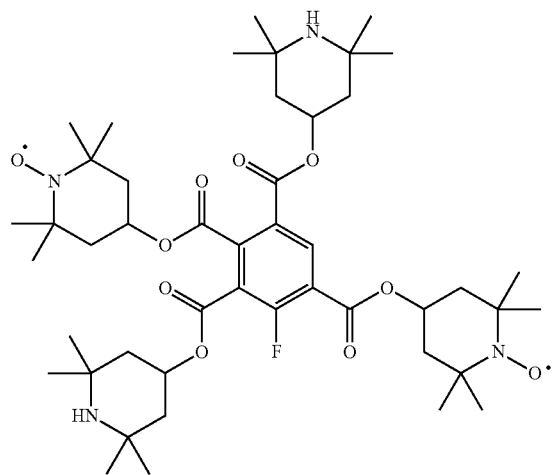 |
| 109 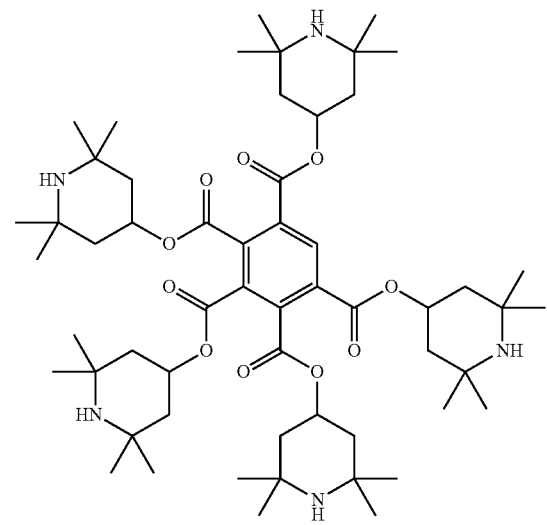 |

| No. |
|---|
| 110 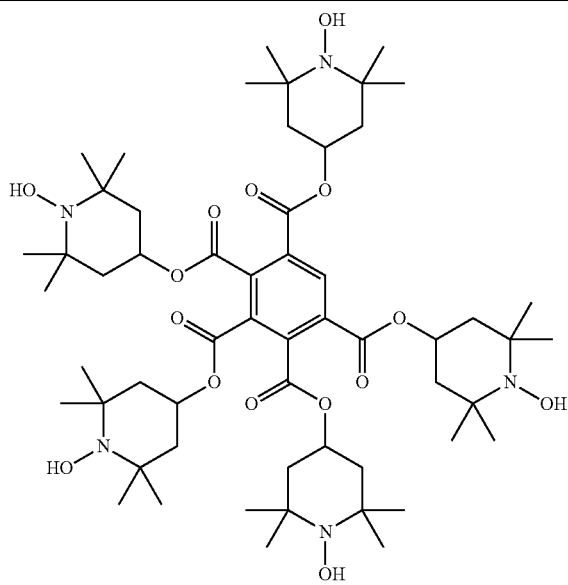 |
| 111 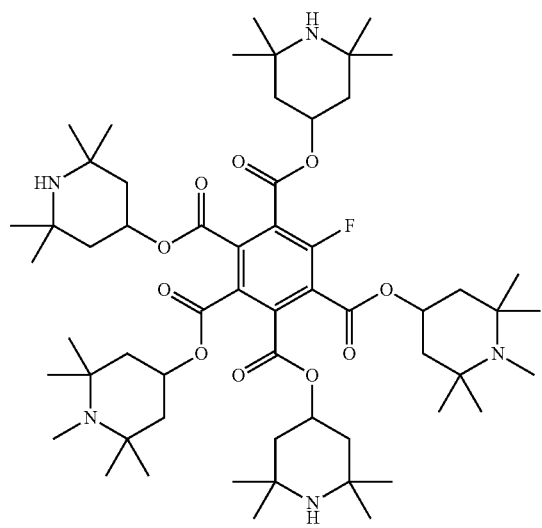 |
| 112 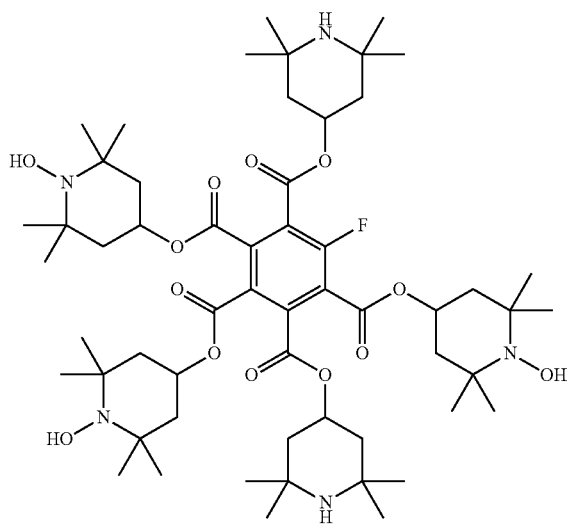 |

| No. |
|---|
| 113 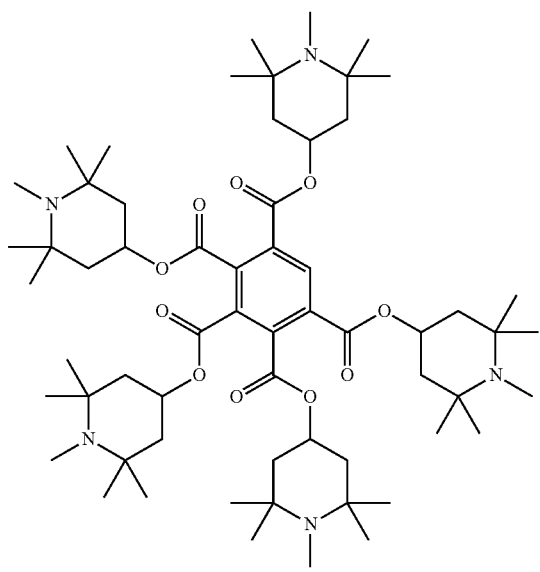 |
| 114 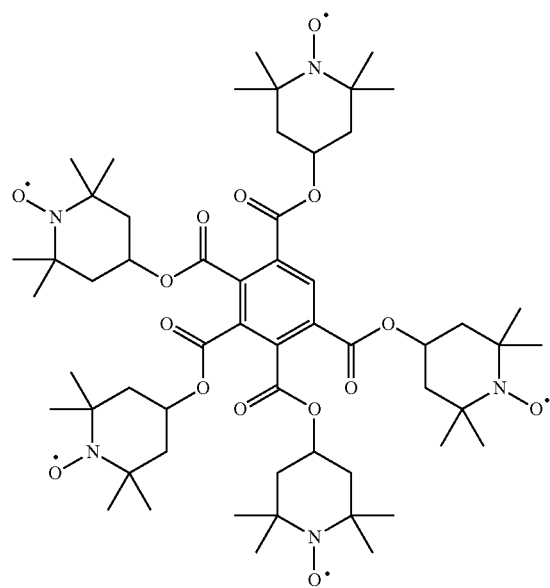 |

| No. |
| --- |
| 115 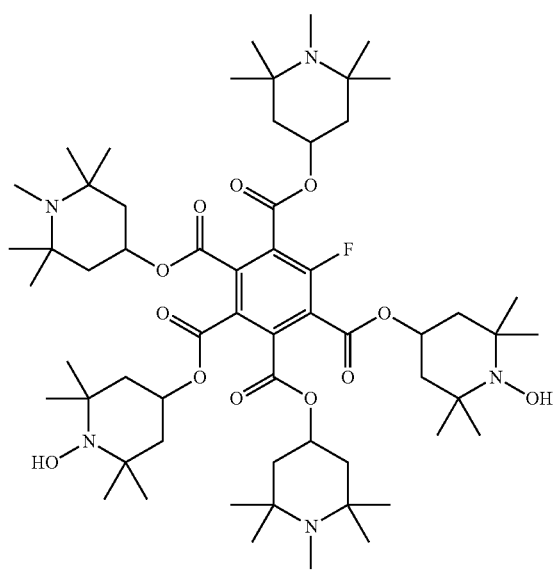 |
| 116 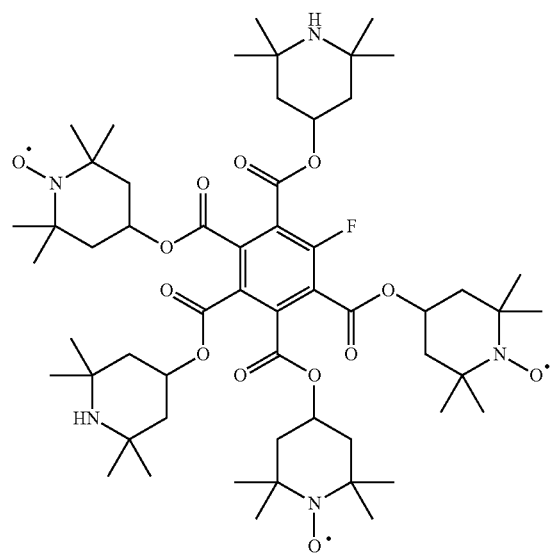 |
| 117 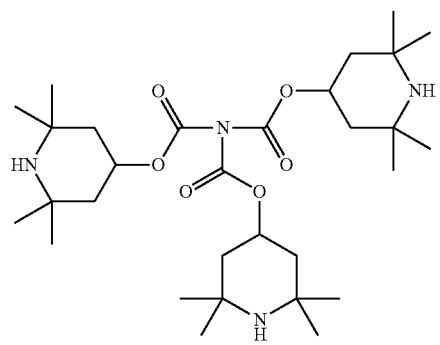 |

| No. |
| --- |
| 118 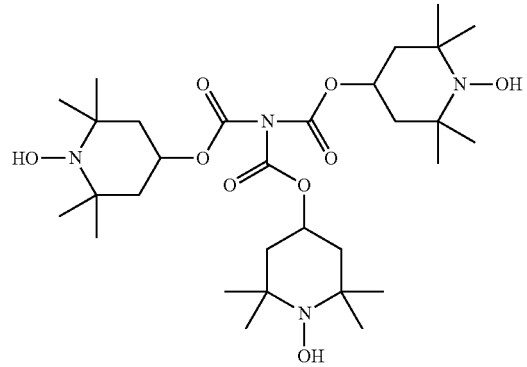 [SMILES: CC1(C)CC(OC(=O)N(C(=O)OC2CC(C)(C)N(O)C(C)(C)C2)C(=O)OC2CC(C)(C)N(O)C(C)(C)C2)CC(C)(C)N1O] |
| 119 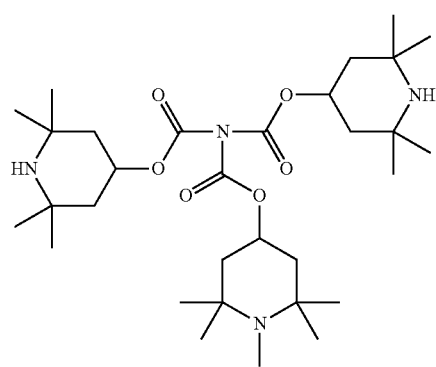 |
| 120 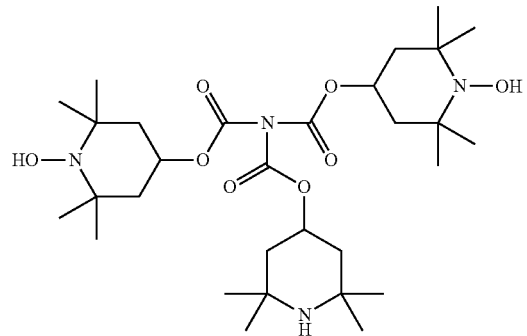 [SMILES: CC1(C)CC(OC(=O)N(C(=O)OC2CC(C)(C)N(O)C(C)(C)C2)C(=O)OC2CC(C)(C)N(O)C(C)(C)C2)CC(C)(C)N1] |
| 121 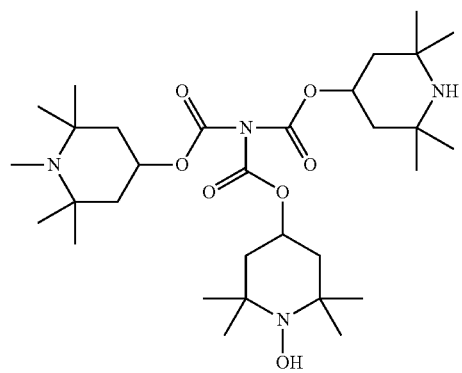 |

| No. |
|---|
| 122 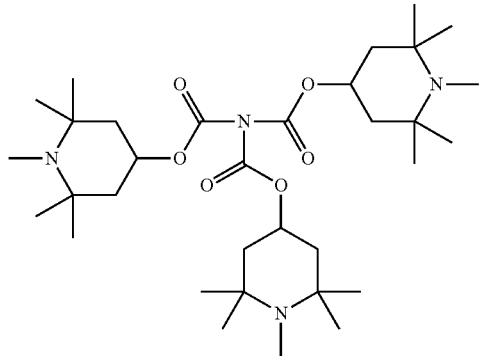 |
| 123 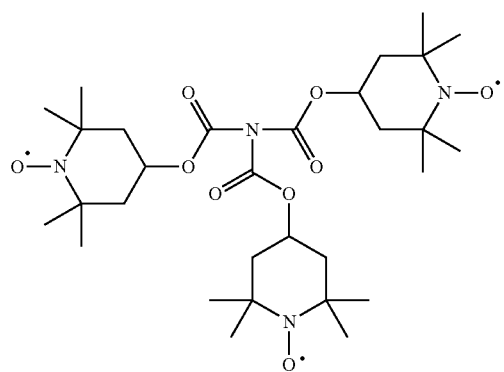 [SMILES: CC1(C)CC(OC(=O)N(C(=O)OC2CC(C)(C)N(O)C(C)(C)C2)C(=O)OC2CC(C)(C)N(O)C(C)(C)C2)CC(C)(C)N1O] |
| 124 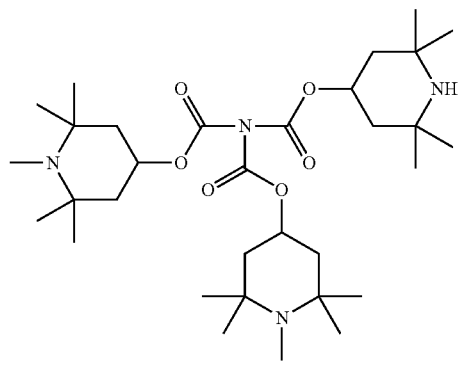 |
| 125 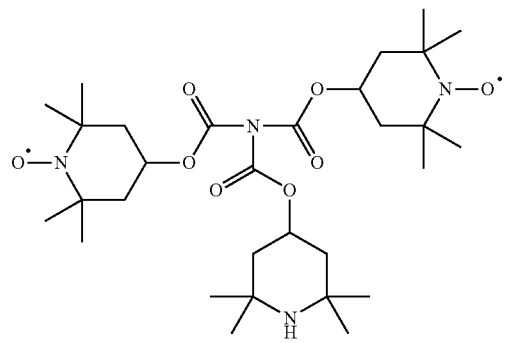 [SMILES: CC1(C)CC(OC(=O)N(C(=O)OC2CC(C)(C)N(O)C(C)(C)C2)C(=O)OC2CC(C)(C)N(O)C(C)(C)C2)CC(C)(C)N1] |

-continued
| No. | |
|---|---|
| 126 | 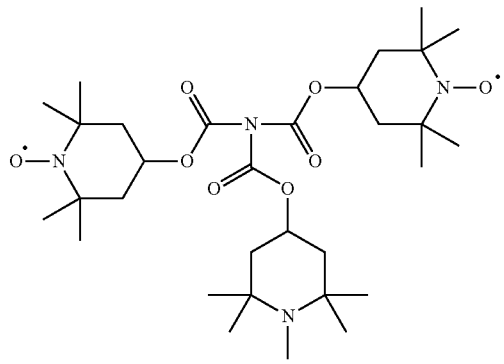 [SMILES: CN1C(C)(C)CC(OC(=O)N(C(=O)OC2CC(C)(C)N(O)C(C)(C)C2)C(=O)OC2CC(C)(C)N(O)C(C)(C)C2)CC1(C)C] |
| 127 | 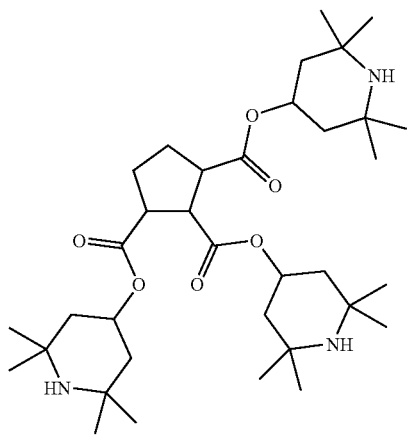 |
| 128 | 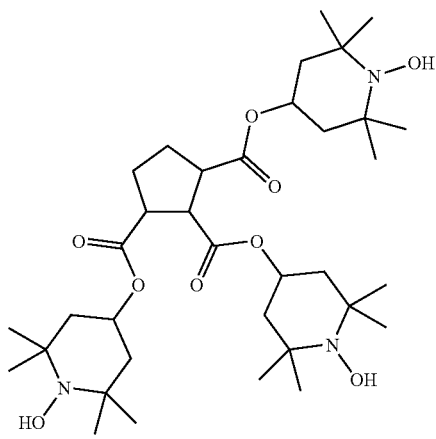 [SMILES: CC1(C)CC(OC(=O)C2CCC(C(=O)OC3CC(C)(C)N(O)C(C)(C)C3)C2C(=O)OC2CC(C)(C)N(O)C(C)(C)C2)CC(C)(C)N1O] |

-continued
| No. |
|---|
| 129 |
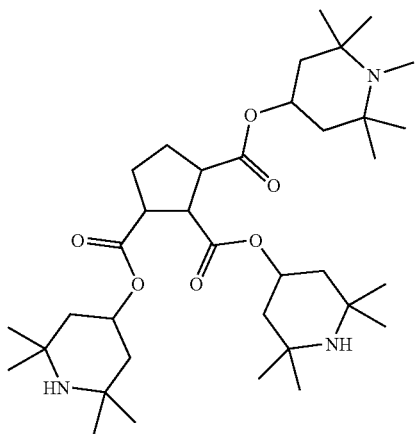
| 130 |
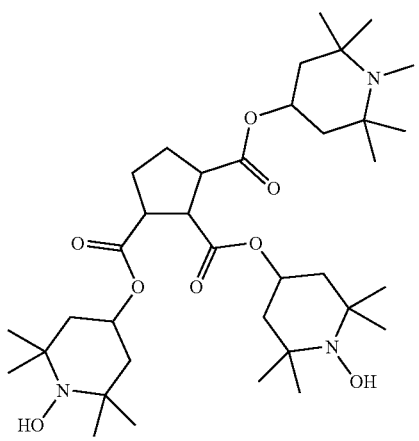
| 131 |
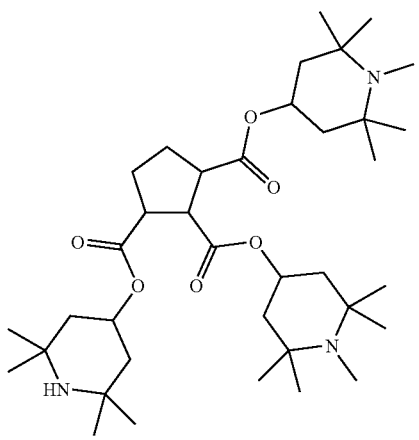

| No. |
|---|
| 132 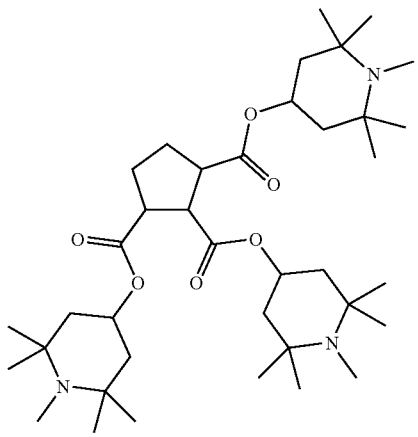 |
| 133 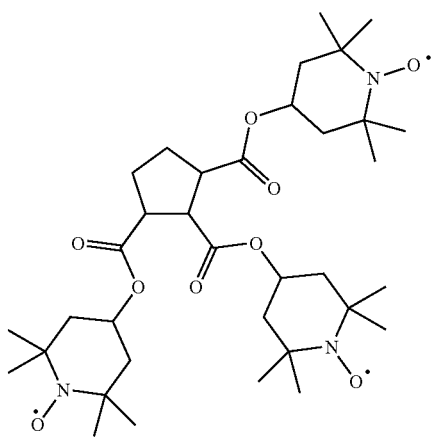 [SMILES: CC1(C)CC(OC(=O)C2CCC(C(=O)OC3CC(C)(C)N(O)C(C)(C)C3)C2C(=O)OC2CC(C)(C)N(O)C(C)(C)C2)CC(C)(C)N1O] |
| 134 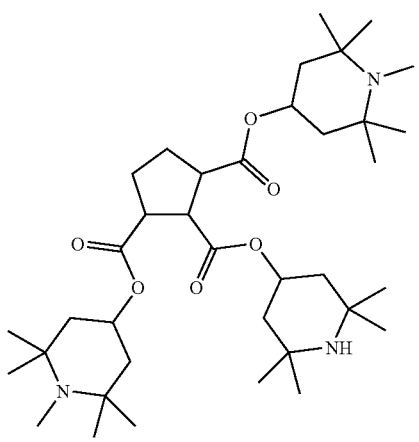 |

| No. |
|---|
| 135 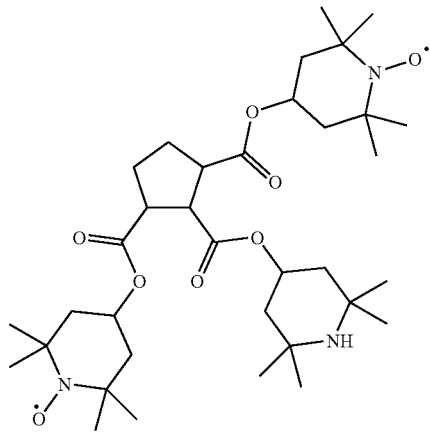 [SMILES: CC1(C)CC(OC(=O)C2C(C(=O)OC3CC(C)(C)N(O)C(C)(C)C3)CCC2C(=O)OC2CC(C)(C)N(O)C(C)(C)C2)CC(C)(C)N1] |
| 136 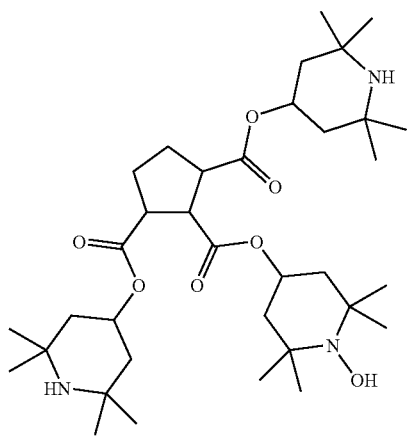 |
| 137 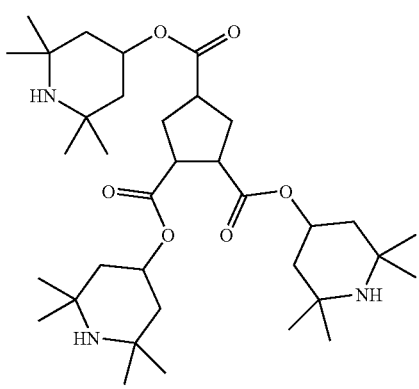 |

-continued
| No. | |
|---|---|
| 138 | 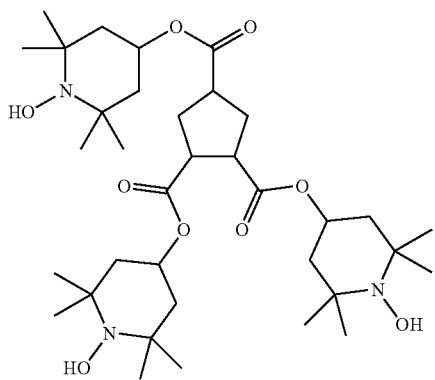 |
| 139 | 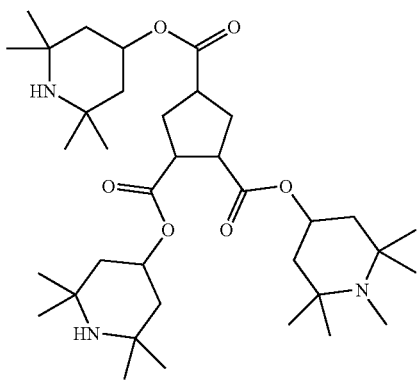 |
| 140 | 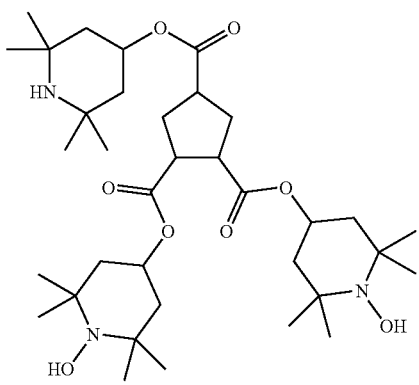 |
| 141 | 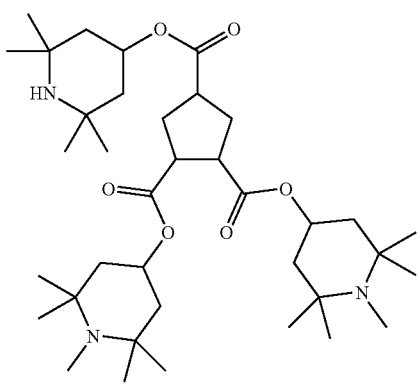 |

| No. |
|---|
| 142 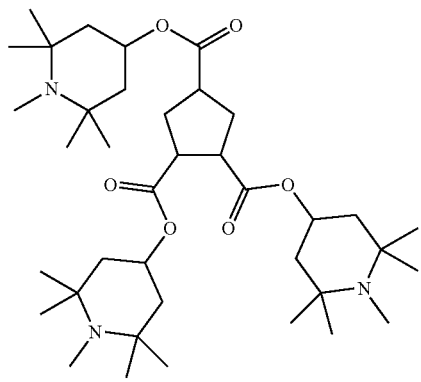 |
| 143 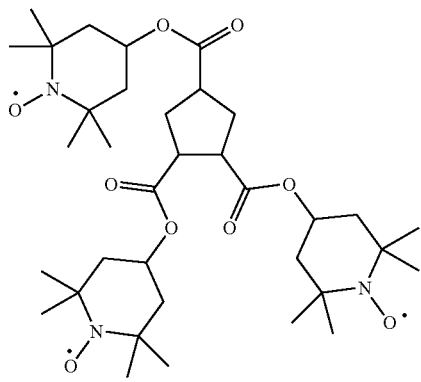 |
| 144 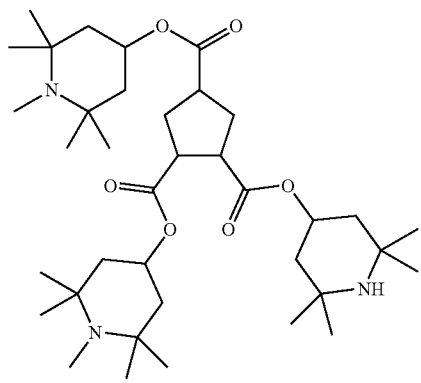 |
| 145 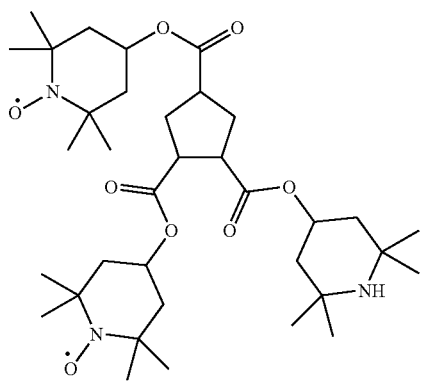 |

| No. |
|---|
| 146 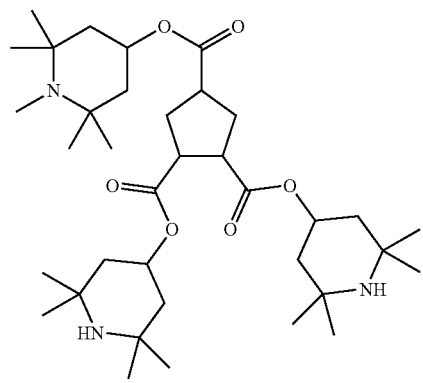 |
| 147 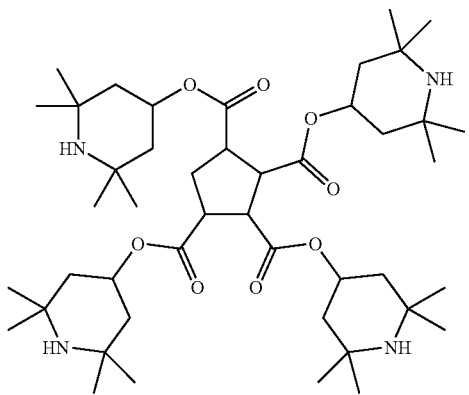 |
| 148 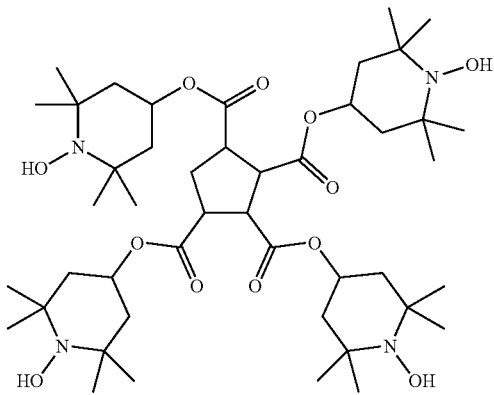 [SMILES: CC1(C)CC(OC(=O)C2CC(C(=O)OC3CC(C)(C)N(O)C(C)(C)C3)C(C(=O)OC3CC(C)(C)N(O)C(C)(C)C3)C2C(=O)OC2CC(C)(C)N(O)C(C)(C)C2)CC(C)(C)N1O] |
| 149 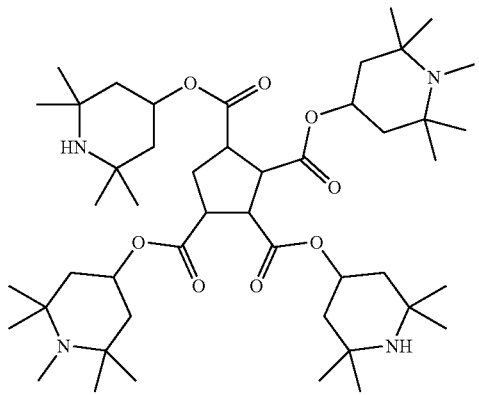 |

| No. | |
|---|---|
| 150 | 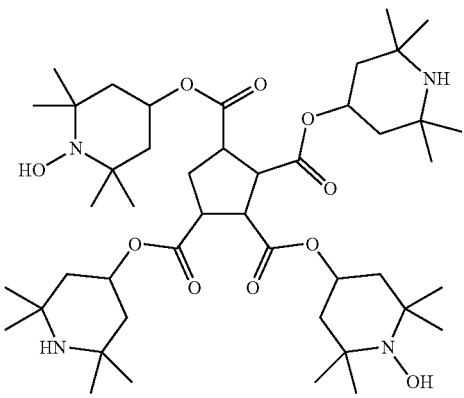 |
| 151 | 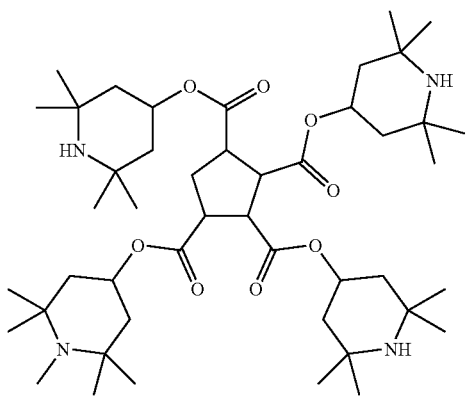 |
| 152 | 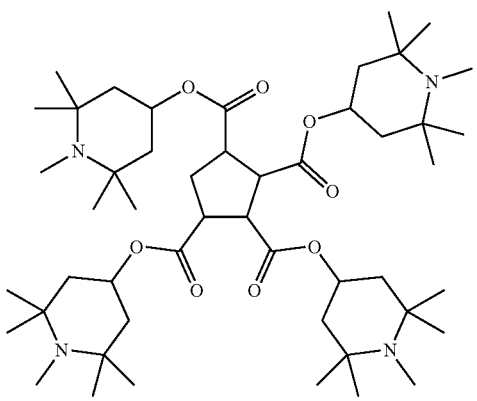 |
| 153 | 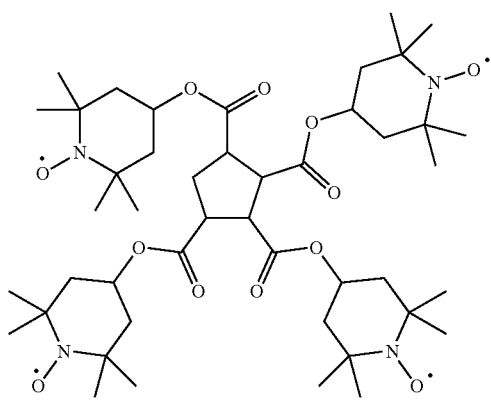 [SMILES: CC1(C)CC(OC(=O)C2CC(C(=O)OC3CC(C)(C)N(O)C(C)(C)C3)C(C(=O)OC3CC(C)(C)N(O)C(C)(C)C3)C2C(=O)OC2CC(C)(C)N(O)C(C)(C)C2)CC(C)(C)N1O] |

| No. |
|---|
| 154 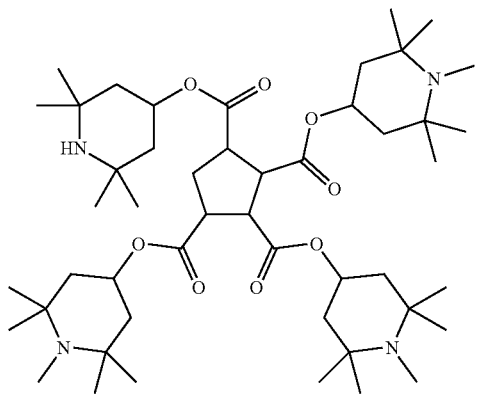 |
| 155 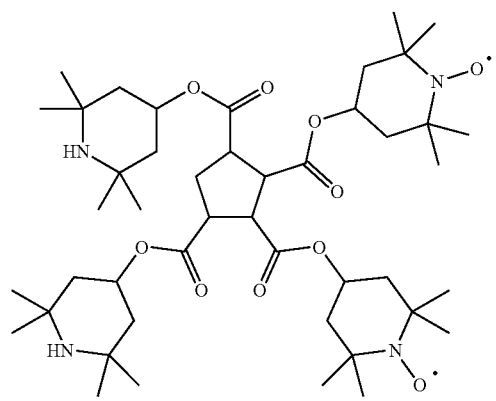 [SMILES: CC1(C)CC(OC(=O)C2CC(C(=O)OC3CC(C)(C)NC(C)(C)C3)C(C(=O)OC3CC(C)(C)N(O)C(C)(C)C3)C2C(=O)OC2CC(C)(C)N(O)C(C)(C)C2)CC(C)(C)N1] |
| 156 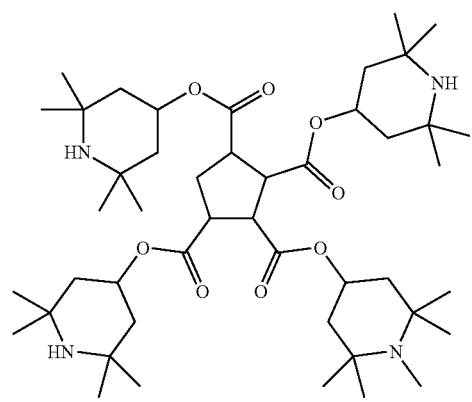 |
| 157 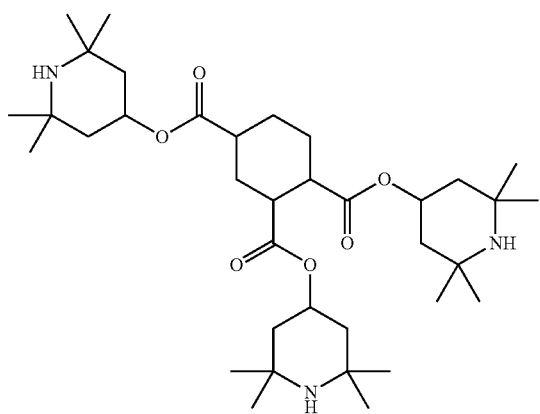 |

-continued
| No. | |
|---|---|
| 158 | 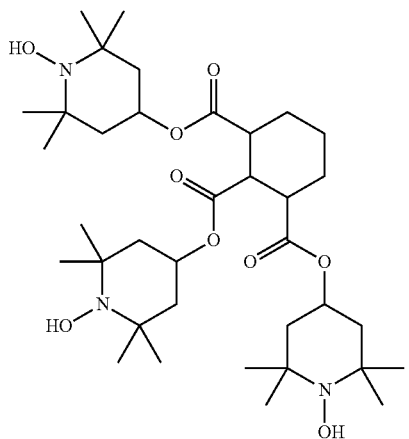 |
| 159 | 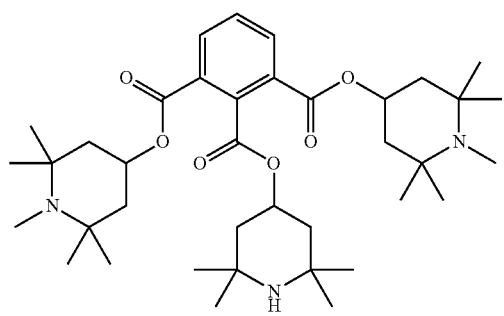 |
| 160 | 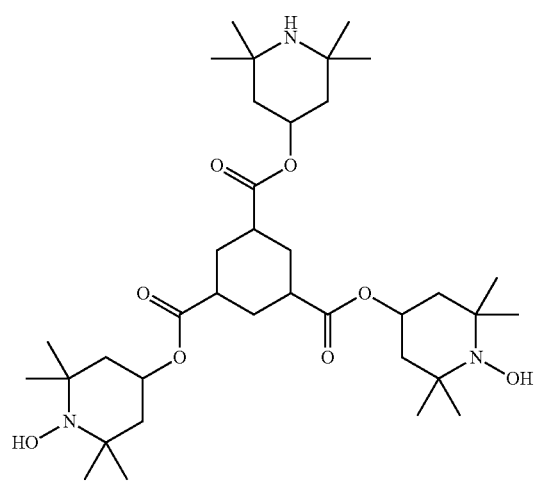 |

-continued
| No. |
|---|
| 161 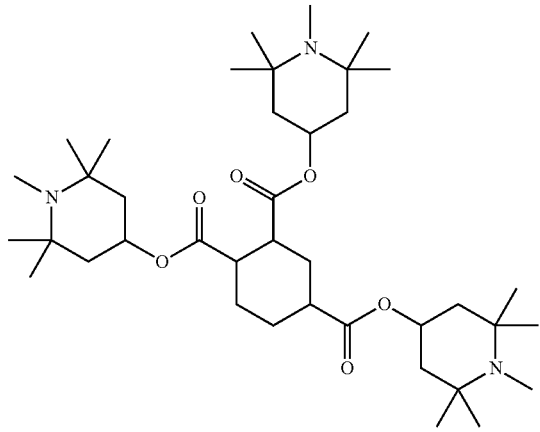 |
| 162 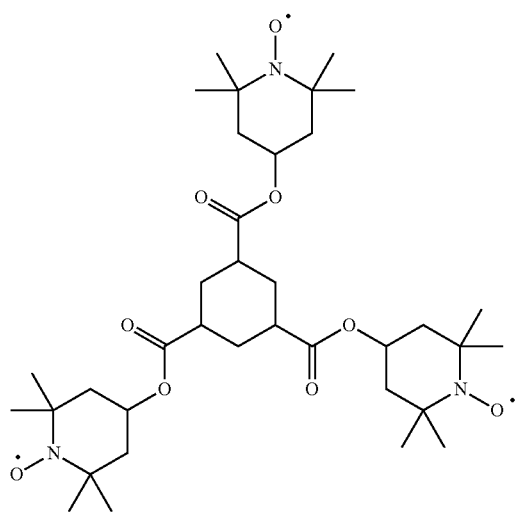 |
| 163 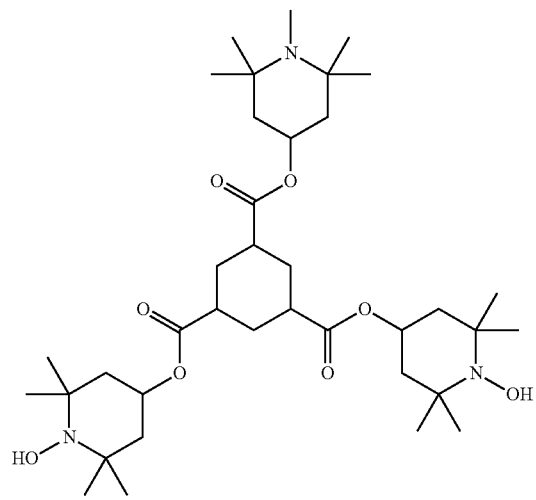 |

| No. | |
|---|---|
| 164 | 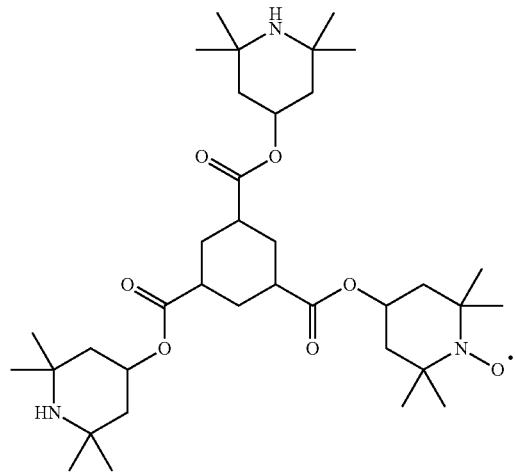 |
| 165 | 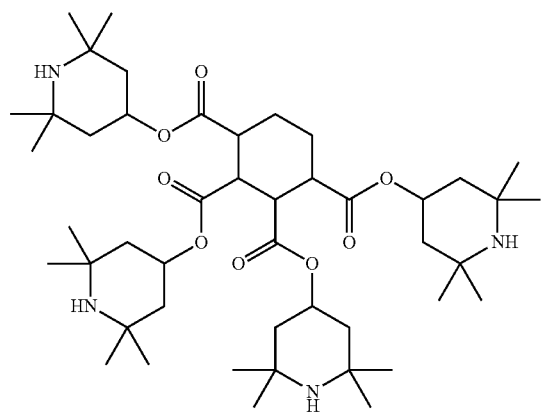 |
| 166 | 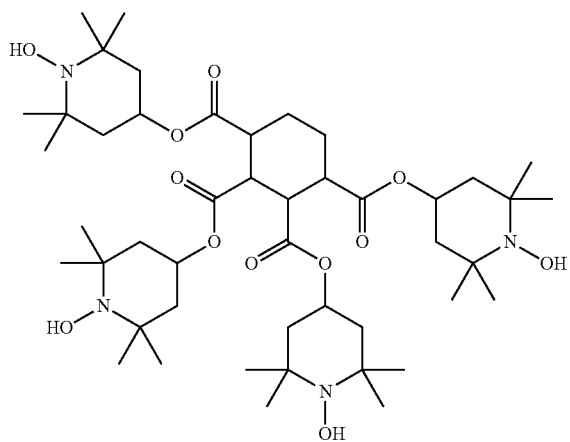 |

-continued
| No. |
| --- |
| 167 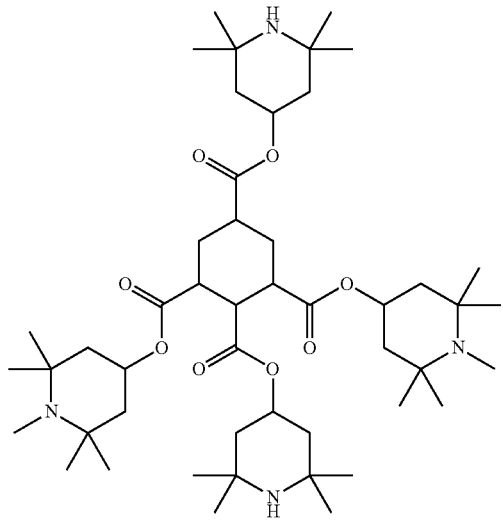 |
| 168 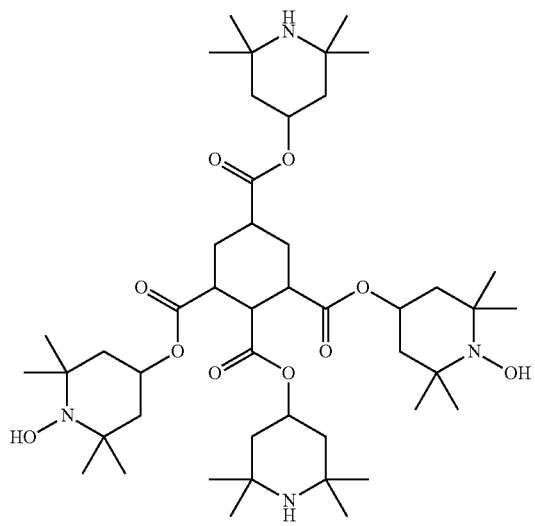 |
| 169 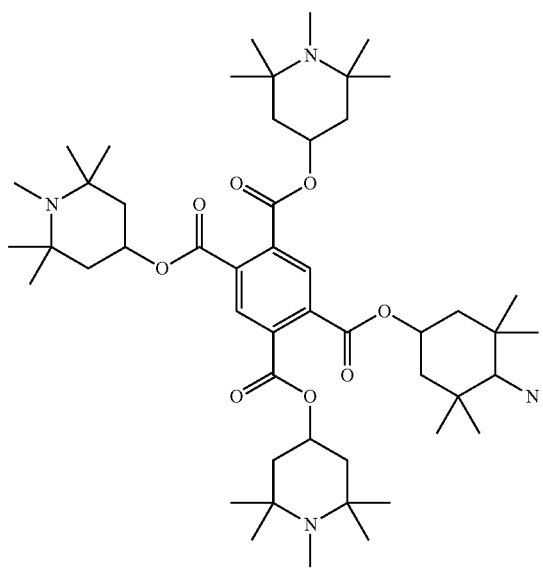 |

| No. |
|---|
| 170 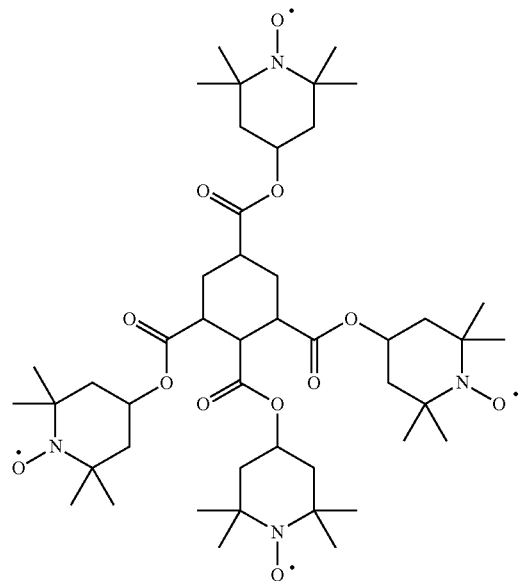 |
| 171 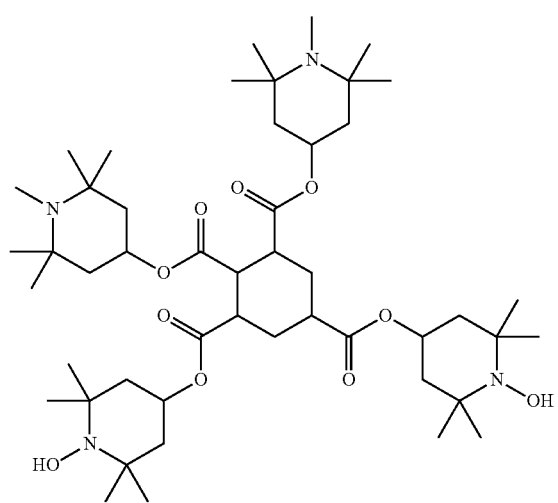 |
| 172 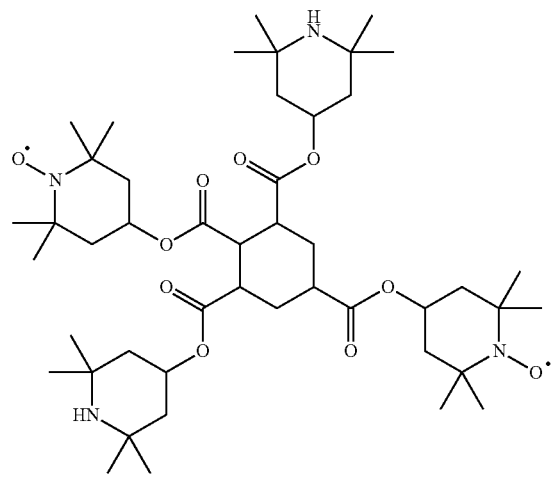 |

| No. | |
|---|---|
| 173 | 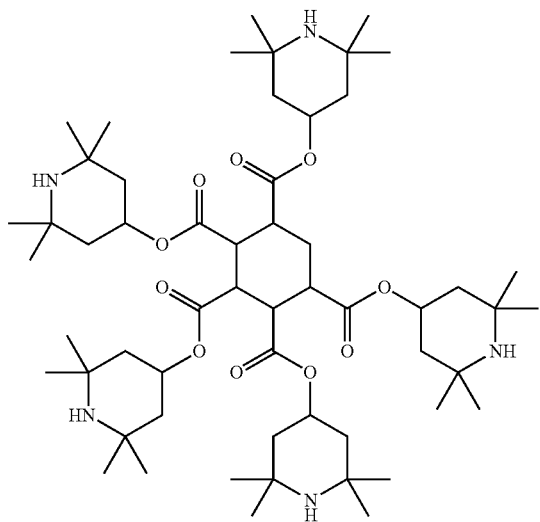 |
| 174 | 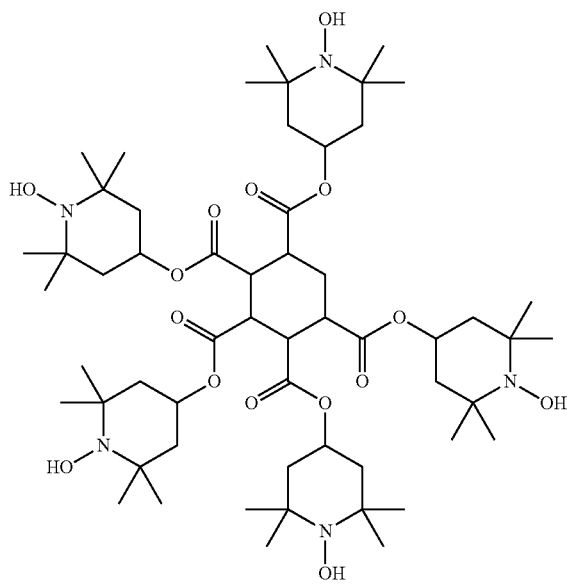 |
| 175 | 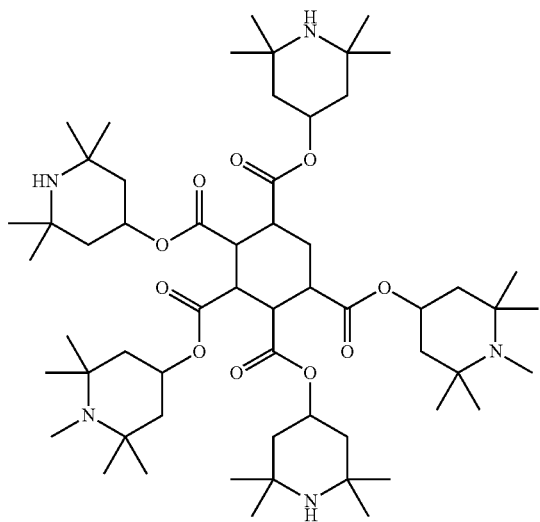 |

| No. |
|---|
| 176 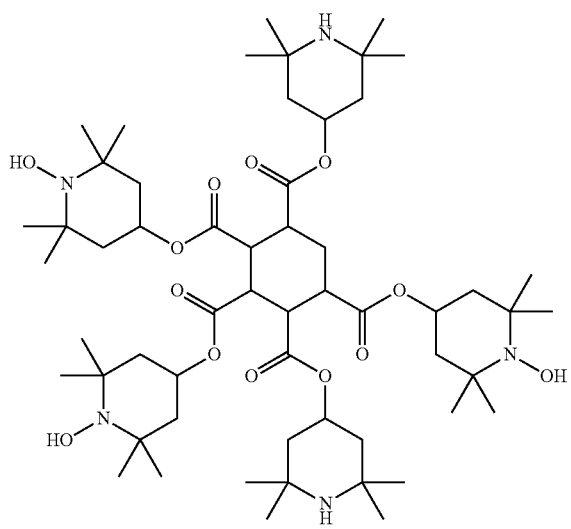 |
| 177 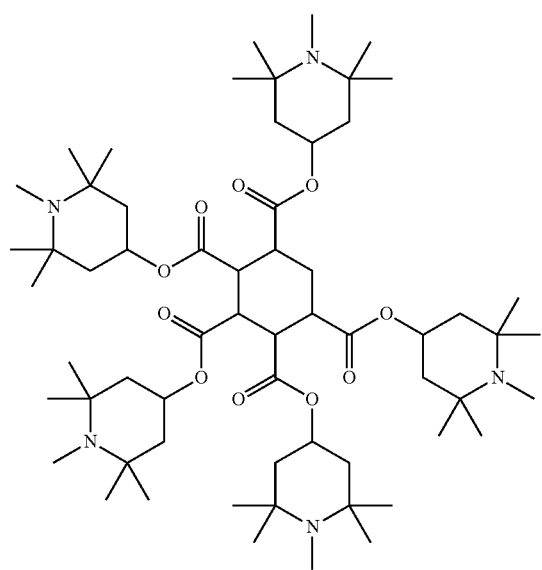 |

| No. |
|---|
| 178 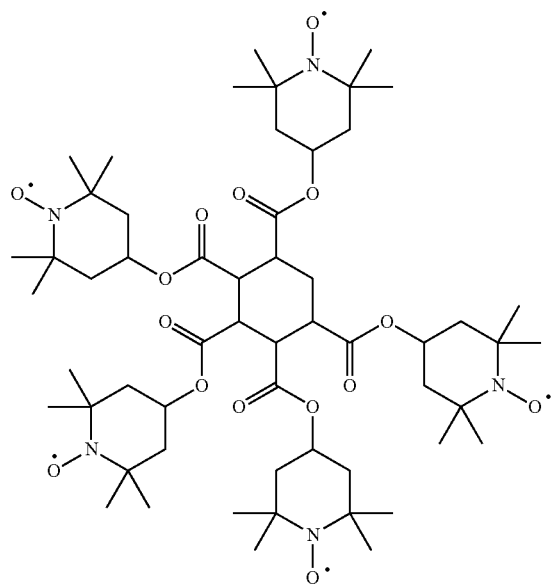 |
| 179 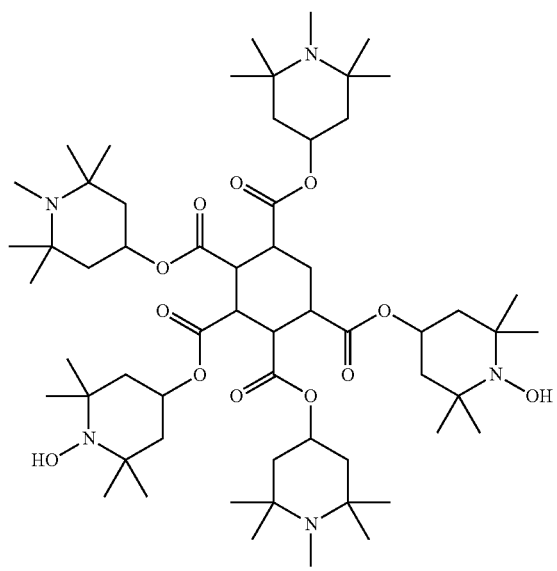 |

| No. | |
|---|---|
| 180 | 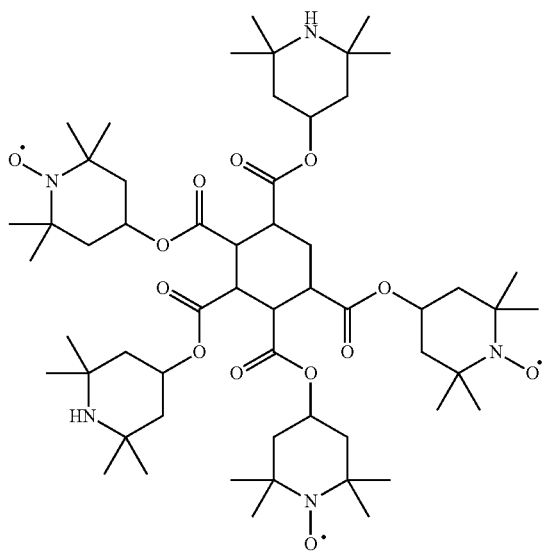 |
| 181 | 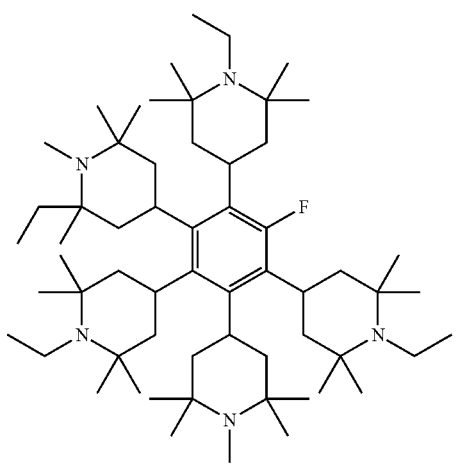 [SMILES: CCN1C(C)(C)CC(c2c(F)c(C3CC(C)(C)N(CC)C(C)(C)C3)c(C3CC(C)(C)N(C)C(C)(CC)C3)c(C3CC(C)(C)N(CC)C(C)(C)C3)c2C2CC(C)(C)N(C)C(C)(C)C2)CC1(C)C] |
| 182 | 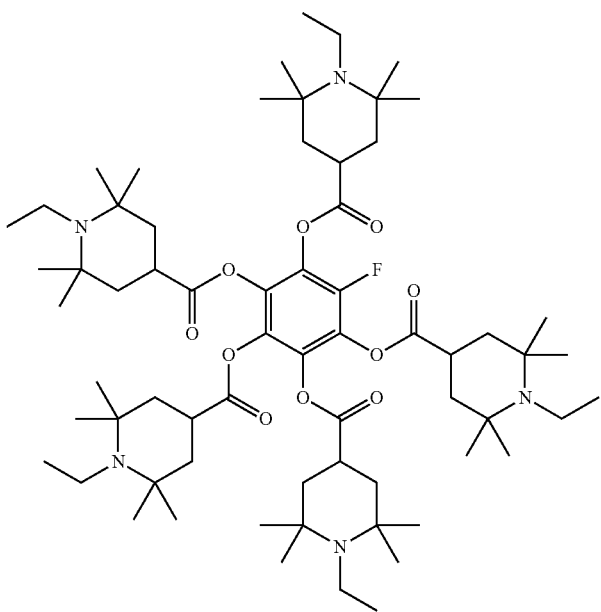 [SMILES: CCN1C(C)(C)CC(C(=O)Oc2c(F)c(OC(=O)C3CC(C)(C)N(CC)C(C)(C)C3)c(OC(=O)C3CC(C)(C)N(CC)C(C)(C)C3)c(OC(=O)C3CC(C)(C)N(CC)C(C)(C)C3)c2OC(=O)C2CC(C)(C)N(CC)C(C)(C)C2)CC1(C)C] |

| No. |
|---|
| 183 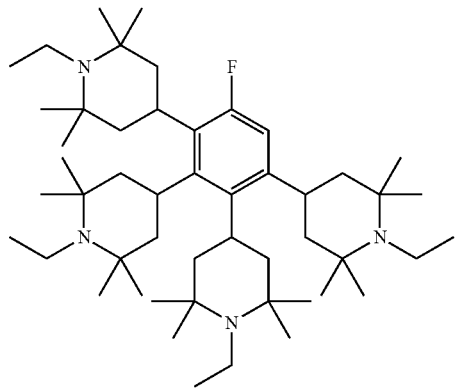 [SMILES: CCN1C(C)(C)CC(c2cc(F)c(C3CC(C)(C)N(CC)C(C)(C)C3)c(C3CC(C)(C)N(CC)C(C)(C)C3)c2C2CC(C)(C)N(CC)C(C)(C)C2)CC1(C)C] |
| 184 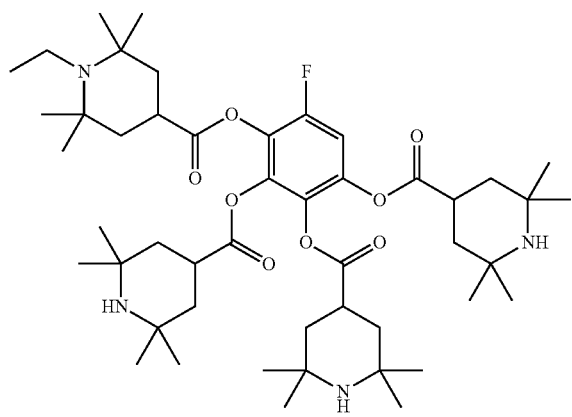 [SMILES: CCN1C(C)(C)CC(C(=O)Oc2c(F)cc(OC(=O)C3CC(C)(C)NC(C)(C)C3)c(OC(=O)C3CC(C)(C)NC(C)(C)C3)c2OC(=O)C2CC(C)(C)NC(C)(C)C2)CC1(C)C] |
| 185 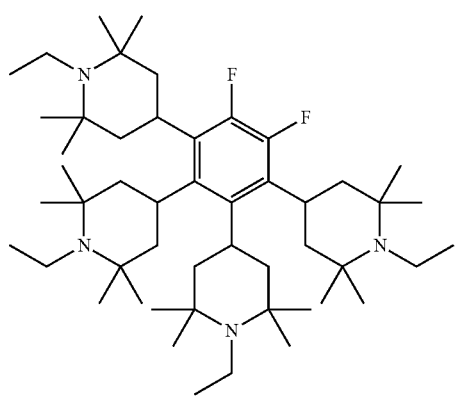 [SMILES: CCN1C(C)(C)CC(c2c(F)c(F)c(C3CC(C)(C)N(CC)C(C)(C)C3)c(C3CC(C)(C)N(CC)C(C)(C)C3)c2C2CC(C)(C)N(CC)C(C)(C)C2)CC1(C)C] |

| No. |
|---|
| 186 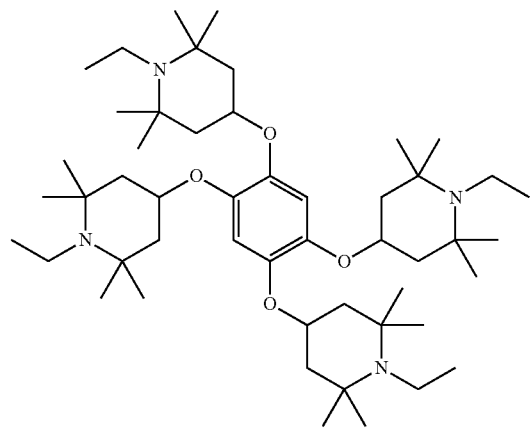 [SMILES: CCN1C(C)(C)CC(Oc2cc(OC3CC(C)(C)N(CC)C(C)(C)C3)c(OC3CC(C)(C)N(CC)C(C)(C)C3)cc2OC2CC(C)(C)N(CC)C(C)(C)C2)CC1(C)C] |
| 187 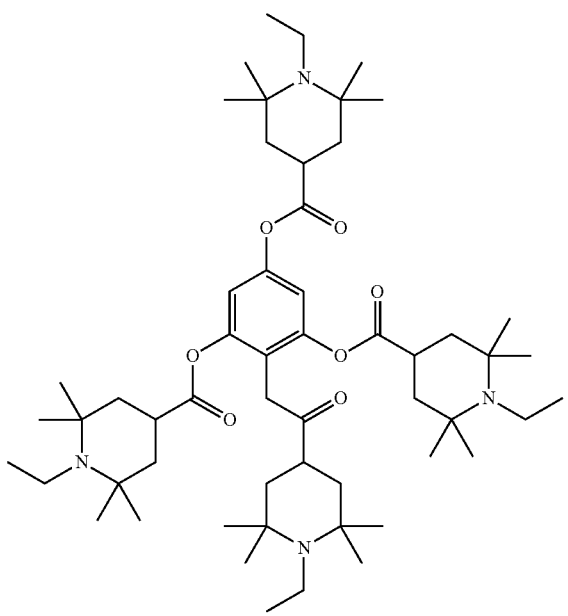 [SMILES: CCN1C(C)(C)CC(C(=O)Cc2c(OC(=O)C3CC(C)(C)N(CC)C(C)(C)C3)cc(OC(=O)C3CC(C)(C)N(CC)C(C)(C)C3)cc2OC(=O)C2CC(C)(C)N(CC)C(C)(C)C2)CC1(C)C] |
| 188 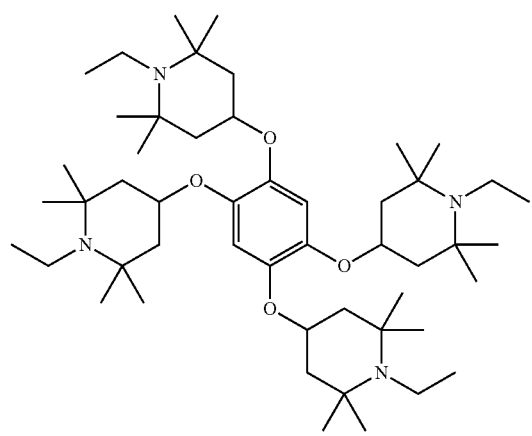 [SMILES: CCN1C(C)(C)CC(Oc2cc(OC3CC(C)(C)N(CC)C(C)(C)C3)c(OC3CC(C)(C)N(CC)C(C)(C)C3)cc2OC2CC(C)(C)N(CC)C(C)(C)C2)CC1(C)C] |

-continued
| No. |
|---|
| 189 |
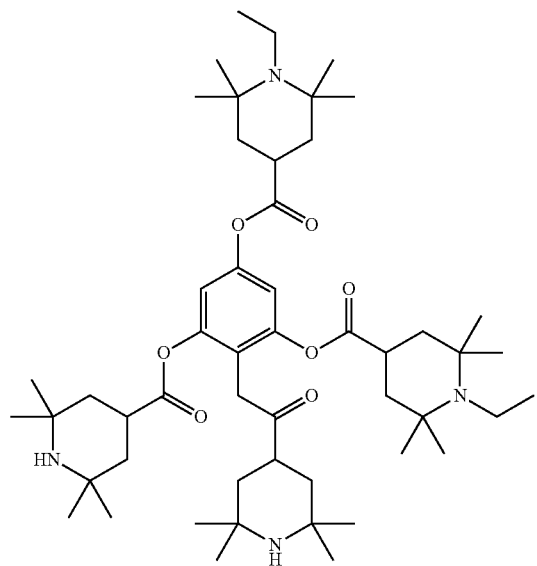 [SMILES: CCN1C(C)(C)CC(C(=O)Oc2cc(OC(=O)C3CC(C)(C)NC(C)(C)C3)c(CC(=O)C3CC(C)(C)NC(C)(C)C3)c(OC(=O)C3CC(C)(C)N(CC)C(C)(C)C3)c2)CC1(C)C]
| 190 |
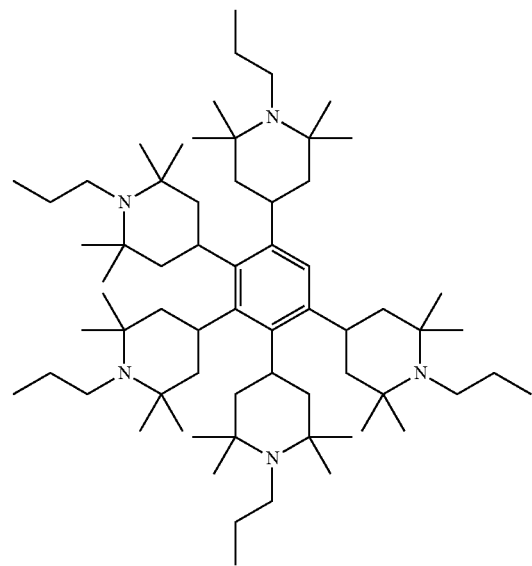 [SMILES: CCCN1C(C)(C)CC(c2cc(C3CC(C)(C)N(CCC)C(C)(C)C3)c(C3CC(C)(C)N(CCC)C(C)(C)C3)c(C3CC(C)(C)N(CCC)C(C)(C)C3)c2C2CC(C)(C)N(CCC)C(C)(C)C2)CC1(C)C]

| No. |
|---|
| 191 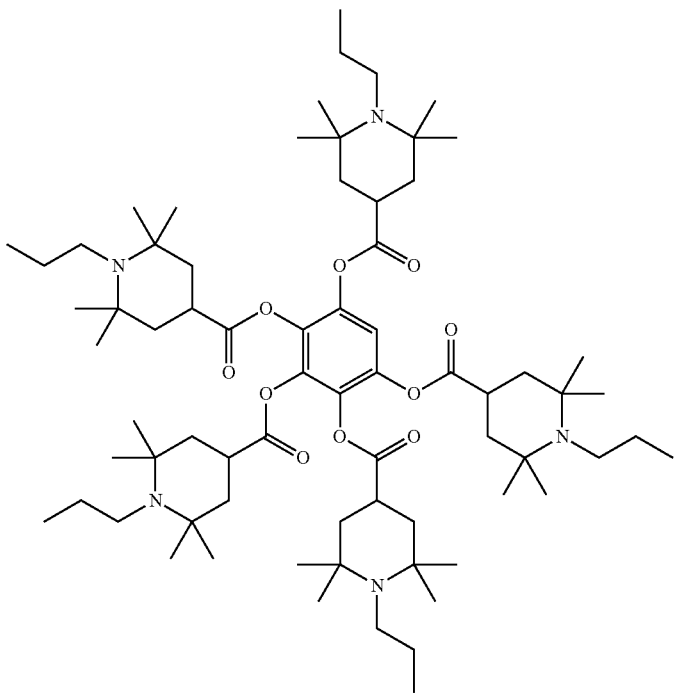 [SMILES: CCCN1C(C)(C)CC(C(=O)Oc2cc(OC(=O)C3CC(C)(C)N(CCC)C(C)(C)C3)c(OC(=O)C3CC(C)(C)N(CCC)C(C)(C)C3)c(OC(=O)C3CC(C)(C)N(CCC)C(C)(C)C3)c2OC(=O)C2CC(C)(C)N(CCC)C(C)(C)C2)CC1(C)C] |
| 192 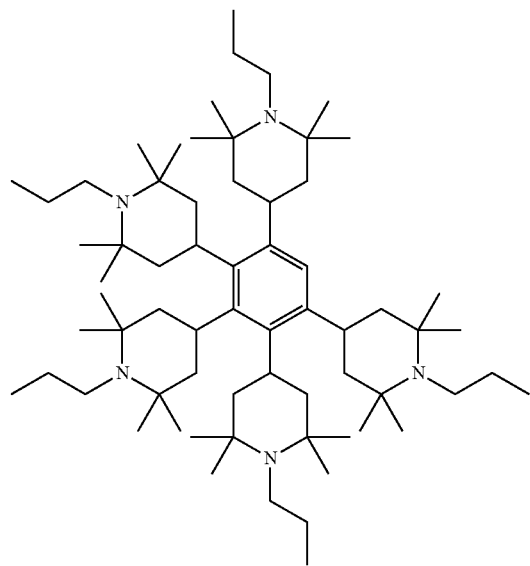 [SMILES: CCCN1C(C)(C)CC(c2cc(C3CC(C)(C)N(CCC)C(C)(C)C3)c(C3CC(C)(C)N(CCC)C(C)(C)C3)c(C3CC(C)(C)N(CCC)C(C)(C)C3)c2C2CC(C)(C)N(CCC)C(C)(C)C2)CC1(C)C] |

| No. |
| --- |
| 193 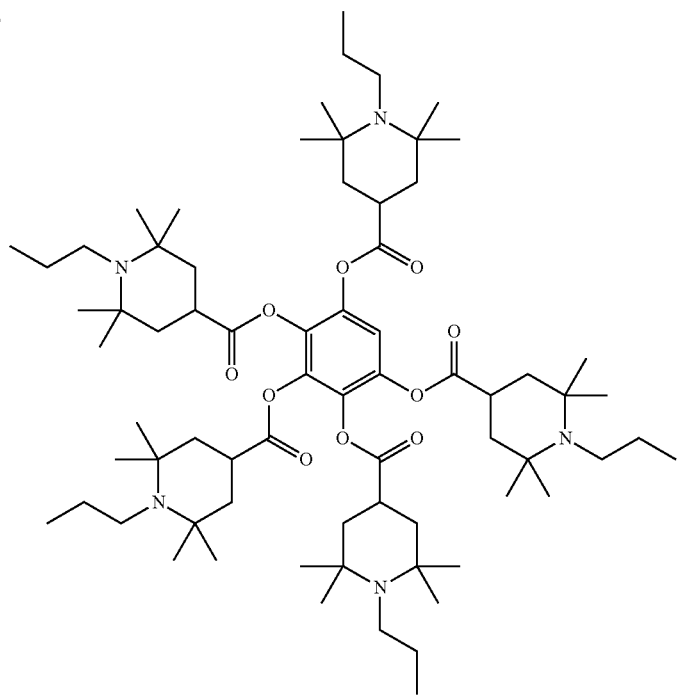 [SMILES: CCCN1C(C)(C)CC(C(=O)Oc2cc(OC(=O)C3CC(C)(C)N(CCC)C(C)(C)C3)c(OC(=O)C3CC(C)(C)N(CCC)C(C)(C)C3)c(OC(=O)C3CC(C)(C)N(CCC)C(C)(C)C3)c2OC(=O)C2CC(C)(C)N(CCC)C(C)(C)C2)CC1(C)C] |
| 194 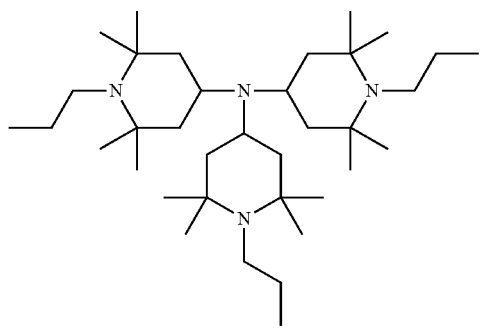 [SMILES: CCCN1C(C)(C)CC(N(C2CC(C)(C)N(CCC)C(C)(C)C2)C2CC(C)(C)N(CCC)C(C)(C)C2)CC1(C)C] |
| 195 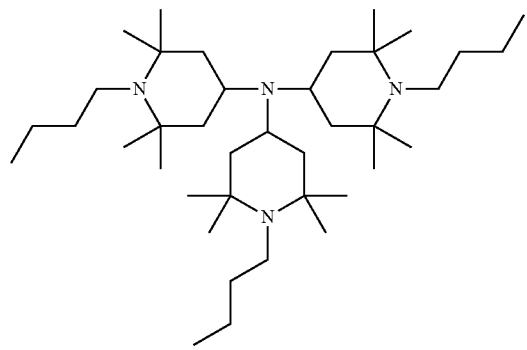 [SMILES: CCCCN1C(C)(C)CC(N(C2CC(C)(C)N(CCCC)C(C)(C)C2)C2CC(C)(C)N(CCCC)C(C)(C)C2)CC1(C)C] |

-continued
| No. |
|---|
| 196 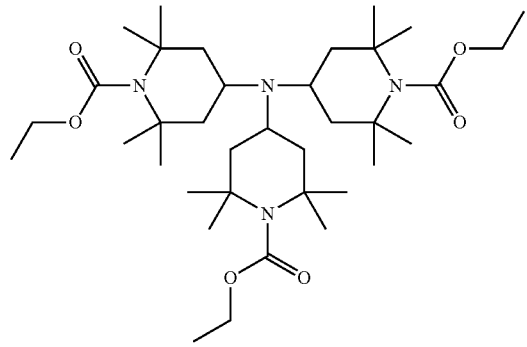 [SMILES: CCOC(=O)N1C(C)(C)CC(N(C2CC(C)(C)N(C(=O)OCC)C(C)(C)C2)C2CC(C)(C)N(C(=O)OCC)C(C)(C)C2)CC1(C)C] |
| 197 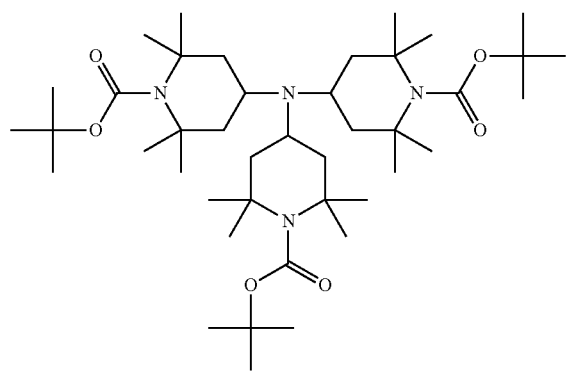 [SMILES: CC(C)(C)OC(=O)N1C(C)(C)CC(N(C2CC(C)(C)N(C(=O)OC(C)(C)C)C(C)(C)C2)C2CC(C)(C)N(C(=O)OC(C)(C)C)C(C)(C)C2)CC1(C)C] |
| 198 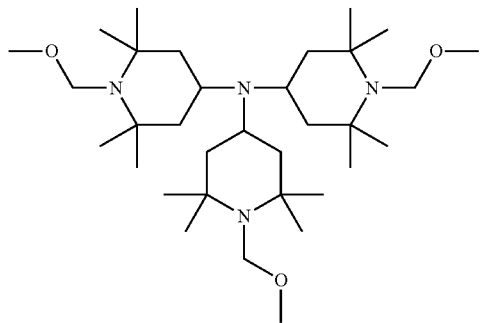 |
| 199 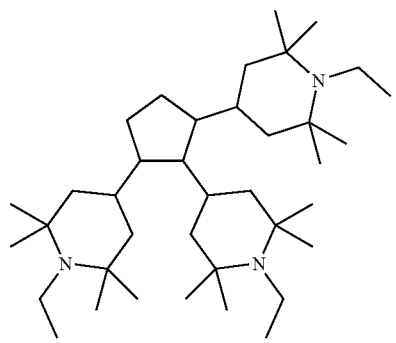 [SMILES: CCN1C(C)(C)CC(C2CCC(C3CC(C)(C)N(CC)C(C)(C)C3)C2C2CC(C)(C)N(CC)C(C)(C)C2)CC1(C)C] |

-continued
| No. |
|---|
| 200 | 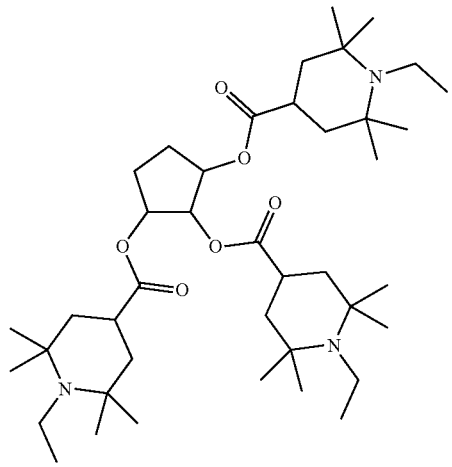 [SMILES: CCN1C(C)(C)CC(C(=O)OC2CCC(OC(=O)C3CC(C)(C)N(CC)C(C)(C)C3)C2OC(=O)C2CC(C)(C)N(CC)C(C)(C)C2)CC1(C)C] |
| 201 | 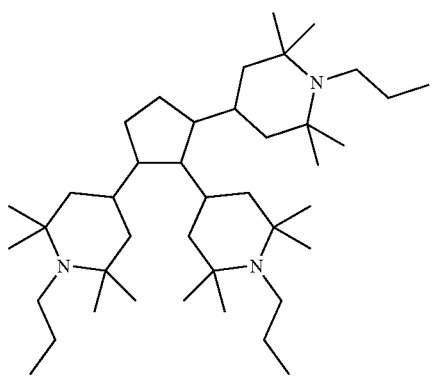 [SMILES: CCCN1C(C)(C)CC(C2CCC(C3CC(C)(C)N(CCC)C(C)(C)C3)C2C2CC(C)(C)N(CCC)C(C)(C)C2)CC1(C)C] |
| 202 | 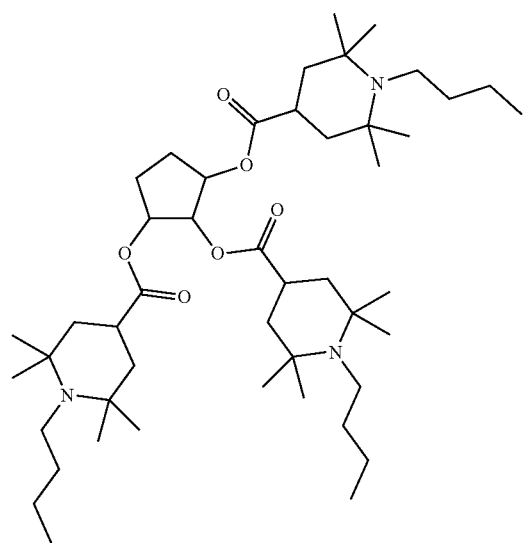 [SMILES: CCCCN1C(C)(C)CC(C(=O)OC2CCC(OC(=O)C3CC(C)(C)N(CCCC)C(C)(C)C3)C2OC(=O)C2CC(C)(C)N(CCCC)C(C)(C)C2)CC1(C)C] |

| No. |
| --- |
| 203 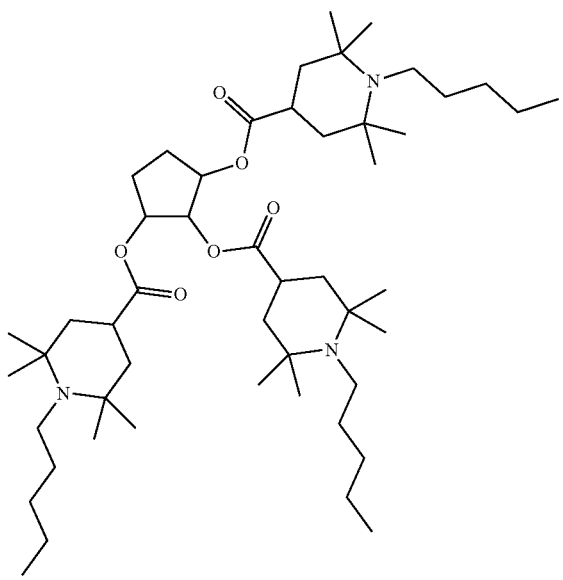 [SMILES: CCCCCN1C(C)(C)CC(C(=O)OC2CCC(OC(=O)C3CC(C)(C)N(CCCCC)C(C)(C)C3)C2OC(=O)C2CC(C)(C)N(CCCCC)C(C)(C)C2)CC1(C)C] |
| 204 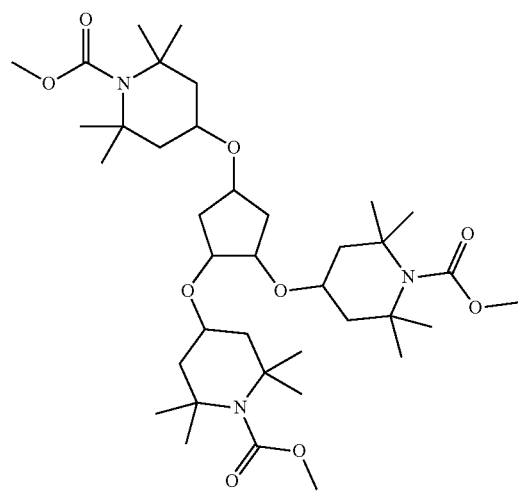 |
| 205 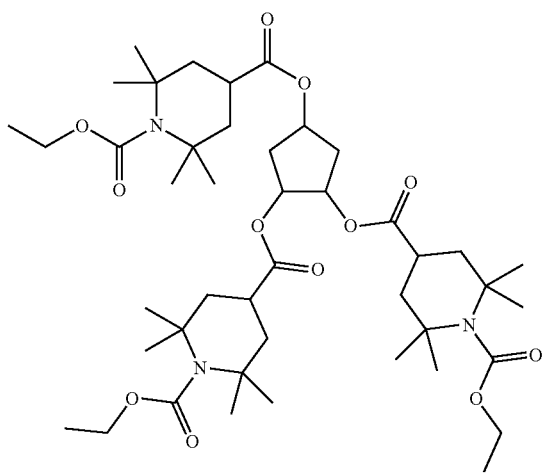 [SMILES: CCOC(=O)N1C(C)(C)CC(C(=O)OC2CC(OC(=O)C3CC(C)(C)N(C(=O)OCC)C(C)(C)C3)C(OC(=O)C3CC(C)(C)N(C(=O)OCC)C(C)(C)C3)C2)CC1(C)C] |

-continued
| No. | |
|---|---|
| 206 | 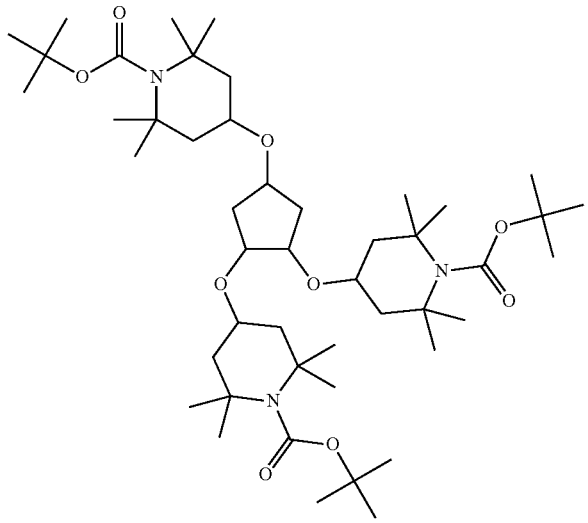 [SMILES: CC(C)(C)OC(=O)N1C(C)(C)CC(OC2CC(OC3CC(C)(C)N(C(=O)OC(C)(C)C)C(C)(C)C3)C(OC3CC(C)(C)N(C(=O)OC(C)(C)C)C(C)(C)C3)C2)CC1(C)C] |
| 207 | 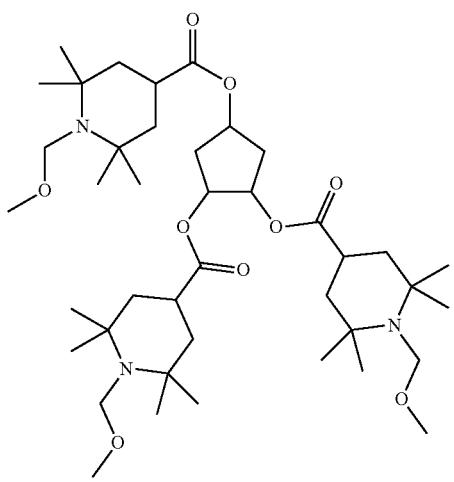 |
| 208 | 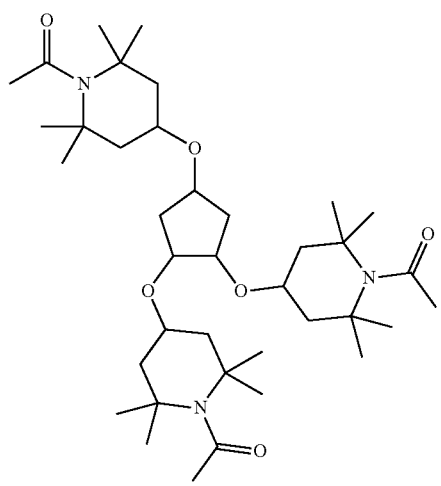 [SMILES: CC(=O)N1C(C)(C)CC(OC2CC(OC3CC(C)(C)N(C(C)=O)C(C)(C)C3)C(OC3CC(C)(C)N(C(C)=O)C(C)(C)C3)C2)CC1(C)C] |

| No. |
|---|
| 209 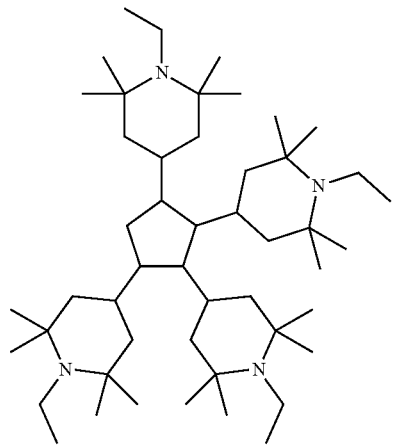 [SMILES: CCN1C(C)(C)CC(C2CC(C3CC(C)(C)N(CC)C(C)(C)C3)C(C3CC(C)(C)N(CC)C(C)(C)C3)C2C2CC(C)(C)N(CC)C(C)(C)C2)CC1(C)C] |
| 210 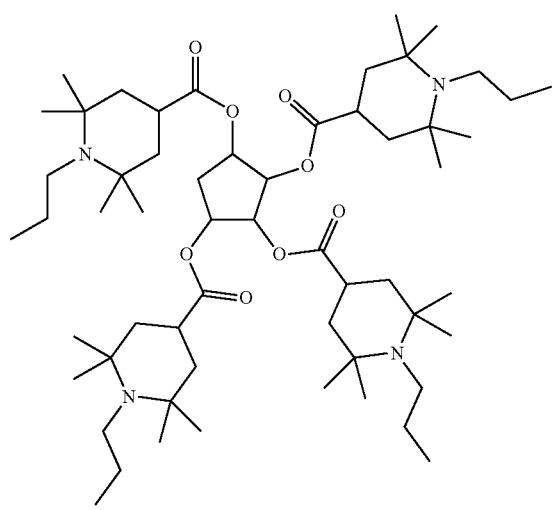 [SMILES: CCCN1C(C)(C)CC(C(=O)OC2CC(OC(=O)C3CC(C)(C)N(CCC)C(C)(C)C3)C(OC(=O)C3CC(C)(C)N(CCC)C(C)(C)C3)C2OC(=O)C2CC(C)(C)N(CCC)C(C)(C)C2)CC1(C)C] |
| 211 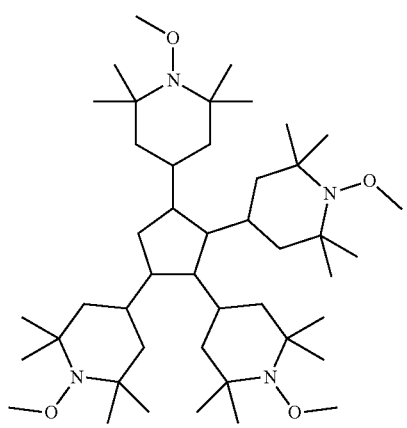 |

-continued
| No. |
|---|
| 212 |
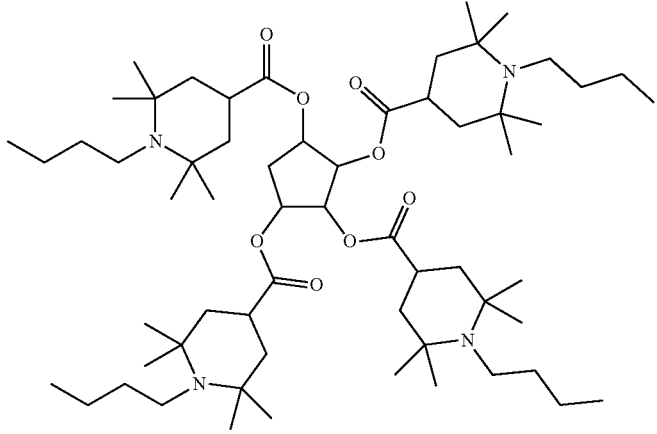 [SMILES: CCCCN1C(C)(C)CC(C(=O)OC2CC(OC(=O)C3CC(C)(C)N(CCCC)C(C)(C)C3)C(OC(=O)C3CC(C)(C)N(CCCC)C(C)(C)C3)C2OC(=O)C2CC(C)(C)N(CCCC)C(C)(C)C2)CC1(C)C]
213
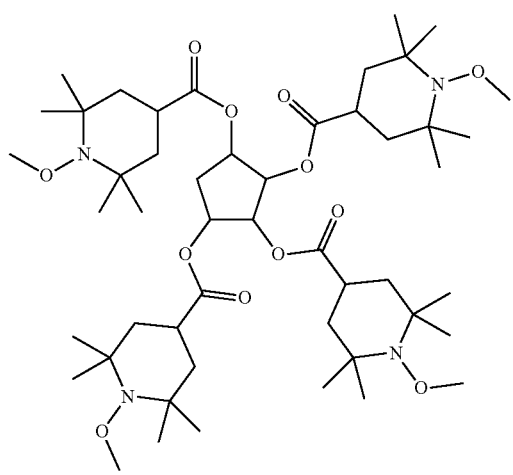
214
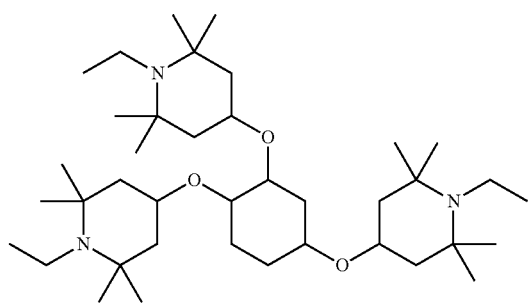 [SMILES: CCN1C(C)(C)CC(OC2CCC(OC3CC(C)(C)N(CC)C(C)(C)C3)C(OC3CC(C)(C)N(CC)C(C)(C)C3)C2)CC1(C)C]

223
-continued
| No. |
|---|
| 215 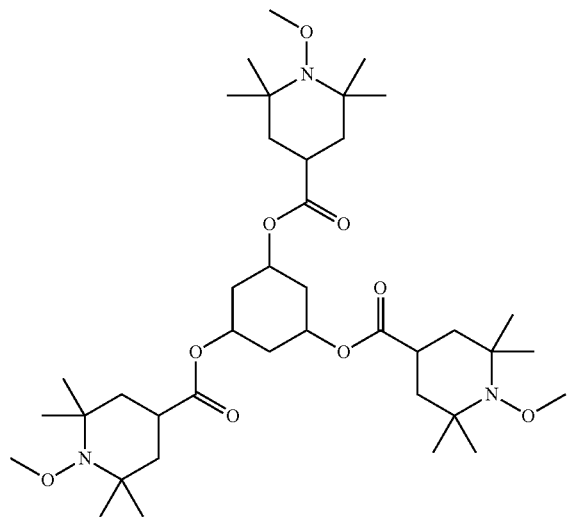 |
| 216 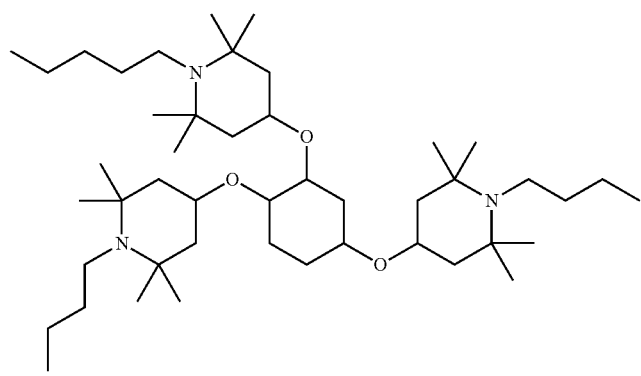 [SMILES: CCCCCN1C(C)(C)CC(OC2CC(OC3CC(C)(C)N(CCCC)C(C)(C)C3)CCC2OC2CC(C)(C)N(CCCC)C(C)(C)C2)CC1(C)C] |
| 217 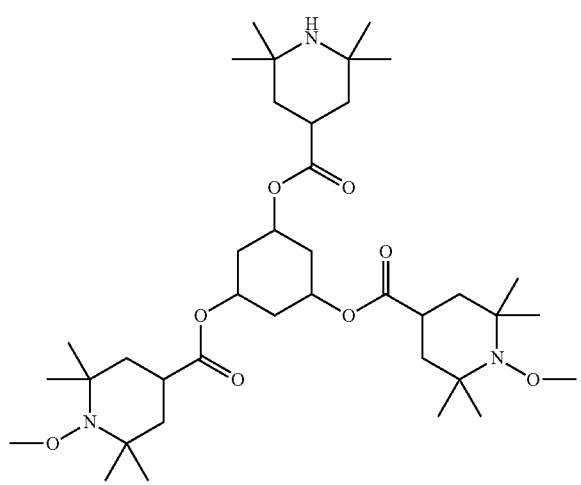 |

-continued
| No. |
|---|
| 218 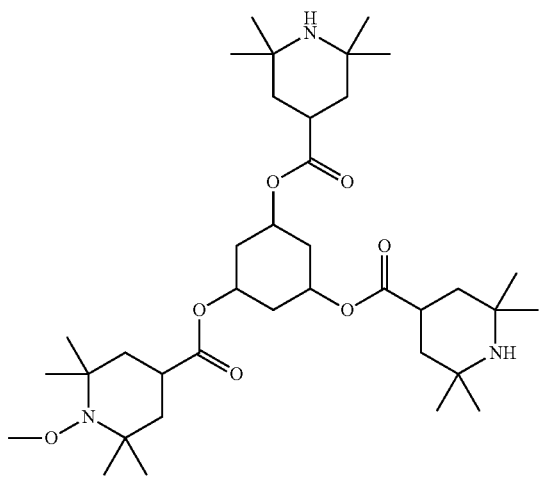 |
| 219 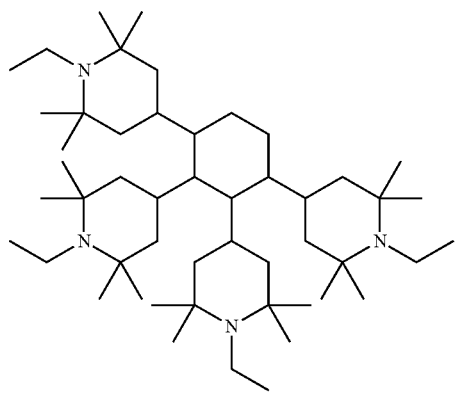 [SMILES: CCN1C(C)(C)CC(C2CCC(C3CC(C)(C)N(CC)C(C)(C)C3)C(C3CC(C)(C)N(CC)C(C)(C)C3)C2C2CC(C)(C)N(CC)C(C)(C)C2)CC1(C)C] |
| 220 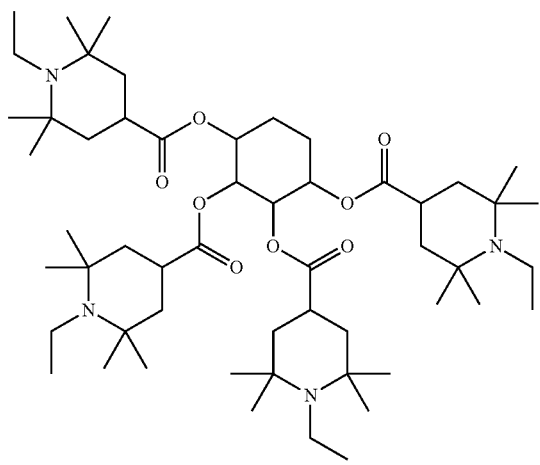 |

| No. | |
|---|---|
| 221 | 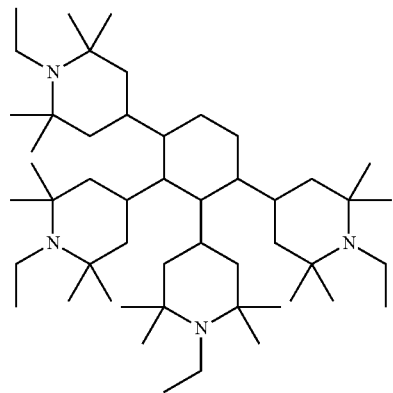 |
| 222 | 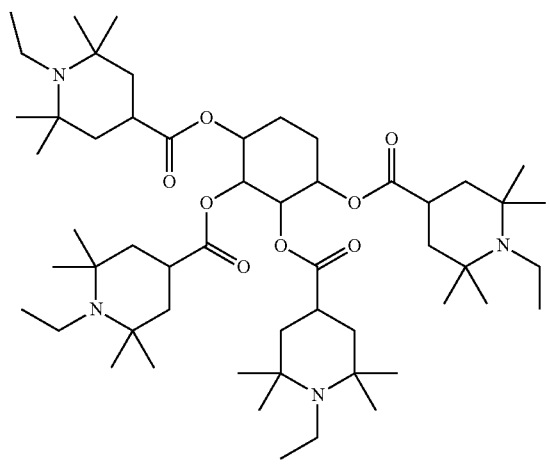 [SMILES: CCN1C(C)(C)CC(C(=O)OC2CCC(OC(=O)C3CC(C)(C)N(CC)C(C)(C)C3)C(OC(=O)C3CC(C)(C)N(CC)C(C)(C)C3)C2OC(=O)C2CC(C)(C)N(CC)C(C)(C)C2)CC1(C)C] |
| 223 | 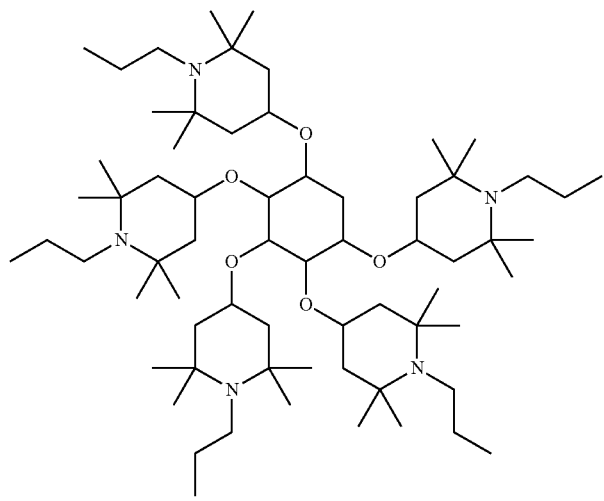 [SMILES: CCCN1C(C)(C)CC(OC2CC(OC3CC(C)(C)N(CCC)C(C)(C)C3)C(OC3CC(C)(C)N(CCC)C(C)(C)C3)C(OC3CC(C)(C)N(CCC)C(C)(C)C3)C2OC2CC(C)(C)N(CCC)C(C)(C)C2)CC1(C)C] |

-continued
| No. |
|---|
| 224 |
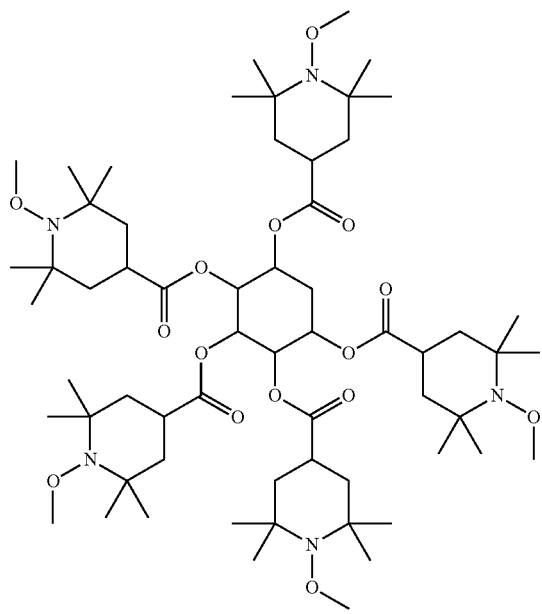
| 225 |
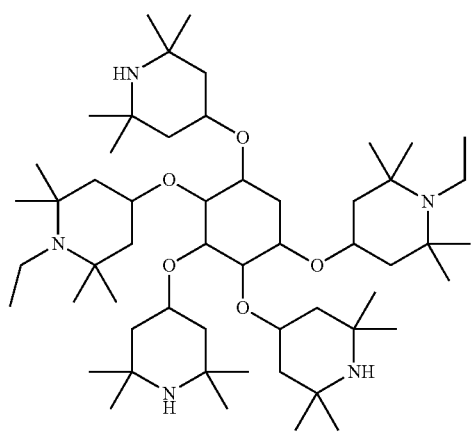 [SMILES: CCN1C(C)(C)CC(OC2CC(OC3CC(C)(C)NC(C)(C)C3)C(OC3CC(C)(C)N(CC)C(C)(C)C3)C(OC3CC(C)(C)NC(C)(C)C3)C2OC2CC(C)(C)NC(C)(C)C2)CC1(C)C]

| No. | |
|---|---|
| 226 | 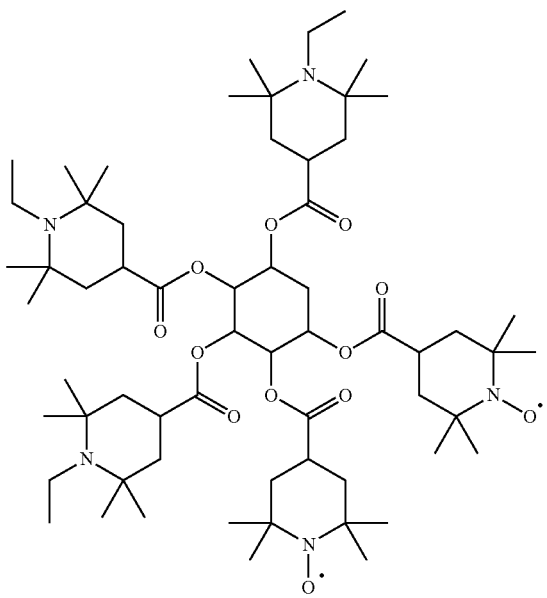 |
| 227 | 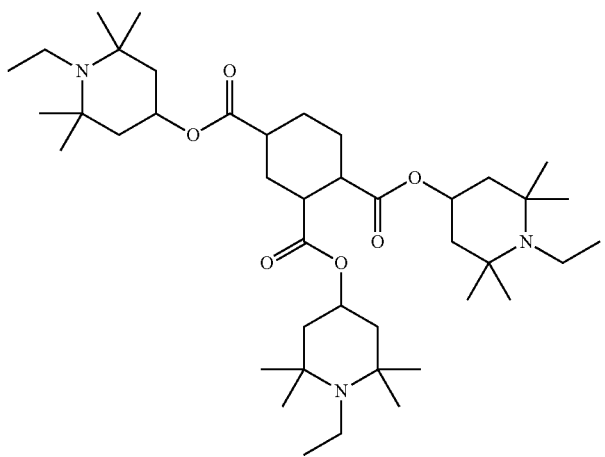 [SMILES: CCN1C(C)(C)CC(OC(=O)C2CCC(C(=O)OC3CC(C)(C)N(CC)C(C)(C)C3)C(C(=O)OC3CC(C)(C)N(CC)C(C)(C)C3)C2)CC1(C)C] |
| 228 | 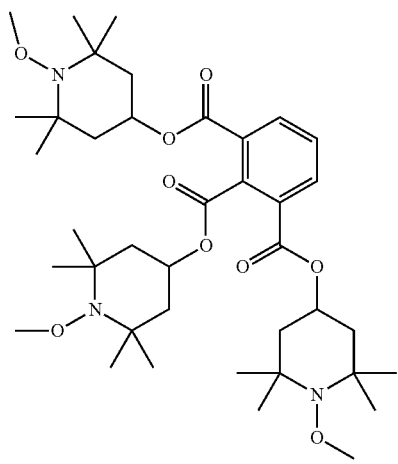 |

-continued
| No. | |
|---|---|
| 229 | 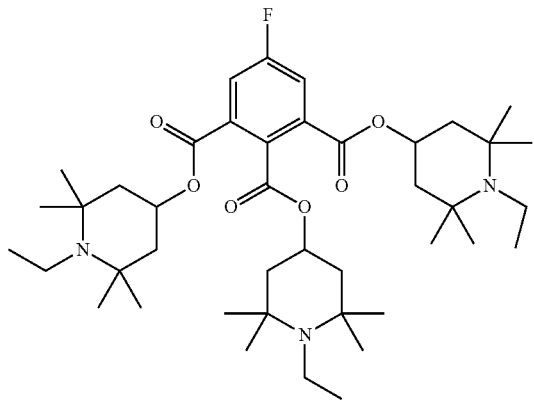 [SMILES: CCN1C(C)(C)CC(OC(=O)c2cc(F)cc(C(=O)OC3CC(C)(C)N(CC)C(C)(C)C3)c2C(=O)OC2CC(C)(C)N(CC)C(C)(C)C2)CC1(C)C] |
| 230 | 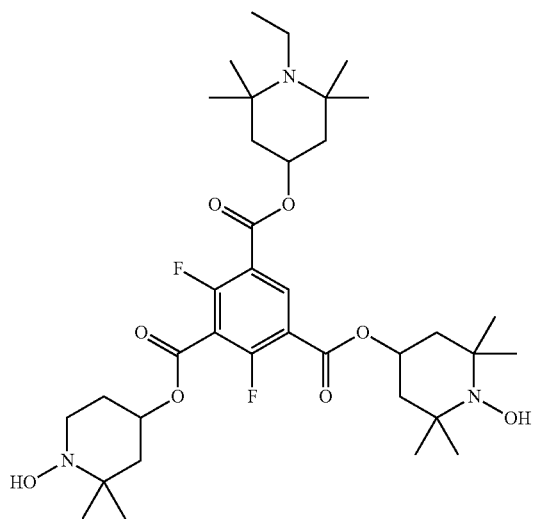 [SMILES: CCN1C(C)(C)CC(OC(=O)c2cc(C(=O)OC3CC(C)(C)N(O)C(C)(C)C3)c(F)c(C(=O)OC3CCN(O)C(C)(C)C3)c2F)CC1(C)C] |
| 231 | 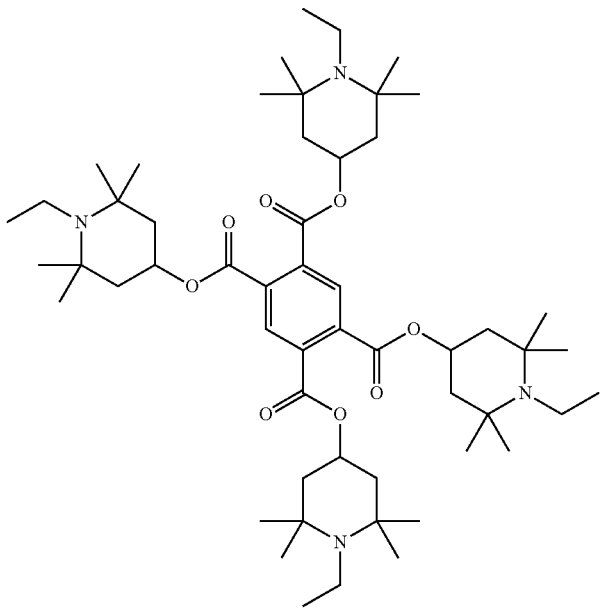 [SMILES: CCN1C(C)(C)CC(OC(=O)c2cc(C(=O)OC3CC(C)(C)N(CC)C(C)(C)C3)c(C(=O)OC3CC(C)(C)N(CC)C(C)(C)C3)cc2C(=O)OC2CC(C)(C)N(CC)C(C)(C)C2)CC1(C)C] |

| No. |
|---|
| 232 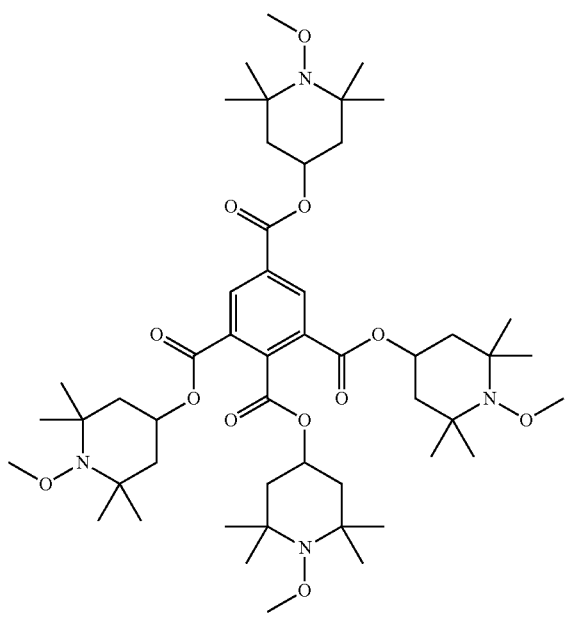 |
| 233 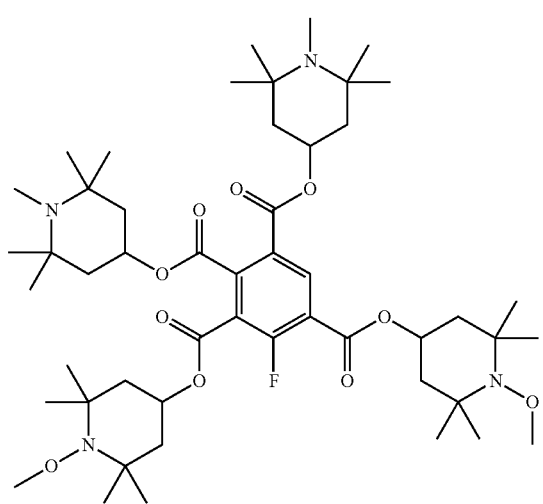 |
| 234 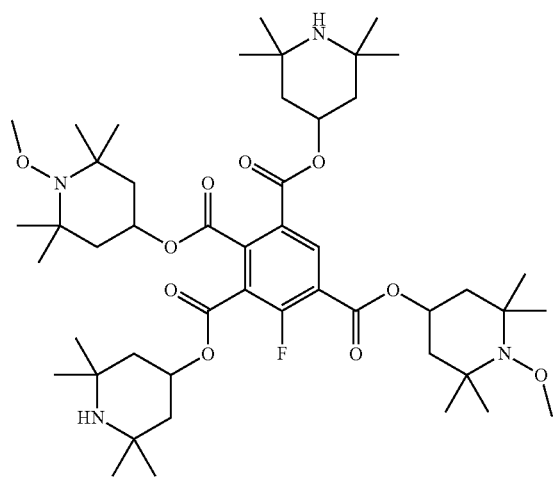 |

| No. |
|---|
| 235 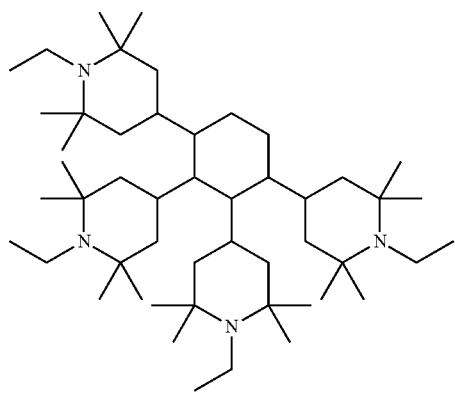 [SMILES: CCN1C(C)(C)CC(C2CCC(C3CC(C)(C)N(CC)C(C)(C)C3)C(C3CC(C)(C)N(CC)C(C)(C)C3)C2C2CC(C)(C)N(CC)C(C)(C)C2)CC1(C)C] |
| 236 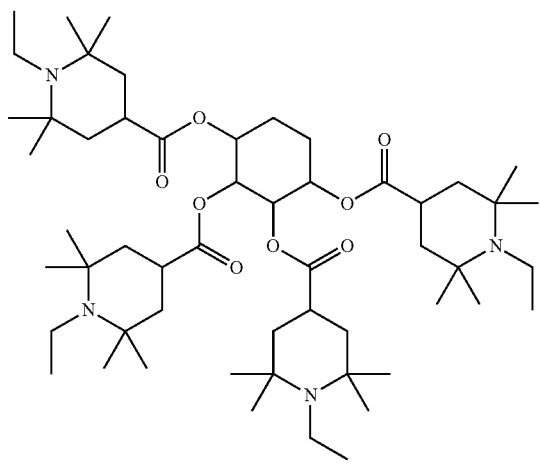 |
| 237 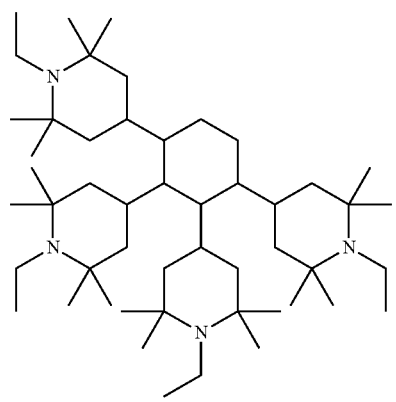 |

-continued
| No. | |
|---|---|
| 238 | 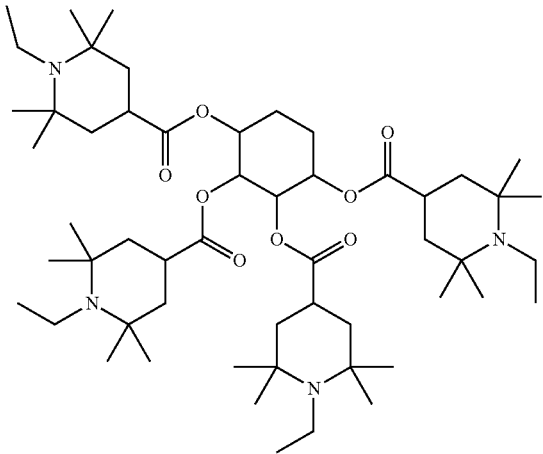 [SMILES: CCN1C(C)(C)CC(C(=O)OC2CCC(OC(=O)C3CC(C)(C)N(CC)C(C)(C)C3)C(OC(=O)C3CC(C)(C)N(CC)C(C)(C)C3)C2OC(=O)C2CC(C)(C)N(CC)C(C)(C)C2)CC1(C)C] |
| 239 | 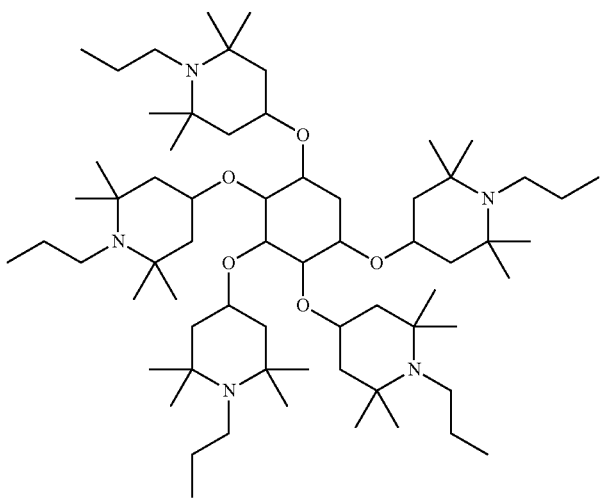 [SMILES: CCCN1C(C)(C)CC(OC2CC(OC3CC(C)(C)N(CCC)C(C)(C)C3)C(OC3CC(C)(C)N(CCC)C(C)(C)C3)C(OC3CC(C)(C)N(CCC)C(C)(C)C3)C2OC2CC(C)(C)N(CCC)C(C)(C)C2)CC1(C)C] |
| 240 | 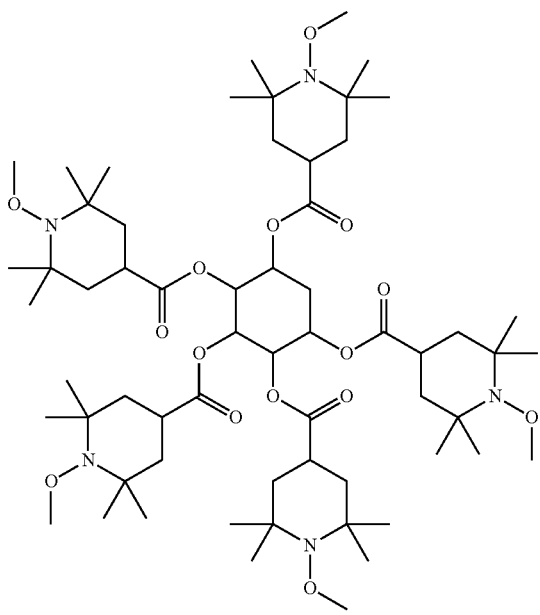 |

-continued
| No. |
|---|
| 241 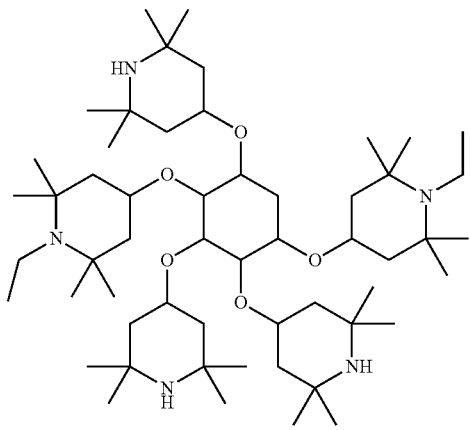 [SMILES: CCN1C(C)(C)CC(OC2CC(OC3CC(C)(C)NC(C)(C)C3)C(OC3CC(C)(C)N(CC)C(C)(C)C3)C(OC3CC(C)(C)NC(C)(C)C3)C2OC2CC(C)(C)NC(C)(C)C2)CC1(C)C] |
| 242 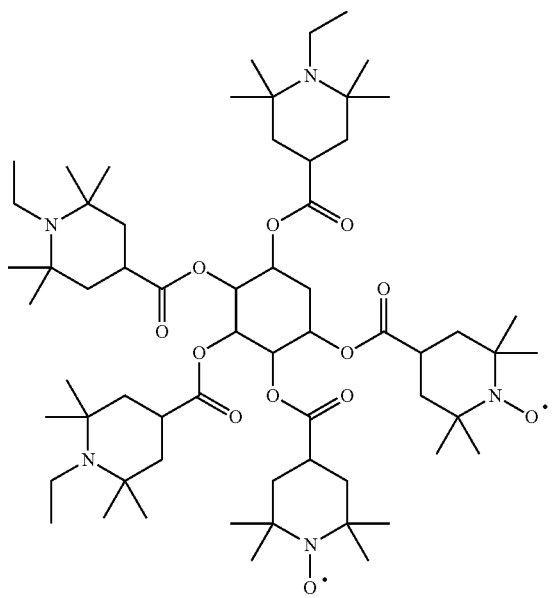 |
| 243 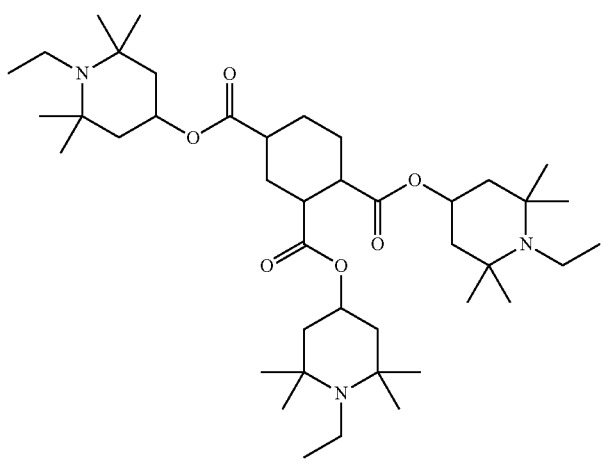 [SMILES: CCN1C(C)(C)CC(OC(=O)C2CCC(C(=O)OC3CC(C)(C)N(CC)C(C)(C)C3)C(C(=O)OC3CC(C)(C)N(CC)C(C)(C)C3)C2)CC1(C)C] |

| No. |
|---|
| 244 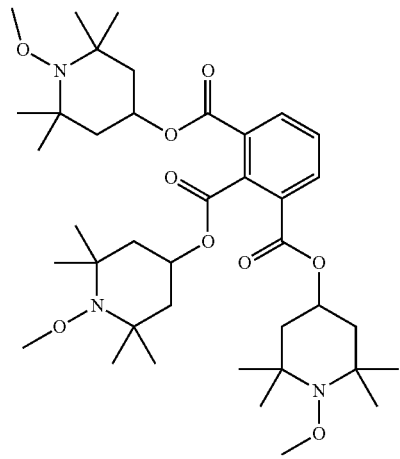 |
| 245 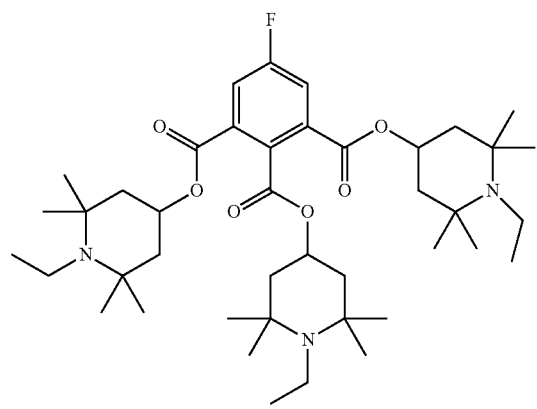 [SMILES: CCN1C(C)(C)CC(OC(=O)c2cc(F)cc(C(=O)OC3CC(C)(C)N(CC)C(C)(C)C3)c2C(=O)OC2CC(C)(C)N(CC)C(C)(C)C2)CC1(C)C] |
| 246 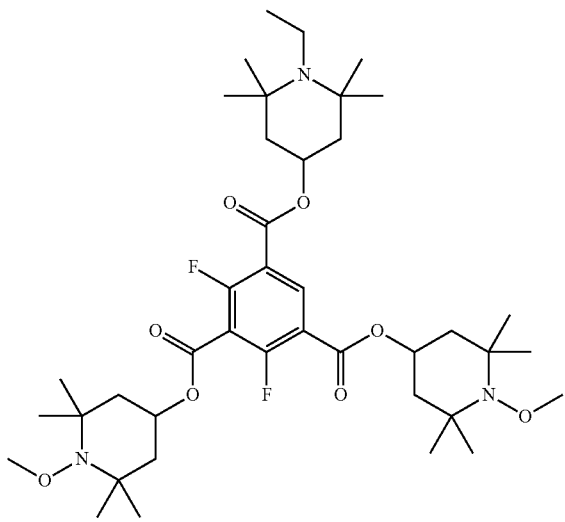 |

| No. |
|---|
| 247 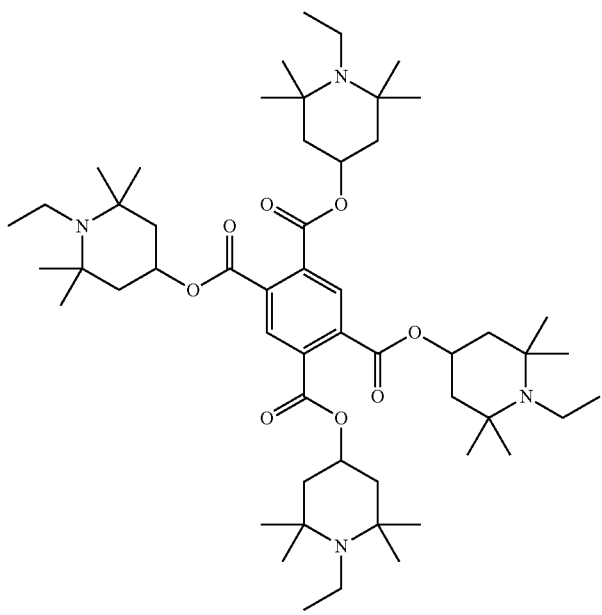 [SMILES: CCN1C(C)(C)CC(OC(=O)c2cc(C(=O)OC3CC(C)(C)N(CC)C(C)(C)C3)c(C(=O)OC3CC(C)(C)N(CC)C(C)(C)C3)cc2C(=O)OC2CC(C)(C)N(CC)C(C)(C)C2)CC1(C)C] |
| 248 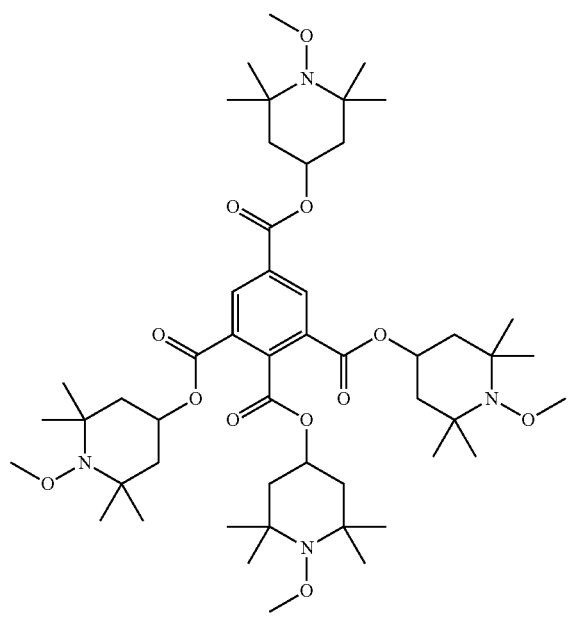 |

| No. | |
|---|---|
| 249 | 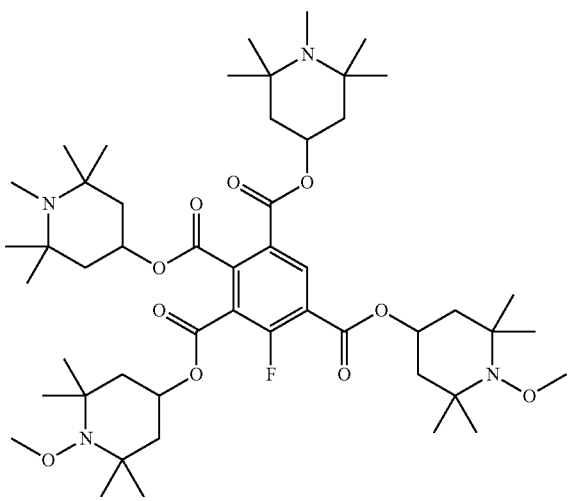 |
| 250 | 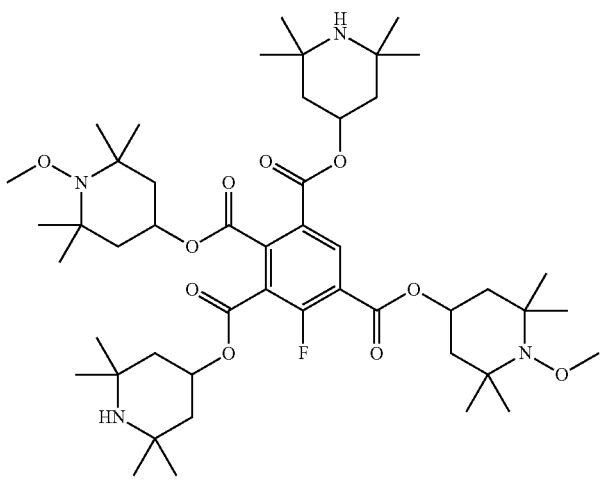 |

3. Examples of Composition

The disclosure will be described in further detail with reference to usage examples. The disclosure is not limited to these usage examples. The disclosure includes a mixture of a composition of Usage Example 1 and a composition of Usage Example 2. The disclosure also includes a mixture in which at least two of compositions of the usage examples are mixed. Compounds in examples (including usage examples) are indicated by symbols based on definitions of the following Table 4. In Table 4, the configuration related to 1,4-cyclohexylene is trans. In examples, a number in parentheses after a symbol represents a chemical formula to which the compound belongs. The symbol (–) refers to other liquid crystalline compounds. A proportion of the liquid crystalline compound is a weight percentage (weight %). Finally, values of properties of the liquid crystal composition are summarized. The properties were measured according to the methods described above and measured values (without extrapolation) are shown without change.

TABLE 4

Method of representing compound using symbols
$R—(A_1)—Z_1—\ldots Z_n—(A_n)—R'$

| 1) Left terminal group R— | symbols |
|---|---|
| $C_nH_{2n+1}—$ | n- |
| $C_nH_{2n+1}O—$ | nO— |
| $C_mH_{2m+1}OC_nH_{2n}$ | mOn |
| $CH_2=CH—$ | V— |
| $C_nH_{2n+1}—CH=CH—$ | nV— |
| $CH_2=CH—C_nH_{2n}—$ | Vn— |
| $C_mH_{2m+1}—CH=CH—C_nH_{2n}—$ | mVn— |
| $CF_2=CH—$ | VFF— |
| $CF_2=CH—C_nH_{2n}—$ | VFFn— |

| 2) Right terminal group —R' | symbols |
|---|---|
| $—C_nH_{2n+1}$ | -n |
| $—OC_nH_{2n+1}$ | —On |
| $—COOCH_3$ | —EMe |
| $—CH=CH_2$ | —V |
| $—CH=CH—C_nH_{2n+1}$ | —Vn |
| $—C_nH_{2n}—CH=CH_2$ | —nV |
| $—C_mH_{2m}—CH=CH—C_nH_{2n+1}$ | —mVn |

TABLE 4-continued

| | |
|---|---|
| —CH=CF₂ | —VFF |
| —F | —F |
| —Cl | —CL |
| —OCF₃ | —OCF3 |
| —OCF₂H | —OCF2H |
| —CF₃ | —CF3 |
| —OCH=CH—CF₃ | —OVCF3 |
| —C≡N | —C |

| 3) Bond group —Z$_n$— | symbols |
|---|---|
| —C$_n$H$_{2n}$— | n |
| —COO— | E |
| —CH=CH— | V |
| —CH₂O— | 1O |
| —OCH₂— | O1 |
| —CF₂O— | X |
| —C≡C— | T |

| 4) Ring structure —A$_o$— | symbols |
|---|---|
|  | H |
|  | B |
| 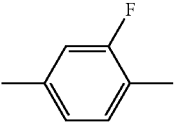 | B(F) |
| 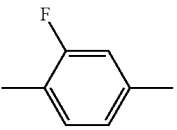 | B(2F) |
| 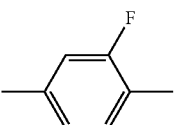 | B(F, F) |
| 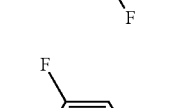 | B(2F, 5F) |
| 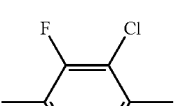 | B(2F, 3Cl) |
| 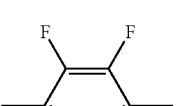 | B(2F, 3F) |
| 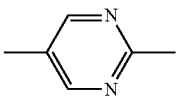 | Py |
| 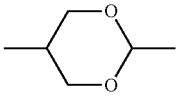 | G |
| 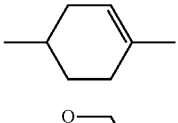 | Ch |
| 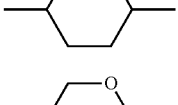 | Dh |
| 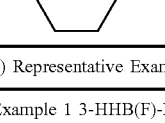 | dh |

5) Representative Examples

Example 1 3-HHB(F)-F

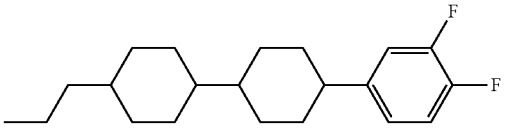 [SMILES: CCCC1CCC(C2CCC(c3ccc(F)c(F)c3)CC2)CC1]

Example 2 4-H2HB(F, F)-F

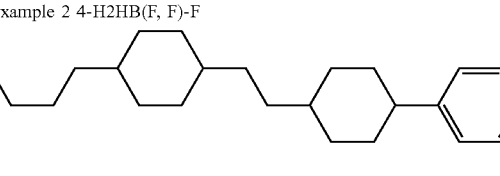

Example 3 3-HB-O2

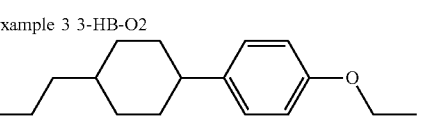

Example 4 3-HB-C

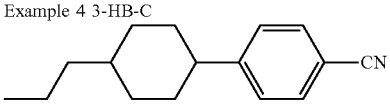

Usage Example 1

| | | |
|---|---|---|
| 1-BB-3 | (2-8) | 7% |
| 1-BB-5 | (2-8) | 8% |
| 2-BTB-1 | (2-10) | 3% |
| 3-HHB-1 | (3-1) | 8% |
| 3-HHB-3 | (3-1) | 12% |
| 3-HHB-O1 | (3-1) | 5% |
| 3-HHB-F | (22-1) | 4% |
| 2-HHB(F)-F | (22-2) | 7% |
| 3-HHB(F)-F | (22-2) | 7% |
| 5-HHB(F)-F | (22-2) | 7% |
| 3-HHB(F,F)-F | (22-3) | 5% |
| 3-HHEB-F | (22-10) | 6% |
| 5-HHEB-F | (22-10) | 4% |
| 2-HB-C | (24-1) | 5% |
| 3-HB-C | (24-1) | 12% |

The following Compound (No. 137) in a proportion of 0.1 weight % was added to the above composition.

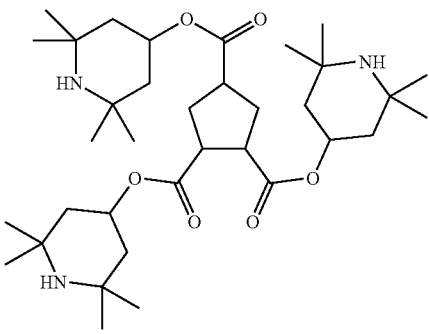
(No. 137)

NI=97.7° C.; η=17.9 mPa·s; Δn=0.109; Δε=4.9.

Usage Example 2

| 3-HH-4 | (2-1) | 13% |
| 7-HB-1 | (2-5) | 3% |
| 5-HB-O2 | (2-5) | 5% |
| 5-HBB(F)B-2 | (4-5) | 5% |
| 5-HBB(F)B-3 | (4-5) | 5% |
| 3-HB-CL | (21-2) | 10% |
| 3-HHB(F,F)-F | (22-3) | 4% |
| 3-HBB(F,F)-F | (22-4) | 30% |
| 5-HBB(F,F)-F | (22-4) | 25% |

The following Compound (No. 142) in a proportion of 0.03 weight % was added to the above composition.

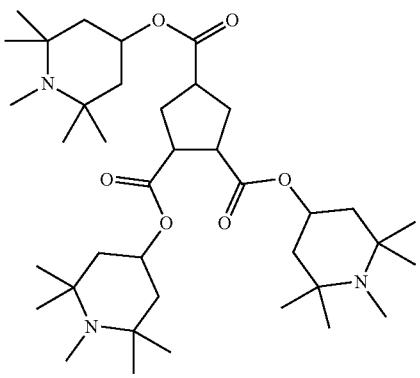
(No. 142)

NI=72.5° C.; η=20.4 mPa·s; ΔN=0.113; Δε=5.8.

Usage Example 3

| 1V2-HH-1 | (2-1) | 3% |
| 1V2-HH-3 | (2-1) | 4% |
| 7-HB(F,F)-F | (21-4) | 3% |
| 2-HHB(F)-F | (22-2) | 11% |
| 3-HHB(F)-F | (22-2) | 11% |
| 5-HHB(F)-F | (22-2) | 10% |
| 2-HBB-F | (22-22) | 4% |
| 3-HBB-F | (22-22) | 4% |
| 5-HBB-F | (22-22) | 3% |
| 2-HBB(F)-F | (22-23) | 9% |
| 3-HBB(F)-F | (22-23) | 9% |
| 5-HBB(F)-F | (22-23) | 13% |
| 3-HBB(F,F)-F | (22-24) | 6% |
| 5-HBB(F,F)-F | (22-24) | 10% |

The following Compound (No. 138) in a proportion of 0.03 weight % was added to the above composition.

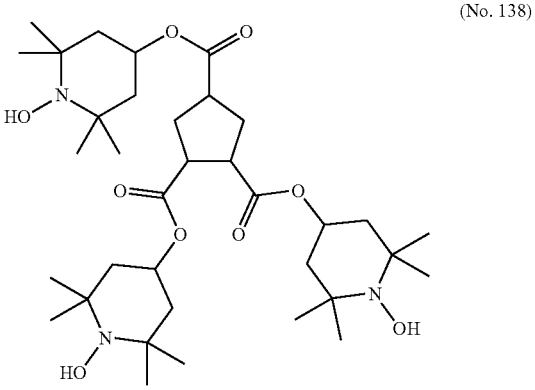
(No. 138)

NI=84.5° C.; η=25.2 mPa·s; Δn=0.110; Δε=5.7.

Usage Example 4

| 2-HH-3 | (2-1) | 4% |
| 3-HH-4 | (2-1) | 10% |
| 1O1-HBBH-5 | (4-1) | 3% |
| 5-HB-CL | (21-2) | 15% |
| 3-HHB-F | (22-1) | 5% |
| 3-HHB-CL | (22-1) | 3% |
| 4-HHB-CL | (22-1) | 4% |
| 3-HHB(F)-F | (22-2) | 10% |
| 4-HHB(F)-F | (22-2) | 9% |
| 5-HHB(F)-F | (22-2) | 9% |
| 7-HHB(F)-F | (22-2) | 8% |
| 5-HBB(F)-F | (22-23) | 4% |
| 3-HHBB(F,F)-F | (23-6) | 2% |
| 4-HHBB(F,F)-F | (23-6) | 3% |
| 5-HHBB(F,F)-F | (23-6) | 3% |
| 3-HH2BB(F,F)-F | (23-15) | 4% |
| 4-HH2BB(F,F)-F | (23-15) | 4% |

The following Compound (No. 143) in a proportion of 0.03 weight % was added to the above composition.

(No. 143)

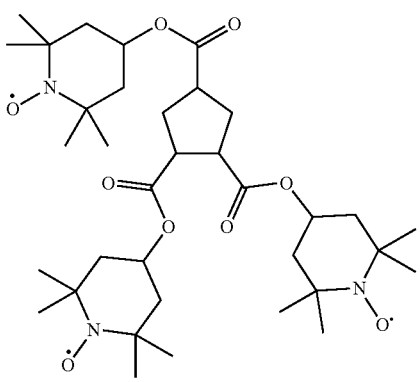

NI=116.9° C.; η=20.6 mPa·s; Δn=0.093; Δε=4.0.

Usage Example 5

| V-HBB-2 | (3-4) | 8% |
| 1O1-HBBH-4 | (4-1) | 5% |
| 1O1-HBBH-5 | (4-1) | 4% |
| 3-HHB(F,F)-F | (22-3) | 9% |
| 3-H2HB(F,F)-F | (22-15) | 8% |
| 4-H2HB(F,F)-F | (22-15) | 8% |
| 5-H2HB(F,F)-F | (22-15) | 8% |
| 3-HBB(F,F)-F | (22-24) | 12% |
| 5-HBB(F,F)-F | (22-24) | 20% |
| 3-H2BB(F,F)-F | (22-27) | 10% |
| 5-HHBB(F,F)-F | (23-6) | 3% |
| 3-HH2BB(F,F)-F | (23-15) | 3% |
| 5-HHEBB-F | (23-17) | 2% |

The following Compound (No. 137) in a proportion of 0.05 weight % was added to the above composition.

(No. 137)

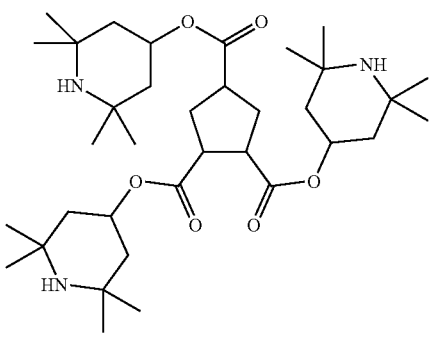

NI=106.6° C.; η=33.3 mPa·s; Δn=0.122; Δε=8.3.

Usage Example 6

| 5-HBBH-3 | (4-1) | 4% |
| 3-HB(F)BH-3 | (4-2) | 3% |
| 5-HB-F | (21-2) | 12% |
| 6-HB-F | (21-2) | 9% |
| 7-HB-F | (21-2) | 7% |
| 2-HHB-OCF3 | (22-1) | 7% |
| 3-HHB-OCF3 | (22-1) | 7% |
| 4-HHB-OCF3 | (22-1) | 7% |

-continued

| 5-HHB-OCF3 | (22-1) | 6% |
| 3-HHB(F,F)-OCF2H | (22-3) | 4% |
| 3-HHB(F,F)-OCF3 | (22-3) | 5% |
| 3-HH2B-OCF3 | (22-4) | 5% |
| 5-HH2B-OCF3 | (22-4) | 4% |
| 3-HH2B(F)-F | (22-5) | 3% |
| 3-HBB(F)-F | (22-23) | 10% |
| 5-HBB(F)-F | (22-23) | 7% |

The following Compound (No. 142) in a proportion of 0.05 weight % was added to the above composition.

(No. 142)

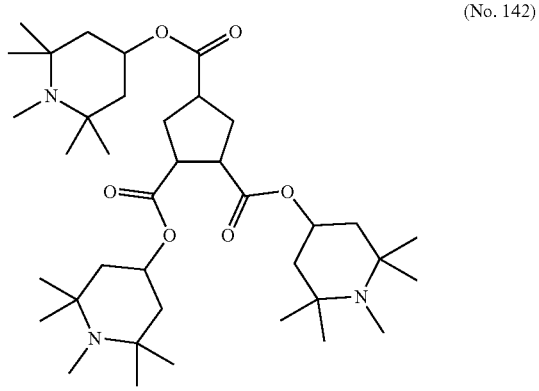

NI=87.4° C.; η=15.0 mPa·s; Δn=0.091; Δε=4.4.

Usage Example 7

| 2-HH-5 | (2-1) | 5% |
| 3-HH-4 | (2-1) | 4% |
| 5-B(F)BB-2 | (3-8) | 6% |
| 5-HB-CL | (21-2) | 11% |
| 3-HHB(F,F)-F | (22-3) | 8% |
| 3-HHEB(F,F)-F | (22-12) | 10% |
| 4-HHEB(F,F)-F | (22-12) | 3% |
| 5-HHEB(F,F)-F | (22-12) | 2% |
| 3-HBB(F,F)-F | (22-24) | 20% |
| 5-HBB(F,F)-F | (22-24) | 15% |
| 2-HBEB(F,F)-F | (22-39) | 3% |
| 3-HBEB(F,F)-F | (22-39) | 5% |
| 5-HBEB(F,F)-F | (22-39) | 3% |
| 3-HHBB(F,F)-F | (23-6) | 5% |

The following Compound (No. 138) in a proportion of 0.05 weight % was added to the above composition.

(No. 138)

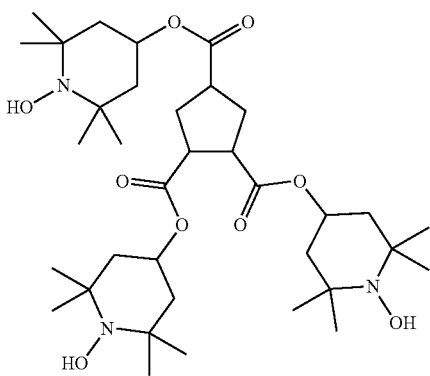

NI=76.0° C.; η=22.2 mPa·s; Δn=0.111; Δε=8.3.

Usage Example 8

| V2-HHB-1 | (3-1) | 6% |
| 3-HB-CL | (21-2) | 5% |
| 5-HB-CL | (21-2) | 4% |
| 3-HHB-OCF3 | (22-1) | 4% |
| 5-HHB(F)-F | (22-2) | 4% |
| V-HHB(F)-F | (22-2) | 5% |
| 3-H2HB-OCF3 | (22-13) | 5% |
| 5-H2HB(F,F)-F | (22-15) | 5% |
| 5-H4HB-OCF3 | (22-19) | 15% |
| 3-H4HB(F,F)-CF3 | (22-21) | 8% |
| 5-H4HB(F,F)-F | (22-21) | 7% |
| 5-H4HB(F,F)-CF3 | (22-21) | 10% |
| 2-H2BB(F)-F | (22-26) | 5% |
| 3-H2BB(F)-F | (22-26) | 11% |
| 3-HBEB(F,F)-F | (22-39) | 6% |

The following Compound (No. 143) in a proportion of 0.05 weight % was added to the above composition.

(No. 143)

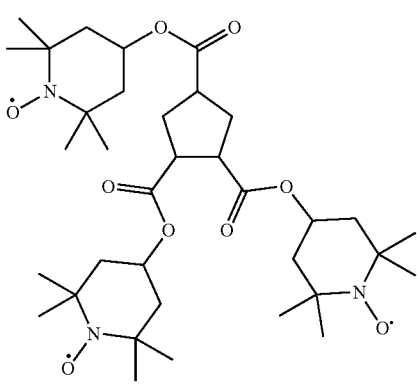

NI=73.6° C.; η=25.5 mPa·s; Δn=0.100; Δε=8.3.

Usage Example 9

| 3-HH-4 | (2-1) | 8% |
| 3-HH-5 | (2-1) | 5% |
| 3-HB-O2 | (2-5) | 15% |
| 3-HHB-1 | (3-1) | 9% |

-continued

| 3-HHB-O1 | (3-1) | 5% |
| 5-HB-CL | (21-2) | 15% |
| 7-HB(F,F)-F | (21-4) | 4% |
| 2-HHB(F)-F | (22-2) | 7% |
| 3-HHB(F)-F | (22-2) | 7% |
| 5-HHB(F)-F | (22-2) | 8% |
| 3-HHB(F,F)-F | (22-3) | 6% |
| 3-H2HB(F,F)-F | (22-15) | 5% |
| 4-H2HB(F,F)-F | (22-15) | 6% |

The following Compound (No. 137) in a proportion of 0.3 weight % was added to the above composition.

(No. 137)

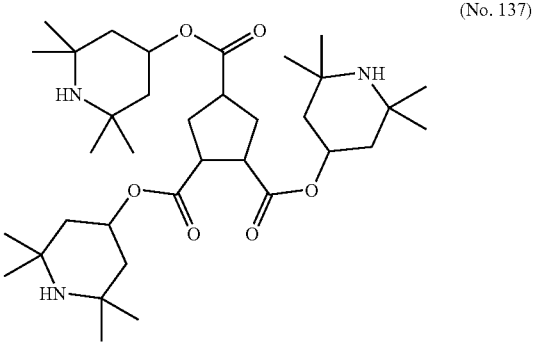

NI=72.4° C.; η=14.8 mPa·s; Δn=0.074; Δε=2.9.

Usage Example 10

| 3-HH-4 | (2-1) | 9% |
| 3-HH-5 | (2-1) | 9% |
| 5-HB-O2 | (2-5) | 12% |
| 5-HB-CL | (21-2) | 3% |
| 7-HB(F)-F | (21-3) | 7% |
| 2-HHB(F,F)-F | (22-3) | 4% |
| 3-HHB(F,F)-F | (22-3) | 5% |
| 3-HHEB-F | (22-10) | 8% |
| 5-HHEB-F | (22-10) | 8% |
| 3-HHEB(F,F)-F | (22-12) | 10% |
| 4-HHEB(F,F)-F | (22-12) | 5% |
| 3-GHB(F,F)-F | (22-109) | 6% |
| 4-GHB(F,F)-F | (22-109) | 6% |
| 5-GHB(F,F)-F | (22-109) | 8% |

The following Compound (No. 142) in a proportion of 0.1 weight % was added to the above composition.

(No. 142)

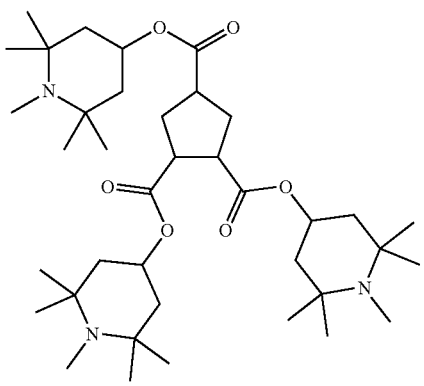

NI=72.0° C.; η=21.0 mPa·s; Δn=0.066; Δε=6.8.

Usage Example 11

| | | |
|---|---|---|
| 3-HH-VFF | (2-1) | 5% |
| 5-HH-VFF | (2-1) | 23% |
| 2-BTB-1 | (2-10) | 10% |
| 3-HHB-1 | (3-1) | 5% |
| VFF-HHB-1 | (3-1) | 9% |
| VFF2-HHB-1 | (3-1) | 11% |
| 3-H2BTB-2 | (3-17) | 5% |
| 3-H2BTB-3 | (3-17) | 4% |
| 3-H2BTB-4 | (3-17) | 3% |
| 3-HB-C | (24-1) | 18% |
| 1V2-BEB(F,F)-C | (24-15) | 7% |

The following Compound (No. 138) in a proportion of 0.1 weight % was added to the above composition.

(No. 138)

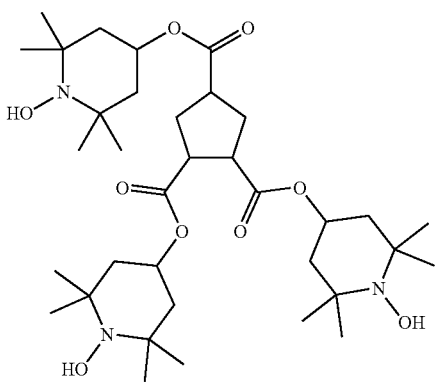

NI=81.5° C.; η=12.1 mPa·s; Δn=0.131; Δε=7.3.

A compound of the disclosure is beneficial as a light stabilizer. A liquid crystal composition containing the compound can be widely used for a liquid crystal display element used in a computer monitor, a television, and the like.

What is claimed is:

1. A compound represented by any one of Formula (1a) to Formula (1m):

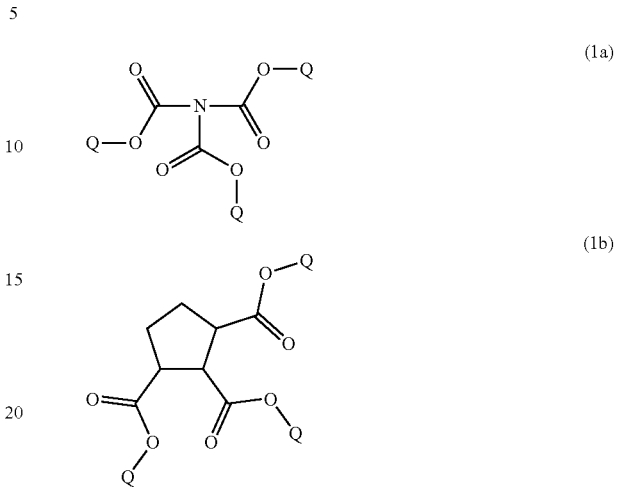

-continued (1g) 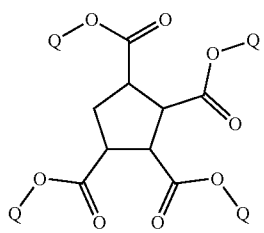

(1h) 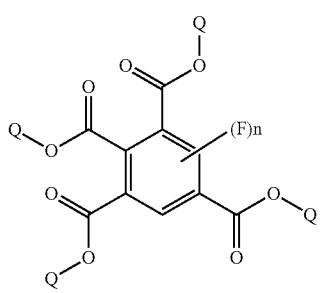

(1i) 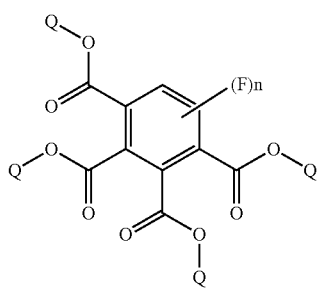

(1j) 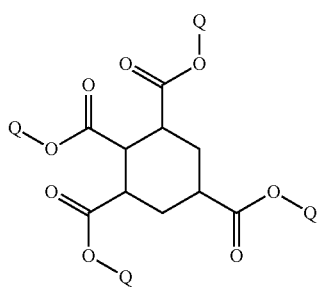

(1k) 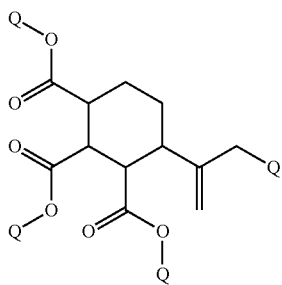

-continued (1l) 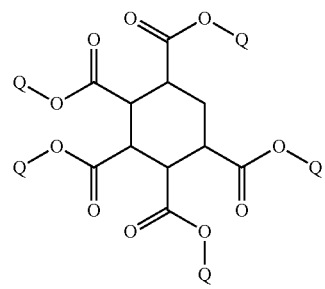

(1m) 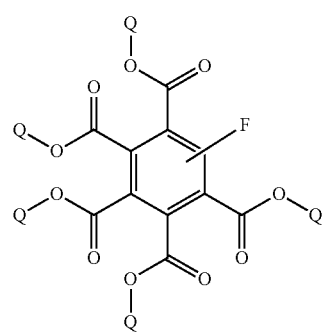

in Formula (1a) to Formula (1e) and Formula (1g) to Formula (1m), n is 0 or 1, in Formula (1f), n is 1; and Q is a monovalent group represented by Formula (Q-1), (Q-1) 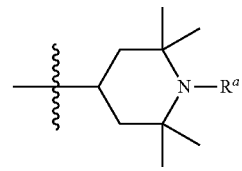

in Formula (Q-1), $R^a$ is a hydrogen atom, —O., —OH, or —$R^1$, and here $R^1$ is an alkyl group having 1 to 10 carbon atoms or an alkenyl group having 2 to 10 carbon atoms, and in this alkyl or alkenyl group, one —$CH_2$— is optionally substituted with —O—, —CO—, —COO—, or —OCO—, a terminal group (—$CH_3$) is optionally substituted with —$NHR^2$ or —$NR^3R^4$, and here $R^2$, $R^3$, and $R^4$ are an alkyl group having 1 to 10 carbon atoms.

2. The compound according to claim 1, which is represented by any one of Formula (1a) to Formula (1j), wherein, in Formula (1a) to Formula (1e) and Formula (1g) to Formula (1j), n is 0 or 1, in Formula (1f), n is 1; and Q is a monovalent group represented by Formula (Q-1), (Q-1) 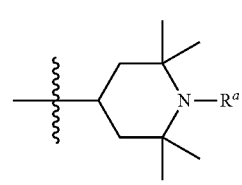

in Formula (Q-1), $R^a$ is a hydrogen atom, —O., —OH, an alkyl group having 1 to 10 carbon atoms, or an alkoxy group having 1 to 10 carbon atoms.

3. The compound according to claim 1, which is represented by any one of Formula (1a), Formula (1b), Formula (1c), Formula (1g), Formula (1j), and Formula (1k), wherein, in Formula (1a), Formula (1b), Formula (1c), Formula (1g), Formula (1j), and Formula (1k), (1a)
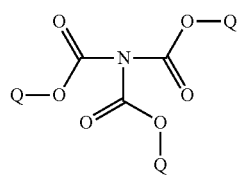

(1b)
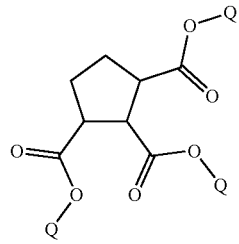

(1c)
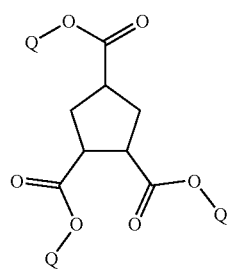

(1g)
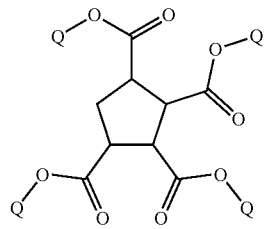

(1j)
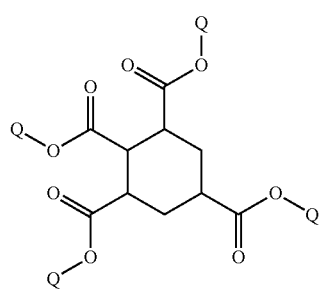

(1k)
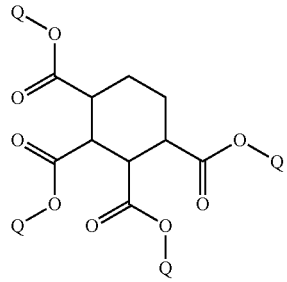

Q is a monovalent group represented by Formula (Q-1), (Q-1)
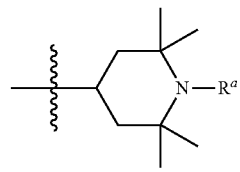

in Formula (Q-1), $R^a$ is a hydrogen atom or an alkyl group having 1 to 10 carbon atoms.

4. The compound according to claim 1, which is represented by Formula (1a-1), Formula (1b-1), Formula (1c-1), Formula (1g-1), Formula (1j-1), or Formula (1k-1):

(1a-1)
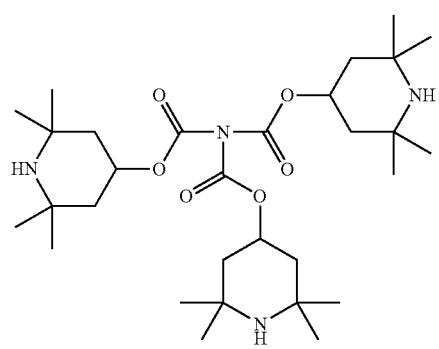

(1b-1)
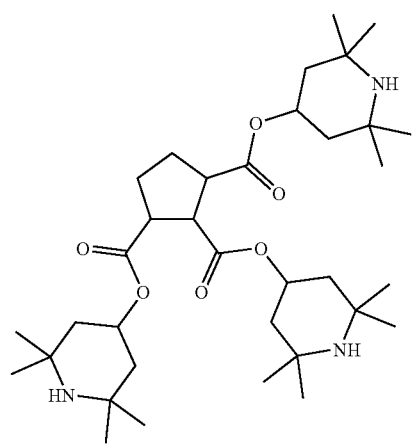

-continued

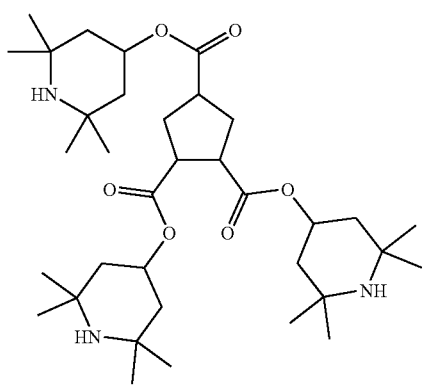
(1c-1)

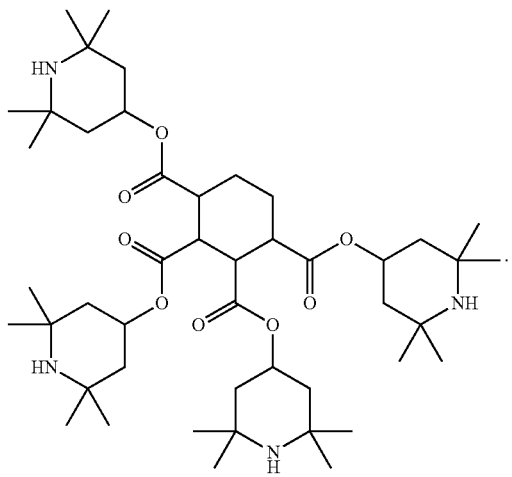
(1k-1)

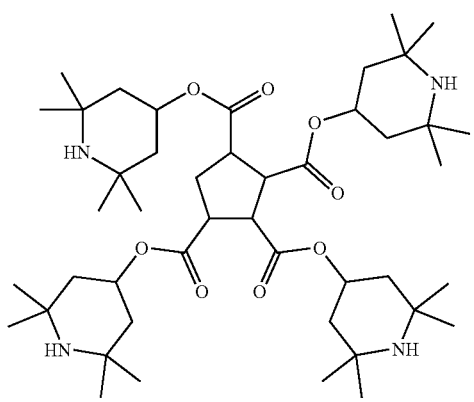
(1g-1)

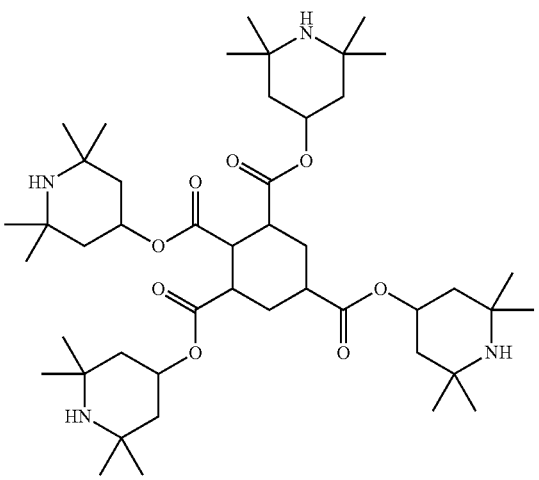
(1j-1)

5. A liquid crystal composition comprising at least one compound according to claim 1.

6. The liquid crystal composition according to claim 5, further comprising at least one compound selected from the group of compounds represented by Formula (2) to Formula (4):

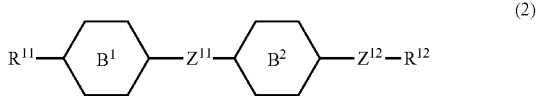
(2)

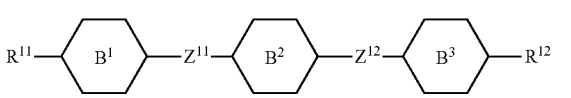
(3)

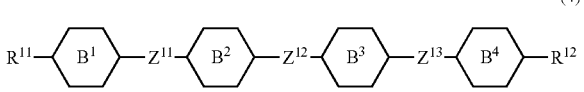
(4)

in Formula (2) to Formula (4), $R^{11}$ and $R^{12}$ are an alkyl group having 1 to 10 carbon atoms or an alkenyl group having 2 to 10 carbon atoms, and in these alkyl and alkenyl groups, at least one —$CH_2$— is optionally substituted with —O—, and in these groups, at least one hydrogen atom is optionally substituted with a fluorine atom;

the ring $B^1$, the ring $B^2$, the ring $B^3$, and the ring $B^4$ are independently 1,4-cyclohexylene, 1,4-phenylene, 2-fluoro-1,4-phenylene, 2,5-difluoro-1,4-phenylene, or pyrimidine-2,5-diyl; and $Z^{11}$, $Z^{12}$, and $Z^{13}$ are independently a single bond, —COO—, —$CH_2CH_2$—, —CH=CH—, or —C≡C—.

7. The liquid crystal composition according to claim 5, further comprising at least one compound selected from the group of compounds represented by Formula (21) to Formula (23):

(21)

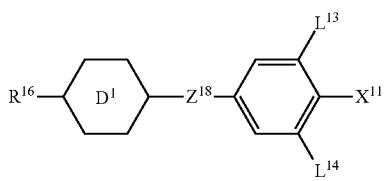

(22)

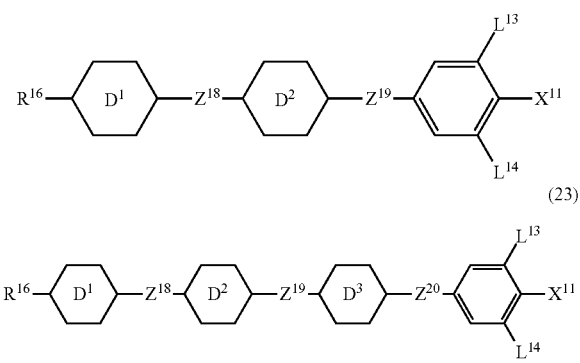

(23)

in Formulae (21) to (23),
  $R^{16}$ is an alkyl group having 1 to 10 carbon atoms or an alkenyl group having 2 to 10 carbon atoms, and in these alkyl and alkenyl groups, at least one —$CH_2$— is optionally substituted with —O—, and in these groups, at least one hydrogen atom is optionally substituted with a fluorine atom;
  $X^{11}$ is a fluorine atom, a chlorine atom, —$CF_3$, —$CHF_2$, —$CH_2F$, —$OCF_3$, —$OCHF_2$, —$OCF_2CHF_2$, or —$OCF_2CHFCF_3$;
  the ring $D^1$, the ring $D^2$, and the ring $D^3$ are independently 1,4-cyclohexylene, 1,4-phenylene in which at least one hydrogen atom is optionally substituted with a fluorine atom, tetrahydropyran-2,5-diyl, 1,3-dioxane-2,5-diyl, or pyrimidine-2,5-diyl;

$Z^{18}$, $Z^{19}$, and $Z^{20}$ are independently a single bond, —COO—, —$CH_2O$—, —$CF_2O$—, —$OCF_2$—, —$CH_2CH_2$—, —CH=CH—, —C≡C—, or —$(CH_2)_4$—; and
  $L^{13}$ and $L^{14}$ are independently a hydrogen atom or a fluorine atom.

8. The liquid crystal composition according to claim 5, further comprising at least one compound selected from the group of compounds represented by Formula (24):

(24)

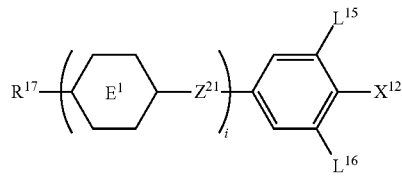

in Formula (24),
  $R^{17}$ is an alkyl group having 1 to 10 carbon atoms or an alkenyl group having 2 to 10 carbon atoms, and in these alkyl and alkenyl groups, at least one —$CH_2$— is optionally substituted with —O—, and in these groups, at least one hydrogen atom is optionally substituted with a fluorine atom;
  $X^{12}$ is —C≡N or —C≡C—C≡N;
  the ring $E^1$ is 1,4-cyclohexylene, 1,4-phenylene in which at least one hydrogen atom is optionally substituted with a fluorine atom, tetrahydropyran-2,5-diyl, 1,3-dioxane-2,5-diyl, or pyrimidine-2,5-diyl;
  $Z^{21}$ is a single bond, —COO—, —$CH_2O$—, —$CF_2O$—, —$OCF_2$—, —$CH_2CH_2$—, or —C≡C—;
  $L^{15}$ and $L^{16}$ are independently a hydrogen atom or a fluorine atom;
  i is 1, 2, 3, or 4.

9. The liquid crystal composition according to claim 5, further comprising at least one compound selected from the group of compounds represented by Formula (5) to Formula (13):

(5)

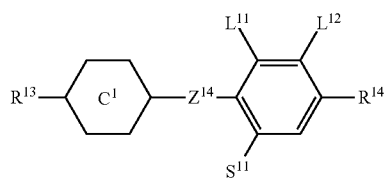

(6)

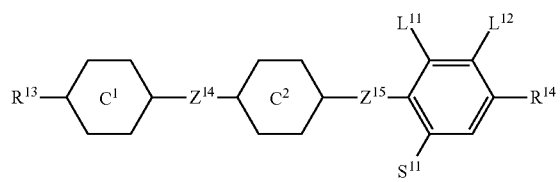

(7)

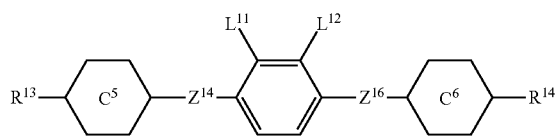

(8)

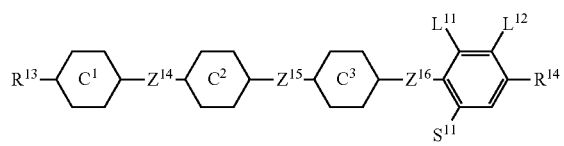

(9)

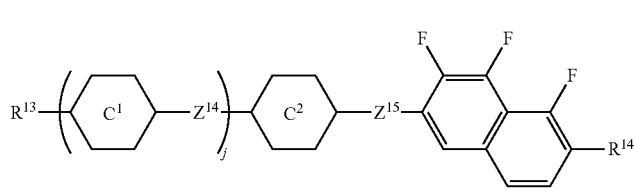

-continued

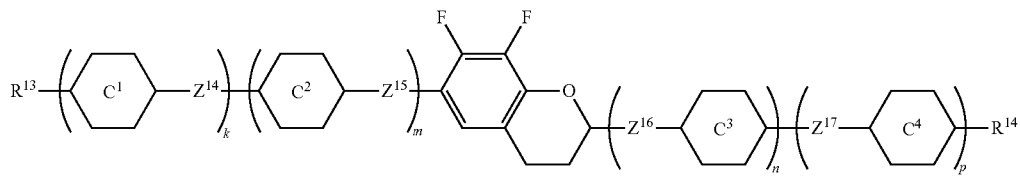
(10)

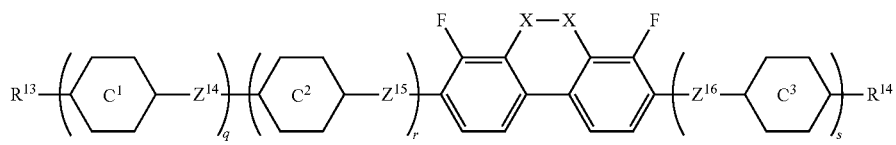
(11)

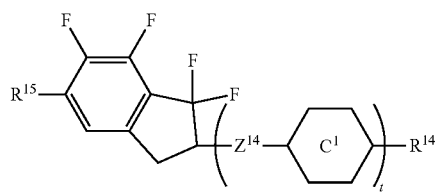
(12)

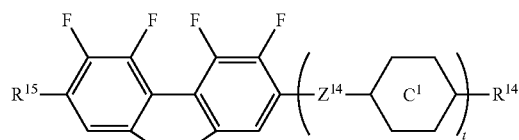
(13)

in Formulae (5) to (13), $R^{13}$, $R^{14}$ and $R^{15}$ are independently an alkyl group having 1 to 10 carbon atoms or an alkenyl group having 2 to 10 carbon atoms, and in these alkyl and alkenyl groups, at least one —CH$_2$— is optionally substituted with —O—, and in these groups, and at least one hydrogen atom is optionally substituted with a fluorine atom, and $R^{15}$ is a hydrogen atom or a fluorine atom;

the ring $C^1$, the ring $C^2$, the ring $C^3$, and the ring $C^4$ are independently 1,4-cyclohexylene, 1,4-cyclohexenylene, 1,4-phenylene in which at least one hydrogen atom is optionally substituted with a fluorine atom, tetrahydropyran-2,5-diyl, or decahydronaphthalene-2,6-diyl;

the ring $C^5$ and the ring $C^6$ are independently 1,4-cyclohexylene, 1,4-cyclohexenylene, 1,4-phenylene, tetrahydropyran-2,5-diyl, or decahydronaphthalene-2,6-diyl;

$Z^{14}$, $Z^{15}$, $Z^{16}$, and $Z^{17}$ are independently a single bond, —COO—, —CH$_2$O—, —OCF$_2$—, —CH$_2$CH$_2$—, or —OCF$_2$CH$_2$CH$_2$—;

$L^{11}$ and $L^{12}$ are independently a fluorine atom or a chlorine atom;

$S^{11}$ is a hydrogen atom or a methyl group;

X is —CHF— or —CF$_2$—; and j, k, m, n, p, q, r, and s are independently 0 or 1, a sum of k, m, n, and p is 1 or 2, and a sum of q, r, and s is 0, 1, 2, or 3, and t is 1, 2, or 3.

10. A liquid crystal display element comprising at least one liquid crystal composition according to claim 5.

11. The compound according to claim 3, which is represented by Formula (1a-1), Formula (1b-1), Formula (1c-1), Formula (1g-1), Formula (1j-1), or Formula (1k-1):

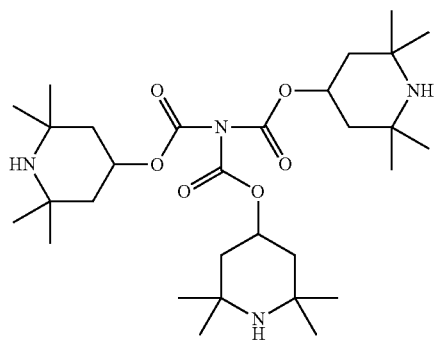
(1a-1)

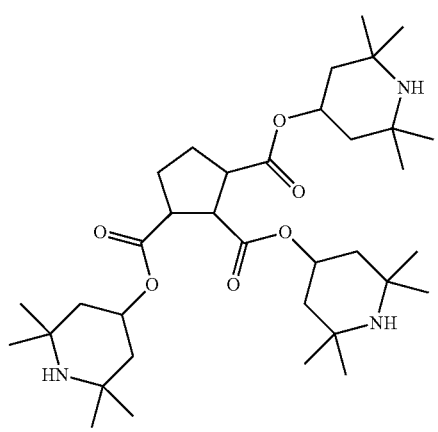
(1b-1)

(1c-1)
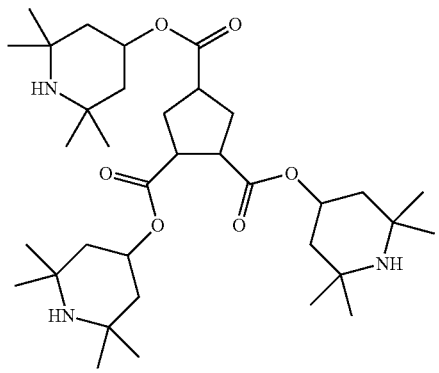
(1g-1)
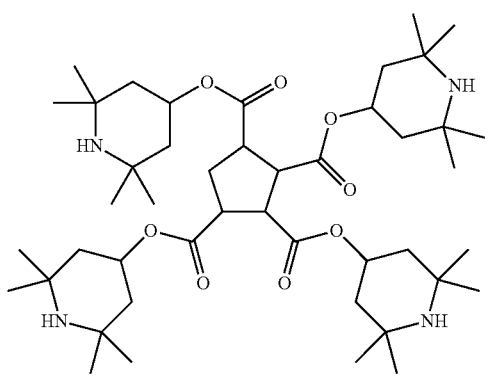
(1j-1)
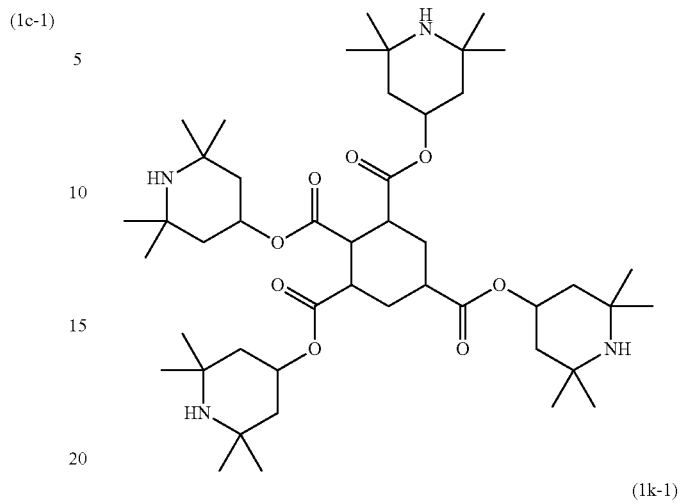
(1k-1)
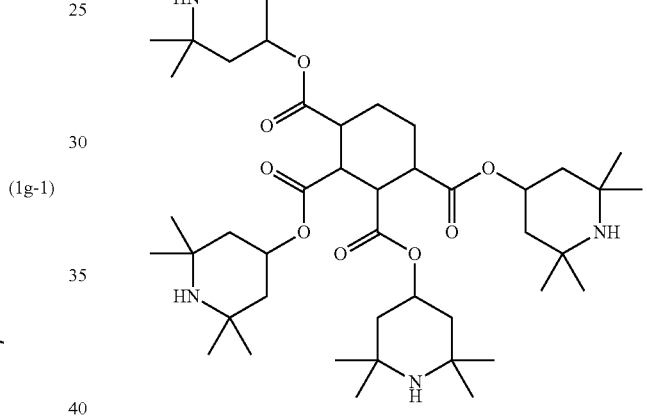
12. A liquid crystal composition comprising at least one compound according to claim 3.
13. A liquid crystal composition comprising at least one compound according to claim 4.
14. A liquid crystal composition comprising at least one compound according to claim 2.
* * * * *